US005559958A

United States Patent [19]

Farrand et al.

[11] Patent Number: 5,559,958

[45] Date of Patent: Sep. 24, 1996

[54] GRAPHICAL USER INTERFACE FOR COMPUTER MANAGEMENT SYSTEM AND AN ASSOCIATED MANAGEMENT INFORMATION BASE

[75] Inventors: Scott C. Farrand, Tomball; Jonathan R. Didner, Houston; Daniel J. Mazina, Spring; Jeffrey S. Autor, Houston; Paul J. Muraski, Spring; Gregory M. Stewart; John A. Dysart, both of Houston, all of Tex.

[73] Assignee: Compaq Computer Corporation, Houston, Tex.

[21] Appl. No.: 110,652

[22] Filed: Aug. 20, 1993

Related U.S. Application Data

[63] Continuation-in-part of Ser. No. 933,920, Aug. 21, 1992, Pat. No. 5,471,617, which is a continuation-in-part of Ser. No. 720,259, Jun. 24, 1991, abandoned.

[51] Int. Cl.[6] .......... G06F 11/30

[52] U.S. Cl. .......... 395/183.03; 395/183.22; 395/184.01; 395/200.1; 364/DIG. 7; 364/264

[58] Field of Search .......... 395/200.1, 200.11, 395/182.02, 600, 183.03, 183.22, 184.01

[56] References Cited

U.S. PATENT DOCUMENTS

| | | | |
|---|---|---|---|
| 4,937,825 | 6/1990 | Ballard et al. | 395/184.01 |
| 5,049,873 | 9/1991 | Robins et al. | 395/200.11 |
| 5,265,241 | 11/1993 | Arnold et al. | 395/200.1 |
| 5,276,863 | 1/1994 | Heider | 395/575 |
| 5,408,618 | 4/1995 | Aho et al. | 395/284 |

*Primary Examiner*—Thomas G. Black
*Assistant Examiner*—John C. Loomis
*Attorney, Agent, or Firm*—Hickman Beyer & Weaver

[57] ABSTRACT

A management system for a file server having a system board, an expansion board, a disk storage system and a server manager for collecting management information from the system board. The management system arranges MIB information for the file server into a first manageable device specific subsystem containing management information describing the system board, a second, manageable device specific, subsystem containing management information describing the expansion board, a third, manageable device specific, subsystem containing management information describing the disk storage system, a fourth, non-manageable device specific, subsystem containing management information describing the configuration of the file server, a fifth, non-manageable device specific, subsystem containing management information describing the security configuration for the file server, a sixth, manageable device specific, subsystem containing management information describing the server manager, a seventh, non-manageable device specific, subsystem containing management information describing I/O ports of the file server, an eighth, non-manageable device specific, subsystem containing management information describing internal environmental conditions of the file server. The management information for each of the first, second, third, fourth, fifth, sixth, seventh and eighth subsystems may then be selectively accessed using a series of GUIs.

32 Claims, 32 Drawing Sheets

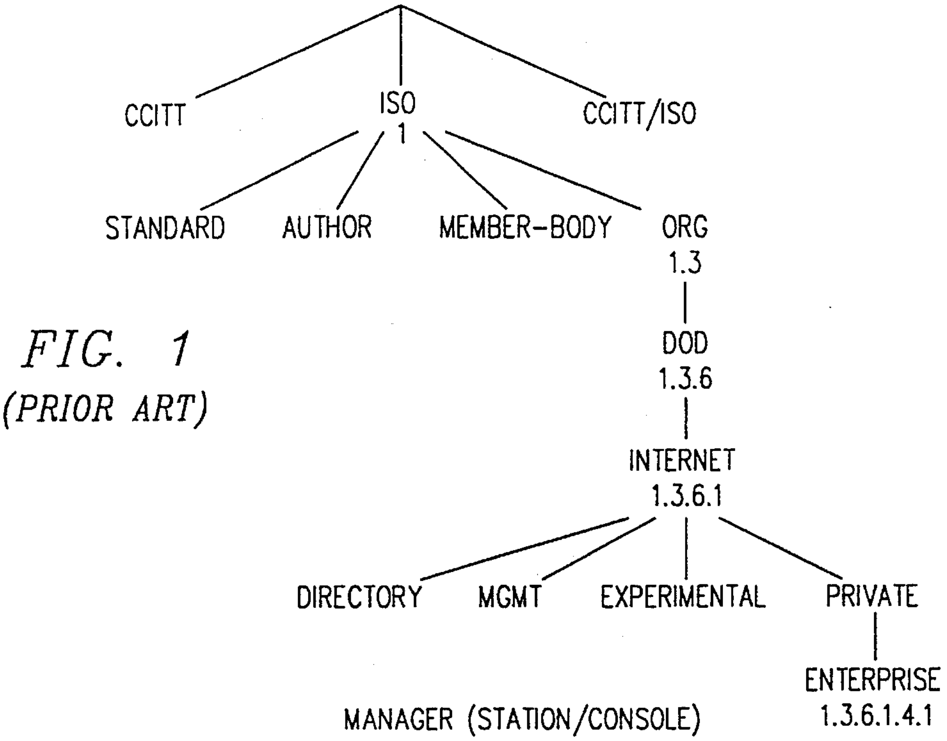
FIG. 1
(PRIOR ART)
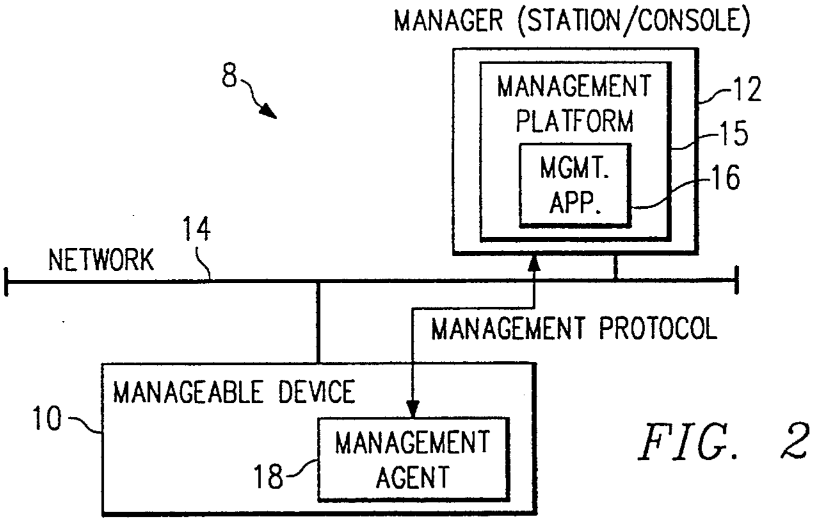
FIG. 2
FIG. 4A
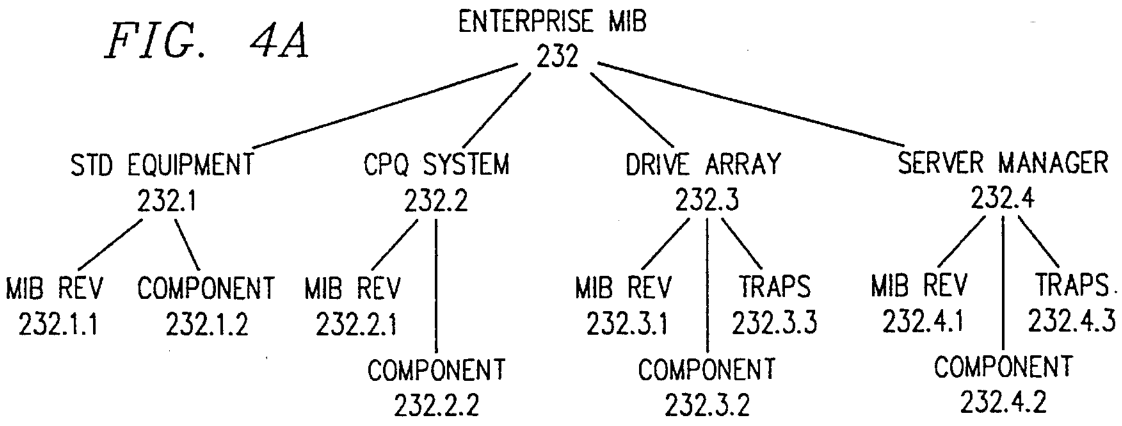

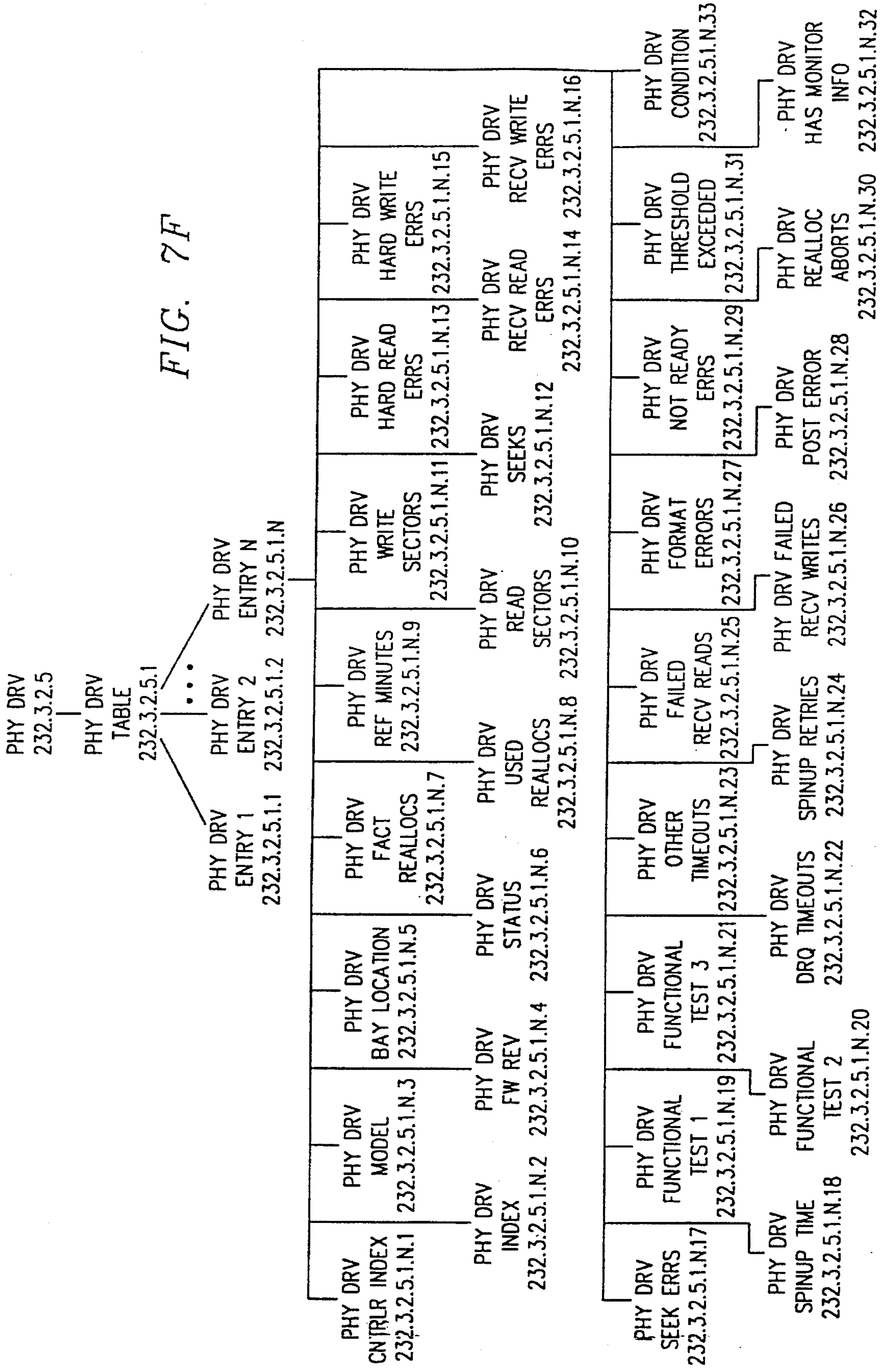

FIG. 7F

- PHY DRV 232.3.2.5
  - PHY DRV TABLE 232.3.2.5.1
    - PHY DRV ENTRY 1 232.3.2.5.1.1
    - PHY DRV ENTRY 2 232.3.2.5.1.2
    - ...
    - PHY DRV ENTRY N 232.3.2.5.1.N
      - PHY DRV CNTRLR INDEX 232.3.2.5.1.N.1
      - PHY DRV INDEX 232.3.2.5.1.N.2
      - PHY DRV MODEL 232.3.2.5.1.N.3
      - PHY DRV FW REV 232.3.2.5.1.N.4
      - PHY DRV BAY LOCATION 232.3.2.5.1.N.5
      - PHY DRV STATUS 232.3.2.5.1.N.6
      - PHY DRV FACT REALLOCS 232.3.2.5.1.N.7
      - PHY DRV USED REALLOCS 232.3.2.5.1.N.8
      - PHY DRV REF MINUTES 232.3.2.5.1.N.9
      - PHY DRV READ SECTORS 232.3.2.5.1.N.10
      - PHY DRV WRITE SECTORS 232.3.2.5.1.N.11
      - PHY DRV SEEKS 232.3.2.5.1.N.12
      - PHY DRV HARD READ ERRS 232.3.2.5.1.N.13
      - PHY DRV RECV READ ERRS 232.3.2.5.1.N.14
      - PHY DRV HARD WRITE ERRS 232.3.2.5.1.N.15
      - PHY DRV RECV WRITE ERRS 232.3.2.5.1.N.16
      - PHY DRV SEEK ERRS 232.3.2.5.1.N.17
      - PHY DRV SPINUP TIME 232.3.2.5.1.N.18
      - PHY DRV FUNCTIONAL TEST 1 232.3.2.5.1.N.19
      - PHY DRV FUNCTIONAL TEST 2 232.3.2.5.1.N.20
      - PHY DRV FUNCTIONAL TEST 3 232.3.2.5.1.N.21
      - PHY DRV DRQ TIMEOUTS 232.3.2.5.1.N.22
      - PHY DRV OTHER TIMEOUTS 232.3.2.5.1.N.23
      - PHY DRV SPINUP RETRIES 232.3.2.5.1.N.24
      - PHY DRV FAILED RECV READS 232.3.2.5.1.N.25
      - PHY DRV FAILED RECV WRITES 232.3.2.5.1.N.26
      - PHY DRV FORMAT ERRORS 232.3.2.5.1.N.27
      - PHY DRV POST ERROR 232.3.2.5.1.N.28
      - PHY DRV NOT READY ERRS 232.3.2.5.1.N.29
      - PHY DRV REALLOC ABORTS 232.3.2.5.1.N.30
      - PHY DRV THRESHOLD EXCEEDED 232.3.2.5.1.N.31
      - PHY DRV HAS MONITOR INFO 232.3.2.5.1.N.32
      - PHY DRV CONDITION 232.3.2.5.1.N.33

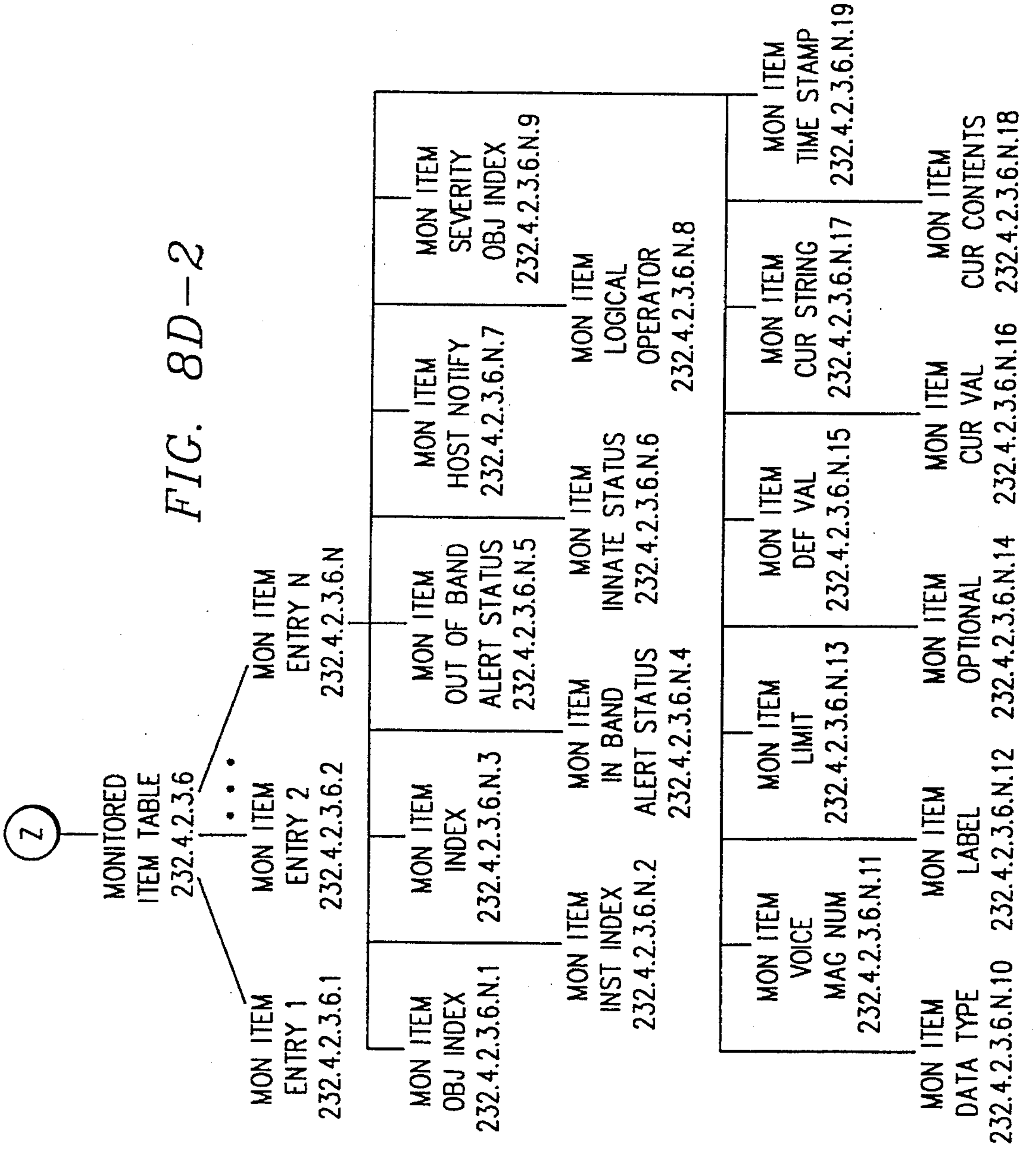

FIG. 8D-2

- MONITORED ITEM TABLE 232.4.2.3.6
  - MON ITEM ENTRY 1   232.4.2.3.6.1
  - MON ITEM ENTRY 2   232.4.2.3.6.2
  - ...
  - MON ITEM ENTRY N   232.4.2.3.6.N
    - MON ITEM OBJ INDEX   232.4.2.3.6.N.1
    - MON ITEM INST INDEX   232.4.2.3.6.N.2
    - MON ITEM INDEX   232.4.2.3.6.N.3
    - MON ITEM IN BAND ALERT STATUS   232.4.2.3.6.N.4
    - MON ITEM OUT OF BAND ALERT STATUS   232.4.2.3.6.N.5
    - MON ITEM INNATE STATUS   232.4.2.3.6.N.6
    - MON ITEM HOST NOTIFY   232.4.2.3.6.N.7
    - MON ITEM LOGICAL OPERATOR   232.4.2.3.6.N.8
    - MON ITEM SEVERITY OBJ INDEX   232.4.2.3.6.N.9
    - MON ITEM DATA TYPE   232.4.2.3.6.N.10
    - MON ITEM VOICE MAG NUM   232.4.2.3.6.N.11
    - MON ITEM LABEL   232.4.2.3.6.N.12
    - MON ITEM LIMIT   232.4.2.3.6.N.13
    - MON ITEM OPTIONAL   232.4.2.3.6.N.14
    - MON ITEM DEF VAL   232.4.2.3.6.N.15
    - MON ITEM CUR VAL   232.4.2.3.6.N.16
    - MON ITEM CUR STRING   232.4.2.3.6.N.17
    - MON ITEM CUR CONTENTS   232.4.2.3.6.N.18
    - MON ITEM TIME STAMP   232.4.2.3.6.N.19

(Z)

GRAPHICAL USER INTERFACE FOR COMPUTER MANAGEMENT SYSTEM AND AN ASSOCIATED MANAGEMENT INFORMATION BASE

CROSS REFERENCE TO RELATED APPLICATIONS

This application is a Continuation-in-Part of U.S. patent application Ser. No. 07/933,920, filed Aug. 21, 1992 and issued Nov. 28, 1995, as U.S. Pat. No. 5,471,617, entitled "Computer Management System and Associated Management Information Base", which is a Continuation-in-Part of U.S. patent application Ser. No. 07/720,259, filed Jun. 21, 1991 and issued Nov. 22, 1994 as U.S. Pat. No. 5,367,670, entitled "Computer System Manager". Both of these applications are assigned to the Assignee of the present application and are hereby incorporated by reference as if reproduced in their entirety.

This application is also related to the following pending U.S. patent applications, all of which are assigned to the Assignee of the present application and are hereby incorporated by reference as if reproduced in their entirety:

| Patent No. | Issue Date | Title |
|---|---|---|
| 5,402,431 | 03/28/95 | Innate Bus Monitoring System for Computer System Manager |
| 07/720,258 | 06/24/91 | In-band/Out-of-Band Alert Delivery System for Computer System Manager |
| 07/719,243 | 06/24/91 | Remote Console Emulator for Computer System Manager |
| 5,283,905 | 02/01/94 | Power Supply for Computer System Manager |
| 07/756,506 | 09/09/91 | Remote System Reboot |
| 5,257,384 | 10/26/93 | Asynchronous Protocol for Computer System Manager |
| 5,309,503 | 05/03/94 | Network Protocol for Computer System Manager |
| 5,272,382 | 12/21/93 | Power Supply for Computer System Manager |

A portion of the disclosure of this patent document contains material which is subject to copyright protection. The copyright owner has no objection to the facisimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The invention relates to a computer management system and, more particularly, to a computer management system having plural instrumentation agents for querying manageable devices to collect object data, an associated enterprise management information base (or "MIB") for storing object data in accordance with a specified MIB architecture and a graphical user interface (or "GUI") for managing the manageable devices using the enterprise MIB.

2. Description of Related Art

The Internet community has defined an organizational framework of data and provides a naming authority allowing any company or group to define information within the framework in a way that allows any or all of this data to coexist. Under the control of the International Telegraph and Telephone Consultative Committee (or "CCITT") and the International Organization for Standardization (or "ISO"), the organizational framework has been constructed as a tree. The root of the tree is managed by CCITT and ISO. Extending from the root of the tree are a series of branches defined by CCITT and ISO. However, while the branch is initially defined by the managing authority, authority for the branch may then be given to another organization for defining the child branches for that branch. FIG. 1 illustrates the structure of the organizational framework defined by the Internet community and is included here so that the relationship of the enterprise MIB subject of the present application and the remainder of the Internet community will be clear.

Every piece of information within the organizational framework is configured in a formal grammar and referred to by its full name so that it can be unambiguously specified, thereby making information transfers within an interoperable network system possible. A series of dotted decimal notations, each separated by periods, specifies all of the branches needed to reach a particular item. For example, all items originating in a private enterprise would be headed by the notation "1.3.6.1.4.1". From a specific private enterprise, an item would be identified using the name 1.3.6.1.4.1.XXX.YY where "XXX" is an identifier assigned to that enterprise by the ISO and "YY" is an identifier assigned to that particular item by enterprise "XXX" under the authority of the ISO.

Simple Network Management Protocol (or "SNMP") is a protocol widely used within the Internet community for interoperable network management The SNMP protocol defines a set of commands that a management application may use to retrieve or change the value of items that a management agent is making available. The Internet community also maintains a series of documents which describe the communication protocols used by the community. These documents are called "Request for Comments" and are commonly referred to as "RFCs". Each RFC is assigned a number to identify the document. For example, RFC 1212 defines the formal grammar for a SNMP MIB.

A MIB is a data base that describes a set of items that management applications and agents use to report and control managed devices. A description of a MIB starts with a line that states the name of the MIB being defined. Typically, the name of the MIB is followed by an import statement which allows the MIB writer to specify information from other well known MIBs that are referred to in the MIB being defined. Within a MIB is a structure for organizing managed items. To form the structure, the MIB defines a group or groups for organizing related pieces of information. A group is defined by stating a name for the group and showing how the group fits into the tree. Typically, all group definitions are placed immediately following the IMPORTS statement. Groups may contain information in the form of items or "objects", sub-groups, or a combination of the two. Similarly, each sub-group is configured like a group.

Within a group or sub-group, data may be organized in one of two basic methods. A scalar item is a single piece of information that is within a group. For example, the total memory in a server is a scalar item. A table is a structure for organizing data that requires more information to uniquely identify a single data item within a group of similar items. An example of an item that is best organized in a table is an EISA board ID. It is necessary for someone requesting an EISA board ID to specify the EISA board to which they are referring.

Each item, either scalar or part of a table, defined in a MIB includes a description which explains the item. Typically, the description includes SYNTAX, ACCESS, STATUS and DESCRIPTION clauses. The SYNTAX clause specifies the type of information which the item contains. Information types typically specified by the SYNTAX clause include INTEGER, OCTET STRING, Counter and DisplayString. INTEGER specifies that the value of the item should be interpreted as a number. OCTET STRING specifies that the value of the item should be interpreted as a string of octets, each having a value between 0 and 255. Counter specifies that the item is an INTEGER that has an implied range of zero to FFFFFFFF. DisplayString specifies that the item is an OCTET STRING where each octet is restricted to a printable ASCII character.

The ACCESS clause specifies the ways the item may be used and shows the actions which the agent may support for the item. ACCESS may be read-only, read-write or not-accessible. Read-only means that the value of the item may be retrieved by a management application but may not be altered. Read-write means that the item may be read and/or altered by a management application. Not-accessible is given as the access for organizational constructs that do not represent data items. Not-accessible is used only for table features and should not be used for a scaler item. The STATUS clause specifies whether the item is required for an agent that supports the defined group. A STATUS of mandatory means that the item will always be present if the defined group is supported by the agent. A STATUS of optional means that a particular implementation has the option of supporting the item. The DESCRIPTION clause contains a double quote delimited text description of the item. Finally, the item definition ends by specifying how the item fits into the MIB tree. The group the item belongs to is given, followed by the unique branch number within the group for the item.

To organize a table requires the use of two additional operators, the SEQUENCE operator and the SEQUENCE OF operator. The SEQUENCE operator allows the definition of a new type that consists of several standard types in a specific order. The SEQUENCE OF operator allows the definition of a list of zero or more of the same type of elements. A table is formed by defining a SEQUENCE, typically called a table entry. A table is defined as a SEQUENCE OF the table entry type. As there is no data that is uniquely referred to by the name of the table or entry, the STATUS of the table and the table entry is not-accessible. The INDEX clause specifies the items that can be used to uniquely identify an element in the table.

A MIB may also contain trap definitions. A trap is a notification sent by the SNMP agent to a management console. The trap is sent to inform the management console about an event that has occurred on the managed system. The trap definition begins with the name of the trap, followed by the term TRAP-TYPE. An ENTERPRISE clause follows to indicate the MIB in which the trap is defined. An optional VARIABLES clause may also be included to specify additional information that will be sent in the trap. Typically, the additional information contained in the VARIABLES clause will be items defined in the MIB identified in the ENTERPRISE clause. A DESCRIPTION clause which explains the significance of the trap and the conditions that would cause it to be sent follows. Finally, the trap is given a number to identify it. The number will be unique within the scope of the ENTERPRISE. Both the enterprise name and the trap number are used by the management station to uniquely determine the identity of a received trap.

SUMMARY OF THE INVENTION

In one aspect, the present invention is of a management system for a file server having at least one manageable device associated therewith from which management information is acquired therefrom and arranged in a management information base (or "MIB"). The management system includes means for arranging the MIB information into at least one subsystem and means for selectively accessing the MIB information for each of the subsystems. In one aspect, each subsystem contains management information describing a manageable device associated with the file server. In further aspects thereof, the file server includes a server manager for collecting management information for the manageable devices and, in this aspect, the management information may be further arranged into a third subsystem which contains management information acquired by the server manager and a fourth subsystem which contains management information acquired by the server manager and management information for the file server itself.

In further aspects thereof, the manageable devices may include a system board, an expansion board and a disk storage system. In these aspects, the management information is arranged into a system board subsystem which contains management information which describes the system board, an expansion board subsystem which contains management information describing the expansion board, a disk storage subsystem which contains management information describing the disk storage system, a configuration subsystem which contains management information which describes the configuration of the file server, a security configuration subsystem which contains management information which describes the security configuration of the file server, an environment subsystem which contains management information which describes the internal temperature and voltage of the file server and an input/output (or "I/O") subsystem which contains management information which related to I/O ports of the file server.

In another embodiment, the present invention is of a management system for a file server having a system board, an expansion board, a disk storage system and a server manager for collecting management information from the system board. The management system includes means for arranging MIB information for the file server into a first manageable device specific subsystem containing management information describing the system board, a second, manageable device specific, subsystem containing management information describing the expansion board, a third, manageable device specific, subsystem containing management information describing the disk storage system, a fourth, non-manageable device specific, subsystem containing management information describing the configuration of the file server, a fifth, non-manageable device specific, subsystem containing management information describing the security configuration for the file server, a sixth, manageable device specific, subsystem containing management information describing the server manager, a seventh, non-manageable device specific, subsystem containing management information describing I/O ports of the file server, an eighth, non-manageable device specific, subsystem containing management information describing internal environmental conditions of the file server, and means for selectively accessing the management information for each of the first, second, third, fourth, fifth, sixth, seventh and eighth subsystems. In various aspects thereof, the management information contained in the eighth subsystem is collected from the system board by the server manager, the management information contained in the seventh subsystem is acquired from the manageable devices and information collected from the system board by the server manager, and the management information contained in the fourth subsystem is comprised of a combination of information available from the remaining subsystems and information uniquely provided to the fourth subsystem.

In yet another embodiment, the present invention is of a management system for a plurality of networked file servers, each having a plurality of manageable devices associated therewith and described by management information contained in a MIB. The management system includes means for selectively accessing the MIB information describing each of the file servers and means for selectively accessing the MIB information describing each of the manageable devices associated with a selected file server. In various aspects thereof, each file server may include a system board, a processor and/or coprocessor, an expansion board and a disk storage system, either a hard disk drive, internal intelligent disk array and/or external intelligent disk array. For each of these aspects of the invention, the means for selectively accessing MIB information includes means for selectively accessing the MIB information describing the system board, the processors and/or coprocessors, the expansion board and the disk storage system, either the hard disk drive, internal intelligent disk array and/or external intelligent disk arrays, associated with the selected file server. In a further aspect thereof, the selective access means may further include means for selectively accessing a physical drive map for each of the internal and external intelligent disk arrays and for determining statuses of logical drives mapped to the internal and external intelligent disk arrays.

In still another embodiment, the present invention is of a method for managing plural networked file servers from a management console. A list of the networked file servers is first displayed at the management console. From the list of networked file servers, a file server to be managed is selected and a plurality of subsystems for the selected file server are displayed. From the plurality of displayed subsystems, a subsystem is selected for viewing and management information describing the selected subsystem is selectively viewed. The operation of the selected file server is then modified based upon the viewed management information. In one aspect thereof, an alert notification is received. An alert log is then accessed and details of an alert causing the alert notification. The file server subsystem management information to be viewed is then selected based upon the viewed alert details.

BRIEF DESCRIPTION OF THE DRAWING

The present invention may be better understood, and its numerous objects, features and advantages will become apparent to those skilled in the art by reference to the accompanying drawing, in which:

FIG. 1 is a tree illustrating the organizational framework defined by CCITT and ISO for an interoperable network of data;

FIG. 2 is a block diagram illustrating a computer management system and an associated MIB;

FIG. 4A is a tree illustrating the organization of an enterprise MIB used in conjunction with the computer management system and associated MIB of FIGS. 2 and 3;

FIGS. 5C-1 through 5C-8 is an inheritance tree illustrating an EISA non-volatile memory child group of the component group of the subMIB of FIG. 5A;

FIGS. 7B-1 through 7B-2 is an inheritance tree illustrating an interface child group of a component group of the subMIB of FIG. 7A;

FIGS. 7C-1 through 7C-2 is an inheritance tree illustrating a controller child group of the component group of the subMIB of FIG. 7A;

FIG. 7F is an inheritance tree illustrating a physical drive child group of the component group of the subMIB of FIG. 7A;

FIGS. 8D-1 through 8D-2 is an inheritance tree illustrating an object data child group of the component group of the subMIB of FIG. 8A;

DETAILED DESCRIPTION

Figure 5A:
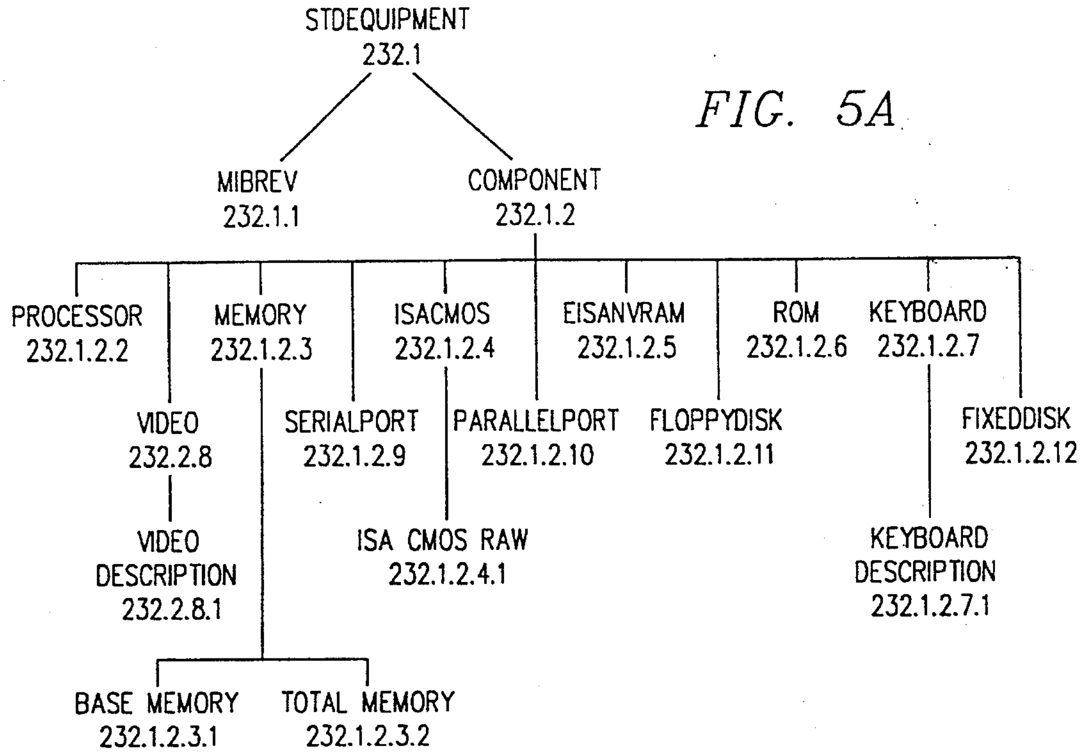
FIG. 5A is an inheritance tree illustrating a first subMIB of the enterprise MIB of FIG. 4A.
Figure 5B:
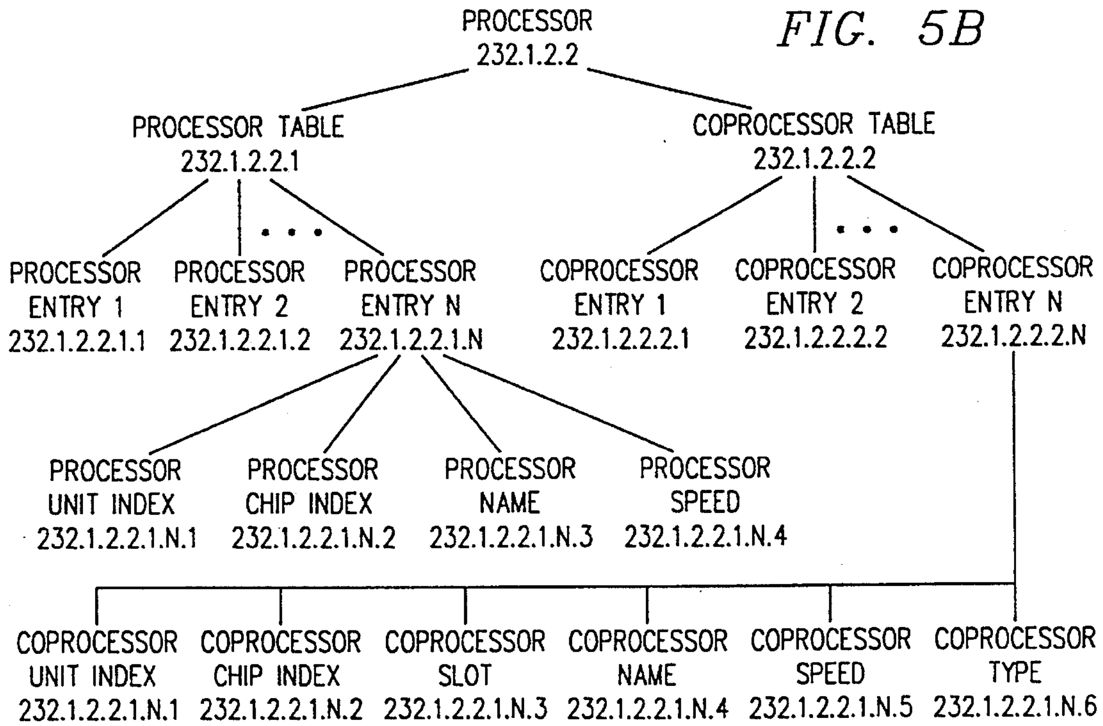
FIG. 5B is an inheritance tree illustrating a processor child group of a component group of the subMIB of FIG. 5A.
Figures 1, 5C:
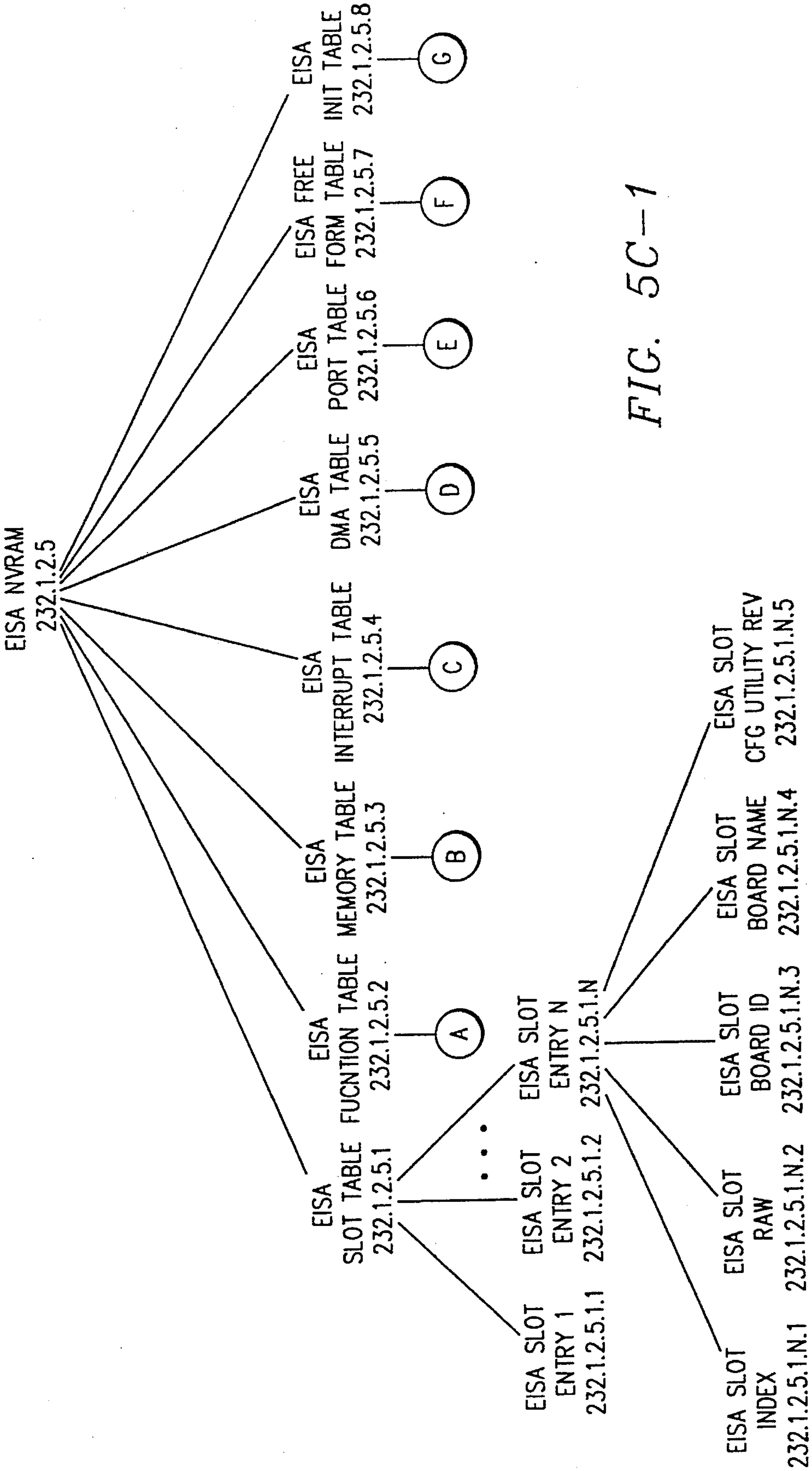
Figures 2, 5C:
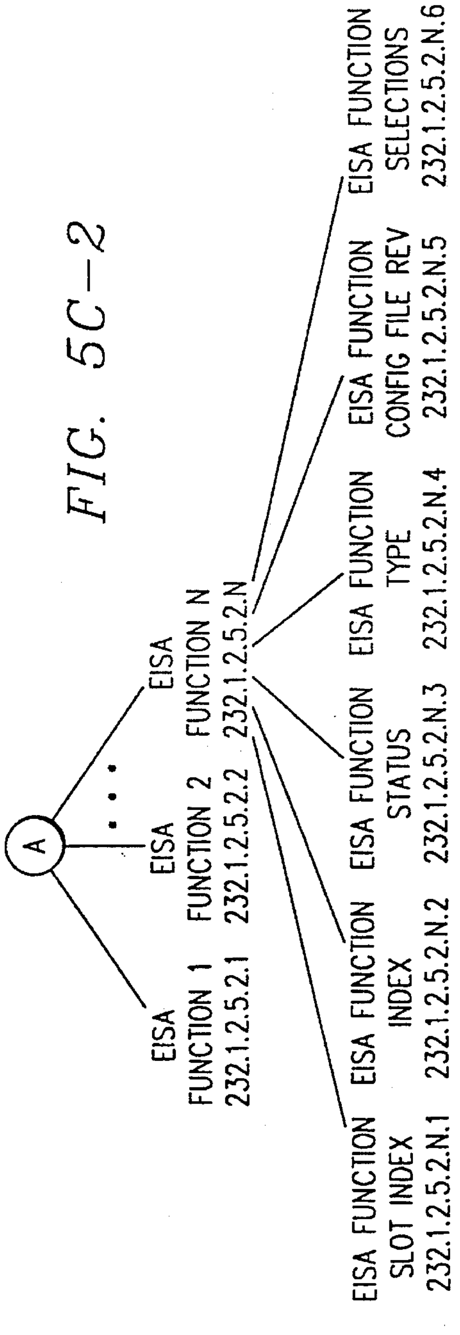
Figures 3, 5C:
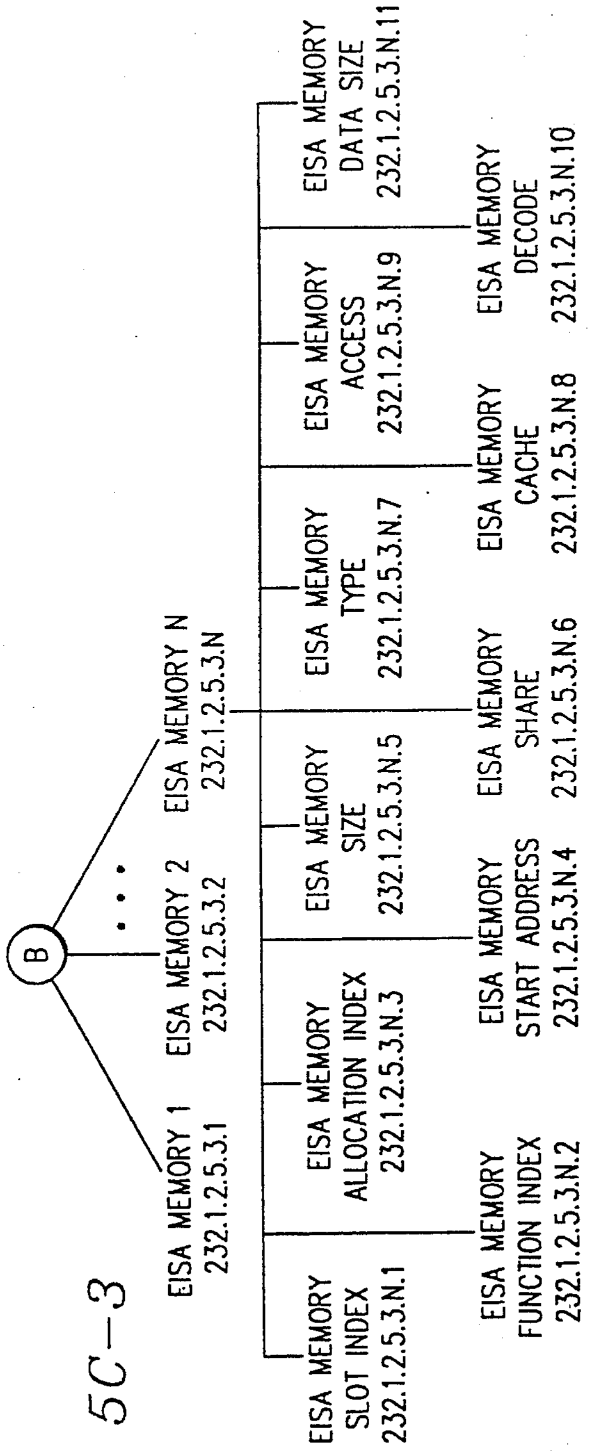

Referring first to FIG. 2, a computer management system which uses a combination of "management" or "instrumentation" agents and an enterprise MIB to manage a manageable device or devices from a management console shall now be described in greater detail. The management system 8 includes at least one manageable device 10 to be managed at a manager station or console 12. Preferably, the manager console 12 should be a computer system having a 386 CPU, 6 Mbyte RAM, 30 Mbyte ROM, a VGA color or higher resolution graphics controller supported by Microsoft Windows, a network interface card compatible with the NetWare open data link interface (or "ODI"), a Microsoft Windows compatible mouse, a Microsoft Windows compatible printer and Microsoft Windows 3.0 or 3.1.

Although only one manageable device 10 is illustrated in FIG. 2, it is specifically contemplated any number or types of manageable devices 10 may be managed at the manager console 12. The manageable device or devices 10 may include any number or combination of intelligent hardware device capable of supporting a software configured management agent 18 therein for interacting with the management system 8 in a manner to be more fully described below. For example, a bridge for interconnecting similar LAN segments, a router for interconnecting dissimilar LANs, a concentrator connected to data terminal equipment (or "DTE") and a file server or other DTE are all manageable devices which may be managed by the management system. For ease of discussion, however, the remainder of this document will assume that the collection of manageable devices 10 interconnected with the manager console 12 for the management thereof consists of a single file server 10 containing plural manageable devices such as industry-standard architecture components, an EISA bus, an intelligent drive array subsystem and a server manager board. The manageable device 10 and the manager console 12 are interconnected by a network 14 which provides a communications pathway for information to be transferred between the two. For example, an ethernet or token ring type network would be suitable for use as the network 14. Furthermore, the network 14 may be a local area network (or "LAN"), a wide area network (or "WAN"), or, more typically, a collection of interconnected LANs and WANs, also known as an "internet".

Installed at the manager console 12 is shell software having a suitable management platform 15, for example, an application process interface (or "API") for the operation of the management application 16. For example, Microsoft Windows would be a suitable platform 15 from which the management application 16 may be launched. In one embodiment of the invention, the management application 16 may coexist with Netware Management System (or "NMS") software manufactured by Novell, Inc., Openview network manager software manufactured by Hewlett Packard or another third party network management systems. For example, it is specifically contemplated that the management application 16 may be launched from Novell's NetWare Management Map focussed on a selected server. Alternately, the management application 16 may operate independent from the NetWare Management System products if the file server 10 is running NetWare v.3.11 or higher.

Once launched, the management application 16 running on the platform 15 performs specific management tasks by interacting with the management agent 18. The management application 16 and the management agent 18 communicate over the network 14 using management application protocols within the TCP/IP protocol suite, preferably the Simple Network Management Protocol (or "SNMP"). Monitored data will be transferred from the managed device 10 to the management application 18 using the SNMP "get request" operation in which the current value(s) associated with a declared variable (or list of variables) relating to a managed object is requested or "polled" by the management application 16 and the "get-next-request" in which the next value associated with a variable, such as a table, that comprises a list of elements, is requested or "polled" by the management application 16. Asynchronous traps, for example, alerts and other fault conditions will be immediately transported from the managed device 10 to the management application 18 using the "trap" operation where a network administrator physically located at the manager console 12 would be notified, either audibly or visually, of the existence of, information regarding the cause of, and possible solutions to, the alert.

In this manner, the management agent 18 collects management information about the file server 10 or other manageable devices and provides that information, which is generally referred to as a management information base (or "MIB") to a network administrator physically located at the manager console 12. The management information provided to the network administrator can be used to monitor the performance of the file server 10 and to respond to alerts as they occur. In this manner, the network administrator can perform "on the network" management" management of the file server 10 or other manageable device. Other functions which can be performed by the network administrator using the management information include security management, fault analysis and configuration management.

Figure 3:
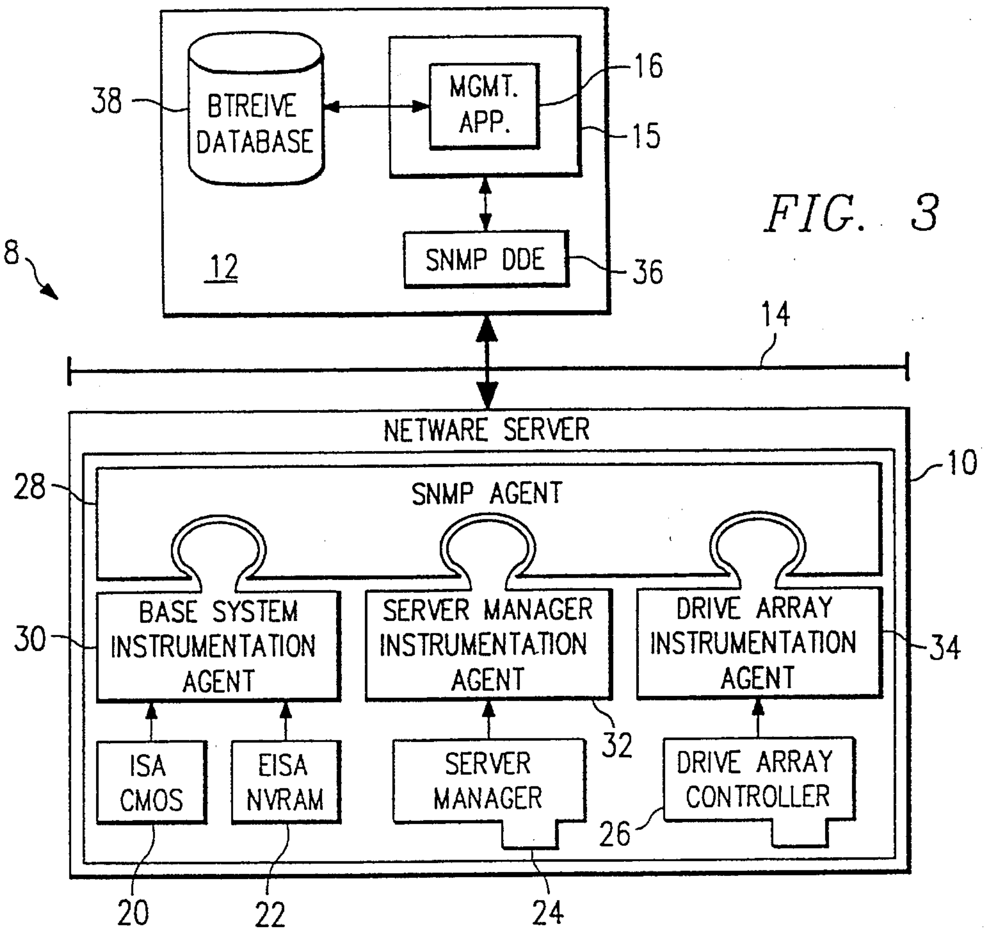
FIG. 3 is an expanded block diagram of the computer management system of FIG. 2.

Referring next to FIG. 3, the computer management system 8 will now be described in greater detail. As may now be seen, the file server 10 is now designated as a NetWare server, thereby indicating that the managed server 10 is running NetWare v3.11 or greater. Installed on the netware server 10 is an SNMP agent 28 for transporting data from a managed device or devices to the management application 16. The SNMP agent is a collection of software capable of querying manageable devices and providing information to the management application 16 using operations defined as part of the SNMP protocol. Manageable devices such as ISA CMOS 20, the battery backed up RAM in the real time clock installed in the system board, EISA NVRAM22, the battery backed up non-volatile memory containing the EISA configuration of the file server 10, server manager board 24, a management device which contains configuration and real time monitored information on the file server 10, and intelligent drive array controller 26, which contains configuration, real time monitor and performance array on the intelligent drive array 26, are instrumented for interfacing with the SNMP agent 28 using base system instrumentation agent 30, server manager instrumentation agent 32 and drive array instrumentation agent 34, respectively. Instrumentation agents 30, 32 and 34 are NetWare loadable modules (or "NLMs") used so that the information regarding the managed device can be transferred to the application 16. As will be more fully discussed below, these instrumentation agents for the managed devices support separate subMIBs for the managed devices, thereby permitting the organization of managed information described herein.

More specifically, the base system instrumentation agent 30 is NLM software connected to provide industry-standard architectural information about the system configuration. This information includes product and model information, processor type, diskette type, hard drive type, EISA board configuration, system ROM version, installed memory, video subsystem and serial and parallel port configurations. It may also provide product ID, serial number and security configuration.

The disk drive array instrumentation agent 32 is NLM software for managing the drive array controller 26. Again using SNMP, the drive array instrumentation agent 34 will gather information including controller configuration, Compaq 4-MB array accelerator write cache configuration and status, if installed, logical drive configuration and status, physical drive configuration and status and spare drive configuration and status.

Finally, the server manager instrumentation agent 32 is NLM software used to manage a server manager 24 and is necessary only if the file server 10 has a server manager board installed therein. A server manager board innately monitors and process objects indicative of computer system performance and actual and/or potential computer systems failures, determines alert conditions based upon the innately monitored and processed objects, reports alert conditions in either an in-band or out-of band mode and provides for correction action to be taken from a remote location. The exact configuration of a server manager board is disclosed at length in the co-pending U.S. patent applications Ser. No. 07/720,259, filed Jun. 24, 1991 and issued Nov. 22, 1994 as U.S. Pat. No. 5,367,670, entitled "Computer System Manager" and previously incorporated by reference. The information gathered by the server manager instrumentation agent 32 includes server manager board configuration information and monitored item information maintained on the server manager board.

From the SNMP agent, information which forms part of the MIB may be transported over the network 14 using the IPX or IP protocol stack to the manager console 12 where Novell SNMP DDE server software 36 is installed so that the management data can be received at or transmitted from the manager console. The manager console 12 is further provided with a Btreive database 38 where object information from the MIB gathered over time by the management application 16 may be stored for later access, either by the management application 16 or another application running on the manager console 12. For example, object information which would be transmitted to the btrieve database 38 for storage would be all alerts transmitted to the management application 16 in the form of traps where they would be assembled as an alert log and information received in response to the polling of monitored items which would be assembled in the btreive database 38 in a manner which would enable trend analysis and reporting.

Referring next to FIG. 4A, an enterprise MIB 232 subject of the present invention and located at branch 1..4.6.1.4.232 of the CCITT/ISO organization framework for data illustrated in FIG. 1 will now be described in greater detail. The enterprise MIB 232 defines the set of all manageable object instances and traps known to the agent, instrumentation agent and the user interface application included as part of the computer management system of FIGS. 2–3. The management application 16 uses the enterprise MIB 232's definition of object instances and traps to manage the manageable devices 10. The variables identified will be read by the management application 16 and be graphically displayed at the workstation 12. The asynchronous traps generated by the SNMP agent supported by the instrumentation will be collected and displayed by the application 16.

The enterprise MIB 232 is organized to include a number of subMIBs, each describing a component in a managed server. The subMIBS include a standard equipment subMIB located at branch 232.1, a manufacturer specific system subMIB located at branch 232.2, a drive array subMIB located at branch 232.3 and a server manager subMIB located at branch 232.4. Each subMIB 232.1, 232.2, 232.3, and 232.4 includes a mibRev childgroup located at branch 232.1.1, 232.2.1, 232.3.1 and 232.4.1, respectively, and a component child group located at branch 232.1.2, 232.2.2, 232.3.2 and 232.4.2, respectively. The drive array subMIB and the server manager subMIB also include a traps child group located at branch 232.3.3 and 232.4.3, respectively. Of these, the mibRev child group for a subMIB contains information about the revision of the enterprise 232 to which the SNMP agent conforms and includes an indication as to that subMIB's last revision, the component child group for a subMIB details all object instances for the components of that subMIB and the traps child group contains a trap log history which will enable the management application 16 to determine alerting events that have occurred within the computer system 8.

Figure 4B:
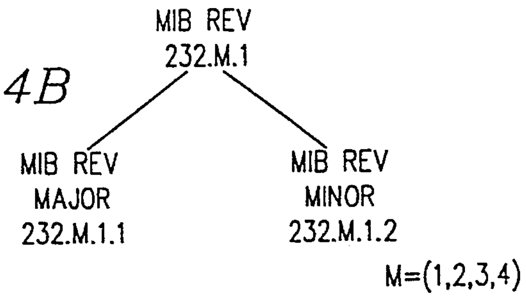
FIG. 4B is an inheritance tree illustrating a MIB revision group commonly configured for each subMIB of the enterprise MIB of FIG. 4A.

Referring next to FIG. 4B, the mibRev child group commonly configured for each subMIB of the enterprise MIB shall now be described in greater detail. Each mibRev child group is located at branch 232.M.1, where M= the subMIB containing that mibRev child group. In this embodiment of the invention, M=(1,2,3,4), thereby indicating that all of the subMIBS are provided with a mibREV child group. Each mibRev child group a major revision object located at branch 232.M.1.1 and a minor revision object located at branch 232.M.1.2. The management application 16 obtains this information from the management agent 18 to determine if they are both using the same definition for the MIB. If the major revision object indicates a revision change, a very significant change in the information supported by the subMIB has occurred and indicates that an upgrade should be made to ensure correct interpretation of data. For example, if the management application 16 and agent 18 for a subMIB are using a MIB definitions having different major revision level, the older of the two should be upgraded. However, if the minor revision object indicates a revision change, the revision should not significantly change the interpretation of data. The formal organization of the mibRev child group is as follows:

```
mibRevMajor      OBJECT-TYPE
    SYNTAX       INTEGER
    ACCESS       read-only
    STATUS       mandatory
    DESCRIPTION
```

```
          "The Major Revision level. A change in the
          major revision level represents a major change
          in the architecture of the MIB. A change in
          the major revision level may indicate a
          significant change in the information supported
          and/or the meaning of the supported
          information, correct interpretation of data may
          require a MIB document with the same major
          revision level."
     ::= ( mibRev 1 )
mibRevMinor      OBJECT-TYPE
     SYNTAX      INTEGER
     ACCESS      read-only
     STATUS      mandatory
     DESCRIPTION
          "The Minor Revision level. A change in the
          minor revision level may represent some minor
          additional support, no changes to any pre-
          existing information has occurred."
     ::= ( mibRev 2 )
```

©1992 Compaq Computer Corporation

Figure 4C:
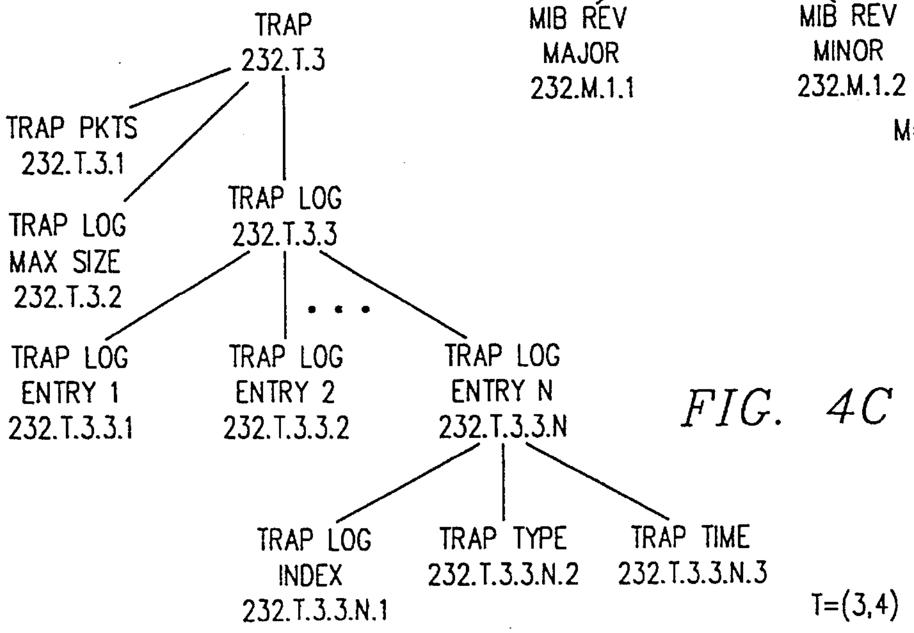
FIG. 4C is an inheritance tree illustrating a trap history group similarly configured for plural subMIBs of the enterprise MIB of FIG. 4A.

Referring next to FIG. 4C, the traps child group, which is similarly configured for the drive array and server manager subMIBs of the enterprise MIB, shall now be described in greater detail. Each traps child group maintains information about the number of traps issued by the corresponding parent subMIB and maintains a table of immediately prior traps issued. In this manner, the management application 16, when accessing the management agent 18, may acquire recent status information regarding the manageable device 10. Each traps child group is located at branch 232.T.3, where T= the subMIB containing a traps child group. In this embodiment of the invention, T=(3,4), thereby indicating that a traps child group is provided for the drive array and server manager subMIBs. Each traps child group includes a trap packets object located at branch 232.T.3.1, a maximum size trap log object located at branch 232.T.3.2 and a trap log table located at branch 232.T.3.3. The trap log table has an entry N located at branch 232.T.3.3.N for each trap issued by the subMIB. For each entry N, the trap log table includes a log index object located at branch 232.T.3.3.N.1, a trap type object located at branch 232.T.3.3.N.2 and a trap time object located at branch 232.T.3.3.N.3. Finally, each subMIB having a traps child group includes a series of trap definitions specific to that subMIB which identifies to the management application 16 the exact type of trap maintained by the trap child group. Further details regarding the traps child group may be found by reference to the formal organizational framework of the traps child group set forth below:

```
trapPkts      OBJECT-TYPE
     SYNTAX      Counter
     ACCESS      read-only
     STATUS      mandatory
     DESCRIPTION
          "The total number of trap packets issued by the
          agent for the Server Manager enterprise since
          the Server Manager SNMP agent was loaded."
     ::= ( trap 1 )
trapLogMaxSize         OBJECT-TYPE
     SYNTAX      INTEGER
     ACCESS      read-only
     STATUS      mandatory
     DESCRIPTION
          "The maximum number of entries that will
          currently be kept in the trap log. If the
          maximum size has been reached and a new trap
          occurs the oldest trap will be removed."
     ::= ( trap 2 )
trapLog       OBJECT-TYPE
```

```
     SYNTAX      SEQUENCE OF TrapLogEntry
     ACCESS      not-accessible
     STATUS      mandatory
     DESCRIPTION
          "An ordered list of trap log entries
          (conceptually a queue). The trap log entries
          will be kept in the order in which they were
          generated with the most recent trap at index 1
          and the oldest trap entry at index
          trapLogMaxSize. If the maximum number size has
          been reached and a new trap occurs the oldest
          trap will be removed when the new trap is added
          so the trapMaxLogSize is not exceeded."
     ::= ( trap 3 )
trapLogEntry           OBJECT-TYPE
     SYNTAX      TrapLogEntry
     ACCESS      not-accessible
     STATUS      mandatory
     DESCRIPTION
          "A description of a trap event."
     INDEX ( trapLogIndex )
     ::= ( trapLog 1 )
trapLogEntry ::= SEQUENCE (
     trapLogIndex          INTEGER,
     trapType              INTEGER,
     trapTime              OCTET STRING (SIZE (0 . . . 6))
)
trapLogIndex           OBJECT-TYPE
     SYNTAX      INTEGER
     ACCESS      read-only
     STATUS      mandatory
     DESCRIPTION
          "The value of this object uniquely identifies
          this trapLogEntry at this time. The most
          recent trap will have an index of 1 and the
          oldest trap Will have an index of
          trapLogMaxSize. Because of the queue-like
          nature of the trapLog this particular trap
          event's index will change as new traps are
          issued."
     ::= ( trapLogEntry 1 )
trapType       OBJECT-TYPE
     SYNTAX      INTEGER
     ACCESS      read-only
     STATUS      mandatory
     DESCRIPTION
          "The type of the trap event that this entry
          describes. This number refers to an entry in
          a list of traps enumerating the possible traps
          the Server Manager agent may issue."
     ::= ( trapLogEntry 2 )
trapTime       OBJECT-TYPE
     SYNTAX      OCTET STRING (SIZE (0 . . . 6))
     ACCESS      read-only
     STATUS      mandatory
     DESCRIPTION
          "The time of the trap event that this entry
          describes. The time is given in year (first
          octet), month, day of month, hour, minute,
          second (last octet) order."
          :: (trapLogEntry 3 )
```

©1992 Compaq Computer Corporation

Referring next to FIG. 5A, the StdEquipment subMIB located at branch 232.1 will now be described in greater detail. The StdEquipment subMIB consists of data that describes the devices typically found on the system board of the file server 10 being managed. IMPORT statements used in the StdEquipment subMIB are as follows:

| Import | Defined by |
|---|---|
| enterprises | RFC1155SMI |
| DisplayString | RFC1158-MIB |
| OBJECT-TYPE | RFC-1212 |

As previously discussed, the StdEquipment subMIB includes two child groups, the mibRev child group located at branch 232.1.1 and the component child group located at branch 232.1.2. The mibRev child group contains information regarding the revision of the subMIB to which the SNMP agent conforms and is configured as previously described with respect to FIG. 4B and the component child group contains information describing equipment typically found on PC, ISA and EISA architectures. This information is contained in plural child groups of the component group. The component group's child groups are a processor group located at branch 232.1.2.2, a memory group located at branch 232.1.2.3, an ISA CMOS group located at branch 232.1.2.4, an EISA non-volatile memory group located at branch 232.1.2.5, a ROM group located at branch 232.1.2.6, a keyboard group located at branch 232.1.2.7, a video group located at branch 232.1.2.8, a serial port group located at branch 232.1.2.9, a parallel port group located at branch 232.1.2.10, a floppy disk group located at branch 232.1.2.11 and a fixed disk branch located at branch 232.1.2.12.

Referring next to FIG. 5B, the proccessor child group located at branch 232.1.2.2 will now be described in greater detail. As is well known to those skilled in the art, a processor is an electronic component that performs general purpose processing which may be used with or without a coprocessor and a coprocessor is a electronic that performs special purpose processing. The processor child group describes the processor and coprocessors in the file server 10 using a plurality of object instances. More specifically, the processor child group describes the processors and coprocessors in the file server 10 using two tables, a processor table located at branch 232.1.2.2.1 and a coprocessor table located at branch 232.1.2.2.2. The processor table includes an entry N located at branch 232.1.2.2.1.N for each of N processors in the system. Similarly, the coprocessor table includes an entry N located at branch 232.1.2.2.2.N for each of N coprocessors in the system. Each entry, whether in the processor or coprocessor table, provides identification, description and speed information for a particular processor or coprocessor.

Each processor entry 232.1.2.2.1.N contains four objects, a unit index object located at branch 232.1.2.2.1.N.1, a slot object located at branch 232.1.2.2.1.N.2, a name object located at branch 232.1.2.2.1.N.3 and a speed object located at branch 232.1.2.2.1.N.4, each of which is described at greater detail in the formal organization of the processor table set forth below:

```
processorTable      OBJECT-TYPE
    SYNTAX          SEQUENCE OF ProcessorEntry
    ACCESS          not-accessible
    STATUS          mandatory
    DESCRIPTION
        "A list of the processors in the system. The
        main processor (if such a concept is valid for
        this machine) should be the first entry in the
        table."
    ::= ( processor 1 )
processorTable      OBJECT-TYPE
    SYNTAX          ProcessorEntry
    ACCESS          not-accessible
    STATUS          mandatory
    DESCRIPTION
        "A description of a processor in the system."
    INDEX           ( processorUnitIndex )
    ::= ( processorTable 1 )
ProcessorEntry ::= SEQUENCE (
    processorUnitIndex      INTEGER,
    processorSlot           INTEGER,
    processorName           DisplayString (SIZE(0 . . . 255)),
    processorSpeed          INTEGER
)
```

-continued

```
processorUnitIndex  OBJECT-TYPE
    SYNTAX          INTEGER
    ACCESS          read-only
    STATUS          mandatory
    DESCRIPTION
        "This is a number that uniquely specifies a
        processor unit. A processing unit may be a set
        of processing chips that are on the same board
        or for other reasons work together as a unit.
processorSlot       OBJECT-TYPE
    SYNTAX          INTEGER
    ACCESS          read-only
    STATUS          mandatory
    DESCRIPTION
        "This value represents the slot that this
        processor is in. If the slot cannot be
        determined the value of zero will be returned."
    ::= ( processorEntry 2 )
    processorName       OBJECT-TYPE
        SYNTAX          DisplayString (SIZE (0 . . . 255)
        ACCESS          read-only
        STATUS          mandatory
        DESCRIPTION
            "This is a string that gives the name of
            the processor described in this entry.
            For example: 80386"
    ::= ( processorEntry 3 )
    processorSpeed      OBJECT-TYPE
        SYNTAX          INTEGER
        ACCESS          read-only
        STATUS          mandatory
        DESCRIPTION
            "This is speed in megahertz of the
            processor described in this entry. Zero
            will be entered if this value is not
            available."
    ::= ( processorEntry 4 )
```

©1992 Compaq Computer Corporation

The coprocessor table, on the other hand, contains six objects, a unit index object located at branch 232.2.2.2.N.1, a chip index object located at branch 232.2.2.2.N.2, a slot object located at branch 232.2.2.2.N.3, a name object located at branch 232.2.2.2.N.4, a speed object located at branch 232.2.2.2.N.5 and a type object located at branch 232.2.2.2.N.6, each of which is described at greater detail in the formal organization of the coprocessor table set forth below:

```
coprocessorTable        OBJECT-TYPE
    SYNTAX          SEQUENCE OF CoprocessorEntry
    ACCESS          not-accessible
    STATUS          mandatory
    DESCRIPTION
        "A list of the coprocessors in the system."
    ::= ( processor 2 )
coprocessorEntry        OBJECT-TYPE
    SYNTAX          CoprocessorEntry
    ACCESS          non-accessible
    STATUS          mandatory
    DESCRIPTION
        "A description of a coprocessor in the system.
        The coprocessorUnitIndex of any entry in this
        table will equal the processorUnitIndex of the
        corresponding processor in the processor
        table."
    INDEX           ( coprocessorUnitIndex,
                    coprocessorChipIndex )
    ::= ( coprocessorTable 1 )
CoprocessorEntry        ::=SEQUENCE (
    coprocessorUnitIndex        INTEGER,
    coProcessorChipIndex        INTEGER,
    coprocessorSlot             INTEGER,
    coprocessorName             DisplayString
                                    (SIZE 0 . . . 255)),
    coprocessorSpeed            INTEGER,
```

-continued

```
    coprocessorType              INTEGER
)
coprocessorUnitIndex      OBJECT-TYPE
    SYNTAX        INTEGER
    ACCESS        read-only
    STATUS        mandatory
    DESCRIPTION
        "This is a number that uniquely specifies a
        processor unit. A processing unit may be a set
        of processing chips that are on the same board
        for other reasons work together as a unit. The
        main processor unit (if there is one) will
        always have the lowest (first) index. this
        field can be used to associate processors with
        their corresponding coprocessors."
    ::= ( coprocessorEntry 1 )
coprocessorChipIndex      OBJECT-TYPE
    SYNTAX        INTEGER
    ACCESS        read-only
    STATUS        mandatory
    DESCRIPTION
        "This is a number that uniquely specifies the
        processor chip. A processor chip is one
        specific processor that may or may not work
        with other processor chips in a processor unit.
        This field is used to distinguish between
        multiple coprocessors that are part of the same
        processor unit. For example, If a processor
        board contained a Intel 80386 processor with
        both a Intel 80387 and a Weitek 3167, both the
        80387 and the 3167 would have the same
        coprocessorUnitIndex (which would match the
        80386's different coprocessorChipIndex field
        values."
    ::= ( coprocessorEntry 2 )
coprocessorSlot           OBJECT-TYPE
    SYNTAX        INTEGER
    ACCESS        read-only
    STATUS        mandatory
    DESCRIPTION
        "This value represents the slot that this
        coprocessor is in. If the slot cannot be
        determined the value of zero will be returned."
    ::= ( coprocessorEntry 3 )
coprocessorName           OBJECT-TYPE
    SYNTAX        DisplayString (SIZE (0 . . . 255)
    ACCESS        read-only
    STATUS        mandatory
    DESCRIPTION
        "This is a string that gives the name of the
        processor described in this entry.
        For example:
        80387
        Weitek 3167"
    ::= ( coprocessorEntry 4 )
coprocessorSpeed          OBJECT-TYPE
    SYNTAX        INTEGER
    ACCESS        read-only
    STATUS        mandatory
    DESCRIPTION
        "This is speed in megahertz of the processor
        described in this entry. Zero will be returned
        if this value is not available."
    ::= ( coprocessorEntry 5 )
coprocessorType           OBJECT-TYPE
    SYNTAX        INTEGER (
        other(1),
        embedded(2),
        external(3)
        )
    ACCESS        read-only
    STATUS        mandatory
    DESCRIPTION
        "This value indicates if the coprocessor this
        entry is describing is embedded in the
        processor or external to the processor chip."
    ::= ( coprocessorEntry 6 )
```

©1992 Compaq Computer Corporation

Returning momentarily to FIG. 5B, the memory child group located at branch 232.1.2.3 and ISA CMOS child group located at branch 232.1.2.4, respectively of the Std-Equipment subMIB will now be described in greater detail. The memory child contains a base memory object located at branch 232.1.2.3.1 and a total memory object located at branch 232.1.2.3.2 that describe the amount of base and total memory, respectively, installed on the file server 10. The formal organization of the memory child group is as follows:

```
baseMemory          OBJECT-TYPE
    SYNTAX          INTEGER
    ACCESS          read-only
    STATUS          mandatory
    DESCRIPTION
        "The amount of base memory in kilobytes. A
        kilobyte is 1024 bytes."
    ::= ( memory 1 )
totalMemory         OBJECT-TYPE
    SYNTAX          INTEGER
    ACCESS          read-only
    STATUS          mandatory
    DESCRIPTION
        "The total amount of memory in kilobytes. A
        kilobyte is 1024 bytes"
::= ( memory 2 )
```

©1992 Compaq Computer Corporation

The ISA CMOS group provides raw data regarding the CMOS variables common among industry standard PCs, including the ISA CMOS real time clock, security, and configuration which is interpretable by the manager application 16. More specifically, the ISA CMOS group contains a raw data object located at branch 232.1.2.4.1 configured as a continuous 64 byte octet string and formally organized in accordance with the following:

```
isaCmosRaw          OBJECT-TYPE
    SYNTAX          OCTET STRING (SIZE (0 . . . 64))
    ACCESS          read-only
    STATUS          mandatory
    DESCRIPTION
        "The contents of the ISA CMOS."
::= ( isaCmos 1 )
```

©1992 Compaq Computer Corporation

Referring next to FIGS. 5C1–8, the EISA non-volatile memory (or "NVRAM") child group located at branch 232.1.2.5 will now be described in greater detail. The EISA NVRAM child group contains a set of tables that detail, by slot and function, the configuration information stored in an EISA bus architecture. The EISA NVRAM child group includes an EISA slot table located at branch 232.1.2.5.1, an EISA function table located at branch 232.1.2.5.2, an EISA memory table located at branch 232.1.2.5.3, an EISA interrupt table located at branch 232.1.2.5.4, an EISA data memory access (or "DMA") table located at branch 232.1.2.5.5, an EISA port table located at branch 232.1.2.5.6, an EISA free form table located at branch 232.1.2.5.7 and EISA initialization table located at branch 232.1.2.5.8.

The EISA slot table located at branch 232.1.2.5.1 contains an entry N located at branch 232.1.2.5.1.N for each configured card installed in the system. For each entry N, the EISA slot table contains a slot index object located at branch 232.1.2.5.1.N.1, a raw object located at branch 232.1.2.5.1.N.2, a board ID object located at branch 232.1.2.5.1.N.3, a board name object located at branch 232.1.2.5.1.N.4 and an EISA configuration utility revision level object located at branch 232.1.2.5.1.N.5.

The formal organization of the EISA slot table located at branch 232.1.2.5.1 is as follows:

```
eisaSlotTable        OBJECT-TYPE
    SYNTAX           SEQUENCE OF EisaSlotEntry
    ACCESS           not-accessible
    STATUS           mandatory
    DESCRIPTION
        "A list of EISA slot information entries."
    ::= ( eisaNvram 1 )
eisaSlotEntry        OBJECT-TYPE
    SYNTAX           EisaSlotEntry
    ACCESS           not-accessible
    STATUS           mandatory
    DESCRIPTION
        "A description of an EISA slot."
    INDEX            ( eisaSlotIndex )
    ::= ( eisaSlotTable 1 )
eisaSlotEntry        ::= SEQUENCE (
    eisaSlotIndex          INTEGER,
    eisaSlotRaw            OCTET STRING (SIZE (0 . . . 12)),
    eisaSlotBoardId        DisplayString (SIZE (0 . . . 7)),
    eisaSlotBoardName      DisplayString (SIZE (0 . . . 255)),
    eisaSlotCfUtilityRev   DisplayString (SIZE (0 . . . 5))
)
eisaSlotIndex        OBJECT-TYPE
    SYNTAX           INTEGER
    ACCESS           read-only
    STATUS           mandatory
    DESCRIPTION
        "The EISA slot number for this entry
        describes."
    ::= ( eisaSlotEntry 1 )
    eisaSlotRaw      OBJECT-TYPE
    SYNTAX           OCTET STRING (SIZE 0 . . . 12))
    ACCESS           read-only
    STATUS           mandatory
    DESCRIPTION
        The EISA slot data for the board in this slot.
        This octet string is actually the set of
        register values returned by the get EISA slot
        information call in the following order:
        AH, AL, BH, BL, CH, CL, DH, DL, DI (lsb), DI
        (msb), SI (lsb), SI (msb)
        AH is the return code for the call and should
        be 0, any other value would indicate an error
        or an empty slot.
        AL contains several bit flags about the product
        ID and slot type.
                Bit 7:        0 = No duplicate ID
                              1 = Duplicate IDs
                Bit 6:        0 = Product ID readable
                              1 = Product ID not readable
                Bit 5, 4:     00 = Expansion slot
                              01 = Embedded device
                              10 = Virtual device
                              11 = Reserved
                Bit 3 . . . 0: This nibble indicates which CFG
                              file is loaded when duplicate
                              file names are present.
                              0000 = No duplicate ID
                              0001 = First duplicate ID
                              0010 = Second duplicate ID
                              0011 = Third duplicate ID
                              .
                              .
                              .
                              1111 = Fifteenth duplicate ID
        NOTE:         Bit 7 is the most significant bit,
                      Bit 0 is the least significant.
        BH contains the major revision level of the
        configuration utility.
        BL contains the minor revision level of the
        configuration utility.
        CH contains the most significant byte of the
        configuration file checksum.
        CL contains the least significant byte of the
        configuration file checksum.
        DH contains the number of device functions.
        DL contains the combined function information:
                Bit 7:        reserved (0)
```

-continued

```
                Bit 6:        reserved (0)
                Bit 5:        slot has one or more port
                              initialization entries.
                Bit 4:        slot has one or more port range
                              entries.
                Bit 3:        slot has one or more DMA
                              entries.
                Bit 2:        slot has one or more interrupt
                              (IRQ) entries.
                Bit 1:        slot has one or more memory
                              entries.
                Bit 0:        slot has one or more function
                              type definitions.
        NOTE:         Bit 7 is the most significant bit,
                      bit 0 is the least significant.
        DI and SI contain the four byte compressed ID
                DI (lsb) = Byte 0
                DI (msb) = Byte 1
                SI (lsb) = Byte 2
                SI (msb) = Byte 3
        For more information about the meaning of this
        information consult the EISA Technical
        Reference Guide.
        "
    ::= ( eisaSlotEntry 2 )
eisaSlotBoardId        OBJECT-TYPE
    SYNTAX             DisplayString (SIZE (0 . . . 0))
    ACCESS             read-only
    STATUS             mandatory
    DESCRIPTION
        "A seven character board ID. The first three
        characters are the manufacturers ID followed by
        three character product ID followed by a one
        character revision level."
    ::= ( eisaSlotEntry 3 )
eisaSlotBoardName      OBJECT-TYPE
    SYNTAX             DisplayString (SIZE (0 . . . 255))
    ACCESS             read-only
    STATUS             mandatory
    DESCRIPTION
        "The product name (or other suitable
        description) of the board described in this
        entry. This field may be empty if no
        descriptive information is known about the
        board."
    ::= ( eisaSlotEntry 4 )
eisaSlotCfUtilityRev       OBJECT-TYPE
    SYNTAX             DisplayString (SIZE (0 . . . 5))
    ACCESS             read-only
    STATUS             mandatory
    DESCRIPTION
        "The revision level of the EISA configuration
        utility that was used to configure the system.
        This should be the same version information
        displayed by the EISA configuration utility."
    ::= ( eisaSlotEntry 5 )
```

©1992Compaq Computer Corporation

Continuing to refer to FIGS. 5C1–8, and, in particular, to FIG. 5C-2, the EISA function table will now be described in greater detail. The EISA function table located at branch 232.1.2.5.2 contains an entry N located at branch 232.1.2.5.2.N for each function performed by a configured card. For each entry N, the function table contains a slot index object located at branch 232.1.2.5.2.N.1, a function index object located at branch 232.1.2.5.2.N.2, a status object located at branch 232.1.2.5.2.N.3, a type object located at branch 232.1.2.5.2.N.4, an EISA configuration revision level object located at branch 232.1.2.5.2.N.5 and a selection object located at branch 232.1.2.5.2.N.6. The formal organization of the EISA function table is as follows:

```
eisaFunctionTable      OBJECT-TYPE
    SYNTAX             SEQUENCE OF EisaFunctionEntry
    ACCESS             not-accessible
    STATUS             mandatory
```

-continued

```
    DESCRIPTION
        "A list EISA function information entries."
    ::= ( eisaNvram 2 )
eisaFunctionEntry      OBJECT-TYPE
    SYNTAX     EisaFunctionEntry
    ACCESS     not-accessible
    STATUS     mandatory
    DESCRIPTION
        "A description of an EISA function."
    INDEX      (eisaFunctionSlotIndex, eisaFunctionIndex)
    ::= ( eisaFunctionTable 1 )
eisaFunctionEntry      ::=SEQUENCE (
    eisaFunctionSlotIndex    INTEGER,
    eisaFunctionIndex        INTEGER,
    eisaFunctionStatus       INTEGER,
    eisaFunctionType         DisplayString (SIZE
                                       (0 . . . 80)),
    eisaFunctionFileRev      DisplayString (SIZE
                                       (0 . . . 5)),
    eisaFunctionSelections   OCTET STRING (SIZE (0 . . . 26))
)
eisaFunctionSlotIndex      OBJECT-TYPE
    SYNTAX     INTEGER
    ACCESS     read-only
    STATUS     mandatory
    DESCRIPTION
        "The EISA slot number of the board that
        registered the function this entry describes."
    ::= ( eisaFunctionEntry 1 )
eisaFunctionIndex      OBJECT-TYPE
    SYNTAX     INTEGER (
    ACCESS     read-only
    STATUS     mandatory
    DESCRIPTION
        "The number of the function this entry
        describes."
    ::= ( eisaFunctionEntry 2)
eisaFunctionStatus     OBJECT-TYPE
    SYNTAX     INTEGER (
        disabled (2),
        enabled (3)
        )
    ACCESS     read-only
    STATUS     mandatory
    DESCRIPTION
        "The status of the function described by this
        entry."
    ::= ( eisaFunctionEntry 3 )
eisaFunctionType       OBJECT-TYPE
    SYNTAX     DisplayString (SIZE (0 . . . 80))
    ACCESS     read-only
    STATUS     mandatory
    DESCRIPTION
        "The type of the function. The type may be
        followed by one or more subtype description
        fields. Some currently defined types are:
```

| Type | Meaning |
|---|---|
| COM | Communication device |
| COM, ASY | ISA compatible 8250 based serial port |
| COM, ASY, FIFO | ISA compatible 16550 based serial port (with fifo) |
| COM, SYN | ISA compatible SDLC port |
| CPU | Microprocessor |
| CPU, 8086 | 8086 compatible microprocessor |
| CPU, 80286 | 80286 compatible microprocessor |
| CPU, 80386SX | 80386SX compatible microprocessor |
| CPU, 80386 | 80386 compatible microprocessor |
| CPU, 80486 | 80486 compatible microprocessor |
| JOY | ISA compatible joystick adapter |
| KEY | Keyboard |
| KEY, nnn, KBD=xx | Standard Keyboard with nnn keys for country xx |

-continued

| Type | Meaning |
|---|---|
| MEM | Memory board |
| MFC | Multifunction board |
| MSD | Mass storage device |
| MSD, DSKCTL | ISA compatible fixed disk controller |
| MSD, FPYCTL | ISA compatible floppy disk controller |
| MSD, TAPCTL | Primary tape controller |
| NET | Network board |
| NPX | Numeric coprocessor |
| NPX, 287 | Intel 287 numeric coprocessor |
| NPX, 387 | Intel 387 numeric coprocessor |
| NPX, 387SX | Intel 387SX numeric coprocessor |
| NPX, W1167 | Weitek 1167 numeric coprocessor |
| NPX, W3167 | Weitek 3167 numeric coprocessor |
| OSE | Operating system/environment |
| OTH | Other |
| PAR | ISA compatible parallel port |
| PAR, BID | Bidirectional parallel port |
| PTR | Pointing device |
| PTR, 8042 | 8042 pointing device (mouse) interface |
| SYS | System board |
| VID | Video board |
| VID, MDA | ISA compatible monochrome adapter |
| VID, MDA, MGA | Hercules monochrome adapter |
| VID, CGA | CGA, no write sync during retrace required |
| VID, CGA, RTR | CGA, write sync during retrace required |
| VID, EGA | ISA compatible EGA adapter |
| VID, VGA | ISA compatible VGA adapter |

```
        This list is not intended to be complete.
        Other types may be found in this field. This
        list describes some of the more common types
        found, other types should be similarly
        recognizable to someone sufficiently
        knowledgeable about computer hardware."
    ::= ( eisaFunctionEntry 4 )
eisaFunctionCfgFileRev     OBJECT-TYPE
    SYNTAX     DisplayString (SIZE (0 . . . 5))
    ACCESS     read-only
    STATUS     mandatory
    DESCRIPTION
        "The revision of the EISA configuration .CFG
        file used to configure this board."
    ::= ( eisaFunctionEntry 4 )
eisaFunctionSelections     OBJECT-TYPE
    SYNTAX     OCTET STRING (SIZE (0 . . . 26))
    ACCESS     read-only
    STATUS     mandatory
    DESCRIPTION
        "The selections that were chosen to create this
        function."
    ::= ( eisaFunctionEntry 6 )
```

©1992 Compaq Computer Corporation

Continuing to refer to FIGS. 5C1–8 and, in particular to FIG. 5C-3, the remaining tables included in EISA NVRAM child group will now be described in greater detail. The remaining tables (the EISA memory table, the EISA interrupt table, the EISA DMAtable, the EISA port table, the EISA free form table and the EISA initialization table) detail the resources used by each function of each configured card. More specifically, for each EISA memory configuration installed, the memory table located at branch 232.1.2.5.3 has an entry N which includes a slot index object located at branch 232.1.2.5.3.N.1, a function index object located at branch 232.1.2.5.3.N.2, an allocation index object located at branch 232.1.2.5.3.N.3, an address start object located at branch 232.1.2.5.3.N.4, a size object located at branch 232.1.2.5.3.N.5, a share object located at branch 232.1.2.5.3.N.6, a memory type object located at branch 232.1.2.5.3.N.7, a cache type object located at branch 232.1.2.5.3.N.8, an access object located at branch 232.1.2.5.3.N.9, a decode object located at branch 232.1.2.5.3.N.10 and a data size object located at branch 232.1.2.5.3.N.11. The formal organization of the memory table located at branch 232.1.2.5.3 is as follows:

```
eisaMemoryTable              OBJECT-TYPE
     SYNTAX       SEQUENCE OF EisaMemoryEntry
     ACCESS       not-accessible
     STATUS       mandatory
     DESCRIPTION
          "A list of EISA function memory configuration
          entries."
     ::= ( eisaNvram 3 )
eisaMemoryEntry              OBJECT-TYPE
     SYNTAX       EisaMemoryEntry
     ACCESS       not-accessible
     STATUS       mandatory
     DESCRIPTION
          "A description of an EISA function memory
          configuration."
     INDEX        ( eisaMemorySlotIndex,
                  eisaMemoryFunctionIndex,
                  eisaMemoryAllocationIndex )
     ::= ( eisaMemoryTable 1 )
EisaMemoryEntry              ::= SEQUENCE
     eisaMemorySlotIndex            INTEGER,
     eisaMemoryFunctionIndex        INTEGER,
     eisaMemoryAllocationIndex      INTEGER,
     eisaMemoryStartAddress         INTEGER,
     eisaMemorySize                 INTEGER,
     eisaMemoryShare                INTEGER,
     eisaMemoryType                 INTEGER,
     eisaMemoryCache                INTEGER,
     eisaMemoryAccess               INTEGER,
     eisaMemoryDecode               INTEGER,
     eisaMemoryDataSize             INTEGER
)
eisaMemorySlotIndex          OBJECT-TYPE
     SYNTAX       INTEGER
     ACCESS       read-only
     STATUS       mandatory
     DESCRIPTION
          "The EISA slot number of the board that
          registered the memory configuration this entry
          describes."
     ::= ( eisamemoryEntry 1 )
eisaMemoryFunctionIndex         OBJECT-TYPE
     SYNTAX       INTEGER
     ACCESS       read-only
     STATUS       mandatory
     DESCRIPTION
          "The function in which this memory
          configuration was registered."
     ::= ( eisaMemoryEntry 2 )
eisaMemoryAllocationIndex          OBJECT-TYPE
     SYNTAX       INTEGER
     ACCESS       read-only
     STATUS       mandatory
     DESCRIPTION
          "The index for this memory allocation entry in
          the EISA function block."
     ::= ( eisaMemoryEntry 3 )
eisaMemoryStartAddress          OBJECT-TYPE
     SYNTAX       INTEGER
     ACCESS       read-only
     STATUS       mandatory
     DESCRIPTION
          "The starting address of the memory
          configuration."
     ::= ( eisaMemoryEntry 4 )
eisaMemorySize    OBJECT-TYPE
     SYNTAX       INTEGER
     ACCESS       read-only
     STATUS       mandatory
```

-continued

```
     DESCRIPTION
          "The size in bytes of the memory
          configuration."
     ::= ( eisaMemoryEntry 5 )
eisaMemoryShare              OBJECT-TYPE
     SYNTAX       INTEGER (
                  nonshareable(1),
                  shareable(2)
                  )
     ACCESS       read-only
     STATUS       mandatory
     DESCRIPTION
          "This value indicates if the memory is
          shareable."
     ::= ( eisaMemoryEntry 6 )
eisaMemoryType    OBJECT-TYPE
     SYNTAX       INTEGER
                  systemBaseOrExtended(1),
                  expanded(2), virtual(3),
                  other(4)
                  )
     ACCESS       read-only
     STATUS       mandatory
     DESCRIPTION
          "The type of memory."
     ::= ( eisaMemoryEntry 7 )
eisaMemoryCache              OBJECT-TYPE
     SYNTAX       INTEGER (
              notCached(1),
              cached(2)
              )
     ACCESS       read-only
     STATUS       mandatory
     DESCRIPTION
          "The value indicates if the memory is cached.
     ::= ( eisaMemoryEntry 8 )
eisaMemoryAccess             OBJECT-TYPE
     SYNTAX       INTEGER (
              readOnly(1),
              readWrite(2)
              )
     ACCESS       read-only
     STATUS       mandatory
     DESCRIPTION
          "The type of access permitted for this memory."
     ::= ( eisaMemoryEntry 9)
eisaMemoryDecode             OBJECT-TYPE
     SYNTAX       INTEGER
     ACCESS       read-only
     STATUS       mandatory
     DESCRIPTION
          The memory decode size (the number of address
          lines supported)."
     ::= ( eisaMemoryEntry 10 )
eisaMemoryDataSize           OBJECT-TYPE
     SYNTAX       INTEGER
     ACCESS       read-only
     STATUS       mandatory
     DESCRIPTION
          "The data access size for the memory in bits."
     ::= ( eisaMemoryEntry 11)
```

©1992 Compaq Computer Corporation

Figures 4, 5C:
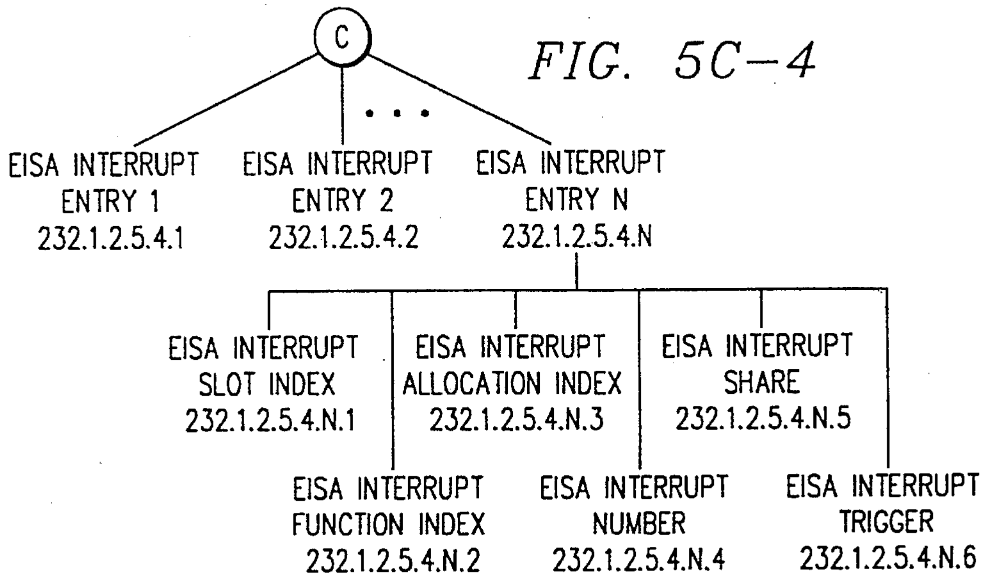

Referring next to FIG. 5C-4, the EISA interrupt table will now be described in greater detail. The EISA interrupt table located at branch 232.1.2.5.4 includes an entry N for each interrupt configuration N. Each entry N includes a slot index object located at branch 232.1.2.5.4.N.1, a function index object located at branch 232.1.2.5.4.N.2, an allocation index object located at branch 232.1.2.5.4.N.3, a number object located at branch 232.1.2.5.4.N.4, a share object located at branch 232.1.2.5.4.N.5 and a trigger object located at branch 232.1.2.5.4.N.6. Additional information regarding the interrupt table is detailed in the formal organization set forth below:

```
eisaInterruptTable          OBJECT-TYPE
    SYNTAX                  SEQUENCE OF
                            EisaInterruptEntry
    ACCESS                  not-accessible
    STATUS                  mandatory
    DESCRIPTION
        "A list of EISA function interrupt configuration
        entries."
    ::= (eisaNvram 4 )
eisaInterruptEntry          OBJECT-TYPE
    SYNTAX      EisaInterruptEntry
    ACCESS      not-accessible
    STATUS      mandatory
    DESCRIPTION
        "A description of an EISA function interrupt
        configuration."
    INDEX       ( eisaInterruptSlotIndex,
                eisaInterruptFunctionIndex,
                eisaInterruptAllocationIndex )
    ::= ( eisaInterruptTable 1
EisaInterruptEntry          ::= SEQUENCE (
    eisaInterruptSlotIndex          INTEGER,
    eisaInterruptFunctionIndex      INTEGER,
    eisaInterruptAllocationIndex    INTEGER,
    eisaInterruptNumber             INTEGER,
    eisaInterruptShare              INTEGER,
    eisaInterruptTrigger            INTEGER
eisaInterruptSlotIndex      OBJECT-TYPE
    SYNTAX      INTEGER
    ACCESS      read-only
    STATUS      mandatory
    DESCRIPTION
        "The EISA slot number of the board that registered
        the interrupt configuration this entry describes."
    ::= ( eisaInterruptEntry 1 )
eisaInterruptFunction Index OBJECT-TYPE
    SYNTAX      INTEGER
    ACCESS      read-only
    STATUS      mandatory
    DESCRIPTION
        "The function in which this interrupt configuration was
        registered."
    ::= ( eisaInterruptEntry 2 )
eisaInterruptAllocationIndex    OBJECT-TYPE
    SYNTAX      INTEGER
    ACCESS      read-only
    STATUS      mandatory
    DESCRIPTION
        "The index for this interrupt allocation entry in the EISA
        function block."
    ::= ( eisaInterruptEntry 3 )
eisaInterruptNumber         OBJECT-TYPE
    SYNTAX      INTEGER
    ACCESS      read-only
    STATUS      mandatory
    DESCRIPTION
        "The interrupt described in this entry."
    ::= ( eisaInterruptEntry 4 )
eisaInterruptShare          OBJECT-TYPE
    SYNTAX      INTEGER (
        nonshareable(1),
        shareable(2)
        )
    ACCESS      read-only
    STATUS      mandatory
    DESCRIPTION
        "This value indicates if the interrupt is shareable."
    ::= ( eisaInterruptEntry 5 )
eisaInterruptTrigger        OBJECT-TYPE
    SYNTAX      INTEGER (
        edged(1),
        level(2)
        )
    ACCESS      read-only
    STATUS      mandatory
```

-continued

```
    DESCRIPTION
        "This value indicates if the interrupt is edge or level
        triggered."
    ::= ( eisaInterruptEntry 6 )
```

© 1992 Compaq Computer Corporation

Figures 5, 5C:
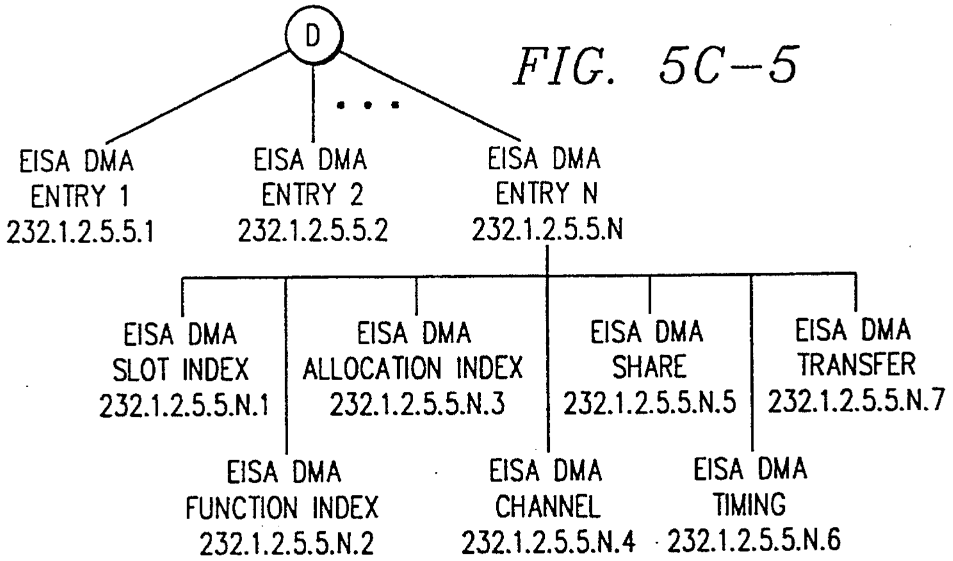

Referring next to FIG. 5C-5, the EISA DMAtable will now be described in greater detail. The EISA DMA table includes N entries, each having a slot index object at branch 232.1.2.5.5.N.1, a function index object at branch 232.1.2.5.5.N.2, an allocation index at branch 232.1.2.5.5 .N.3, a DMA channel object at branch 232.1.2.5.5 .N.4, a share object at branch 232.1.2.5.5 .N.5, a timing object at branch 232.1.2.5.5 .N.6 and a transfer size object at branch 232.1.2.5.6 .N.6. Further details regarding each of the entry objects for the EISA DMA table are as follows:

```
eisaDmaTable            OBJECT-TYPE
    SYNTAX              SEQUENCE OF EisaDmaEntry
    ACCESS              not-accessible
    STATUS              mandatory
    DESCRIPTION
        "A list of EISA function DMA configuration entries."
    ::= ( eisaNvram 5 )
eisaDmaEntry            OBJECT-TYPE
    SYNTAX      EisaDmaEntry
    ACCESS      not-accessible
    STATUS      mandatory
    DESCRIPTION
        "A description of an EISA function DMA
        configuration."
    ::= ( eisaDmaTable 1 )
EisaDmaEntry        ::= SEQUENCE (
    eisaDmaSlotIndex        INTEGER,
    eisaDmaFunctionIndex    INTEGER,
    eisaDmaAllocationIndex  INTEGER,
    eisaDmaChannel          INTEGER,
    eisaDmaShare            INTEGER,
    eisaDmaTiming           INTEGER,
    eisaDmaTransferSize     INTEGER
    )
eisaDmaSlotIndex        OBJECT-TYPE
    SYNTAX      INTEGER
    ACCESS      read-only
    STATUS      mandatory
    DESCRIPTION
        "The EISA slot number of the board that registered
        the DMA configuration this entry describes."
    ::= ( eisaDmaEntry 1 )
eisaDmaFunctionIndex    OBJECT-TYPE
    SYNTAX      INTEGER
    ACCESS      read-only
    STATUS      mandatory
    DESCRIPTION
        "The function in which this DMA configuration was
        registered."
    ::= ( eisaDmaEntry 2 )
eisaDmaAllocationIndex  OBJECT-TYPE
    SYNTAX      INTEGER
    ACCESS      read-only
    STATUS      mandatory
    DESCRIPTION
        "The index for this DMA channel allocation entry in
        the EISA function block."
    ::= ( eisaDmaEntry 3 )
eisaDmaChannelIndex     OBJECT-TYPE
    SYNTAX      INTEGER
    ACCESS      read-only
    STATUS      mandatory
    DESCRIPTION
        "The DMA channel described in this entry."
    ::= ( eisaDmaEntry 4 )
eisaDmaShare            OBJECT-TYPE
    SYNTAX      INTEGER (
        nonshareable(1),
        shareable(2)
```

```
    )
    ACCESS      read-only
    STATUS      mandatory
    DESCRIPTION
        "This value indicates if the DMA channel is
        shareable."
    ::= ( eisaDmaEntry 5 )
eisaDmaTiming           OBJECT-TYPE
    SYNTAX      INTEGER (
        eisaTiming(1),
        typeA(2),
        typeB(3),
        burstTypeC(4)
        )
    ACCESS      read-only
    STATUS      mandatory
    DESCRIPTION
        "This value indicates the timing (transfer rate)
        associated with this configuration of the DMA
        channel."
    ::= ( eisaDmaEntry 6 )
eisaDmaTransferSize     OBJECT-TYPE
    SYNTAX      INTEGER
    ACCESS      read-only
    STATUS      mandatory
    DESCRIPTION
        "This value indicates the transfer size in bits used over
        this DMA channel."
    ::= ( eisaDmaEntry 7 )
```

© 1992 Compaq Computer Corporation

Figures 5, 5C, 6:
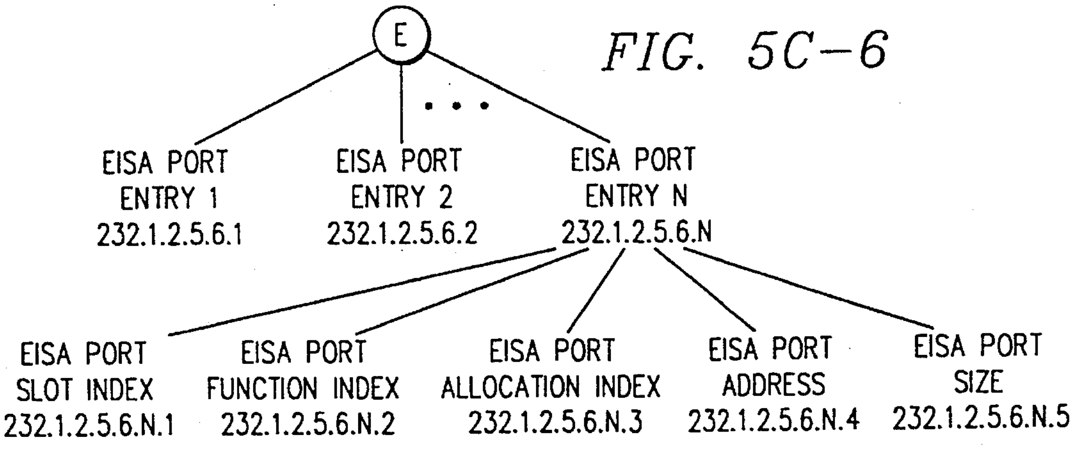
Figures 5, 5C, 6, 7:
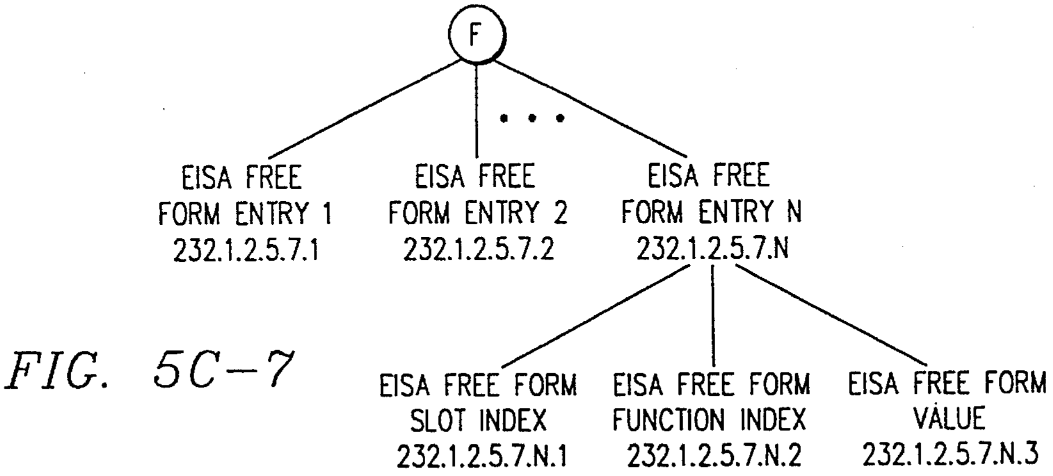
Figures 5, 5C, 6, 7, 8:
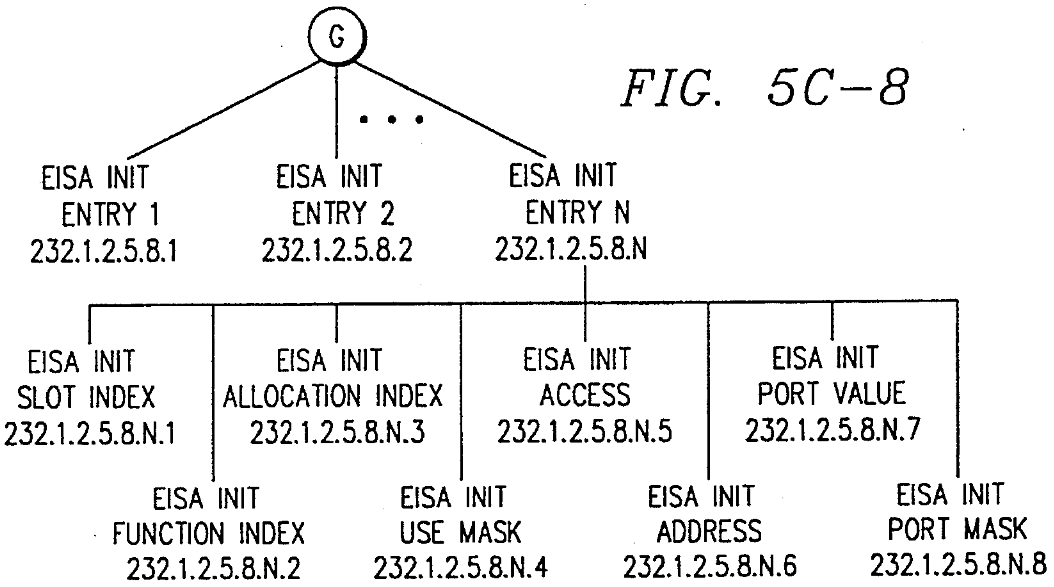

Referring next to FIG. 5C-6, the EISA port table will now be described in greater detail. The EISA port table includes N entries, each having a slot index object at branch 232.1.2.5.6.N.1, a function index object at branch 232.1.2.5.6.N.2, an allocation index at branch 232.1.2.5.6.N.3, an address object at branch 232.1.2.5.6.N.4 and a size object at branch 232.1.2.5.6.N.5. Further details regarding each of the entry objects for the EISA port table are as follows:

```
eisaPortTable               OBJECT-TYPE
    SYNTAX          SEQUENCE OF EisaPortEntry
    ACCESS          not-accessible
    STATUS          mandatory
    DESCRIPTION
        "A list of EISA function port I/O configuration
        entries."
    ::= ( eisaNvram 6 )
eisaPortEntry               OBJECT-TYPE
    SYNTAX      EisaPortEntry
    ACCESS      not-accessible
    STATUS      mandatory
    DESCRIPTION
        "A description of an EISA function Port I/O
        configuration."
    INDEX       (eisaPortSlotIndex, eisaPortFunctionIndex,
                eisaPortAllocationIndex )
    ::= ( eisaPortTable 1 )
EisaPortEntry       ::= SEQUENCE (
    eisaPortSlotIndex           INTEGER,
    eisaPortFunctionIndex       INTEGER,
    eisaPortAllocationIndex     INTEGER,
    eisaPortAddress             INTEGER,
    eisaPortShare               INTEGER,
    eisaPortSize                INTEGER
    )
eisaPortSlotIndex           OBJECT-TYPE
    SYNTAX      INTEGER
    ACCESS      read-only
    STATUS      mandatory
    DESCRIPTION
        "The EISA slot number of the board that registered
        the I/O port configuration this entry describes."
    ::= ( eisaPortEntry 1 )
eisaPortFunctionIndex       OBJECT-TYPE
```

```
    SYNTAX      INTEGER
    ACCESS      read-only
    STATUS      mandatory
    DESCRIPTION
        "The function in which this I/O port range
        configuration was registered."
    ::= ( eisaPortEntry 2 )
eisaPortAllocationIndex     OBJECT-TYPE
    SYNTAX      INTEGER
    ACCESS      read-only
    STATUS      mandatory
    DESCRIPTION
        "The index for this I/O port range allocation entry in
        the EISA function block."
    ::= ( eisaPortEntry 3 )
eisaPortAddress             OBJECT-TYPE
    SYNTAX      INTEGER
    ACCESS      read-only
    STATUS      mandatory
    DESCRIPTION
        "The I/O port address being described in this entry."
    ::= ( eisaPortEntry 4 )
eisaPortShare               OBJECT-TYPE
    SYNTAX      INTEGER (
        nonshareable(1),
        shareable(2)
        )
    ACCESS      read-only
    STATUS      mandatory
    DESCRIPTION
        "This value indicates if the Port channel is shareable."
    ::= ( eisaPortEntry 5 )
eisaPortSize                OBJECT-TYPE
    SYNTAX      INTEGER
    ACCESS      read-only
    STATUS      mandatory
    DESCRIPTION
        "The number of sequential ports starting at the
        eisaPortAddrIndex that are be configured."
    ::= ( eisaPortEntry 6 )
```

© 1992 Compaq Computer Corporation

Referring next to FIG. 5C-7, the EISA free form table will now be described in greater detail. The EISA free form table includes N entries, each having a slot index object at branch 232.1.2.5.7.N.1, a function index object at branch 232.1.2.5.7.N.2, and a value object at branch 232.1.2.5.7.N.3. Further details regarding each of the entry objects for the EISA free form table are as follows:

```
eisaFreeFormTable               OBJECT-TYPE
    SYNTAX      SEQUENCE OF EisaFreeFormEntry
    ACCESS      not-accessible
    STATUS      mandatory
    DESCRIPTION
        "A list of EISA function free form entries."
    ::= ( eisaNvram 7 )
eisaFreeFormEntry               OBJECT-TYPE
    SYNTAX      EisaFreeFormEntry
    ACCESS      not-accessible
    STATUS      mandatory
    DESCRIPTION
        "A description of an EISA function free form."
    INDEX       ( eisaFreeFormSlotIndex,
                eisaFreeFormFunctionIndex )
    ::= ( eisaFreeFormTable 1 )
    EisaPortEntry       ::= SEQUENCE (
eisaFreeFormSlotIndex           INTEGER,
eisaFreeFormFunctionIndex       INTEGER,
eisaFreeFormValue               OCTET STRING
                                (SIZE (0..25))
)
eisaFreeFormSlotIndex           OBJECT-TYPE
    SYNTAX      INTEGER
    ACCESS      read-only
    STATUS      mandatory
    DESCRIPTION
```

-continued

```
        "The EISA slot number of the board that registered
        the free form information this entry describes."
    ::= ( eisaFreeFormEntry 1 )
eisaFreeFormFunctionIndex        OBJECT-TYPE
    SYNTAX      INTEGER
    ACCESS      read-only
    STATUS      mandatory
    DESCRIPTION
        "The function in which this free form was registered."
    ::= ( eisaFreeFormEntry 2 )
eisaFreeFormValue                OBJECT-TYPE
    SYNTAX      OCTET STRING (SIZE (0..205)
    ACCESS      read-only
    STATUS      mandatory
    DESCRIPTION
        "The free form value."
    ::= ( eisaFreeFormEntry 3 )
```

© 1992 Compaq Computer Corporation

Referring next to FIG. 5C-8, the EISA initialization table will now be described in greater detail. The EISA initialization table includes N entries, each having a slot index object at branch 232.1.2.5.8.N.1, a function index object at branch 232.1.2.5.8.N.2, an allocation index object at branch 232.1.2.5.8.N.3, a use mask object at branch 232.1.2.5.8.N.4, an access object at branch 232.1.2.5.8.N.5, an address object at branch 232.1.2.5.8.N.6, a port value object at branch 232.1.2.5.8.N.7 and a port mask object at branch 232.1.2.5.8.N.8. Further details regarding each of the entry objects for the EISA initialization table are as follows:

```
eisaInitTable            OBJECT-TYPE
    SYNTAX               SEQUENCE OF EisaInitEntry
    ACCESS               not-accessible
    STATUS               mandatory
    DESCRIPTION
        "A list of EISA function port initialization entries."
    ::= ( eisaNvram 8 )
eisaInitEntry            OBJECT-TYPE
    SYNTAX      EisaInitEntry
    ACCESS      not-accessible
    STATUS      mandatory
    DESCRIPTION
        "A description of an EISA function port initialization."
INDEX           (eisaInitSlotIndex, eisaInitFunctionIndex,
                eisaInitAllocationIndex)
    ::= ( eisaInitTable 1 )
EisaInitEntry    ::= SEQUENCE (
    eisaInitSlotIndex           INTEGER,
    eisaInitFunctionIndex       INTEGER,
    eisaInitAllocationIndex     INTEGER,
    eisaInitUseMask             INTEGER,
    eisaInitAccess              INTEGER,
    eisaInitAddress             INTEGER,
    eisaInitPortValue           INTEGER,
    eisaInitPortMask            INTEGER
    )
eisaInitSlotIndex        OBJECT-TYPE
    SYNTAX      INTEGER
    ACCESS      read-only
    STATUS      mandatory
    DESCRIPTION
        "The EISA slot number of the board that registered
        the port initialization this entry describes."
    ::= ( eisaInitEntry 1 )
eisaInitFunctionIndex    OBJECT-TYPE
    SYNTAX      INTEGER
    ACCESS      read-only
    STATUS      mandatory
    DESCRIPTION
        "The function in which this port initialization was
        registered."
    ::= ( eisaInitEntry 2 )
eisaInitAllocationIndex  OBJECT-TYPE
    SYNTAX      INTEGER
    ACCESS      read-only
```

-continued

```
    STATUS      mandatory
    DESCRIPTION
        "The index for this port initialization entry in the EISA
        function block."
    ::= ( eisaInitEntry 3 )
eisaInitUseMask          OBJECT-TYPE
    SYNTAX      INTEGER (
        useValueOnly(1),
        useValueAndMask(2)
        )
    ACCESS      read-only
    STATUS      mandatory
    DESCRIPTION
        "This indicates if a mask will be used when performing
        initialization."
    ::= ( eisaInitEntry 4 )
eisaInitAccess           OBJECT-TYPE
    SYNTAX      INTEGER (
        eightBitAddress(1),
        sixteenBitAddress(2)
        thirtyTwoBitAddress (3)
        )
    ACCESS      read-only
    STATUS      mandatory
    DESCRIPTION
        "This value indicates the number of bits this entry
        initializes."
    ::= ( eisaInitEntry 5 )
eisaInitAddress          OBJECT-TYPE
    SYNTAX      INTEGER
    ACCESS      read-only
    STATUS      mandatory
    DESCRIPTION
        "This value indicates the port address this entry
        initializes."
    ::= ( eisaInitEntry 6 )
eisaInitPortValue        OBJECT-TYPE
    SYNTAX      INTEGER
    ACCESS      read-only
    STATUS      mandatory
    DESCRIPTION
        "This value indicates the value this entry initializes the
        port to."
    ::= ( eisaInitEntry 7 )
eisaInitPortMask         OBJECT-TYPE
    SYNTAX      INTEGER
    ACCESS      read-only
    STATUS      mandatory
    DESCRIPTION
        "This value indicates the mask to use when performing
        initialization."
    ::= ( eisaInitEntry 8 )
```

© 1992 Compaq Computer Corporation

Figure 5D:
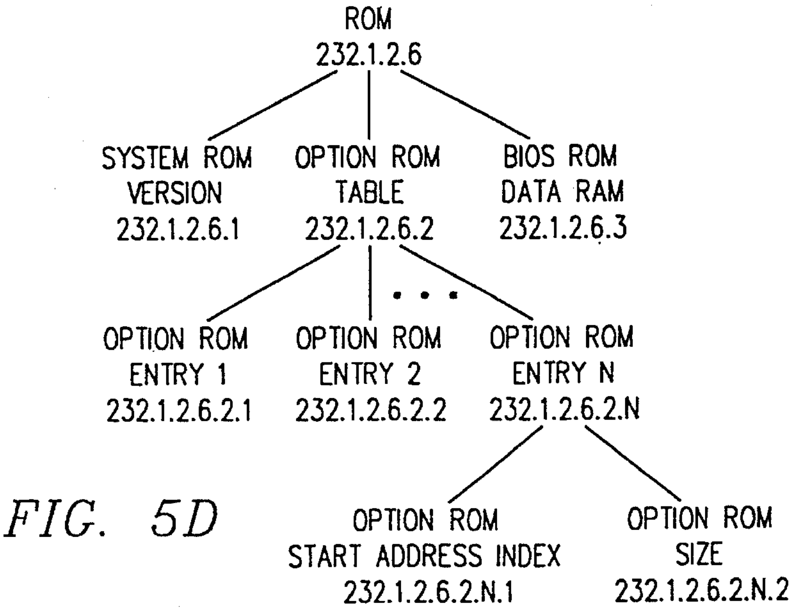
FIG. 5D is an inheritance tree illustrating a ROM child group of the component group of the subMIB of FIG. 5A.

Referring now to FIG. 5D, the ROM child group will now be described in greater detail. The ROM group located at branch 232.1.2.6 describes the system ROM, both version and date using a version object located at branch 232.1.2.6.1, and uses an N entry option ROM table, each entry having an address index object located at branch 232.1.2.6.2.N.1 and a size object located at branch 232.1.2.6.2.N.2 which describes the starting address and size of each option ROM in the system. The formal organization of the ROM group is as follows:

```
systemRomVersion         OBJECT-TYPE
    SYNTAX      DisplayString (SIZE (0..255))
    ACCESS      read-only
    STATUS      mandatory
    DESCRIPTION
        "The system ROM manufacturer, family, and version
        information."
    ::= ( rom 1 )
optionRomTable           OBJECT-TYPE
    SYNTAX      SEQUENCE OF OptionSlotEntry
    ACCESS      not-accessible
```

-continued

```
    STATUS        optional
    DESCRIPTION
        "A table of option ROM descriptions."
    ::= ( rom 2 )
optionRomEntry                OBJECT-TYPE
    SYNTAX        OptionRomEntry
    ACCESS        not-accessible
    STATUS        optional
    DESCRIPTION
        "An option ROM description."
    INDEX     ( optionRomStartAddrIndex )
    ::= ( optionRomTable 1 )
OptionRomEntry                ::-SEQUENCE (
    optionRomStartAddrIndex       INTEGER,
    optionRomSize                 INTEGER
    )
optionRomStartAddrIndex       OBJECT-TYPE
    SYNTAX        INTEGER
    ACCESS        read-only
    STATUS        optional
    DESCRIPTION
        "The starting address of the option ROM."
    ::= ( optionRomEntry 1 )
optionRomSize                 OBJECT-TYPE
    SYNTAX        INTEGER
    ACCESS        read-only
    STATUS        optional
    DESCRIPTION
        "The size in bytes of the option ROM."
    ::= ( optionRomEntry 2 )
biosRomDataRaw                OBJECT-TYPE
    SYNTAX        OCTET STRING (SIZE (0..256))
    ACCESS        read-only
    STATUS        optional
    DESCRIPTION
        "The BIOS ROM data area. This may be the current
        contents a copy of the BIOS ROM data area from
        when the SNMP agent was loaded."
    ::= ( rom 3 )
```

© 1992 Compaq Computer Corporation

Returning momentarily to FIG. 5A, the keyboard child group will now be described in greater detail. The keyboard group is located at branch 232.1.2.7 contains a description object located at branch 232.1.2.7.1 which describes the keyboard attached to the system and which is organized as follows:

```
keyboardDescription       OBJECT-TYPE
    SYNTAX        DisplayString (SIZE (0...255))
    ACCESS        read-only
    STATUS        mandatory
    DESCRIPTION
        "A description of the keyboard"
    ::= ( keyboard 1)
```

© 1992 Compaq Computer Corporation

The video group is located at branch 232.1.2.8 and includes a description object located at branch 232.1.2.8.1 which describes the video adaptor and display and is configured as follows:

```
videoDescription          OBJECT-TYPE
    SYNTAX        DisplayString (SIZE (0..255))
    ACCESS        read-only
    STATUS        mandatory
    DESCRIPTION
        "A description of the video system in the computer.
        This may include the manufacturer, board name, modes
        supported, etc.."
    ::= ( video 1 )
```

© 1992 Compaq Computer Corporation

Figure 5E:
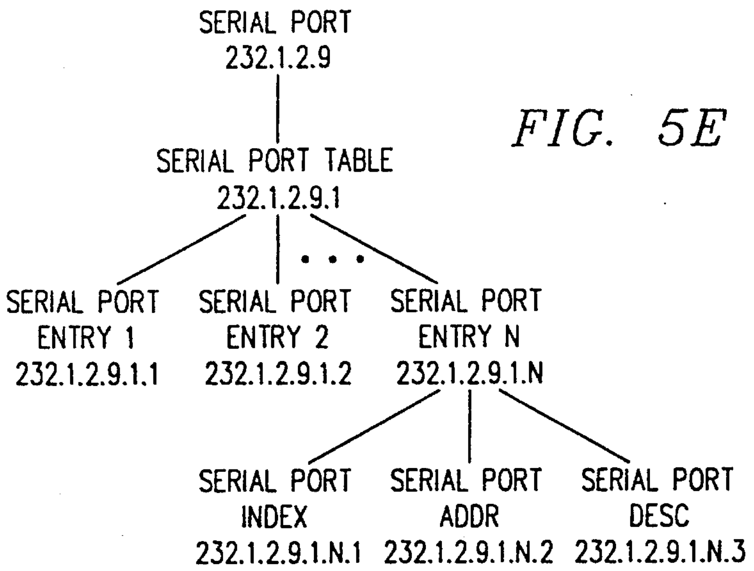
FIG. 5E is an inheritance tree illustrating a serial port child group of the component group of the subMIB of FIG. 5A.

Referring now to FIG. 5E, the serial port child group will now be described in greater detail. The serial port group is located at branch 232.1.2.9 and includes a table located at branch 232.1.2.9.1 which contains N entries, each containing configuration information for one of the serial ports installed in the system. The configuration information is contained in an index object located at branch 232.1.2.9.1.N.1, an address object located at branch 232.1.2.9.1.N.2 and a description object located at branch 232.1.2.9.1.N.3. The serial port group is organized as follows:

```
serialPortTable       OBJECT-TYPE
    SYNTAX        SEQUENCE OF SerialPortEntry
    ACCESS        not-accessible
    STATUS        mandatory
    DESCRIPTION
        "A table of serial port descriptions."
    ::= ( serialPort 1 )
serialPortIndex       OBJECT-TYPE
    SYNTAX        INTEGER
    ACCESS        read-only
    STATUS        mandatory
    DESCRIPTION
        "A description of a serial port."
    INDEX         ( serialPortIndex )
    ::= ( serialPortTable 1 )
SerialPortEntry       ::= SEQUENCE
    serialPortIndex     INTEGER,
    serialPortAddr      INTEGER,
    serialPortDesc      DisplayString (SIZE (0..255))
    serialPortIndex     OBJECT-TYPE
    SYNTAX        INTEGER
    ACCESS        read-only
    STATUS        mandatory
    DESCRIPTION
        "An index that uniquely specifies this entry."
    ::= ( serialPortEntry 1)
serialPortAddr        OBJECT-TYPE
    SYNTAX        INTEGER
    ACCESS        read-only
    STATUS        mandatory
    DESCRIPTION
        "The I/O port address used by this serial port."
    ::= ( serialPortEntry 2 )
serialPortDesc        OBJECT-TYPE
    SYNTAX        INTEGER
    ACCESS        read-only
    STATUS        mandatory
    DESCRIPTION
        "A text description of further information known about
        the serial port. This may be an empty string if no
        further information is known."
    ::= ( serialPortEntry 3 )
```

© 1992 Compaq Computer Corporation

Figure 5F:
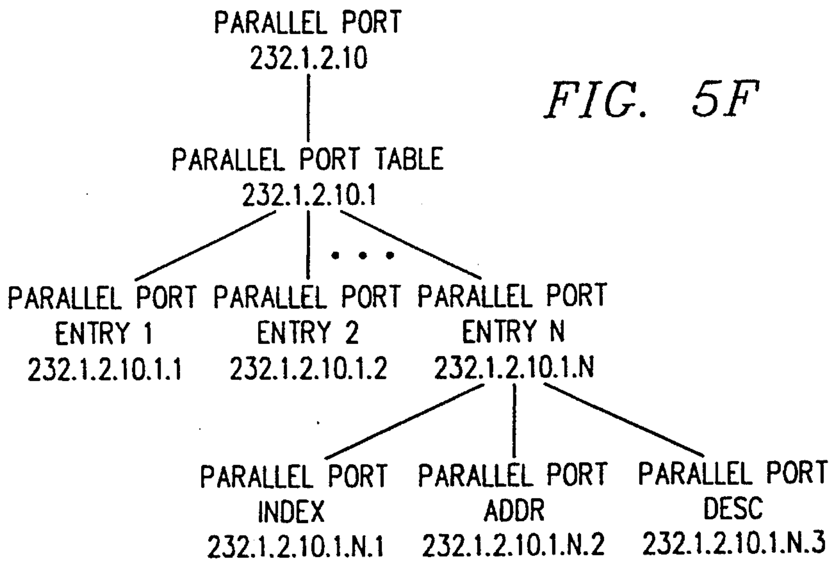
FIG. 5F is an inheritance tree illustrating a parallel port child group of the component group of the subMIB of FIG. 5A.

Referring now to FIG. 5F, the parallel port child group will now be described in greater detail. The parallel port group is located at branch 232.1.2.10 and includes a table located at branch 232.1.2.10.1 which contains N entries, each containing configuration information for one of the parallel ports installed in the system. The configuration information is contained in an index object located at branch 232.1.2.10.1.N.1, an address object located at branch 232.1.2.10.1.N.2 and a description object located at branch 232.1.2.10.1.N.3. The parallel port group is organized as follows:

```
parallelPortTable     OBJECT-TYPE
    SYNTAX        SEQUENCE OF ParallelPortEntry
    ACCESS        not-accessible
    STATUS        mandatory
    DESCRIPTION
        "A table of parallel port descriptions."
    ::= ( parallelPort 1 )
parallelPortEntry     OBJECT-TYPE
    SYNTAX        ParallelPortEntry
```

```
    ACCESS      not-accessible
    STATUS      mandatory
    DESCRIPTION
        "A description of a parallel port."
    INDEX       ( parallelPortIndex )
    ::= ( parallelPortTable 1 )
ParallelPortEntry     ::-SEQUENCE (
    parallelPortIndex    INTEGER,
    parallelPortAddr     INTEGER,
    parallelPortDesc     DisplayString (SIZE (0..255))
)
parallelPortIndex    OBJECT-TYPE
    SYNTAX      INTEGER
    ACCESS      read-only
    STATUS      mandatory
    DESCRIPTION
        "An index that uniquely specifies this entry."
    ::= ( parallelPortEntry 1 )
parallelPortAddr     OBJECT-TYPE
    SYNTAX      INTEGER
    ACCESS      read-only
    STATUS      mandatory
    DESCRIPTION
        "The I/O port address used by this parallel port."
    ::= ( parallelPortEntry 2 )
parallelPortDesc     OBJECT-TYPE
    SYNTAX      displayString (SIZE (0..255))
    ACCESS      read-only
    STATUS      mandatory
    DESCRIPTION
        "A text description of further information known abut
        the parallel port. This may be an empty string if no
        further information is known."
    ::= (parallelPortEntry 3 )
```

© 1992 Compaq Computer Corporation

Figure 5G:
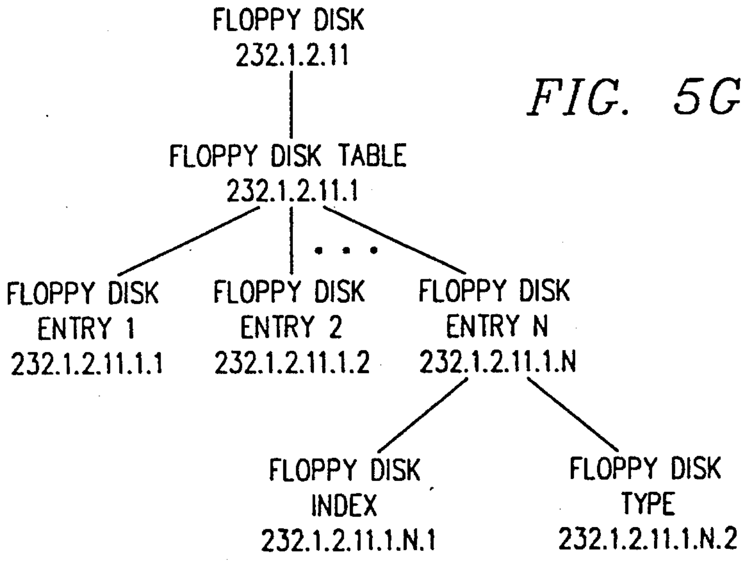
FIG. 5G is an inheritance tree illustrating a floppy disk child group of the component group of the subMIB of FIG. 5A.

Referring now to FIG. 5G, the floppy diskette child group will now be described in greater detail. The floppy diskette group is located at branch 232.1.2.11 and includes a table located at branch 232.1.2.11.1 which contains N entries, each of which describes a floppy diskette drive installed in the system. The description of a floppy diskette drive is contained in an index object located at branch 232.1.2.11.1.N.1 and a type object located at branch 232.1.2.11.1.N.2. The floppy diskette group is organized as follows:

```
floppyDisketteTable    OBJECT-TYPE
    SYNTAX      SEQUENCE OF FloppyDisketteEntry
    ACCESS      not-accessible
    STATUS      mandatory
    DESCRIPTION
        "A table of floppy drive descriptions."
    ::= ( floppyDiskette 1 )
floppyDisketteEntry    OBJECT-TYPE
    SYNTAX      FloppyDisketteEntry
    ACCESS      not-accessible
    STATUS      mandatory
    DESCRIPTION
        "A floppy drive description."
    INDEX       ( floppydisketteIndex )
    ::= ( floppyDisketteTable 1 )
FloppyDisketteEntry      ::=SEQUENCE (
    floppyDisketteIndex      INTEGER,
    floppyDisketteType       INTEGER
)
floppyDisketteIndex    OBJECT-TYPE
    SYNTAX      INTEGER
    ACCESS      read-only
    STATUS      mandatory
    DESCRIPTION
        ""An index that uniquely specifies this entry. If
        possible, this field will map directly to the drive letter
        (1 for A:, 2 for B:)."
    ::= ( floppyDisketteEntry 1 )
floppyDiskettetype     OBJECT-TYPE
    SYNTAX      INTEGER (
        drive360k(1),
        drive1200k(2),
        drive720k(3),
        drive1440k(4)
        )
    ACCESS      read-only
    STATUS      mandatory
    DESCRIPTION
        "The type (capacity) of the floppy drive. The following
        values are valid:
        drive360k (1) This is a 360 kilobyte, 5.25 inch floppy
        drive.
        drive1200k (2) This is a 1.2 megabyte, 5.25 inch floppy
        drive.
        drive720k (3) This is a 720 kilobyte, 3.5 inch floppy
        drive.
        drive1440k (4) This is a 1.44 megabyte, 3.5 inch
        floppy drive."
    ::= ( floppyDisketteEntry 2 )
```

© 1992 Compaq Computer Corporation

Figure 5H:
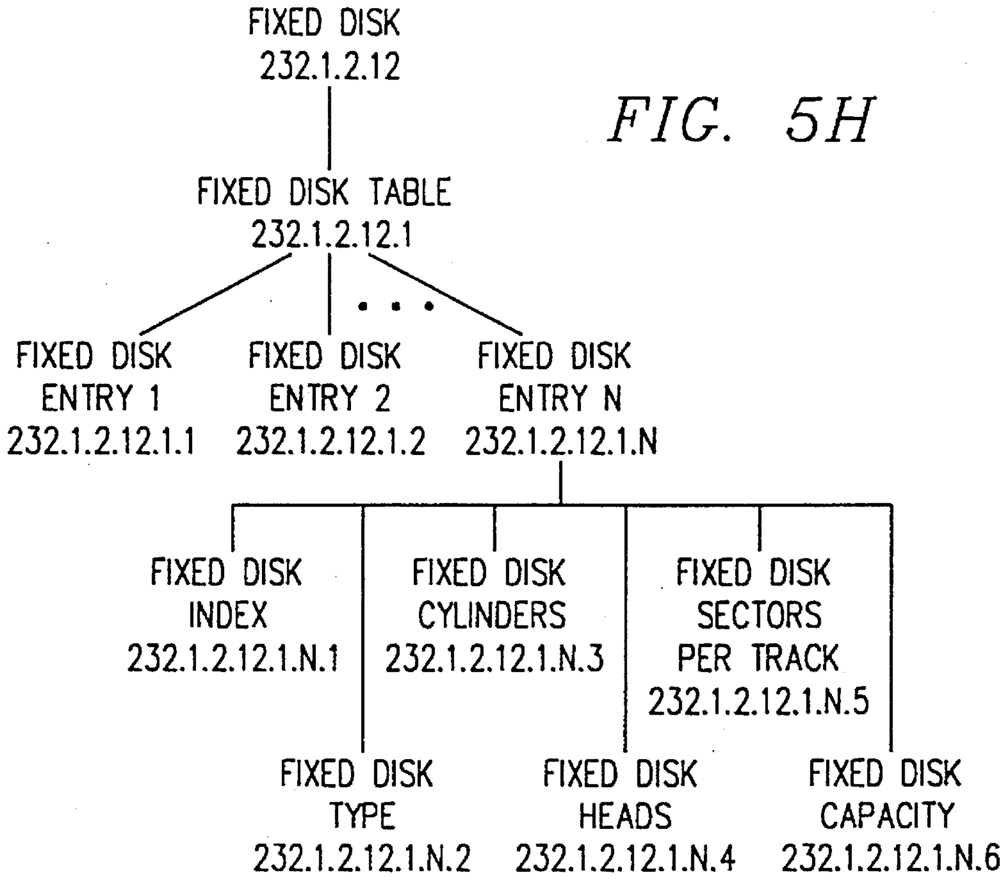
FIG. 5H is an inheritance tree illustrating a fixed disk child group of the component group of the subMIB of FIG. 5A.

Referring now to FIG. 5H, the fixed disk child group will now be described in greater detail. The fixed disk group is located at branch 232.1.2.12 and includes a table located at branch 232.1.2.12.1 which contains N entries, each of which describes the configuration of a fixed disk drive installed in the system which is accessible through a ST506 compatible interface. The description of a fixed disk drive is contained in an index object located at branch 232.1.2.12.1.N.1, a type object located at branch 232.1.2.12.1.N.2, a cylinders object located at branch 232.1.2.12.1.N.3, a heads object located at branch 232.1.2.12.1.N.4, a sectors per track object located at branch 232.1.2.12.1.N.5 and a capacity object located at branch 232.1.2.12.1.N.6. The floppy diskette group is organized as follows:

```
fixedDiskTable              OBJECT-TYPE
    SYNTAX                  SEQUENCE OF FixedDiskEntry
    ACCESS                  not-accessible
    STATUS                  mandatory
    DESCRIPTION
        "A table of ST-506 interface accessible fixed disk
        descriptions."
    ::= ( fixedDisk 1 )
fixedDiskEntry              OBJECT-TYPE
    SYNTAX                  fixedDiskEntry
    ACCESS                  not-accessible
    STATUS                  mandatory
    DESCRIPTION
        "A fixed disk description."
    INDEX                   ( fixedDiskIndex )
    ::= ( fixedDiskTable 1)
FixedDiskEntry              ::= SEQUENCE (
    fixedDiskIndex               INTEGER,
    fixedDiskType                INTEGER,
    fixedDiskCylinders           INTEGER,
    fixedDiskHeads               INTEGER,
    fixedDiskSectorsPerTrack     INTEGER,
    fixedDiskCapacity            INTEGER
)
fixedDiskIndex              OBJECT-TYPE
    SYNTAX                  INTEGER
    ACCESS                  read-only
    STATUS                  mandatory
    DESCRIPTION
        "An index that uniquely specifies this entry. Each
        possible index value indicates a special drive as shown
        in the table below:
        fiskDiskIndex   IDE/ESDI Controller   Drive Unit
        1               Primary               1
        2               Primary               2
        3               Secondary             1
        4               Secondary             2
        Any other index value would be implementation
```

-continued

```
        specific."
    ::= ( fixedDiskEntry 1 )
fixedDiskType               OBJECT-TYPE
    SYNTAX                  INTEGER
    ACCESS                  read-only
    STATUS                  mandatory
    DESCRIPTION
        "The drive type."
    ::= ( fixedDiskEntry 2 )
fixedDiskCylinders          OBJECT-TYPE
    SYNTAX      INTEGER
    ACCESS      read-only
    STATUS      mandatory
    DESCRIPTION
        "The number of cylinders on the drive."
    ::= ( fixedDiskEntry 3 )
fixedDiskHeads              OBJECT-TYPE
    SYNTAX                  INTEGER
    ACCESS                  read-only
    STATUS                  mandatory
    DESCRIPTION
        "The number of heads on the drive."
    ::= ( fixedDiskEntry 4 )
fixedDiskSectorsPerTrack    OBJECT-TYPE
    SYNTAX      INTEGER
    ACCESS      read-only
    STATUS      mandatory
    DESCRIPTION
        "The number of sectors per tract on the drive."
    ::= ( fixedDiskEntry 5 )
fixedDiskCapacity           OBJECT-TYPE
    SYNTAX      INTEGER
    ACCESS      read-only
    STATUS      mandatory
    DESCRIPTION
        "The capacity of the drive in megabytes."
    ::= ( fixedDiskEntry 6 )
```

© 1992 Compaq Computer Corporation

Figure 6B:
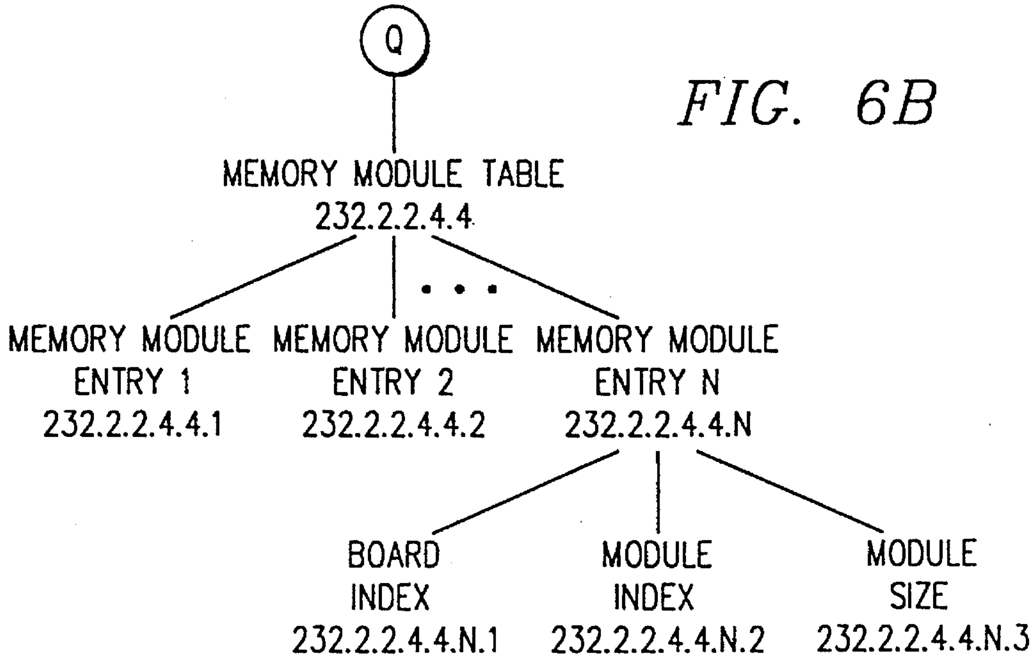
FIG. 6B is an inheritance tree illustrating a system board child group of a component group of the subMIB of FIG. 6A.
Figure 6A:
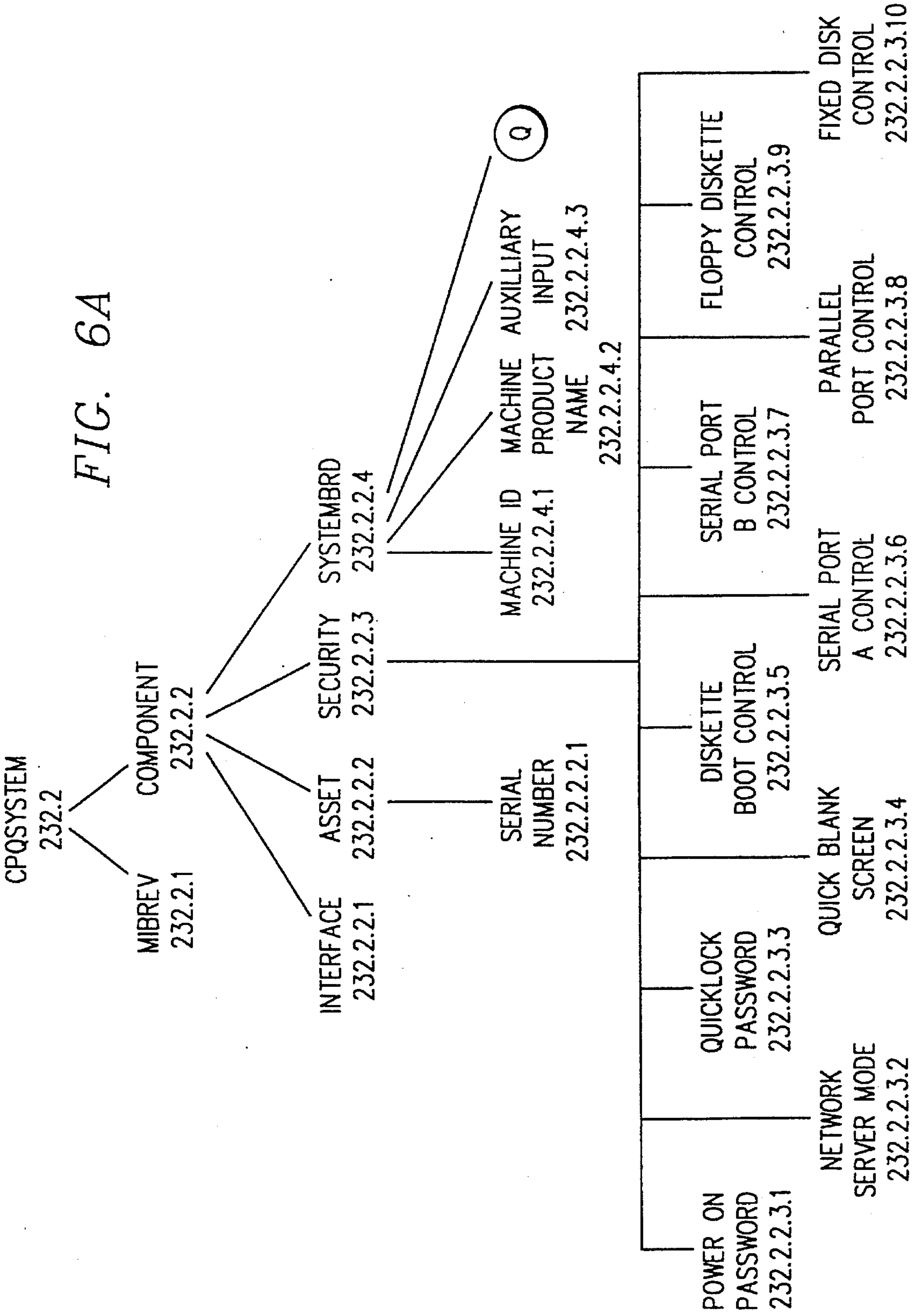
FIG. 6A is an inheritance tree illustrating a second subMIB of the enterprise MIB of FIG. 4A.

Referring next to FIG. 6A, the Compaq system subMIB 232.2 which consists of data describing system board information specific to computer systems manufactured by Compaq Computer Corporation shall now be described in greater detail. IMPORTS used in the system subMIB 232.2 are as follows:

| Import | Defined by |
|---|---|
| enterprises | RFC1155-SMI |
| Counter | RFC1155-SMI |
| Gauge | RFC1155-SMI |
| TimeTicks | RFC1155-SMI |
| DisplayString | RFC1158-MIB |
| OBJECT-TYPE | RFC-1212 |

The system subMIB includes two child groups, a mibRev group located at branch 232.2.1 and a component group located at branch 232.2.2. The mibRev child group contains information regarding the revision of the subMIB to which the SNMP agent conforms and is configured as previously described in FIG. 4*b*.

The component child group contains information describing Compaq extensions to standard PC, ISA and EISA architectures. This information is contained in plural child groups of the component group. The component group's child groups are an interface child group containing information specific to the host software that supports runtime object instances, located at branch 232.2.2.1, an asset child group located at branch 232.2.2.2, a security child group located at branch 232.2.2.3 and a system board child group located at branch 232.2.2.4.

The asset child group located at branch 232.2.2.2 contains the serial numbers of any hardware, for example, file server 10, manufactured by Compaq Computers which support asset management and is comprised of a single object, referred to as a serial number object, located at branch is organized according to the following:

```
systemSerialNumber   OBJECT-TYPE
    SYNTAX      DisplayString (SIZE (0..255))
    ACCESS      read-only
    STATUS      mandatory
    DESCRIPTION
        "The serial number of the system unit. The string will
        be empty if the system does not report the serial
        number function."
```

© 1992 Compaq Computer Corporation

The security child group located at branch 232.2.2.3 contains object instances describing how security features installed on computers manufactured by Compaq Computer Corporation installed in the system are configured. The security group includes 10 objects, a power on password object located at branch 232.2.2.1, a network server mode object located at branch 232.2.2.2, a quick lock password object located at branch 232.2.2.3, a quick blank screen object located at branch 232.2.2.4, a diskette boot control object located at branch 232.2.2.5, a primary serial port access control object located at branch 232.2.2.6, a secondary serial port access control object located at branch 232.2.2.7, a parallel port access control object located at branch 232.2.2.8, a floppy diskette control object located at branch 232.2.2.9, a fixed disk control object located at branch 232.2.2.10. The security child group is organized according to the following framework:

```
powerOnPassword         OBJECT-TYPE
    SYNTAX      INTEGER     (
        other(1),
        disabled(2),
        enabled (3)
        )
    ACCESS      read-only
    STATUS      mandatory
    DESCRIPTION
        "The state of the power on password feature."
    ::= ( security 1 )
networkServerMode       OBJECT-TYPE
    SYNTAX      INTEGER     (
        other(1),
        disabled(2),
        enabled (3)
        )
    ACCESS      read-only
    STATUS      mandatory
    DESCRIPTION
        "The state of the network server mode feature."
    ::= ( security 2 )
quickLockPassword       OBJECT-TYPE
    SYNTAX      INTEGER     (
        other(1),
        disabled(2),
        enabled (3)
        )
    ACCESS      read-only
    STATUS      mandatory
    DESCRIPTION
        "The state of the quicklock password feature."
    ::= ( security 3 )
    quickBlankScreen    OBJECT-TYPE
    SYNTAX      INTEGER     (
        other(1),
        disabled(2),
        enabled (3)
        )
    ACCESS      read-only
    STATUS      mandatory
    DESCRIPTION
        "The state of the quicklock blank screen feature."
```

-continued

```
    ::= ( security 4 )
disketteBootcontrol      OBJECT-TYPE
    SYNTAX      INTEGER     (
        other(1),
        disabled(2),
        enabled (3)
        )
    ACCESS      read-only
    STATUS      mandatory
    DESCRIPTION
        "The state of the diskette boot control feature."
    ::= ( security 5 )
serialPortAControl       OBJECT-TYPE
    SYNTAX      INTEGER     (
        other(1),
        disabled(2),
        enabled (3)
        )
    ACCESS      read-only
    STATUS      mandatory
    DESCRIPTION
        "The state of the access control for the primary serial
        port interface embedded in the Compaq system board."
    ::= ( security 6 )
serialPortBControl       OBJECT-TYPE
    SYNTAX      INTEGER     (
        other(1),
        disabled(2),
        enabled (3)
        )
    ACCESS      read-only
    STATUS      mandatory
    DESCRIPTION
        "The state of the access control for the secondary
        serial port interface embedded in the Compaq system
        board."
    ::= ( security 7 )
parallelPortControl      OBJECT-TYPE
    SYNTAX      INTEGER     (
        other(1),
        disabled(2),
        enabled (3)
        )
    ACCESS      read-only
    STATUS      mandatory
    DESCRIPTION
        "The state of the access control for the parallel
        port interface embedded in the Compaq system board."
    ::= ( security 8 )
floppyDisketteControl    OBJECT-TYPE
    SYNTAX      INTEGER     (
        other(1),
        disabled(2),
        enabled (3)
        )
    ACCESS      read-only
    STATUS      mandatory
    DESCRIPTION
        "The state of the access control for the floppy
        diskette interface embedded in the Compaq system
        board."
    ::= ( security 9 )
fixedDiskControl         OBJECT-TYPE
    SYNTAX      INTEGER     (
        other(1),
        disabled(2),
        enabled (3)
        )
    ACCESS      read-only
    STATUS      mandatory
    DESCRIPTION
        "The state of the access control for the fixed
        disk interface embedded in the Compaq system board."
    ::= ( security 10 )
```

© 1992 Compaq Computer Corporation

The system board child group located at branch 232.2.2.4 describes features of a Compaq Computer Corporation type system board such as machine ID, product name and others. Such features are described in three objects, a machine ID object located at branch 232.2.2.4.1, a machine product name object located at branch 232.2.2.4.2 and an auxiliary input object located at branch 232.2.2.4.3 and a memory module table located at branch 232.2.2.4.4. Further details regarding the aforementioned objects are set forth in the organizational structure for the system board group set forth below:

```
machineId                OBJECT-TYPE
    SYNTAX      INTEGER
    ACCESS      read-only
    STATUS      mandatory
    DESCRIPTION
        "The machine ID."
    ::= ( systemBoard 1 )
machineProductName       OBJECT-TYPE
    SYNTAX      DisplayString (SIZE (0..255))
    ACCESS      read-only
    STATUS      mandatory
    DESCRIPTION
        "The machine product name."
    ::= ( systemBoard 2 )
auxiliaryInput           OBJECT-TYPE
    SYNTAX      INTEGER     (
        other(1),
        disabled(2),
        enabled (3)
        )
    ACCESS      read-only
    STATUS      mandatory
    DESCRIPTION
        "The state of the auxiliary input (pointing) device."
    ::= ( systemBoard 4 )
```

© 1992 Compaq Computer Corporation

Referring next to FIG. 6B, the memory module table of the system board child group will now be described in greater detail. The memory module table is located at branch 232.2.2.4.4 and describes the memory board installed in the file server 10. The memory module table includes N branches, one for each memory board installed in the file server 10. Each entry includes a board index object located at branch 232.2.2.4.4.N.1, a module index located at branch 232.2.2.4.4.N.2 and a module size object located at branch 232.2.2.4.4.N.3. The memory module table is organized as follows:

```
memoryModuleTable        OBJECT-TYPE
    SYNTAX      SEQUENCE OF MemoryModuleEntry
    ACCESS      not-accessible
    STATUS      optional
    DESCRIPTION
        "The table of memory module descriptions."
    ::= ( systemBoard 5 )
memoryModuleEntry        OBJECT-TYPE
    SYNTAX      MemoryModuleEntry
    ACCESS      not-accessible
    STATUS      optional
    DESCRIPTION
        "A memory module description."
    ::= ( memoryModuleTable 1 )
MemoryModuleEntry        ::=SEQUENCE        (
    memoryBoardIndex        INTEGER,
    memoryModuleIndex       INTEGER,
    memoryModuleSize        INTEGER
    )
memoryBoardIndex         OBJECT-TYPE
    SYNTAX      INTEGER
    ACCESS      read-only
    STATUS      optional
    DESCRIPTION
        "The slot in which the memory board is installed."
    ::= ( memoryModuleEntry 1 )
memoryModuleIndex        OBJECT-TYPE
    SYNTAX      INTEGER
```

-continued

```
    ACCESS      read-only
    STATUS      optional
    DESCRIPTION
        "The memory module number."
    ::= ( memoryModuleEntry 2 )
memoryModuleSize    OBJECT-TYPE
    SYNTAX      INTEGER
    ACCESS      read-only
    STATUS      optional
    DESCRIPTION
        "Module memory size in kilobytes. A kilobyte of
        memory is defined as 1024 bytes."
    ::= ( memoryModuleEntry 2 )
```

© 1992 Compaq Computer Corporation

Figure 7A:
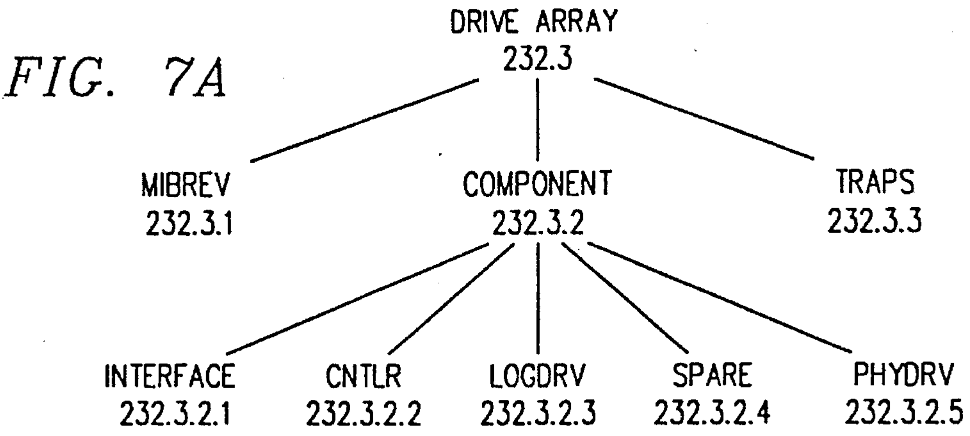
FIG. 7A is an inheritance tree illustrating a third subMIB of the enterprise MIB of FIG. 4A.

Referring next to FIG. 7A, the drive array subMIB located at branch 232.3 will now be described in greater detail. The drive array subMIB details the intelligent drive array and includes data which describes the drive array subsystem, including the internal intelligent drive array (or "IDA"), external IDA and accelerated IDA, including configuration and status information about the controllers, logical drives, physical drives, spare drives, 4MB array accelerator write cache board typically included in an intelligent drive array. Information regarding the relationship of the intelligent drive array and the host operating system is also included in the drive array subMIB.

The drive array subMIB includes three child groups, a mibREV group located at branch 232.3.1, a component group located at branch 232.3.2, and a traps group located at branch 232.3.3. The mibRev child group contains information regarding the revision of the subMIB to which the SNMP agent conforms and is configured as previously described in FIG. 4B and the trap group contains information regarding traps issued from the drive array subMIB and is configured as previously described in FIG. 4*c*. Trap definitions specific to the traps child group located at branch 232.2.3 are as follows:

```
logDrvStatusChange              TRAP-TYPE
    ENTERPRISE                  driveArray
    VARIABLES                   ( logDrvStatus )
    DESCRIPTION
        "A logDrvStatusChange trap signifies
        that the sending SNMP agent has
        detected a change in the
        logDrvStatus of a Compaq Drive Array
        logical drive. The variable
        logDrvStatus indicates the new
        logical drive status."
    ::= 1
spareStatusChange               TRAP-TYPE
    ENTERPRISE                  driveArray
    VARIABLES                   ( spareStatus )
    DESCRIPTION
        "A spareStatusChange trap signifies
        that the sending SNMP agent has
        detected a change in the sparestatus
        of a Compaq Drive Array spare. The
        variable sparestatus indicates the
        new spare drive status."
    ::= 2
phyDrvStatusChange              TRAP-TYPE
    ENTERPRISE                  driveArray
    VARIABLES                   ( phyDrvStatus )
    DESCRIPTION
        "A phyDrvStatusChange trap signifies
        that the sending SNMP agent has
        detected a change in the
        phyDrvStatus of a Compaq Drive Array
        physical drive. The variable
        phyDrvStatus indicates the new
        physical drive status."
```

-continued

```
    ::= 3
phyDrvThreshExceededTrap        TRAP-TYPE
    ENTERPRISE                  driveArray
    VARIABLES                   ( PhyDrvThreshExceeded )
    DESCRIPTION
        "A PhyDrvThreshExceededTrap   trap
        signifies that the sending SNMP
        agent has detected factory threshold
        associated with one of the drive
        attributes on a Compaq Drive Array
        physical drive has been exceeded.
    ::= 4
phyDrvStatusChange              TRAP-TYPE
    ENTERPRISE                  driveArray
    VARIABLES                   accelStatus , accelErrCode
    DESCRIPTION
        "A accelStatusChange trap signifies
        that the sending SNMP agent has
        detected a change in the accelstatus
        of the COMPAQ 4MB Array Accelerator
        Write Cache."
    ::= 5
accelBadData                    TRAP-TYPE
    ENTERPRISE                  driveArray
    VARIABLES                   ( accelBadData )
    DESCRIPTION
        "An accelBadData trap signifies that
        the sending SNMP agent has detected
        a COMPAQ 4MB Array Accelerator Write
        Cache that has lost battery power.
        If data was being stored in the
        accelerator memory it has been
        lost."
    ::= 6
accelBatteryFailed              TRAP-TYPE
    ENTERPRISE                  driveArray
    VARIABLES                   accelBatteryStatus
    DESCRIPTION
        "An accelBatteryFailed   trap
        signifies that the sending SNMP
        agent has detected a COMPAQ 4MB
        Array Accelerator Write Cache that
        had a cache battery failure."
    ::= 7
```

© 1992 Compaq Computer Corporation

The component group contains a series of child groups, each of which describe a particular part of a drive array subsystem. These child groups include an interface group located at branch 232.3.2.1, a controller group located at branch 232.3.2.2, a logical drive group located at branch 232.3.2.3, a spare drive group located at branch 232.3.2.4 and a physical drive group located at branch 232.3.2.5.

Figures 1, 7B:
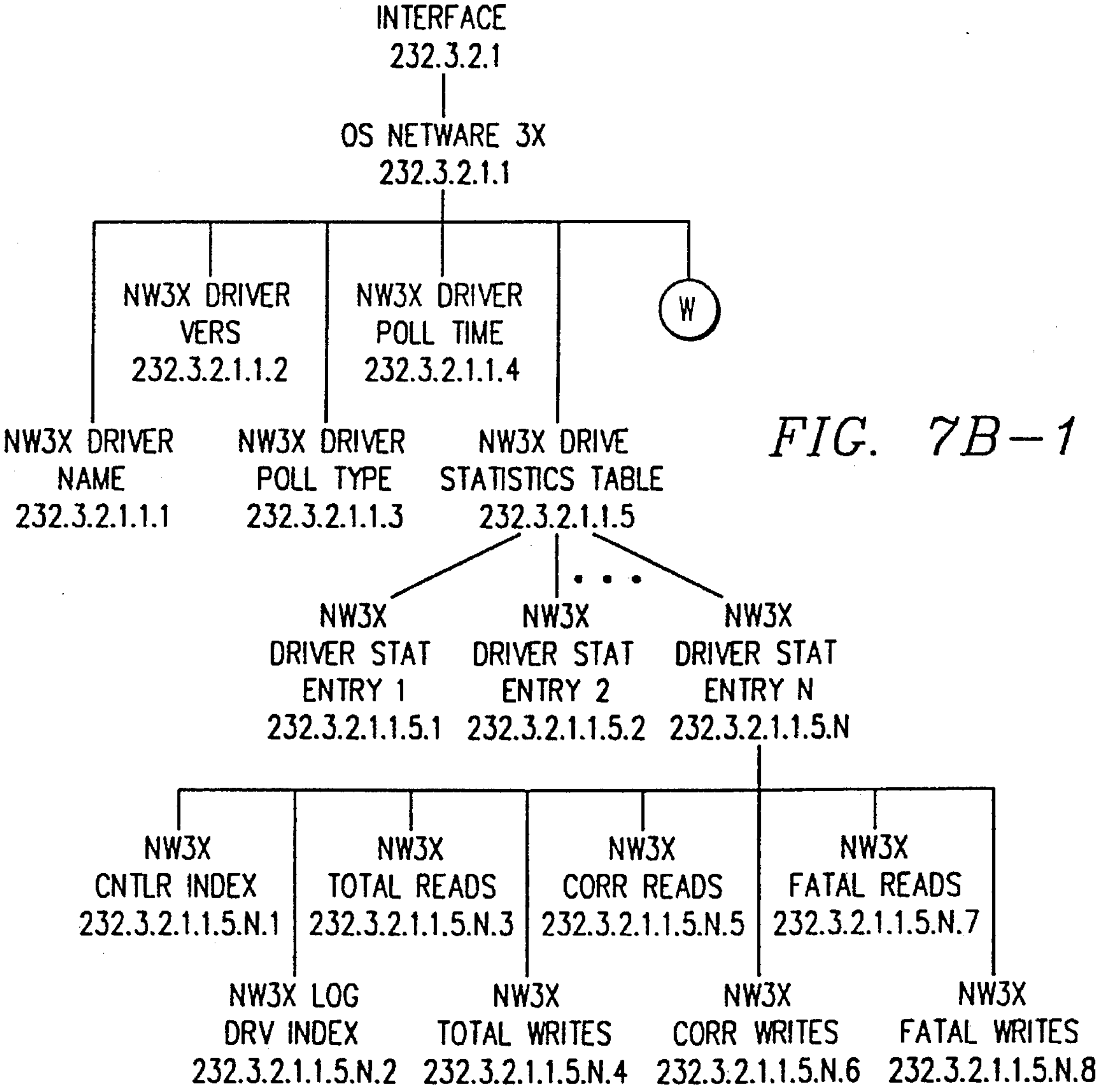
Figures 2, 7B:
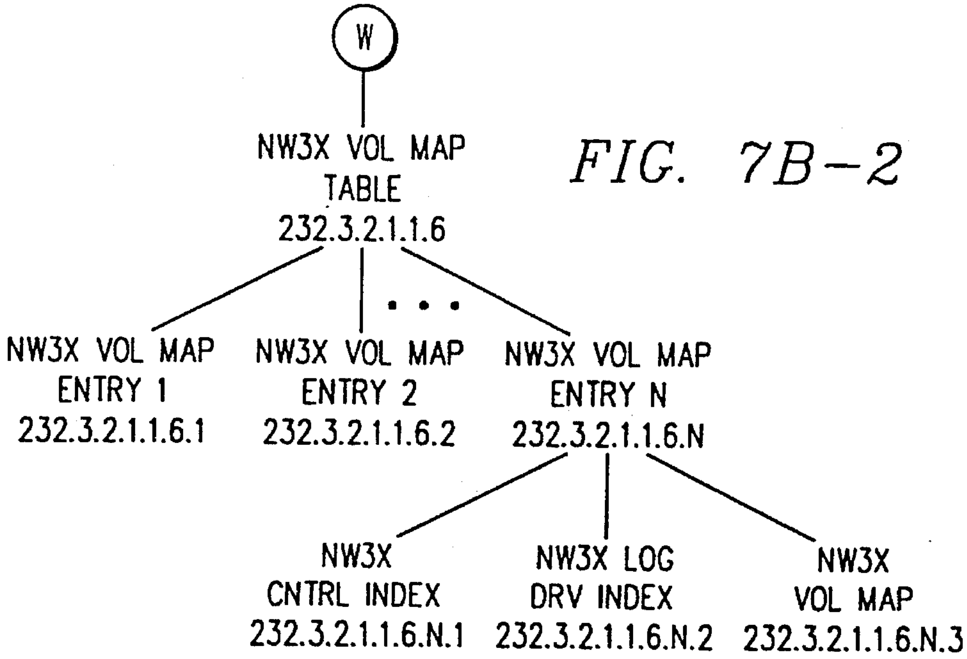

Referring next to FIGS. 7B-1 through 7B-2 in general and FIG. 7B-1 in particular, the interface child group located at branch 232.3.2.1 will now be described in greater detail. The interface group contains at least one child group which contains information describing how the drive array subsystem interfaces with a particular host operating system. In the embodiment of the invention disclosed herein, a single child group describing the interface with a NetWare operating system is disclosed. It is contemplated, however, that as additional host operating system are instrumented, more child groups will be created. The osNetWare3x group is located at branch 232.3.2.1.1 and describes the driver module of the drive array controller in its software interface with the NetWare v3.x operating system using four objects, a driver name object located at branch 232.3.2.1.1.1, a driver version object located at branch 232.3.2.1.1.2, a driver poll type object located at branch 232.3.2.1.1.3 and a driver poll time object located at branch 232.3.2.1.1.4, and two tables, a drive statistics table located at branch 232.3.2.1.1.5 and a volume map table located at branch 232.3.2.1.1.6.

The objects included as part of the osNetware3x group are formally organized as follows:

```
nw3xDriverName          OBJECT-TYPE
    SYNTAX              DisplayString (SIZE (0 . . 255))
    ACCESS              read-only
    STATUS              mandatory
    DESCRIPTION
        "COMPAQ Array Controller Driver Interface Name
        This is the name of the device driver for the
        COMPAQ Array controllers. For example, the
        name for the NetWare driver is CPQDA386.DSK."
    ::= ( osNetWare3x 1 )
nw3xDriverVers          OBJECT-TYPE
    SYNTAX              DisplayString (SIZE (0 . . 5))
    ACCESS              read-only
    STATUS              mandatory
    DESCRIPTION
        "COMPAQ Array Controller Driver Interface
        Version
        This is the version number of the device for
        the COMPAQ Array Controllers."
    ::= ( osNetWare3x 2 )
nw3xDriverPollType      OBJECT-TYPE
    SYNTAX              INTEGER    (
        other(1),
        polled (2),
        demand(3)
    )
    ACCESS              read-only
    STATUS              mandatory
    DESCRIPTION
        "COMPAQ Array Controller Driver Interface Poll
        Type
        The SNMP instrument agent collects information
        from the device driver in two ways:
            Polled (2)      Indicates that the
                            information is
                            periodically requested and
                            stored by the server based
                            agent and is available
                            when requested.
            Demand (3)      Indicates that the
                            information is collected
                            at the time of the
                            request.
    ::= osNetWare3x 3 )
nw3xDrivePollTime       OBJECT-TYPE
    SYNTAX              INTEGER
    ACCESS              read-only
    STATUS              mandatory
    DESCRIPTION
        "COMPAQ Array Controller Driver Interface Poll
        Time
        If the Poll Type is Polled, this value shows
        how frequently, in seconds, the instrument
        agent requests Information from the device
        driver.
        For example, if the Poll Type is Polled and the
        Poll Time is two, the instrument agent will
        poll the device driver every two seconds.
        To change the Poll Time for Novell Netware, you
        need to unload and then reload the instrument
        agent using the following commands:
            UNLOAD CPQDASA
            LOAD CPQDASA (/uN)
        The parameter /U specifies the frequency of
        updates in seconds. The variable n represents
        the Number of seconds that the NLM should wait
        before collecting new data. The minimum is one
        second. The maximum value is 300 seconds (five
        minutes)."
    ::= ( osNetWare3x 4 )
```

© 1992 Compaq Computer Corporation

The drive statistics table for the osNetWare3x group includes N entries, each including a controller index object located at branch 232.3.2.1.1.5.N.1, a logical drive index object located at branch 232.3.2.1.1.5.N.2, a total reads object located at branch 232.3.2.1.1.5.N.3, a total writes object located at branch 232.3.2.1.1.5.N.4, a corrected reads object located at branch 232.3.2.1.1.5.N.5, a corrected writes object located at branch 232.3.2.1.1.5.N.6, a fatal reads object located at branch 232.3.2.1.1.5.N.7 and a fatal writes object located at branch 232.3.2.1.1.5.N.8. The formal organization of the drive statistics table is as follows:

```
nw3xDriverStatTable     OBJECT-TYPE
    SYNTAX              SEQUENCE OF Nw3xDriveStatEntry
    ACCESS              not-accessible
    STATUS              mandatory
    DESCRIPTION
        "COMPAQ Array Controller Driver Statistics
        Table
        This is a Table of logical drive statistics
        which are gathered by the device driver."
    ::= ( osNetWare 3x 5 )
nw3xDriverStatEntry     OBJECT-TYPE
    SYNTAX              Nw3xDriverStatEntry
    ACCESS              not-accessible
    STATUS              mandatory
    DESCRIPTION
        "COMPAQ Array Controller Driver Statistics
        Table Entry
        One entry in the driver statistics table. Each
        entry represents a logical drive for which the
        statistics are kept."
    INDEX               ( nw3DriveStatTable 1 )
Nw3xDriverStatEntry     ::=SEQUENCE
(
        nw3xCntlrIndex      INTEGER,
        nw3xLogDrvIndex     INTEGER,
        nw3xTotalReads      Counter,
        nw3xTotalWrites     Counter,
        nw3xCorrReads       Counter,
        nw3xCorrWrites      Counter,
        nw3xFatalReads      Counter,
        nw3xFatalWrites     Counter
)
nw3xCntlrIndex          OBJECT-TYPE
    SYNTAX              INTEGER
    ACCESS              read-only
    STATUS              mandatory
    DESCRIPTION
        "COMPAQ Array Controller Index
        This maps the logical drives into their
        respective controllers. This controller index
        matches the controller group entries."
    ::= ( nw3xDriverStatEntry 1 )
nw3xLogDrvIndex         OBJECT-TYPE
    SYNTAX              INTEGER
    ACCESS              read-only
    STATUS              mandatory
    DESCRIPTION
        "COMPAQ Array Logical Drive Index
        This is the logical drive number which keeps
        track of multiple instances of logical drives
        which are on the same controller. For each
        controller index value, the logical drive index
        starts at 1 and increments for each logical
        drive."
    ::= ( nw3xDriverStatEntry 2 )
nw3xTotalWrites         OBJECT-TYPE
    SYNTAX              Counter
    ACCESS              read-only
    STATUS              mandatory
    DESCRIPTION
        "COMPAQ Array Logical Drive Total Writes
        This shows the total number of writes
        performed by the IDA device driver to this
        logical drive. This number is reset each
        time the device driver is loaded for this
        logical drive."
    ::= ( memoryModuleEntry 2 )
nw3xCorrReads           OBJECT-TYPE
    SYNTAX              Counter
    ACCESS              read-only
    STATUS              mandatory
    DESCRIPTION
        "COMPAQ Array Logical Drive corrected Reads
```

```
        This is the total number of read commands sent
        to the specified logical drive which had to be
        corrected by fault tolerance. This number is
        reset each time the device driver is loaded for
        this logical drive.
        If the number of corrected reads is higher than
        normal for a particular system, check the
        physical drive screen for abnormal activity.
        There may be a problem with a drive. If you
        suspect that a problem exists, schedule server
        down time to run COMPAQ DIAGNOSTICS on the
        monitored system."
    ::= ( nw3xDriverStatEntry 5 )
nw3xCorrWrites          OBJECT-TYPE
    SYNTAX              Counter
    ACCESS              read-only
    STATUS              mandatory
    DESCRIPTION
        "COMPAQ Array Logical Drive Corrected
        Writes
        This is the total number of write commands
        sent to the specified logical drive which
        had to be corrected by fault tolerance.
        This number is reset each time the device
        driver is loaded for this logical drive.
        If the number of corrected writes is
        higher than normal for a particular
        system, check the physical drive screen
        for abnormal activity. There may be a
        problem with a drive. If you suspect that
        a problem exists, schedule server down
        time to run COMPAQ DIAGNOSTICS on the
        monitored system."
    ::= ( nw3xDriverStatEntry 6 )
nw3xFatalReads          OBJECT-TYPE
    SYNTAX              Counter
    ACCESS              read-only
    STATUS              mandatory
    DESCRIPTION
        "COMPAQ Array Logical Drive Fatal Reads
        This is the total number of read commands sent
        to the specified logical drive which failed.
        This number is reset each time the device
        driver is loaded for this logical drive.
        The drive array was unable to correct these
        reads. Check the drive status to see if any
        of the drives have failed. If a drive has
        failed you will need to replace the drive."
    ::= ( nw3xDriverStatEntry 7 )
nw3xFatalWrites         OBJECT-TYPE
    SYNTAX              Counter
    ACCESS              read-only
    STATUS              mandatory
    DESCRIPTION
        "COMPAQ Array Logical Drive Fatal Writes
        This is the total number of write commands sent
        to the specified logical drive which failed.
        This number is reset each time the device
        driver is loaded for this logical drive.
        The drive array was unable to correct these
        writes. Check the drive status to see if any
        of the drives have failed. If a drive has
        failed you will need to replace the drive."
    ::= ( nw3xDriverStatEntry 8 )
```

© 1992 Compaq Computer Corporation

Figures 1, 7C:
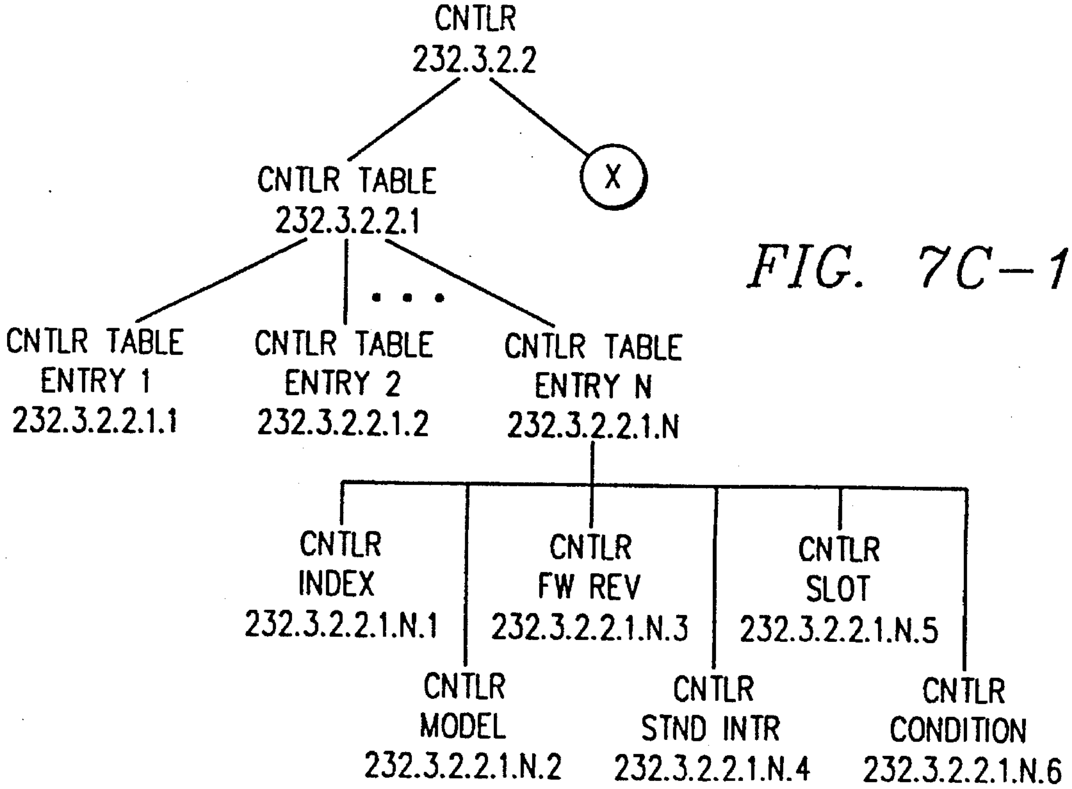
Figures 2, 7C:
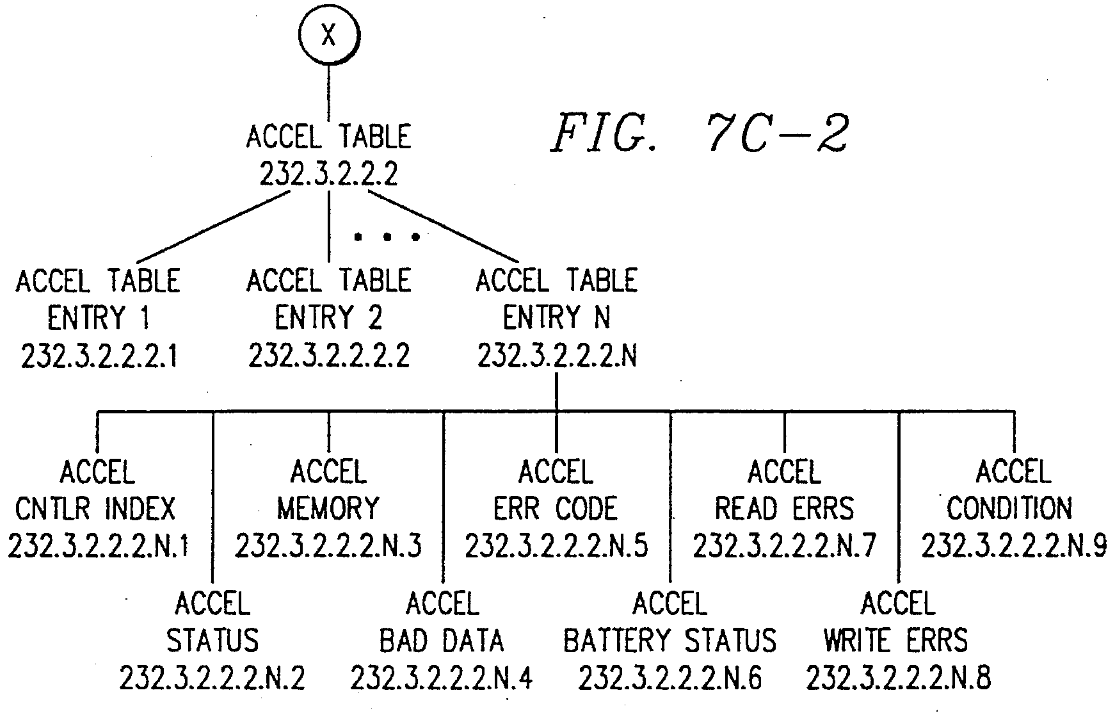

No referring specifically to FIG. 7C-2, the volume map table for the osNetWare3x group includes N entries, each including a controller index object located at branch 232.3.2.1.1.6.N.1, a logical drive index object located at branch 232.3.2.1.1.6.N.2 and a volume map located at branch 232.3.2.1.1.6.N.3. The formal organization of the volume map table is as follows:

```
nw3xVolMapTable             OBJECT-TYPE
    SYNTAX              SEQUENCE OF Nw3xVolMapEntry
    ACCESS              not-accessible
```

```
    STATUS              mandatory
    DESCRIPTION
        "Volume Map Table
        This is a table of NetWare volumes which map
        into the logical drives."
    ::= ( osNetWare3x 6 )
nw3xVolMapEntry             OBJECT-TYPE
    SYNTAX              Nw3xVolMapEntry
    ACCESS              not-accessible
    STATUS              mandatory
    DESCRIPTION
        "Volume Map Table Entry
        One entry in the volume map table. Each entry
        represents a logical drive for which the volume
        map is kept."
    INDEX               ( nw3xVolCntlrIndex,
                          nw3xVolLogDrvIndex )
    ::= ( nw3xVolMapTable 1 )
Nw3xVolMapEntry             ::= SEQUENCE
    (
            nw3xVolCntlrIndex       INTEGER,
            nw3xVolLogDrvIndex      INTEGER,
        nw3xVolMap                  OCTET STRING
    )
nw3xVolCntlrIndex           OBJECT-TYPE
    SYNTAX              INTEGER
    ACCESS              read-only
    STATUS              mandatory
    DESCRIPTION
        "COMPAQ Array Controller Index
        This maps the logical drives into their
        respective controllers. This controller index
        matches the controller group entries."
    ::= ( nw3xVolMapEntry 1 )
nw3xVolLogDrvIndex          OBJECT-TYPE
    SYNTAX              INTEGER
    ACCESS              read-only
    STATUS              mandatory
    DESCRIPTION
        "COMPAQ Array Logical Drive Index
        This is the logical drive number which keeps
        track of multiple instances of logical drives
        which are on the same controller. For each
        controller index value, the logical drive index
        starts at 1 and increments for each logical
        drive."
    ::= ( nw3xVolMapEntry 2 )
nw3xVolMap                  OBJECT-TYPE
    SYNTAX              OCTET STRING (SIZE (0 . . 255))
    ACCESS              read-only
    STATUS              mandatory
    DESCRIPTION
        "NetWare Volume Map
        This is a data structure containing the volume
        mappings for this logical drive. There are 8
        entries in a volume mapping. Each entry has
        the following format. An entry can be null
        indicating no mapping exists.
                        BYTE    Name(16)
                        BYTE    Segment"
    ::= ( nw3xVolMapEntry 3 )
```

© 1992 Compaq Computer Corporation

Referring next to FIGS. 7C-1 through 7C-2, the controller child group located at branch 232.3.2.2 will now be described in greater detail. The controller group, which contains the configuration and statistical information relating to the drive array controllers and controller accelerator boards, includes a controller table located at branch 232.3.2.2.1 and an accelerator table located at branch 232.3.2.2.2. The controller table includes an entry N for each controller installed in the system. For each entry N, the controller table includes 6 objects, an index object located at branch 232.3.2.2.1.N.1, a model object located at branch 232.3.2.2.1.N.2, a firmware revision object located at branch 232.3.2.2.1.N.3, a standard interface object located at branch 232.3.2.2.1.N.4, a slot object located at branch 232.3.2.2.1.N.5 and a condition object located at branch 232.3.2.2.1.N.6. The formal organization of the controller table is as follows:

```
cntlrTable              OBJECT-TYPE
    SYNTAX              SEQUENCE OF CntlrEntry
    ACCESS              not-accessible
    STATUS              mandatory
    DESCRIPTION
        "COMPAQ Array Controller Table
        A Table of controller entries."
    ::= ( cntlr 1 )
cntlrEntry              OBJECT-TYPE
    SYNTAX              CntlrEntry
    ACCESS              not-accessible
    STATUS              mandatory
    DESCRIPTION
        "COMPAQ Array Controller Entry
        A controller entry."
    INDEX               ( cntlrIndex )
    ::= ( cntlrTable 1 )
CntlrEntry              ::= SEQUENCE
(
    cntlrIndex              INTEGER,
    cntlrModel              INTEGER,
    cntlrFWRev              DisplayString,
    cntlrStndIntr           INTEGER,
    cntlrSlot               INTEGER,
    cntlrCondition          INTEGER
)
    cntlrIndex          OBJECT-TYPE
    SYNTAX              INTEGER
    ACCESS              read-only
    STATUS              mandatory
    DESCRIPTION
        "COMPAQ Array Controller Index
        This value is a logical number whose
        meaning is OS
        dependent. Each physical controller has
one unique
        controller number associated with it."
    ::= ( cntlrEntry 1 )
cntlrModel              OBJECT-TYPE
    SYNTAX              INTEGER
    (
        other(1),
        ida(2),
        idaExpansion(3),
        ida-2(4)
    )
    ACCESS              read-only
    STATUS              mandatory
    DESCRIPTION
        "COMPAQ Array Controller Module
        The type of controller card. The valid types
        are:
          IDA (2)                COMPAQ 32-Bit
                                 Intelligent Drive
                                 Array Controller.
                                 The physical drives
                                 are located inside
                                 the system.
          IDA Expansion (3)      COMPAQ 32-Bit
                                 Intelligent Drive
                                 Array Expansion
                                 Controller. The
                                 physical drives are
                                 located in the Array
                                 Expansion System that
                                 is connected to the
                                 system by a cable.
          IDA 2 (4)              COMPAQ Intelligent
                                 Drive Array
                                 Controller-2 (IDA-2).
                                 The physical drives
                                 are located inside
                                 the system
          Other (1)              You may need to
                                 upgrade your driver
                                 software and/or
                                 instrument agent(s).
                                 You have a drive
```

-continued

```
                                 array controller in
                                 the system that the
                                 instrument agent does
                                 not recognize."
    ::= ( cntlrEntry 2 )
cntlrFWRev              OBJECT-TYPE
    SYNTAX              DisplayString (SIZE (0 . . 5))
    ACCESS              read-only
    STATUS              mandatory
    DESCRIPTION
        "COMPAQ Array Controller Firmware Revision
        The firmware revision of the COMPAQ Drive Array
        Controller. This value can be used to help
        identify a particular revision of the
        controller."
    ::= ( cntlrEntry 3 )
cntlrStndIntr           OBJECT-TYPE
SYNTAX                  INTEGER
    (
        other(1),
        primary(2),
        secondary(3),
        disabled(4)
        unavailable(5)
    )
    ACCESS              read-only
    STATUS              mandatory
    DESCRIPTION
        "The status of the Standard Interface Revision
        The standard Interface is how DOS communicates
        with a drive. Run the COMPAQ EISA
        Configuration Utility to change the Standard
        Interface setting.
        The following values are valid for Standard
        Interface:
          Unavailable (5)        This controller does
                                 not support a
                                 Standard Interface.
                                 DOS cannot access
                                 these drives. For
                                 example, the COMPAQ
                                 32-Bit Intelligent
                                 Drive Array Expansion
                                 Controller does not
                                 support a Standard
                                 Interface.
          Disabled (4)           The Standard
                                 Interface is not
                                 enabled for
                                 communication. DOS
                                 will not be able to
                                 access these drives.
          Primary (2)            The Standard
                                 Interface is using
                                 the primary address
                                 for communication.
                                 DOS can access this
                                 drive and use this
                                 drive as the primary
                                 boot device if it has
                                 been configured for
                                 this purpose.
          Secondary (3)          The standard
                                 Interface is using
                                 the secondary address
                                 for communication.
                                 DOS can access these
                                 drives, but cannot
                                 boot from them.
          Other (1)              The device driver may
                                 not be loaded for
                                 this controller. The
                                 instrument agent
                                 could not read the
                                 information from the
                                 device. Please load
                                 the device driver."
    ::= ( cntlrEntry 4 )
cntlrSlot               OBJECT-TYPE
    SYNTAX              INTEGER
```

-continued

```
    ACCESS              read-only
    STATUS              mandatory
    DESCRIPTION
        "COMPAQ Array Controller Slot
        This identifies the physical slot where the
        COMPAQ Array Controller resides in the system.
        For example, if this value is three, then the
        COMPAQ Array Controller is located in the slot
        three of your computer."
    ::= ( cntlrEntry 5)
cntlrCondition          OBJECT-TYPE
    SYNTAX              INTEGER
    (
        other(1),
        ok(2),
        degraded(3),
        failed(4)
    )
    ACCESS              read-only
    STATUS              mandatory
    DESCRIPTION
        "The condition of the device. This value
        represents the overall condition of this
```

-continued

```
        controller, and any associated logical drives,
        physical drives, and array accelerators."
    ::= ( cntlrEntry 6)
```

© 1992 Compaq Computer Corporation

Similarly, the accelerator table includes an entry N for each accelerator installed in the system. For each entry N, the accelerator table includes 9 objects, an controller inex object located at branch 232.3.2.2.2.N.1, a status object located at branch 232.3.2.2.2.N.2, a memory object located at branch 232.3.2.2.2.N.3, a bad data object located at branch 232.3.2.2.2.N.4, an error code object located at branch 232.3.2.2.2.N.5, a battery status object located at branch 232.3.2.2.2.N.6, a read errors status located at branch 232.3.2.2.2.N.7, a write errors object located at branch 232.3.2.2.2.N.8 and a condition object located at branch 232.3.2.2.2.N.9. The formal organization of the accelerator table is as follows:

```
accelTable       OBJECT-TYPE
     SYNTAX      SEQUENCE OF AccelEntry
     ACCESS      not-accessible
     STATUS      mandatory
     DESCRIPTION
          "Array Accelerator Board Table

          A table of accelerator board entry."
     ::= ( cntlr 2 )

accelEntry       OBJECT-TYPE
     SYNTAX      AccelEntry
     ACCESS      not-accessible
     STATUS      mandatory
     DESCRIPTION
          "Array Accelerator Board

          An accelerator board entry."
     INDEX       ( acelCntlrIndex )
     ::= ( accelTable 1 )

AccelEntry       ::= SEQUENCE
(
     accelcntlrIndex          INTEGER,
     accelStatus              INTEGER,
     accelMemory              INTEGER,
     accelBadData             INTEGER,
     accelErrCode             INTEGER,
     accelBatteryStatus       INTEGER,
     accelReadErrs            Counter,
     accelWriteErrs           Counter,
     accelCondition           INTEGER
```

```
accelCntlrIndex     OBJECT-TYPE
     SYNTAX    INTEGER
     ACCESS    read-only
     STATUS    mandatory
     DESCRIPTION
          "Array Accelerator Board Controller Index

          This value is a logical number whose meaning is
          OS dependent.  The value has a direct mapping
          to the controller table index such that
          controller 'i' has accelerator table entry
          'i'."
     ::= ( accelEntry 1 )

accelStatus    OBJECT-TYPE
     SYNTAX    INTEGER
     (
          other(1),
          invalid(2),
          enabled(3),
          tmpDisabled(4)
          permDisabled(5)
     )
     ACCESS    read-only
     STATUS    mandatory
     DESCRIPTION
          "Array Accelerator Board Status

          This describes the status of the COMPAQ 4MB
          Array Accelerator Write Cache.

          This status can be:

               Enabled (3)                 Indicates that
                                           write cache
                                           operates are
                                           currently
                                           configured and
                                           enabled for
                                           least one
                                           logical drive.

               Temporarily Disabled (4)    Indicates that
                                           write cache
                                           operations have
```

| | |
|---|---|
| | been temporarily disabled. View the Array Accelerator Board Error Code object instance to determine why the write cache operations have been temporarily disabled. |
| Permanently Disabled (5) | Indicates that write cache operations have been permanently disabled. View the Array Accelerator Board Error Code object instance to determine why the write cache operations have been disabled. |
| Invalid (2) | Indicates that an Array Accelerator board has not been installed in this system. |
| Other (1) | Indicates that the instrument agent does not recognize the status of the Array Accelerator. You may need to upgrade the instrument agent." |

::= ( accelEntry 2 )

```
accelMemory    OBJECT-TYPE
     SYNTAX    INTEGER
     ACCESS    read-only
     STATUS    mandatory
     DESCRIPTION
          "Write Cache Memory Revision

          This shows the amount of memory allocated for
          the write cache in kilobytes.  Because data is
          kept in duplicate (mirrored), the actual amount
          of usable memory is half the amount shown."
     ::= ( accelEntry 3 )

accelBadData   OBJECT-TYPE
     SYNTAX    INTEGER
     (
          other(1),
          none(2),
          possible(3),
     )
     ACCESS    read-only
     STATUS    mandatory
     DESCRIPTION
          "Array Accelerator Board Bad Data

          The following values are valid:

               Possible (3)   Indicates that at power
                              up, the battery packs were
                              not sufficiently charged.
                              Because the batteries did
                              not retain sufficient
                              charge when the system
                              resumed power, the board
                              has not retained any data
                              that may have been stored.
                              If no data was on the
                              board, no data was lost.
                              Several things may have
                              caused this condition:

                              If the system was without
                              power for eight days, and
                              the battery packs were on
```

(battery packs only activate if system looses power unexpectedly), any data that may have been stored in the batteries was lost.

There may be a problem with the battery pack. See the Battery Status for more information.

This message will also appear is the Array Accelerator board is replaced with a new board that has discharged batteries. No data has been lost in this case, and posted writes will automatically be enabled when the batteries reach full charge.

| | |
|---|---|
| None (2) | Indicates that no data loss occurred. At power up, the battery packs were properly charged. |

```
     ::= ( accelEntry 4 )

accelErrCode   OBJECT-TYPE
     SYNTAX    INTEGER
     (
          other(1),
          invalid(2),
          badConfig(3),
          lowBattery(4),
          disembleCmd(5),
          noResources(6),
          notConnected(7),
          badMirrorData(8),
          readErr(9),
          writeErr(10),
          configCmd(11)
     )
```

ACCESS read-only
STATUS mandatory
DESCRIPTION
"Array Accelerator Board Error Code Use this to determine the status of the write cache operations.

The status can be:

| | |
|---|---|
| Invalid (2) | Indicated that write cache operations are currently configured and enabled for at least one logical drive. No write cache errors have occurred. |
| Bad Configuration (3) | Indicates that write cache operations are temporarily disabled. The Array Accelerator board was configured for a different controller. This error could be caused if boards were switched from one system to an other. Return the COMPAQ EISA Configuration Utility and insure that the board has been properly configured for this system. Note: If data from another system was stored on the board, rerunning EISA Configuration will cause the data to be lost. |

| | |
|---|---|
| Low Battery Power (4) | Indicates that write cache operations are temporarily disabled due to insufficient battery power. Please view the Batter Status object instance for more information. |
| Disable Command Issued (5) | Indicates that write cache operations are temporarily disabled. The device driver issues this command when the server is taken down. This condition should not exist when the system regains power. |
| No Resources Available (6) | Indicates that write cache operations are temporarily disabled. The controller does not have sufficient resources to perform write cache operations. For example, when a replaced drive is being rebuilt, there will not be sufficient resources. Once the operation that requires the resources has completed, this condition will clear and write cache operations will resume. |
| Board Not Connected (7) | Indicates that write cache operations are |

temporarily disabled. The Array Accelerator board has been configured but is not currently attached to the controller. Check the alignment of the board and connections.

| | |
|---|---|
| Bad Mirror Data (8) | Indicates that write cache operations have been permanently disabled. The Array Accelerator board stores mirrored copies of all data. If data exists on the board when the system is first powered up, the board performs a data compare test between the mirrored copies. If the data does not match, an error has occurred. Data may have been lost. Your board may need servicing. |
| Read Failure (9) | Indicates that write cache operations have been permanently disabled. The Array Accelerator board stores mirror copies of all data. While reading the data from the board, memory parity errors have occurred. both copies were corrupted and cannot be retrieved. Data has been lost, and you |

should service the board.

| | |
|---|---|
| Write Failure (10) | Indicates that write cache operations have been permanently disabled. This error occurs when an unsuccessful attempt was made to write data to the Array Accelerator board. Data could not be written to write cache memory in duplicate due to the detection of parity errors. This error does not indicate dat loss. You should service theArray Accelerator board. |
| Config Command (11) | Indicates that write cache operations have been permanently disabled. The configuration of the logical drives has changed. you need to reconfigure the Array Accelerator board. |
| Other | Indicates that the instrument agent does not recognize the error code. You may need to update your software." |

```
    ::= ( accelEntry 5)

accelBatteryStatus  OBJECT-TYPE
    SYNTAX    INTEGER
    (
         other(1),
```

```
        ok(2),
        recharging(3),
        failed(4)
        degraded(5)
)
ACCESS     read-only
STATUS     mandatory
DESCRIPTION
        "Battery Status

        This monitors the status of each battery pack
        on the board.  The batteries can only recharge
        when the system is powered on

        The following values are valid:

            ok (2)          Indicates that a
                            particular battery pack is
                            fully charged.

            Failed (4)      The battery pack is below
                            the sufficient voltage
                            level and has not
                            recharged in 36 hours.
                            Your Array Accelerator
                            board needs to be
                            serviced.

            Charging (3)    The battery power is less
                            than 75%.  The Drive Array
                            Controller is attempting
                            to recharge the battery.
                            A battery can take as long
                            as 36 hours to fully
                            recharge.  After 36 hours,
                            if the battery has not
                            recharged, it is
                            considered failed.

            Degraded (5)    The battery is still
                            operating, however, one of
                            the batteries in the pack
                            has failed to recharge
                            properly.  Your Array
                            Accelerator board should
```

```
                                  be serviced as soon as
                                  possible.

              Other (1)           Indicates that the
                                  instrument agent does not
                                  recognize battery status.
                                  You may need to update
                                  your software."
     ::= ( accelEntry 6)

accelReadErrs  OBJECT-TYPE
     SYNTAX    Counter
     ACCESS    read-only
     STATUS    mandatory
     DESCRIPTION
          "Read Errors

          This show the total number of read memory
          parity errors that were detected while reading
          from the Array Accelerator board. The mirrored
          copy of data on th eboard can be accessed to
          obtain correct data if a parity errors occurs.

          Memory parity errors occur when the system
          detects that information has not been
          transferred correctly.  A parity bit is
          included for each byte of information stored in
          memory.  When the microprocessor reads or
          writes data, the system counts the value of the
          bits in each byte. If the total does not match
          the system's corruption, or lack of refresh may
          cause memory parity errors."
     ::- (accelEntry 7)

accelWriteErrs OBJECT-TYPE
     SYNTAX    Counter
     ACCESS    read-only
     STATUS    mandatory
     DESCRIPTION
          "Write Errors

          This shows the total number of write memory
          parity errors that were detected while writing
          to the Array Accelerator board.
```

```
          Write parity errors occur when the system
          detects that information has not been
          transferred to the Array Accelerator board
          correctly.  A parity bit is included for each
          byte of information stored in memory.  When the
          microprocessor reads or writes data, the system
          counts the value of the bits in each byte.  If
          the total does not match the system's
          expectations, a parity error has occurred."
     ::= ( accelEntry 8 )

accelCondition OBJECT-TYPE
     SYNTAX    INTEGER
     (
          other(1)
          ok(2)
          degraded(3)
          failed(4)
     )
     ACCESS    read-only
     STATUS    mandatory
     DESCRIPTION
          "The condition of the device.  This value
          represents the overall condition of this array
          accelerator."
     ::= ( accelEntry 9 )
```

©1992 Compaq Computer Corporation

Figure 7E:
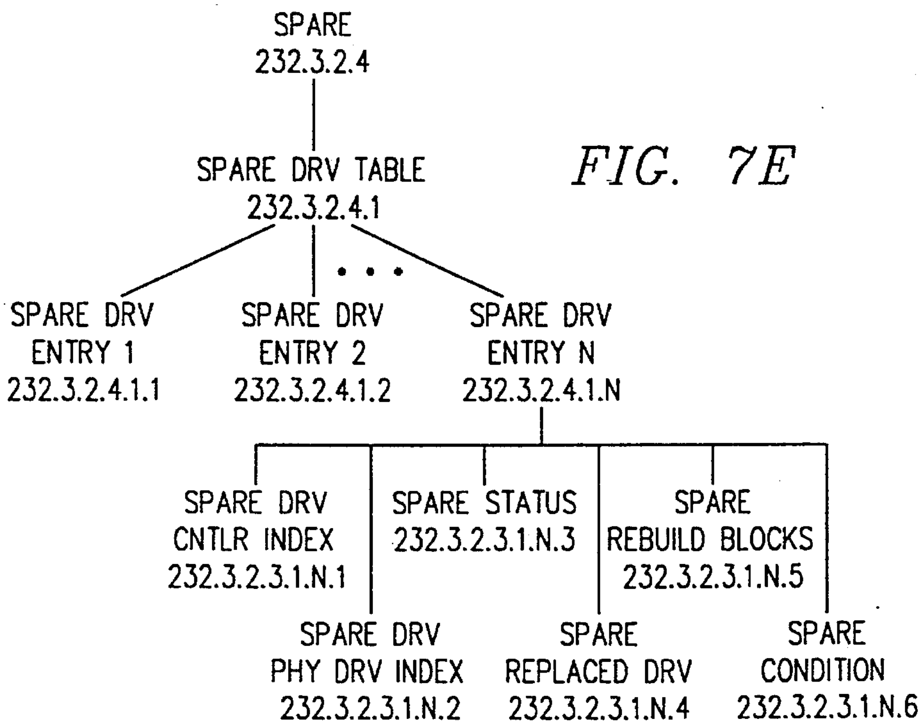
FIG. 7E is an inheritance tree illustrating a spare drive child group of the component group of the subMIB of FIG. 7A.
Figure 7D:
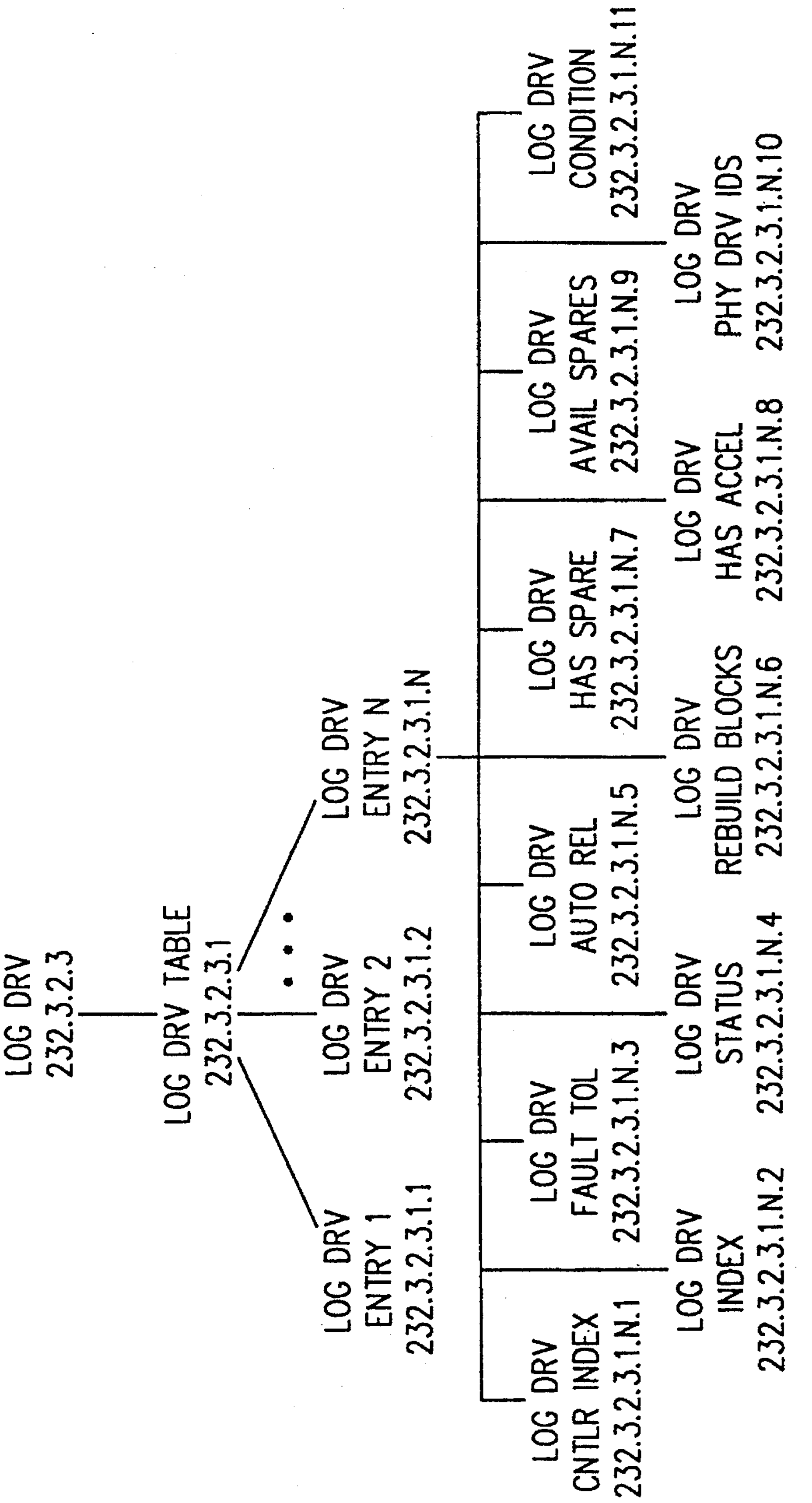
FIG. 7D is an inheritance tree illustrating a logical drive child group of the component group of the subMIB of FIG. 7A.

Referring next to FIG. 7D, the logical drive child group located at branch 232.3.2.3 will now be described in greater detail. The logical drive child group contains configuration and statistical information regarding the logical drives associated with the drive array controller in the form of objects which describe the size, status, fault tolerance and other characteristics of the logical drives of the array. More specifically, the logical drive child group contains a logical drive table located at branch 232.3.2.3.1. The logical drive table includes an entry N for each logical drive associated with the drive array and, for each entry N, the logical drive table includes a controller index object located at branch 232.3.2.3.1.N.1, a drive index object located at branch 232.3.2.3.1.N.2, a fault tolerance object located at branch 232.3.2.3.1.N.3, a status object located at branch 232.3.2.3.1.N.4, an auto-reliability object located at branch 232.3.2.3.1.N.5, a rebuild blocks available object located at branch 232.3.2.3.1.N.6, an accelerator board object located at branch 232.3.2.3.1.N.7, an available spares object located at branch 232.3.2.3.1.N.8, a drive size object located at branch 232.3.2.3.1.N.9, a physical drive ID located at branch 232.3.2.3.1.N.10 and a drive condition object located at branch 232.3.2.3.1.N.11. The formal organization of the logical drive table is as follows:

```
logDrvTable         OBJECT-TYPE
     SYNTAX    SEQUENCE OF LogDrvEntry
     ACCESS    not-accessible
     STATUS    mandatory
     DESCRIPTION
          "Drive Array Logical Drive Table

          A table of logical drive entries."
     ::= ( logDrv 1 )

logDrvEntry         OBJECT-TYPE
     SYNTAX    LogDrvEntry
     ACCESS    not-accessible
     STATUS    mandatory
     DESCRIPTION
          "Drive Array Logical Drive Entry

          A logical drive entry."
     INDEX     ( logDrvCntlrIndex,
               logDrvIndex )
     ::= ( logDrvTable 1 )

LogDrvEntry    ::=SEQUENCE
```

```
(
    logDrvCntlrIndex    INTEGER,
    logDrvIndex         INTEGER,
    logDrvFaultTol      INTEGER,
    logDrvStatus        INTEGER,
    logDrvAutoRel       INTEGER,
    logDrvRebuildBlocks Counter,
    logDrvHasAccel      INTEGER,
    logDrvAvailSpares   OCTET STRING,
    logDrvSize          INTEGER,
    logDrvPhyDrvIDs     OCTET STRING,
    logDrvCondition     INTEGER
)

logDrvCntlrIndex    OBJECT-TYPE
    SYNTAX      INTEGER
    ACCESS      read-only
    STATUS      mandatory
    DESCRIPTION
        "Drive Array Logical Drive Controller Index

        This maps the logical drives into their
        respective controllers.  Controller index 'i'
        under the controller group owns the associated
        drives in the logical drive group which use
        that index."
    ::= ( logDrvEntry 1 )

logDrvIndex     OBJECT-TYPE
    SYNTAX      INTEGER
    ACCESS      read-only
    STATUS      mandatory
    DESCRIPTION
        "Drive Array Logical Drive Index

        This is the logical drive number which keeps
        track of multiple instances of logical drives
        which are on the same controller.  For each
        controller index value, the logical drive index
        starts at 1 and increments for each logical
        drive."
    ::= ( logDrvEntry 2 )

logDrvFaultTol OBJECT-TYPE
    SYNTAX      INTEGER
```

```
(
     other(1),
     none(2),
     mirroring(3),
     dataGuard(4),
     distribDataGuard(5)
)
ACCESS    read-only
STATUS    mandatory
DESCRIPTION
     "Logical Drive Fault Tolerance
```

This shows the fault tolerance mode of the logical drive. To change the fault tolerance mode, run the COMPAQ EISA Configuration Utility.

The following values are valid for the Logical Drive Fault Tolerance:

| | |
|---|---|
| None (2) | Fault tolerance is not enabled. If a physical drive reports an error, the data cannot be recovered by the COMPAQ Drive Array Controller. |
| Mirroring (3) | For each physical drive, there is a second physical drive containing identical data. If a drive fails, the data can be retrieved from the mirror drive. |
| Data Guard (4) | One of the physical drives is used as a data guard drive and contains the exclusive OR of the data on the remaining drives. If a failure |

```
                                           is detected, the
                                           COMPAQ Drive Array
                                           Controller rebuilds
                                           the data using the
                                           data guard
                                           information plus
                                           information from the
                                           other drives.

     Distributed Data Guard (5)            Distributed Data
                                           Guarding, sometimes
                                           referred to as RAID
                                           5, is similar to Data
                                           Guarding, but instead
                                           of storing the parity
                                           information on one
                                           drive, the
                                           information is
                                           distributed across
                                           all of the drives.
                                           If a failure is
                                           detected, the COMPAQ
                                           Drive Array
                                           Controller rebuilds
                                           the data using the
                                           data guard
                                           information from all
                                           the drives."
     ::= ( logDrvEntry 3 )

logDrvStatus   OBJECT-TYPE
     SYNTAX    INTEGER
     (
          other(1),
          ok(2),
          failed(3),
          unconfigured(4),
          recovering(5),
          readyForRebuild(6),
          rebuilding(7),
          wrongDrive(8),
          badConnect(9),
          overheating(10),
          shutdown(11)
     )
```

ACCESS read-only
STATUS mandatory
DESCRIPTION
"Logical Drive Status

The logical drive can be in one of the following states:

| | |
|---|---|
| ok (2) | Indicates that the logical drive is in normal operation mode. |
| Failed (3) | Indicates that more physical drives have failed than the fault tolerance mode of the logical drive can handle without data loss. |
| Unconfigured (4) | Indicates that the logical drive is not configured. |
| Recovering (5) | Indicates that the logical drive is using Interim Recovery Mode. In Interim Recovery Mode, at least one physical drive has failed, but the logical drive's fault tolerance mode lets the drive continue to operate with no data loss. |
| Ready Rebuild (6) | Indicates that the logical drive is ready for Automatic Data Recovery. During Automatic Data Recovery, fault |

tolerance algorithms restore data to the replacement drive.

| | |
|---|---|
| Wrong Drive (8) | Indicates that the wrong physical drive was replaced after a physical drive failure. |
| Bad Connect (9) | Indicates that a physical drive is not responding. |
| Overheating | Indicates that the drive array enclosure that contains the logical drive is overheating. The drive array is still functioning, but should be shutdown. |
| Shutdown (11) | Indicates that the drive array enclosure that contains the logical drive has overheated. The logical drive is no longer functioning." |

```
     ::= (logDrvEntry4 )

logDrvAutoRel  OBJECT-TYPE
     SYNTAX    INTEGER
     ACCESS    read-write
     STATUS    mandatory
     DESCRIPTION
          "COMPAQ Array Controller Logical Drive Auto-
          Reliability Delay

          This value indicates how many seconds the
          logical drive will wait with no requests before
          beginning Auto-Reliability Monitoring.  for
          example, the default value is five, sot he
          logical drive will begin Auto-Reliability
```

```
          Monitoring if it receives no requests for five
          seconds.  If the value is zero, the logical
          drive will not perform Auto-Reliability
          Monitoring.  Auto-Reliability only operates if
          the logical drive is configured in one of the
          fault tolerance modes

          If the logical drive receives a request while
          performing Auto Reliability Monitoring, the
          drive will stop performing Auto-Reliability
          Monitoring to process the request.  Once it has
          satisfied all incoming requests, the drive will
          wit for the Auto-Reliability Delay to expire
          before returning to Auto-Reliability
          Monitoring.

          Auto-Reliability Monitoring is a process to
          insure the highest level of data reliability.
          In this process each disk is scanned to verify
          that all of the sectors in the drive array are
          readable.  If the auto-Reliability Monitoring
          process detects any bad sectors on the drives,
          it automatically remaps these bad sectors where
          possible."
     ::= ( logDrvEntry 5 )

logDrvRebuildingBlocks   OBJECT-TYPE
     SYNTAX    Counter
     ACCESS    read-only
     STATUS    mandatory
     DESCRIPTION
          "Logical Drive Rebuild Blocks Left

          After a failed physical drive has been
          replaced, the physical drive must have its data
          rebuilt.  This value show how many blocks of
          data still need to be rebuilt.  When the value
          reaches zero, the rebuilding process is
          complete.  The drive array continues to operate
          in interim recovery mode while a drive is
          rebuilding.

          This value is only valid if the Logical Drive
          Status is rebuilding (7)."
     ::= ( logDrvEntry 6)
```

```
logDrvHasAccel OBJECT-TYPE
     SYNTAX    INTEGER
     (
          other(1),
          unavailable(2),
          enabled(3),
          disabled(4)
     )
     ACCESS    read-only
     STATUS    mandatory
     DESCRIPTION
          "Logical Drive Has Array Accelerator Board

          This indicates whether the logical drive has an
          Array Accelerator board configured and enabled.
          The following values are valid:

               Enabled (3)          Indicates that the
                                    Array Accelerator
                                    board is configured
                                    and enabled for this
                                    logical drive. Run
                                    the COMPAQ EISA
                                    Configuration Utility
                                    to change this value.

               Disabled (4)         Indicates that the
                                    Array Accelerator
                                    board is configured
                                    but not enabled for
                                    this logical drive.
                                    Run the COMPAQ EISA
                                    Configuration Utility
                                    to change this value.

               Unavailable (2)      Indicates that there
                                    is no Array
                                    Accelerator board
                                    configured for this
                                    logical drive.

               Other (1)            Indicates that the
                                    instrument agent does
                                    not recognize the
                                    Array Accelerator
```

```
                                        board.  You may need
                                        to    upgrade    your
                                        software."
    ::= ( logDrvEntry 7 )

logDrvAvailSpares   OBJECT-TYPE
    SYNTAX    OCTET STRING
    ACCESS    read-only
    STATUS    mandatory
    DESCRIPTION
        "Drive Array Logical Drive Available Spares

        This indicates if this logical drive has one or
        more spares designated for it that are not
        currently in use by another drive.  Each octet
        present will be a physical drive ID that is an
        available spare for this logical drive.  These
        are the same ID's which can be used as indexes
        into the physical drive table.  An octet string
        of length zero indicates that there are no
        available spares for this logical drive."
    ::= ( logDrvEntry 8 )

logDrvSize      OBJECT-TYPE
    SYNTAX    INTEGER
    ACCESS    read-only
    STATUS    mandatory
    DESCRIPTION
        "Logical Drive Size

        This is the size of the logical drive in
        megabytes.  This value is calculated using the
        value 1,048,576 (2^20) as a megabyte.  Drive
        manufacturers sometimes use the number
        1,000,000 as a megabyte when giving drive
        capacities so this value may differ from the
        advertised size of a drive."
    ::= ( logDrvEntry 9 )

logDrvPhyDrvIDs     OBJECT-TYPE
    SYNTAX    OCTET STRING
    ACCESS    read-only
    STATUS    mandatory
    DESCRIPTION
        "Drive Array Logical Drive Physical Drive IDs
```

```
          This lists the physical drive IDs which are
          associated with this logical drive. These are
          the same IDs which can be used as indices into
          the physical drive table.  Each byte of the
          string is an index."
     ::= ( logDrvEntry 10 )

logDrvcondition     OBJECT-TYPE
     SYNTAX    INTEGER
     (
          other(1),
          ok(2),
          degraded(3),
          failed(4)
     )
     ACCESS    read-only
     STATUS    mandatory
     DESCRIPTION
          "The condition of the device.  This value
          represents the overall condition of this
          logical drive and any associated physical
          drives."
     ::= ( logDrvEntry 11 )
```

©1992 Compaq Computer Corporation

Referring next to FIG. 7E, the spare drive child group located at branch 232.3.2.4 will now be described in greater detail. The spare drive group contains statistical and configuration information regarding the spare drives associated with the drive array controller in the form of objects which describe the spare drive or drives that may be present on an external IDA. Spare drives are available for any particular logical drive until allocated for use. Examples of information which would be contained in the objects of the spare drive child group include status of spare drive (other, failed, inactive building or active), and the identity of the physical drive which the spare drive is replacing. More specifically, the spare drive group located at branch 232.3.2.4 contains a spare drive table at branch 232.3.2.4.1. The spare drive table includes an entry N for each spare drive associated with the drive array and, for each entry N, the spare drive table includes a controller index object located at branch 232.3.2.4.1.N.1, a drive index object located at branch 232.3.2.4.1.N.2, a status object located at branch 232.3.2.4.1.N.3, a replaced drive object located at branch 232.3.2.4.1.N.4, a rebuild blocks object located at branch 232.3.2.4.1.N.5 and a spare condition object located at branch 232.3.2.4.1.N.6. The formal organization of the spare drive child group is as follows:

```
spareTable              OBJECT-TYPE
    SYNTAX              SEQUENCE OF SpareEntry
    ACCESS              not-accessible
    STATUS              mandatory
    DESCRIPTION
        "Drive Array Spare Table
        A table of spare entries."
    ::= ( spareDrv 1 )
    spareEntry              OBJECT-TYPE
    SYNTAX              SpareEntry
    ACCESS              not-accessible
    STATUS              mandatory
    DESCRIPTION
        "Drive Array Spare Entry
        An entry in the spare table."
    INDEX               ( spareCntlrIndex,
                            sparePhyDrvIndex )
    ::= ( spareTable 1 )
SpareEntry              ::= SEQUENCE
(
    spareCntlrIndex         INTEGER,
    sparePhyDrvIndex        INTEGER,
    spareStatus             INTEGER,
    spareReplacedDrv        INTEGER,
    spareRebuildblocks      Counter,
    spareCondition          INTEGER
)
spareCntlrIndex             OBJECT-TYPE
    SYNTAX              INTEGER
    ACCESS              read-only
    STATUS              mandatory
    DESCRIPTION
        "Drive Array Spare Controller Index
        This index maps the spare drive back to the
        controller to which it is attached. The value
        of this index is the same as the one used under
        the controller group."
    ::= ( spareEntry 1 )
accelStatus             OBJECT-TYPE
    SYNTAX              INTEGER
    ACCESS              read-only
    STATUS              mandatory
    DESCRIPTION
        "Drive Array Spare Physical Drive Index
        This index maps to the physical drive it
        represents. The value of this index is the
        same as the one used with the physical drive
        table."
    ::= ( spareEntry 2 )
spareStatus             OBJECT-TYPE
    SYNTAX              INTEGER
    (
```

-continued

```
            other(1),
            invalid(2),
            failed(3),
            inactive(4),
            building(5),
            active(6)
    )
    ACCESS              read-only
    STATUS              mandatory
    DESCRIPTION
        "Spare Status
        The following values are valid for the spare
        status:
            Building (5)        A physical drive has
                                failed. Automatic Data
                                Recovery is in progress to
                                recover data to the on-
                                line spare.
            Active (6)          A physical drive has
                                failed. Automatic Data
                                Recover is complete. The
                                system is using the on-
                                line spare as a
                                replacement for the failed
                                drive.
            Failed (3)          The on-line spare has
                                failed and is no longer
                                available for use.
            Inactive (4)        The monitored system has
                                an on-line spare
                                configured, but is not
                                currently in use."
    ::= ( spareEntry 3 )
spareReplacedDrv            OBJECT-TYPE
    SYNTAX              INTEGER
    ACCESS              read-only
    STATUS              mandatory
    DESCRIPTION
        "If the spare status is active (6), then this
        has the physical drive number of the replaced
        drive."
    ::= ( spareEntry 4 )
spareRebuildBlocks          OBJECT-TYPE
    SYNTAX              Counter
    ACCESS              read-only
    STATUS              mandatory
    DESCRIPTION
        "Drive Array Spare Number of Rebuild Blocks
Left
        If the spare status is building (5), then this
        is this is the number of blocks left to rebuild
        before completion.
        The data contained on the failed physical drive
        must be reconstructed from the fault tolerance
        data and copied to the spare so that the spare
        can function in place of the failed drive.
        When the number reaches zero, the building
        process is complete and the spare has replaced
        the physical drive."
    ::= ( spareEntry 5 )
spareCondition              OBJECT-TYPE
    SYNTAX              INTEGER
    (
            other(1),
            ok(2),
            degraded(3),
            failed(4)
    )
    ACCESS              read-only
    STATUS              mandatory
    DESCRIPTION
        "The condition of the device. This value
        represents the overall condition of this spare
        drive and any associated physical drives."
    ::= ( spareEntry 6 )
```

© 1992 Compaq Computer Corporation

Referring next to FIG. 7F, the physical drive child group located at branch 232.3.2.5 will now be described in greater detail. The physical drive child group contains configuration and statistical information regarding the physical drives associated with the drive array controller in the form of objects that describe each individual spindle in the array. Examples of information which would be contained in the physical drive child group include drive model, firmware revision, bay offset, reallocation units available, reallocation units used, on-line performance test results. More specifically, the physical drive child group contains a physical drive table located at branch 232.3.2.5.1. The physical drive table includes an entry N for each physical drive associated with the drive array and, for each entry N, the physical drive table includes a controller index object located at branch 232.3.2.5.1.N.1, a drive index object located at branch 232.3.2.5.1.N.2, a model object located at branch 232.3.2.5.1.N.3, a firmware revision object located at branch 232.3.2.5.1.N.4, a bay location object located at branch 232.3.2.5.1.N.5, a status object located at branch 232.3.2.5.1.N.6, a factory reallocation object located at branch 232.3.2.5.1.N.7, a used reallocations object located at branch 232.3.2.5.1.N.8, a reference minutes object located at branch 232.3.2.5.1.N.9, a read sectors object located at branch 232.3.2.5.1.N.10, a write sectors object located at branch 232.3.2.5.1.N.11, a seeks object located at branch 232.3.2.5.1.N.12, a hard read errors object located at branch 232.3.2.5.1.N.13, a recovered read errors object located at branch 232.3.2.5.1.N.14, a hard write errors object located at branch 232.3.2.5.1.N.15, a recovered write errors object located at branch 232.3.2.5.1.N.16, a seek errors object located at branch 232.3.2.5.1.N.17, a spinup time object located at branch 232.3.2.5.1.N.18, first, second and third functional test objects located at branches 232.3.2.5.1.N.19, 232.3.2.5.1.N.20 and 232.3.2.5.1.N.21, respectively, a DRQ timeouts object located at branch 232.3.2.5.1.N.22, an other timeouts object located at branch 232.3.2.5.1.N.23, a spinup retries object located at branch 232.3.2.5.1.N.24, a recover failed read errors object located at branch 232.3.2.5.1.N.25, a recover failed write errors object located at branch 232.3.2.5.1.N.26, a format errors object located at branch 232.3.2.5.1.N.27, a power on self test error object located at branch 232.3.2.5.1.N.28, a drive not ready errors object located at branch 232.3.2.5.1.N.29, a reallocation abort object located at branch 232.3.2.5.1.N.30, a factory threshold exceeded object located at branch 232.3.2.5.1.N.31, a monitor information object located at branch 232.3.2.5.1.N.32 and a drive condition object located at branch 232.3.2.5.1.N.33. The formal organization of the physical drive table is as follows:

```
phyDrvTable     OBJECT-TYPE
     SYNTAX     SEQUENCE OF PhyDrvEntry
     ACCESS     not-accessible
     STATUS     mandatory
     DESCRIPTION
          "Drive Array Physical Drive Table

          A table of physical drive entry"
     ::- ( phyDrv 1 )

PhyDrvEntry     ::= SEQUENCE
(
     phyDrvCntlrIndex          INTEGER,
     phyDrvModel               DisplayString,
     phyDrvFWRev               DisplayString,
     phyDrvBayLocation         INTEGER,
     phyDrvstatus              INTEGER,
     phyDrvFactRealloc         INTEGER,
```

```
    phyDrvUsedRealloc          Counter,
    phyDrvRefMinutes           Counter,
    phyDrvReadSectors          Counter,
    phyDrvWriteSectors         Counter,
    phyDrvSeeks                Counter,
    phyDrvHardReadErrs         Counter,
    phyDrvRecvReadErrs         Counter,
    phyDrvSeekErrs             Counter,
    phyDrvSpinupTime           INTEGER,
    phyDrvFunctionalTest1      Gauge,
    phyDrvFunctionalTest2      Gauge,
    phyDrvFunctionalTest3      Gauge,
    phyDrvDrqTimeouts          Counter,
    phyDrvOtherTimeouts        Counter,
    phyDrvSpinupRetries        Counter,
    phyDrvFailedRecvReads      Counter,
    phyDrvFailedRecWrites      Counter,
    phyDrvFormatErrors         Counter,
    phyDrvPostError            INTEGER,
    phyDrvDrvNotReadyErrs      Counter,
    phyDrvReallocAborts        Counter,
    phyDrvThresholdExceeded    INTEGER,
    phyDrvDrvHasMonitorInfo    INTEGER,
    phyDrvCondition            INTEGER

phyDrvCntlrIndex    OBJECT-TYPE
    SYNTAX    INTEGER
    ACCESS    read-only
    STATUS    mandatory
    DESCRIPTION
        "Drive Array Physical Drive Controller Index

        This index maps the physical drive back to the
        controller to which it is attached.  The value
        of this index is the same as the one used under
        the controller group."
    ::= ( phyDrvEntry 1 )

phyDrvIndex    OBJECT-TYPE
    SYNTAX    INTEGER
    ACCESS    read-only
    STATUS    mandatory
    DESCRIPTION
        "Drive Array Physical Drive Index
```

```
        This index is used for selecting the physical
        drive table entry.  The index is the physical
        drive number based on the logical drive's drive
        assignment map."
    ::= ( phyDrvEntry 2 )

phyDrvModel     OBJECT-TYPE
    SYNTAX      DisplayString
    ACCESS      read-only
    STATUS      mandatory
    DESCRIPTION
        "Physical Drive Model

        This is a test description of the physical
        drive.  The text that appears depends upon who
        manufactured the drive and the drive type.

        For example, you might see: COMPAQ 210MB
        CP3201.

        If a model number is not present, you may not
        have properly initialized the drive array to
        which the physical drive is attached for
        monitoring.  If you suspect that a problem
        exists, schedule server down time to run COMPAQ
        DIAGNOSTICS and select the Drive Monitoring
        Diagnostics option."
    ::= ( phyDrvEntry 3)

phyDrvModel     OBJECT-TYPE
    SYNTAX      DisplayString
    ACCESS      read-only
    STATUS      mandatory
    DESCRIPTION
        "Physical Drive Model

        This is a test description of the physical
        drive.  The text that appears depends upon who
        manufactured the drive and the drive type.

        For example, you might see: COMPAQ 210MB
        CP3201.

        If a model number is not present, you may not
        have properly initialized the drive array to
```

which the physical drive is attached for
monitoring. If you suspect that a problem
exists, schedule server down time to run COMPAQ
DIAGNOSTICS and select the Drive Monitoring
Diagnostics option."
::= ( phyDrvEntry 3 )

phyDrvFWRev     OBJECT-TYPE
    SYNTAX      DisplayString (SIZE (0..8))
    ACCESS      read-only
    STATUS      mandatory
    DESCRIPTION
        "Physical Drive Firmware Revision This shows the physical drive revision number.

If the firmware revision is not present, you
        have not properly initialized the drive array.
        If you suspect that a problem exists, schedule
        server down time to run COMPAQ DIAGNOSTICS and
        select the Drive Monitoring Diagnostics
        option."
    ::= ( phyDrvEntry 4 )

phyDrvBayLocation   OBJECT-TYPE
    SYNTAX      INTEGER
    ACCESS      read-only
    STATUS      mandatory
    DESCRIPTION
        "Physical Drive Bay Location This value matches the bay location where the
        physical drive has been installed. Each bay is
        labeled with a separate number so that you can
        identify the location of the drive."
    ::= ( phyDrvEntry 5 )

phyDrvStatus    OBJECT-TYPE
    SYNTAX      INTEGER
    (
        other(1),
        ok(2),
        failed(3)
    )
    ACCESS      read-only

```
     STATUS    mandatory
     DESCRIPTION
          "Physical Drive Status

          This shows the status of the physical drive.

          The following values are valid for the physical
          drive status:

               ok (2)          Indicates the drive is
                               functioning properly.

               Failed (3)      Indicates that the drive
                               is no longer operating and
                               should be replaced.

               Other (1)       Indicates that the
                               instrument agent does not
                               recognize the drive. You
                               may need to upgrade your
                               software.

          If you suspect a problem, run COMPAQ
DIAGNOSTICS."
     ::= ( phyDrvEntry 6 )

phyDrvFactReallocs  OBJECT-TYPE
     SYNTAX    INTEGER
     ACCESS    read-only
     STATUS    mandatory
     DESCRIPTION
          "Physical Drive Used Reallocated Sectors

          This shows the number of sectors of the
          reallocation area that have been used by the
          physical drive.

          To see how many sectors were originally
          available for use in the reallocation area,
          refer to the factory reallocation information
          if it exists. Not all drives support factory
          reallocation.
```

```
          Because  of  the  nature  of  magnetic  disks,
          certain  sectors  on  a  drive  may  have  media
          defects.  The reallocation area is part of the
          disk drive that the drive manufacturer sets
          aside to compensate for these defects.  The
          drive  array  controller  writes  information
          addressed  from  these  unusable  sectors  to
          available sectors in the reallocation area.  If
          too many sectors have been reallocated, there
          may be a problem with the drive.

          If you suspect a problem, schedule server down
          time to run COMPAQ DIAGNOSTICS and select the
          Drive Monitoring Diagnostics option to verify
          that a problem exists."
     ::= ( phyDrvEntry 8 )

phyDrvRefMinutes    OBJECT-TYPE
     SYNTAX    Counter
     ACCESS    read-only
     STATUS    mandatory
     DESCRIPTION
          "Reference Minutes

          This shows the total number of minutes that a
          physical drive has been spinning since the
          drive was stamped.  The drive will have either
          been stamped when it left the factory or when
          you ran COMPAQ DIAGNOSTICS on your new drive.
          You can use the reference time to calculate
          rates for other physical drive events."
     ::= ( phyDrvEntry 9 )

phyDrvReadSectors   OBJECT-TYPE
     SYNTAX    Counter
     ACCESS    read-only
     STATUS    mandatory
     DESCRIPTION
          "Sectors Read

          This shows the total number of sectors read
          from the physical disk drive.

          This information may be useful for determining
          rates.    For  instance,  if  you  wanted  to
```

```
        calculate the average number of reads per
        minute of operation, divide this number by the
        reference minutes."
    ::= (phyDrvEntry 10 )

phyDrvWriteSectors  OBJECT-TYPE
    SYNTAX    Counter
    ACCESS    read-only
    STATUS    mandatory
    DESCRIPTION
        "Sectors Written

        This shows the total number of sectors written
        to the physical disk drive.  This information
        may be useful for determining rates.  For
        instance, if you wanted to calculate the
        average number of writes per minute of
        operation, divide this number by the reference
        minutes."
    ::= ( phydrvEntry 11 )

phyDrvSeeks    OBJECT-TYPE
    SYNTAX    Counter
    ACCESS    read-only
    STATUS    mandatory
    DESCRIPTION
        "Total Seeks

        This shows the total number of seek operations
        performed by the physical drive since the drive
        was shipped."
    ::= ( phydrvEntry 12 )

phyDrvHardReadErrs  OBJECT-TYPE
    SYNTAX    Counter
    ACCESS    read-only
    STATUS    mandatory
    DESCRIPTION
        "Hard Read Errors

        This shows the number of read errors that have
        occurred on a drive that could not be recovered
        by a physical drive's Error Correction Code
        (ECC) algorithm or through retries.  Overtime,
        a disk drive may produce *these errors.  If you
```

```
            receive these errors, a problem may exist with
            your drive.

            The value increases every time the physical
            drive detects another error.

            The severity of these errors depends on whether
            the monitored system is running in a fault
            tolerant mode.  With fault tolerance, the
            controller can remap data to eliminate the
            problems caused by these errors.  In either
            case, if you see an increase in these errors,
            schedule server down time to run COMPAQ
            DIAGNOSTICS to verify that a problem exists."
        ::= (phyDrvEntry 13 )

phyDrvRecvReadErrs  OBJECT-TYPE
        SYNTAX    Counter
        ACCESS    read-only
        STATUS    mandatory
        DESCRIPTION
            "Recovered Read Errors

            This shows the number of read errors corrected
            through physical drive retries.

            Over time, all disk drives produce these
            errors.  If you notice a rapid increase in the
            value for Recovered Read Errors (or Hard Read
            Errors), a problem may exist with the drive.
            The value increases every time the physical
            drive detects and corrects another error.

            Expect more Recovered Read Errors than Hard
            Read Errors.  If you suspect that a problem may
            exist with the drive, schedule server down time
            to run COMPAQ DIAGNOSTICS."
        ::= ( phyDrvEntry 14 )

phyDrvHardWriteErrs          OBJECT-TYPE
        SYNTAX    Counter
        ACCESS    read-only
        STATUS    mandatory
        DESCRIPTION
```

```
        "Hard Write Errors

        This shows the number of write errors that
        could not be recovered by a physical drive.

        Over time a disk drive may detect these errors.
        If you notice an increase in the value shown
        for Hard Write Errors or Recovered Write
        Errors, a problem may exist with the drive.
        The value increases every time the physical
        drive detects another error. On average, these
        errors should occur less frequently than read
        errors.  If you see an increase in these
        errors, schedule server down time to run COMPAQ
        DIAGNOSTICS to verify that a problem exists."
    ::= ( phyDrvEntry 15 )

phyDrvRecWriteErrs  OBJECT-TYPE
    SYNTAX    Counter
    ACCESS    read-only
    STATUS    mandatory
    DESCRIPTION
        "Recovered Write Errors

        This shows the number of write errors corrected
        through physical drive retries or recovered by
        a physical drive on a monitored system.

        Over time a disk drive may produce these
        errors.

        If you notice an increase in the value shown
        for Hard Write Errors or Recovered Write
        Errors, a problem may exist with the drive.

        The value increases every time the physical
        drive detects and corrects and error.  Only an
        unusually rapid increase in these errors
        indicates a problem.

        On average, these errors should occur less
        frequently than hard read errors.  If you
        suspect that a problem may exist with the
        drive, schedule server down time to run COMPAQ
        DIAGNOSTICS."
```

```
     ::= ( phyDrvEntry 16 )

phyDrvSeekErrs OBJECT-TYPE
     SYNTAX    Counter
     ACCESS    read-only
     STATUS    mandatory
     DESCRIPTION
          "Seek Errors

          This shows the number of seek errors that a
          physical drive detects.  Over time, a disk
          drive usually produces these errors.  If you
          notice a rapid increase in the value shown for
          Seek Errors, this physical drive may be
          failing.

          The value increases every time the physical
          drive produces another error.  Only an
          unusually rapid increase in these errors
          indicates a problem.  If you suspect that a
          problem exists, schedule server down time to
          run COMPAQ DIAGNOSTICS."
     ::= (phyDrvEntry 17 )

phyDrvSpinupTime    OBJECT-TYPE
     SYNTAX    INTEGER
     ACCESS    read-only
     STATUS    mandatory
     DESCRIPTION
          "Spinup Time in milliseconds

          This is the time it takes for a physical drive
          to spin up to full speed.

          Disks require time to gain momentum and reach
          operating speed.  As cars are tested to go from
          0 mph to 60 mph in x number of seconds, drive
          manufacturers have preset expectations for the
          time it takes the drive to spin to full speed.
          Drives that do not meet these expectations may
          have problems.

          The value may be zero under one of the
          following conditions:
```

```
                If you are monitoring a physical drive that is
                part of the monitored system's internal drive
                array storage, and you use a warm boot to reset
                the monitored system.  During a warm boot, the
                drives continue to spin.

                If you have a COMPAQ Drive Array but have a
                version of the physical controller ROM that is
                less than version 1.00.  If you have used and
                upgrade utility on versions less than 1.00, the
                value may still be zero.

                If you are monitoring a physical drive in an
                Intelligent Array Expansion System and you
                reset the monitored system but not the
                Intelligent Array Expansion System.

                If you suspect a problem, schedule server down
                time to run COMPAQ DIAGNOSTICS and select the
                Drive Monitoring Diagnostics option to verify
                that a problem exists."
        ::= ( phyDrvEntry 18 )

phyDrvFunctionalTest1    OBJECT-TYPE
        SYNTAX     Gauge
        ACCESS     read-only
        STATUS     mandatory
        DESCRIPTION
                "Functional Test 1

                This provides information about a series of
                tests that indicate how well a physical drive
                works.  These tests compare the way the
                physical drive currently operates when
                performing various tasks with the way it worked
                when it was new.

                A percent value is displayed that represents
                how the drive works currently when compared to
                how the drive worked when new.  New drives
                operate at 100% level.  By default, if the
                current value is less than or equal to 80
                percent, a problem may exist.
```

```
          If you suspect a problem, schedule server down
          time to run COMPAQ DIAGNOSTICS and select the
          Drive Monitoring Diagnostics option to verify
          that a problem exists."
     ::= ( phyDrvEntry 19 )

phyDrvFunctionalTest2    OBJECT-TYPE
     SYNTAX    Gauge
     ACCESS    read-only
     STATUS    mandatory
     DESCRIPTION
          "Functional Test 2

          This provides information about a series of
          test that indicates how well a physical drive
          works. These test compare the way the physical
          drive currently operates when performing
          various tasks with the way it worked when it
          was new.

          A percent value is displayed that represents
          how the drive works currently when compared to
          how the drive worked when new.  New drives
          operate at the 100% level. By default, if the
          current value is less than or equal to 80
          percent, a problem may exist.

          If you suspect a problem, schedule server down
          time to run COMPAQ DIAGNOSTICS and select the
          Drive Monitoring Diagnostics option to verify
          that a problem exists."
     ::= (phyDrvEntry 20 )

phyDrvFunctionalTest3    OBJECT-TYPE
     SYNTAX    Gauge
     ACCESS    read-only
     STATUS    mandatory
     DESCRIPTION
          "Functional Test 3

          This provides information about a series of
          tests that indicate how well a physical drive
          works.  These tests compare the way the
          physical drive currently operates when
```

```
            performing various tasks when the way it worked
            when it was new.

            A percent value is displayed that represents
            how the drive works currently when compared to
            how the drive worked when new.  New drives
            operate at the 100% level.  By default, if the
            current value is less than or equal to 80
            percent, a problem may exist.

            If you suspect a problem, schedule server down
            time to run COMPAQ DIAGNOSTICS and select the
            Drive Monitoring Diagnostics option to verify
            that a problem exists."
    ::= ( phyDrvEntry 21 )

phyDrvDrqTimeouts   OBJECT-TYPE
    SYNTAX    Counter
    ACCESS    read-only
    STATUS    mandatory
    DESCRIPTION
            "DRQ Timeouts

            The number of time that a physical drive
            continued to request data, but did not get a
            command completion.  This value increases every
            time a DRQ timeout occurs for the physical
            drive.

            A defective drive or cable may cause DRQ
            timeouts to occur.  If you see an increase in
            these errors, complete the following steps for
            the monitored system:

            1.  Check the cables connecting the drive to
                ensure that they are intact.

            2.  If the cables are properly connected,
                schedule server down time to run COMPAQ
                DIAGNOSTICS to verify that a problem
                exists."
    ::= ( phyDrvEntry 22 )

phyDrvOtherTimeouts OBJECT-TYPE
    SYNTAX    Counter
```

```
    ACCESS      read-only
    STATUS      mandatory
    DESCRIPTION
        "Other Timeouts

        The number of times that a physical drive did
        not  respond  with  an  interrupt  within  a
        controller-defined  period  of  time  after  a
        command had been issued. This does not include
        DRQ timeouts.

        If  you  suspect  a  problem,  complete  the
        following steps for the monitored system:

        1.   Check the cables connecting the drive to
             ensure that they are intact.

        2.   If  the  cables  are  properly  connected,
             schedule server down time to run COMPAQ
             DIAGNOSTICS  to  verify  that  a  problem
             exists."
    ::= ( phyDrvEntry 23 )

phyDrvSpinupRetries OBJECT-TYPE
    SYNTAX      Counter
    ACCESS      read-only
    STATUS      mandatory
    DESCRIPTION
        "Spinup Retries

        The number of times that a physical drive had
        to  retry  to  spin  up  before  successfully
        achieving  operating  speed.   This  value
        represents the spin-up retries that occurred
        since the last time you turned the monitored
        system on.

        If you suspect a problem, schedule server down
        time to run COMPAQ DIAGNOSTICS and select the
        Drive Monitoring Diagnostics option to verify
        that a problem exists."
    ::= ( phyDrvEntry 24 )

phyDrvFailedRecvReads    OBJECT-TYPE
    SYNTAX      Counter
```

```
        ACCESS    read-only
        STATUS    mandatory
        DESCRIPTION
             "Recover Failed Read Error

             The number of times a read error occurred while
             performing Automatic Data Recovery from this
             physical drive to another drive.

             If a read error occurs, Automatic Data Recovery
             stops.  These errors indicate that the physical
             drive has failed.  If you suspect a problem,
             schedule server down time to run COMPAQ
             DIAGNOSTICS and select the Drive Monitoring
             Diagnostics option to verify that a problem
             exits."
        ::= ( phyDrvEntry 25 )

   phyDrvFailedRecWrites    OBJECT-TYPE
        SYNTAX    Counter
        ACCESS    read-only
        STATUS    mandatory
        DESCRIPTION
             "Recovery Failed Write Error

             The number of times a write error occurred
             while performing Automatic Data Recovery from
             another drive to this physical drive.

             If a write error occurs, Automatic Data
             Recovery stops.  These error indicate that the
             physical drive has failed.  If you suspect a
             problem, schedule server down time to run
             COMPAQ DIAGNOSTICS and select the Drive
             Monitoring Diagnostics option to verify that a
             problem exists."
        ::= ( phyDrvEntry 26 )

   phyDrvFormatErrs    OBJECT-TYPE
        SYNTAX    Counter
        ACCESS    read-only
        STATUS    mandatory
        DESCRIPTION
             "Format Errors
```

```
        The number of times a format operation failed
        when the controller attempted to remap a bad
        sector.  Zero indicates that no format errors
        have occurred.  The value increases each time
        a format error occurs.  A failed format
        operation may cause the controller to mark a
        drive failed.

        If you suspect a problem, schedule server down
        time to run COMPAQ DIAGNOSTICS and select the
        Drive Monitoring Diagnostics option to verify
        a problem exists."
    ::= (phyDrvEntry 27 )

phyDrvPostError     OBJECT-TYPE
    SYNTAX    Counter
    ACCESS    read-only
    STATUS    mandatory
    DESCRIPTION
        "Power On Self Test (Post) Error

        The number of times that a physical drive
        failed its self test.

        The physical drive does a self test each time
        the system is turned on."
    ::= ( phyDrvEntry 28 )

phyDrvNotReadyErrs  OBJECT-TYPE
    SYNTAX    Counter
    ACCESS    read-only
    STATUS    mandatory
    DESCRIPTION
        "Drive Not Ready Errors

        The number of times the physical drive failed
        after the spin up command was issued.  When the
        spin up command was issued, the drive failed to
        reach its ready state.  If the current value is
        zero, the drive has not failed, If the current
        value is greater than zero, at least one
        failure occurred.

        This error could be caused because the physical
        drive has failed to spin.
```

```
        If you suspect a problem:

             1.   Check the cables connecting the
                  drive to ensure that they are
                  intact.

             2.   If the cables are properly
                  connected, schedule server down time
                  to run COMPAQ DIAGNOSTICS to verify
                  that a problem exists."
     ::= ( phyDrvEntry 29 )

phyDrvReallocAborts      OBJECT-TYPE
     SYNTAX    Counter
     ACCESS    read-only
     STATUS    mandatory
     DESCRIPTION
          "Physical Drive Reallocation Aborts

          The number of times the physical drive has
          failed due to an error that occurred when the
          controller was trying to reallocate a bad
          sector. Zero indicates that no Reallocation
          Abort errors have occurred. The value
          increases each time a Reallocation Abort error
          occurs.

          Because of the nature of magnetic disks,
          certain sectors on a drive may have media
          defects. The reallocation area is part of the
          disk drive that is set aside to compensate for
          these defects. The array controller writes
          information addressed from unusable sectors to
          available sectors in the reallocation area.

          If you suspect a problem, schedule server down
          time to run COMPAQ DIAGNOSTICS and select the
          Drive Monitoring Diagnostics option to verify
          a problem exists."
     ::= ( phyDrvEntry 30 )

phyDrvThreshExceeded     OBJECT-TYPE
     SYNTAX    INTEGER
     (
          false(1),
```

```
        true(2)
    )
    ACCESS    read-only
    STATUS    mandatory
    DESCRIPTION
        "Physical Drive Factory Threshold Exceeded

        When the drive is shipped, certain thresholds
        have been set to monitor performance of the
        drives.  For example, a threshold might be set
        up for Spinup Time.  If the time that it takes
        the drive to spin up exceeds the factory
        threshold, there may be a problem with one of
        the drives.

        If you suspect a problem, schedule server down
        time to run COMPAQ DIAGNOSTICS and select the
        Physical Drive Test option.

        Note:     These thresholds may be under COMPAQ
                  warranty under certain conditions."
    ::= ( phyDrvEntry 31 )

phyDrvHasMonitorInfo     OBJECT-TYPE
    SYNTAX    INTEGER
    (
        false(1),
        true(2)
    )
    ACCESS    read-only
    STATUS    mandatory
    DESCRIPTION
        "Physical Drive Has Monitor Info

        All of the physical disk table fields except
        for the physical disk status (phyDrvStatus) and
        the bay location (phyDrvBayLocation) are
        invalid unless this field has a value of
        true(2).

        If the value is false(1), you must run COMPAQ
        DIAGNOSTICS and select the Physical Drive Test
        option.  This will enable the physical disk
        monitoring information."
    ::= ( phyDrvEntry 32 )
```

```
phyDrvCondition     OBJECT-TYPE
     SYNTAX    INTEGER
     (
          other(1),
          ok(2),
          degraded(3),
          failed(4)
     )
     ACCESS    read-only
     STATUS    mandatory
     DESCRIPTION
          "The condition of the device.  This value
          represents the overall condition of this
          physical drive."
     ::= ( phyDrvEntry 33 )
```

©1992 Compaq Computer Corporation

Referring next to FIG. 7E, the spare drive child group located at branch 232.3.2.4 shall not be described in greater detail. The spare drive child group contains object instances that describe the spare drive that may be present on an external IDA. Spare drives may be available for any particular logical drive until allocated for use. Example object instances would be status (other, failed, inactive building or active) physical drive number the spare is replacing and others. More specifically, the spare drive child group contains a spare drive table located at branch 232.3.2.3.1 which contains N entries, one for each spare drive installed in the drive array. For each installed spare drive, the spare drive table includes a controller index object located at branch 232.3.2.4.1.N.1, a physical drive index object located at branch 232.3.2.3.1.N.2, a spare status object located at branch 232.3.2.3.1.N.3, a replaced drive object located at branch 232.3.2.3.1.N.4, a rebuild blocks object located at branch 232.3.2.3.1.N.5 and a spare condition object located at branch 232.3.2.3.1.N.6. Further details are set forth in the formal organizational framework of the spare child group set forth below:

```
spareTable              OBJECT-TYPE
    SYNTAX              SEQUENCE OF SpareEntry
    ACCESS              not-accessible
    STATUS              mandatory
    DESCRIPTION
        "Drive Array Spare Table
        A table of spare entries."
    ::= ( spareDrv 1 )
spareEntry              OBJECT-TYPE
    SYNTAX              SpareEntry
    ACCESS              not-accessible
    STATUS              mandatory
    DESCRIPTION
        "Drive Array Spare Entry
        An entry in the spare table."
    INDEX               ( spareCntlrIndex,
                        sparePhyDrvIndex )
    ::= ( spareTable 1 )
SpareEntry              ::= SEQUENCE
(
    spareCntlrIndex          INTEGER,
    sparePhyDrvIndex         INTEGER,
    spareStatus              INTEGER,
    spareReplacedDrv         INTEGER,
    spareRebuildblocks       Counter,
    spareCondition           INTEGER
    spareCntlrIndex        OBJECT-TYPE
    SYNTAX              INTEGER
    ACCESS              read-only
    STATUS              mandatory
    DESCRIPTION
        "Drive Array Spare Controller Index
        This index maps the spare drive back
        to the controller to which it is
        attached. The value of this index
        is the same as the one used under
        the controller group."
    ::= ( spareEntry 1 )
accelStatus             OBJECT-TYPE
    SYNTAX              INTEGER
    ACCESS              read-only
    STATUS              mandatory
    DESCRIPTION
        "Drive Array Spare Physical Drive
        Index
        This index maps to the physical
        drive it represents. The value of
        this index is the same as the one
        used with the physical drive table."
    ::= ( spareEntry 2 )
spareStatus             OBJECT-TYPE
    SYNTAX              INTEGER
    (
            other(1),
            invalid(2),
```

-continued

```
            failed(3),
            inactive(4),
            building(5),
            active(6)
    )
    ACCESS              read-only
    STATUS              mandatory
    DESCRIPTION
        "Spare Status
        The following values are valid for
        the spare status:
            Building (5)        A physical drive has
                                failed. Automatic Data
                                Recovery is in progress to
                                recover data to the on-
                                line spare.
            Active (6)          A physical drive has
                                failed. Automatic Data
                                Recover is complete. The
                                system is using the on-
                                line spare as a
                                replacement for the failed
                                drive.
            Failed (3)          The on-line spare has
                                failed and is no longer
                                available for use.
            Inactive (4)        The monitored system has
                                an on-line spare
                                configured, but is not
                                currently in use."
    ::= ( spareEntry 3 )
spareReplacedDrv        OBJECT-TYPE
    SYNTAX              INTEGER
    ACCESS              read-only
    STATUS              mandatory
    DESCRIPTION
        "If the spare status is active (6),
        then this has the physical drive
        number of the replaced drive."
    ::- (spareEntry 4 )
spareRebuildBlocks      OBJECT-TYPE
    SYNTAX              Counter
    ACCESS              read-only
    STATUS              mandatory
    DESCRIPTION
        "Drive Array Spare Number of Rebuild Blocks
Left
        If the spare status is building (5),
        then this is this is the number of
        blocks left to rebuild before
        completion.
        The data contained on the failed
        physical drive must be reconstructed
        from the fault tolerance data and
        copied to the spare so that the
        spare can function in place of the
        failed drive.
        When the number reaches zero, the
        building process is complete and the
        spare has replaced the physical
        drive."
    ::= ( spareEntry 5)
spareCondition          OBJECT-TYPE
    SYNTAX              INTEGER
    (
            other(1),
            ok(2),
            degraded(3),
            failed(4)
    )
    ACCESS              read-only
    STATUS              mandatory
    DESCRIPTION
        "The condition of the device. This
        value represents the overall
```

-continued

```
        condition of this spare drive and
        any associated physical drives."
    ::= ( spareEntry 6)
```

© 1992 Compaq Computer Corporation

Figure 8A:
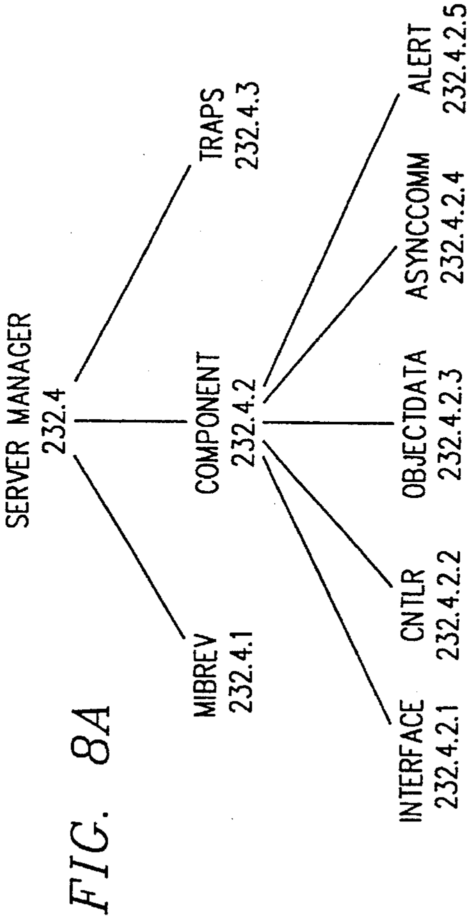
FIG. 8A is an inheritance tree illustrating a fourth subMIB of the enterprise MIB of FIG. 4A.

Referring next to FIG. 8A, the server manager subMIB located at branch 232.4 will now be described in greater detail. The server manager subMIB details the configuration of the server manager board 24, monitored item information maintained on the server board 24 and historical information about important events occurring on the board. The server manager subMIB includes three child groups, a mibREV group located at branch 232.4.1, a component group located at branch 232.4.2, and a traps group located at branch 232.4.3. The mibRev child group contains information regarding the revision of the subMIB to which the SNMP agent conforms and is configured as previously described in FIG. 4B, the component group describes the server manager and the trap group contains information regarding traps issued from the server manager subMIB and is configured as previously described in FIG. 4*c*. Trap definitions specific to the traps child group located at branch 232.4.3 are as follows:

```
boardFailed       TRAP-TYPE
    ENTERPRISE        serverManager
    DESCRIPTION
        "A boardFailed trap signifies that the sending
        SNMP agent has detected a failure of the COMPAQ
        Server Manager/R board in the system."
    ::= 1
boardReset        TRAP-TYPE
    ENTERPRISE        serverManager
    DESCRIPTION
        "A boardReset trap signifies that the sending
        SNMP agent has detected a reset of the Server
        Manager board in the system."
    ::= 2
serverManagerAlert        TRAP-TYPE
    ENTERPRISE      serverManager
    VARIABLES       ( monItemCurVal , objectLabel,
                      monItemLabel, monItemDataType,
                      monItemSeverity, monitemLimit,
                      monItemOptional, monItemComparator,
                      monItemTimeStamp
                    )
    DESCRIPTION
        "A serverManagerAlert trap signifies a
        monitored item on the Server Manager board
        exceeding a threshold when alerting is enabled
        for the monitored item."
    ::= 3
commFailed        TRAP-TYPE
    ENTERPRISE        serverManager
    DESCRIPTION
        "A commFailed trap signifies a failure of the
        Server Manager board's asynchronous
        communication system."
    ::= 4
batteryFailed     TRAP-TYPE
    ENTERPRISE        serverManager
    DESCRIPTION
        "A batteryFailed trap signifies a failure of
        the Server Manager board's onboard battery."
    ::= 5
boardTimeout      TRAP-TYPE
    ENTERPRISE        serverManager
    DESCRIPTION
        "A boardTimeout trap signifies that the sending
        SNMP agent has detected a timeout of the System
        Manager board in the system by the Server
        Manager Board driver."
    ::= 6
```

© 1992 Compaq Computer Corporation

The component group located at branch 232.4.2 contains a series of child groups, each of which describes a particular part of the server manager 24. Of these, the interface child group located at branch 2.4.2.1 contains information specific to the host software that supports the server manager controller. The controller child group located at branch 232.4.2.2 contains configuration and statistical information regarding the server manager board such as board name, board ID, firmware date, country code, modem type voice ROM status and others. The object data child group located at branch 232.4.2.3 lists and describes the objects and monitored items on the server manager board 24. In addition to containing the objects, the object data child group also contains the attribute label and value for each object in the group. Finally, the object data child group also contains information regarding the server manager's object management resource utilization. The asynchronous communication child group located at branch 232.4.2.4 describes the configuration and status of the server manager board's asynchronous communication ports using a series of objects which contain information regarding port status, modem type, session status, modem setting and other data relating to the aforementioned communication ports. Finally, the alert child group located at branch 232.4.2.5 contains object instance information describing the "off the network" alerting capabilities of the system manager. For example, alert destinations, including device type (SMF, pager or voice), phone number to dial, number or retries and others is typical information related to off the network alerting capabilities which is contained in the alert child group.

Figure 8B:
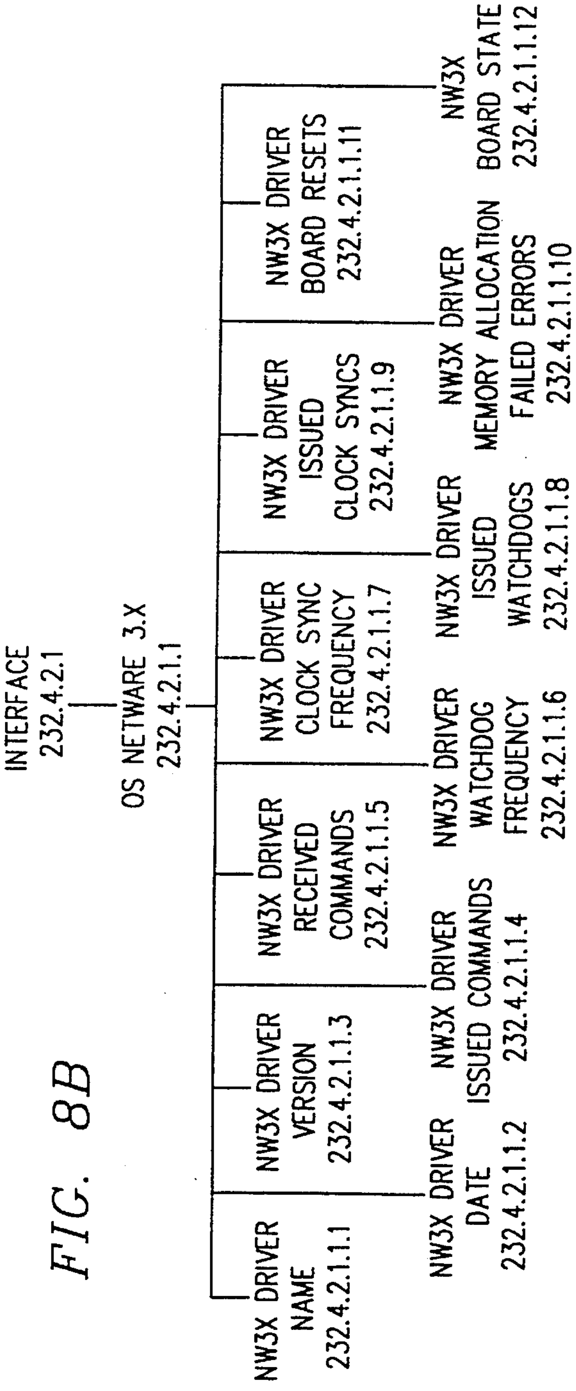
FIG. 8B is an inheritance tree illustrating an interface child group of a component group of the subMIB of FIG. 8A.

Referring next to FIG. 8*b*, the interface child group located at branch 232.4.2.1 will now be described in greater detail. The interface group contains at least one child group which contains information describing how the server manager board 24 interfaces with a particular host operating system for the computer management system 8. In the embodiment of the invention disclosed herein, a single child group describing the interface of the server manager board 24 with a NetWare operating system is disclosed. It is contemplated, however, that as additional host operating system are instrumented, more child groups will be created.

The NetWare3x group is located at branch 232.4.2.1.1 and describes the driver module of the server manager board in its software interface with the NetWare v3.x operating system using twelve objects, a driver name object located at branch 232.4.2.1.1.1, a driver date object located at branch 232.4.2.1.1.2, a driver version object located at branch 232.4.2.1.1.3, an issued commands object located at branch 232.4.2.1.1.4, a received commands object located at branch 232.4.2.1.1.5, a watchdog frequency object located at branch 232.4.2.1.1.6, a clock synchronization command frequency object located at branch 232.4.2.1.1.7, an issued watchdogs object located at branch 232.4.2.1.1.8, an issued clock synchronization commands object located at branch 232.4.2.1.1.9, a memory allocation failure errors object located at branch 232.4.2.1.1.10, a board resets object located at branch 232.4.2.1.1.11 and a board state object located at branch 232.4.2.1.1.12. The formal organization of the interface child group is as follows:

```
nw3xDriverName          OBJECT-TYPE
    SYNTAX              DisplayString (SIZE (0 . . 255))
    ACCESS              read-only
    STATUS              mandatory
    DESCRIPTION
        "Driver Name
        The value identified the NetWare loadable
```

-continued

```
module      providing the operating system access to
            the Server Manager board."
    ::= ( osNetWare 3x 1 )
nw3xDriverDate          OBJECT-TYPE
    SYNTAX          DisplayString (Size (0 . . 8))
    ACCESS          read-only
    STATUS          mandatory
    DESCRIPTION
        "Driver Date
        The date of the NetWare loadable module
        providing the operating system access to the
        Server Manager board. The date is provided in
        mm/dd/yy format."
    ::=( osNetWare 3x 2 )
nw3xDriverVerson        OBJECT-TYPE
    SYNTAX          DisplayString (SIZE (0 . . 5))
    ACCESS          read-only
    STATUS          mandatory
    DESCRIPTION
        "Driver Version
        This is the version of the NetWare loadable
        module providing the operating system access to
        the Server Manager board. Version 1.20 or
        greater of the driver is required for the
        Server Manager SNMP agent."
    ::=( osNetWare3x 3 )
nw3xDriverIssued Commands       OBJECT-TYPE
    SYNTAX          Counter
    ACCESS          read-only
    STATUS          mandatory
    Description
        "Server Manager Commands Sent
        The number of commands the driver has issued to
        the Server Manager board since it was loaded."
    ::=( osNetWare 3x 4 )
nw3xDriverReceivedCommands      OBJECT-TYPE
    SYNTAX          Counter
    ACCESS          read-only
    STATUS          mandatory
    DESCRIPTION
        "Server Manager Commands Received
        The number of commands the driver has received
        from the Service Manager board since it was
        loaded."
    ::=( osNetWare3x 5 )
nw3xDriverWatchdogFrequency     OBJECT-TYPE
    SYNTAX          INTEGER ( ) . . 255)
    ACCESS          read-only
    STATUS          mandatory
    DESCRIPTION
        "Server Manager Watchdog Frequency
        The number of minutes between watchdog
        commands. The watchdog command is the way the
        Server Manager board determines that the driver
        and NetWare are still running. A value of 0
        means no watchdog is being performed."
    ::=( osNetWare3x 6 )
nw3xDriverClockSyncFrequency    OBJECT-TYPE
    SYNTAX          INTEGER (0 . . 65535)
    ACCESS          read-only
    STATUS          mandatory
    DESCRIPTION
        "Server Manager Clock Sync Frequency
        The number of minutes between clock
        synchronization commands. The clock
        synchronization command sets the Server Manager
        board's clock to the same value as the NetWare
        OS clock. A value of 0 means no clock
        synchronization is being performed."
    ::=( osNetWare3x 7 )
nw3xDriverIssuedWatchdogs       OBJECT-TYPE
    SYNTAX          Counter
    ACCESS          read-only
    STATUS          mandatory
    DESCRIPTION
        "Server Manager Watchdog Commands Issues
        The number of watch dog commands issued since
        the driver was loaded."
    ::=( osNetWare3x 8 )
nw3xDriverIssuedClockSyncs      OBJECT-TYPE
    SYNTAX          Counter
    ACCESS          read-only
    STATUS          mandatory
    DESCRIPTION
        "Server Manager Clock Sync Commands Issues
        The number of clock synchronization commands
        performed since the driver was loaded."
    ::=( osNetWare3x 9 )
nw3xDriverMemoryAllocationsFailedErrs       OBJECT-TYPE
    SYNTAX          Counter
    ACCESS          read-only
    STATUS          mandatory
    DESCRIPTION
        "Server Manager Memory Allocation Errors
        The number of times that a memory allocation
        failed when a command received by the driver
        required a buffer to be allocated."
        ::=( osNetWare3x 10 )
nw3xDriverBoardResets       OBJECT-TYPE
    SYNTAX          Counter
    ACCESS          read-only
    STATUS          mandatory
    DESCRIPTION
        "Server Manager Board Resets
        The number of times the driver detected the
        Server Manager board resetting itself."
    ::=( osNetWare3x 11 )
nw3xBoardState          OBJECT-TYPE
    SYNTAX          INTEGER
                      ok(1),
                      failed(2)
                      )
    ACCESS          read-only
    STATUS          mandatory
    DESCRIPTION
        "Server Manager Board State
        The driver's perception of the Server Manager
        board's state."
    ::=( osNetWare3x 12 )
```

© 1992 Compaq Computer Corporation

Figure 8C:
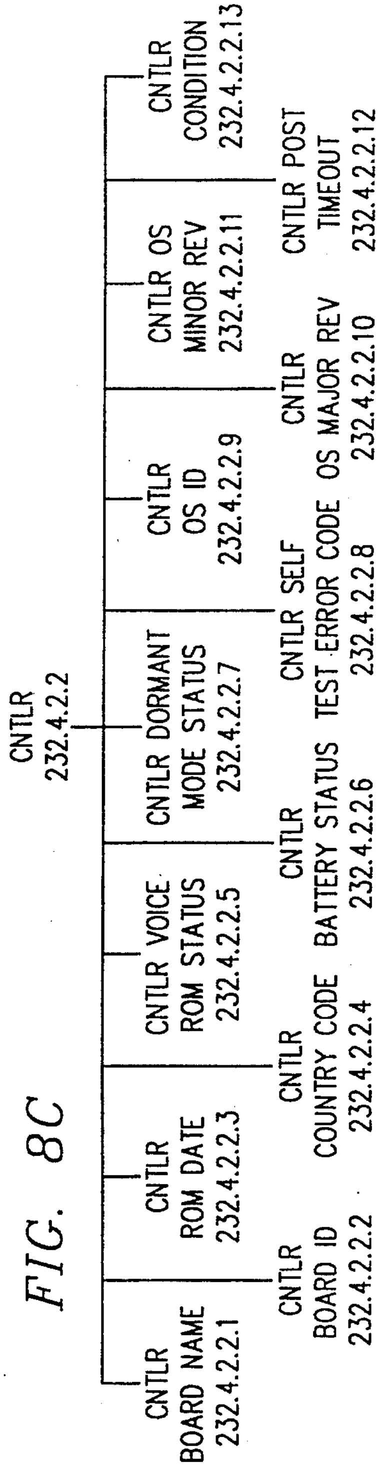
FIG. 8C is an inheritance tree illustrating a controller child group of the component group of the subMIB of FIG. 8A.

Referring next to FIG. 8C, the controller child group located at branch 232.4.2.2 will now be described in greater detail. The controller child group contains configuration and statistical information, for example, board name, board ID, firmware date, country code, modem type and voice ROM status, regarding the server manager controller. The group is comprised of twelve objects which detail this information. The objects of the child group are a board name object located at branch 232.4.2.2.1, a board ID object located at branch 232.4.2.2.2, a ROM date object located at branch 232.4.2.2.3, a country code object located at branch 232.4.2.2.4, a ROM status object located at branch 232.4.2.2.5, a battery status object located at branch 232.4.2.2.6, a dormant mode status object located at branch 232.4.2.2.7, a self test error code object located at branch 232.4.2.2.8, an operating system ID object located at branch 232.4.2.2.9, an operating system major revision object located at branch 232.4.2.2.10, an operating system minor revision object located at branch 232.4.2.2.11, a power on self test timeout object located at branch 232.4.2.2.12, and a condition object located at branch 232.4.2.2.13. The formal organization of the controller child group is as follows:

```
cntrlrBoardName OBJECT-TYPE
     SYNTAX  DisplayString (SIZE (0..15))
     ACCESS  read-only
     STATUS  mandatory
     DESCRIPTION
          "Server Manger Board Name

          The name of the Server Manager board supplied
          by the user during configuration of the Server
          Manager board using the EISA CONFIGURATION
          UTILITY."
     ::=( cntlr 1 )

cntlrBoardId  OBJECT-TYPE
     SYNTAX  DisplayString (SIZE (0..5))
     ACCESS  read-only
     STATUS  mandatory
```

```
     DESCRIPTION
          "Server Manager Board ID

          The ID of the Server Manager board supplied by
          the user during configuration of the Server
          Manager board using the EISA CONFIGURATION
          UTILITY."
     ::=( cntlr 2 )

cntlrRomDate OBJECT-TYPE
     SYNTAX  DisplayString (SIZE (0..8))
     ACCESS  read-only
     STATUS  mandatory
     DESCRIPTION
          "Server Manager ROM Date

          The date of the firmware on the board in
          mm/dd/yy format."
     ::= ( cntlr 3)

cntlrCountryCode  OBJECT-TYPE
     SYNTAX  DisplayString (SIZE (0..2))
     ACCESS  read-only
     STATUS  mandatory
     DESCRIPTION
          "Server Manager Country Code

          An abbreviation for the country (language) for
          which the Server Manager board is configured.
          The possible values are:

               AE   Arabic-English
               AF   Arabic-French
               AU   Australia
               BE   Belgium
               BF   Belgium-Flemish
               CE   Canadian-English
               CF   Canadian-French
               CH   China
               DN   Denmark
               DU   Dutch
               EE   European-English
               FN   Finland
               FR   French
               GR   Germany
```

```
                HA   Hungary
                IT   Italy
                IS   Israel
                KA   Kangi
                LA   Latin America
                ME   Middle East
                NE   Netherlands
                NO   Norway
                PO   Portugal
                SP   Spain
                SW   Sweden
                ST   Switzerland
                SF   Swiss-French
                SG   Swiss-German
                TA   Taiwan
                UK   United Kingdom
                US   United States"
    ::= ( cntrl 4 )

cntlrVoiceRomStatus  OBJECT-TYPE
    SYNTAX   INTEGER (
             notInstalled(1),
             installed(2)
             )
    ACCESS   read-only
    STATUS   mandatory
    DESCRIPTION
        "Server Manager Voice ROM Status

        The value specifies if the Server Manager board
        has a voice ROM installed."
    ::=( cntlr 5)

cntlrBatteryStatus  OBJECT-TYPE
    SYNTAX   INTEGER (
             connected(1),
             disconnected(2)
             )
    ACCESS   read-only
    STATUS   mandatory
    DESCRIPTION
        "Server Manager Battery Connection Status."
    ::= ( cntlr 6 )

cntlrDormantModeStatus  OBJECT-TYPE
```

```
    SYNTAX  INTEGER (
            normal(1),
            dormantOnPowerDown(2)
            )
    ACCESS  read-only
    STATUS  mandatory
    DESCRIPTION
         "Server Manager Dormant Mode Status

         The status of the power management system."
    ::=( cntlr 7)

cntlrSelfTestErrorCode  OBJECT-TYPE
    SYNTAX  INTEGER  (0..65535)
    ACCESS  read-only
    STATUS  mandatory
    DESCRIPTION
         "Server Manager Self Test Error Code

         The result of the self test run by the Server
         Manager board's firmware.  This value is a set
         of bit flags defined as follows (bit 0 is the
         least significant bit):
              Bit 0 set -  ROM Checksum failed
              Bit 1 set -  RAM test failed
              Bit 2 set -  80186 timer failed
              Bit 3 set -  Built in modem failed
              Bit 4 set -  Direct connect interface
                           failed
              Bit 5 set -  Real time clock failed
              Bit 6 set -  Temperature and/or voltage
                           sensor failed
              Bit 7 set -  DTMF failed
              Bit 8 set -  VSL failed
              Bit 9 set -  Host bus monitor failed
              Bit 10 set - BMIC interface failed
              Bit 11 set - Battery is broken
         Bits 12 - 15 are currently reserved.

         A value of zero (no bits are set) indicates no
         self test error has occurred."
    ::= ( cntlr 8 )

cntlrOsId OBJECT-TYPE
    SYNTAX  INTEGER (
```

```
                other(1),
                netware286(177),
                netware386(178),
                os2LanManager(179),
                unix(180),
                banyan(181),
                dos(182),
                )
        ACCESS  read-only
        STATUS  mandatory
        DESCRIPTION
            "Server Manager Operating System ID

            The host operating system registered by the
            driver with the Server Manager board."
        ::= ( cntlr 9 )

cntlrOsMajorRev  OBJECT-TYPE
        SYNTAX  INTEGER (0..255)
        ACCESS  read-only
        STATUS  mandatory
        DESCRIPTION
            "Server Manager Operating System Major Revision

            The major revision of the host operating system
            registered by the driver with the Server
            Manager board."
        ::=( cntlr 10 )

cntlrOsMinorRev  OBJECT-TYPE
        SYNTAX  INTEGER (0..255)
        ACCESS  read-only
        STATUS  mandatory
        DESCRIPTION
            "Server Manager Operating System Minor Revision

            The minor revision of the host operating system
            registered by the driver with the Server
            Manager board."
        ::=( cntlr 11 )

cntlrPostTimeout  OBJECT-TYPE
        SYNTAX  INTEGER (0..60)
        ACCESS  read-only
        STATUS  mandatory
```

```
     DESCRIPTION
          "Server Manager Power on Self Test Timeout

          The number of minutes the board should wait for
          POST to complete.  A value of 0 indicates that
          the version of firmware on the Server Manager
          board   does   not   make   this   information
          available."
     ::=( cntlr 12 )

cntlrCondition  OBJECT-TYPE
     SYNTAX  INTEGER (
             other(1),
             ok(2),
             degraded(3),
             failed(4)
             )
     ACCESS  read-only
     STATUS  mandatory
     DESCRIPTION
          "Server Manager Condition

          This represents the overall condition of the
          Server Manager board."
     ::=( cntlr 13 )
```

©1992 Compaq Computer Corporation

Figures 1, 8D:
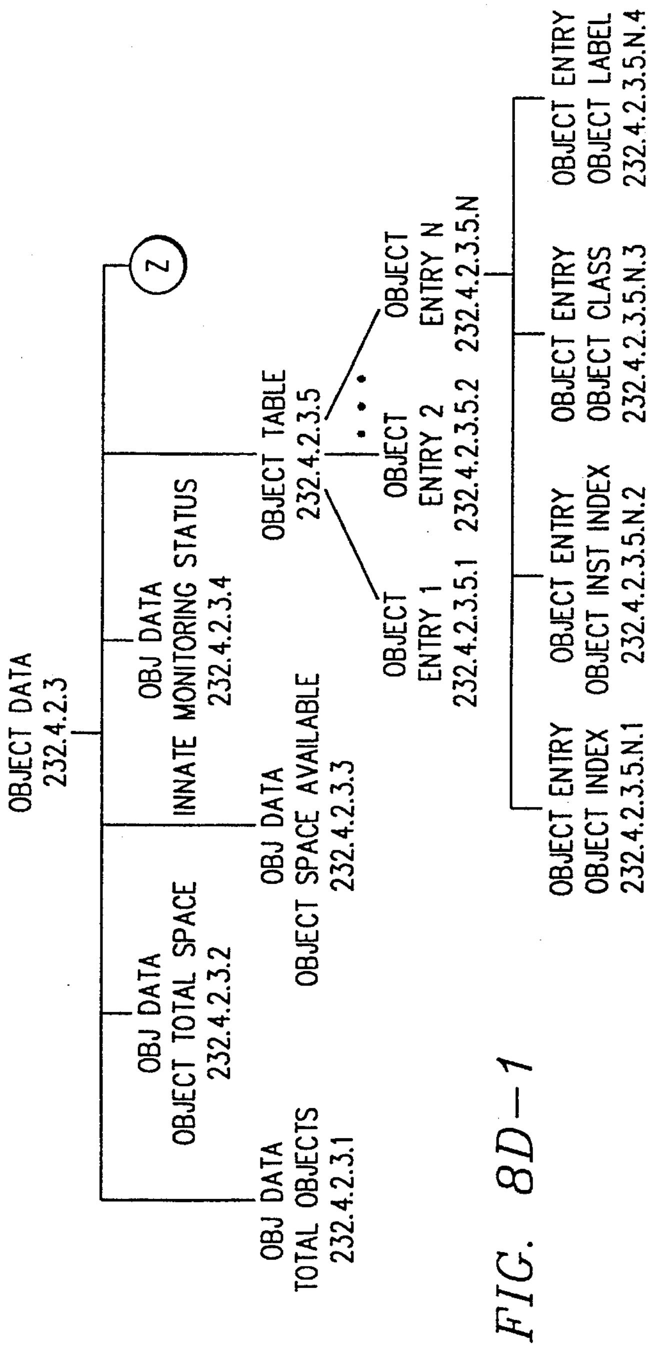

Referring generally to FIGS. 8D-1 through 8D-2 and, in particular to FIG. 8D-1, the object data child group located at branch 232.4.2.3 will now be described in greater detail. The object data child group describes the objects and monitored items on the server manager board 24 using three objects, a total objects object located at branch 232.4.2.3.1, a total object space object located at branch 232.4.2.3.2, an innate monitoring status object located at branch 232.4.2.3.4, an object table located at branch 232.4.2.3.5 and a monitored item table located at branch 232.4.2.3.6.

The object table is comprised of N entries, one for each object monitored by the server manager 24. For each entry N, the object table contains four objects: an object index object located at branch 232.4.2.3.5.N.1, an object instance index object located at branch 232.4.2.3.5.N.2, an object class object located at branch 232.4.2.3.5.N.3 and an object label object located at branch 232.4.2.3.5.N.4.

Referring, in particular, to FIG. 8D-2, the monitored item table located at branch 232.4.2.3.6 includes an entry N for each item monitored by the server manager. For each entry N, the monitored item table contains 18 objects: a monitored item index object located at branch 232.4.2.3.6.N.1, a monitored item instruction index object located at branch 232.4.2.3.6.N.2, a monitored item index located at branch 232.4.2.2.3.6.N.3, an in-band alert status object located at branch 232.4.2.3.6.N.4, an out-of-band alert status object located at branch 232.4.2.3.6.N.5, an innate status object located at branch 232.4.2.3.6.N.6, a host notification object located at branch 232.4.2.3.6.N.7, a logical operator object located at branch 232.4.2.3.6.N.8, a monitored item severity object located at branch 232.4.2.3.5.N.9, a monitored item data type object located at branch 232.4.2.3.5.N.10, a voice message number object located at branch 232.4.2.3.5.N.11, a monitored item label object located at branch 232.4.2.3.5.N.12, a monitored item limit object located at branch 232.4.2.3.5.N.13, an optional monitored item object located at branch 232.4.2.3.5.N.14, a monitored item default value object located at branch 232.4.2.3.5.N.15, a monitored item, current value object located at branch 232.4.2.3.5.N.16, a monitored item current string object located at branch 232.4.2.3.5.N.17, a monitored item current contents located at branch 232.4.2.3.5.N.18 and a monitored item time stamp located at branch 232.4.2.3.5.N.19.

The formal organization of the object data child group is as follows:

```
objDataTotalObjects  OBJECT-TYPE
     SYNTAX  INTEGER
     ACCESS  read-only
     STATUS  mandatory
     DESCRIPTION
          "Server Manager Total Objects

          The total number of objects currently defined
          on the Server Manager Board."
     ::=( objData 1 )

objDataTotalSpace  OBJECT-TYPE
     SYNTAX  INTEGER
     ACCESS  read-only
     STATUS  mandatory
     DESCRIPTION
          "Server Manager Total Object Space

          The  total  amount  of  memory  on  the  Server
          Manager board for storing object and monitored
          item  information.   This  number  is  given  in
          Server Manger board specific unit type and is
          best    used    in    comparison    with    the
          objDataObjectSpaceAvailable."
     ::=( objData 2 )

objDataObjectSpaceAvailable  OBJECT-TYPE
     SYNTAX  INTEGER
     ACCESS  read-only
     STATUS  mandatory
     DESCRIPTION
          "Server Manager Available Object Space
```

```
          The amount of memory currently available on the
          Server Manager board for storing object and
          monitored item information.  This number is
          given in a Server Manager board specific unit
          type and is best used in comparison with the
          objDataObjectTotalSpace."
     ::=( objData 3 )

objDataInnateMonitoringStatus  OBJECT-TYPE
     SYNTAX  INTEGER (
             other(1),
             disabled(2),
             enabled(3),
             )
     ACCESS  read-only
     STATUS  mandatory
     DESCRIPTION
          "Server Manager Innate Monitoring Status

          The following values are valid:

                   Enabled (3)     Innate Monitoring is
                                   active.

                   Disabled (2)    Innate Monitoring is
                                   not active.

                   Other (1)       Innate   Monitoring
                                   s t a t u s   i s
                                   unobtainable

          Innate Monitoring is performed by the Server
          Manager board without input from the operating
          system.  It includes monitoring of information
          such as Temperature, Input/Output Check, and
          Power.

          COMPAQ DIAGNOSTICS disables Innate Monitoring
          before executing any tests so that alerts are
          not caused inadvertently.  After completion,
          Diagnostics re-enables alerting."
     ::= (objData 4 )

objectTable  OBJECT-TYPE
     SYNTAX  SEQUENCE OF ObjectEntry
```

```
     ACCESS  not-accessible
     STATUS  mandatory
     DESCRIPTION
          "A list of the objects currently defined on the
          Server Manager board."
     ::= ( objData 5 )

objectEntry  OBJECT-TYPE
     SYNTAX  ObjectEntry
     ACCESS  not-accessible
     STATUS  mandatory
     DESCRIPTION
          "A description of an object currently defined
          on the Server Manager board."
     INDEX  ( objectIndex, objectInstIndex )
     ::=( objectTable 1 )

objectEntry ::= SEQUENCE (
     objectIndex          INTEGER  (0..4294967295),
     objectInstIndex      INTEGER  (0..255),
     objectClass          INTEGER  (0..4294967195),
     objectLabel          DisplayString (SIZE (0..15))
     )

objectIndex  OBJECT-TYPE
     SYNTAX  INTEGER  (0..4294967295)
     ACCESS  read-only
     STATUS  mandatory
     DESCRIPTION
          "This is a number that uniquely specifies a
          type of object on the Server Manager board.
          The number zero will never be an object."
     ::= (objectEntry 1)

objectInstIndex  OBJECT_TYPE
     SYNTAX  INTEGER  (0..255)
     ACCESS  read-only
     STATUS  mandatory
     DESCRIPTION
          "This number uniquely specifies a particular
          instance of an object on the Server Manager
          board."
     ::= (objectEntry 2 )

objectClass  OBJECT-TYPE
```

```
        SYNTAX  INTEGER (0..429496795)
        ACCESS  read-only
        STATUS  mandatory
        DESCRIPTION
             "A number used to group associated objects
             together by the type of function they perform.
             The currently defined classes are:

                  4096  (1000 hex) System Board
                  8192  (2000 hex) Disk Storage
                  16384 (4000 hex) Tape Storage
                  20480 (5000 hex) Network
                  24576 (6000 hex) NetWare
                  28672 (7000 hex) SCO-Unix
                  32768 (8000 hex) OS/2 - LanMan
                  36864 (9000 hex) Banyan Vines"
        ::= ( objectEntry 3 )

objectLabel  OBJECT-TYPE
        SYNTAX  DisplayString (SIZE (0..15))
        ACCESS  read-only
        STATUS  mandatory
        DESCRIPTION
             "A short text description of the object."
        ::= ( objectEntry 4)

monItemTable  OBJECT-TYPE
        SYNTAX  SEQUENCE OF MonItemEntry
        ACCESS  not-accessible
        STATUS  mandatory
        DESCRIPTION
             "A list of the monitored items currently
             defined on the Server Manager Board."
        ::= ( objData 6 )

monItemEntry  OBJECT-TYPE
        SYNTAX  MonItemEntry
        ACCESS  not-accessible
        STATUS  mandatory
        DESCRIPTION
             "A description of a monitored item currently
             defined on the Server Manager board."
        INDEX   (   monItemObjIndex,   monItemInstIndex,
monItemIndex)
        ::= ( monItemTable 1)
```

```
MonItemEntry ::= SEQUENCE (
    monItemObjIndex        INTEGER (0..4294967295),
    monItemInstIndex       INTEGER (0..255),
    monItemIndex           INTEGER (0..255),
    monItemInBandAlertStatus INTEGER,
    monItemOutOfBandAlertStatus   INTEGER,
    monItemInnateStatus         INTEGER,
    monItemHostNotify           INTEGER,
    monItemLogicalOperator      INTEGER,
    monItemSeverity             INTEGER,
    monItemDataType             INTEGER,
    monItemVoiceMagNum          INTEGER (0..511),
    monItemLabel                DisplayString (SIZE
                                (0..15)),
    monItemLimit                INTEGER
                                (-2147483648..2147483647)
    monItemOption               INTEGER
                               (-2147483648..2147483647),
    monItemDefVal               INTEGER
                               (-2147483648..2147483647),
    monItemCurVal               INTEGER
                               (-2147483648..2147483647),
    monItemCurString     Displaystring (SIZE (0..255)),
    monItemCurContents   OCTET STRING (SIZE (0..256)),
    monItemTimeStamp     OCTET STRING (SIZE (0..6))
    )

monItemObjIndex  OBJECT-TYPE
    SYNTAX  INTEGER (0..4294967295)
    ACCESS  read-only
    STATUS  mandatory
    DESCRIPTION
        "This is a number that uniquely specifies a
        type of object on the Server Manager board with
        which this monitored item is associated."
    ::= ( monItemEntry 1 )

monItemInstIndex  OBJECT-TYPE
    SYNTAX  INTEGER (0..255)
    ACCESS  read-only
    STATUS  mandatory
    DESCRIPTION
        "This is a number that uniquely specifies a
        particular instance of an object on the Server
```

```
          Manager board that with which this monitored
          item is associated."
     ::= ( monItemEntry 2 )

monItemIndex  OBJECT-TYPE
     SYNTAX  INTEGER (0..255)
     ACCESS  read-only
     STATUS  mandatory
     DESCRIPTION
          "This is a number that specifies the monitored
          item of the object and instance given in the
          first two fields that this entry describes."
     ::= ( monItemEntry 3 )

monItemInBandAlertStatus  OBJECT-TYPE
     SYNTAX  INTEGER (
             other(1),
             disabled(2),
             enabled (3)
             )
     ACCESS  read-only
     STATUS  mandatory
     DESCRIPTION
          "This field indicates whether the driver will
          be notified when this monitored item crosses a
          defined threshold.  The driver may provide some
          mechanism for logging the event or notifying
          specified users.

          This field is undefined if the monItemDataType
          is string, date, or queue."
     ::= ( monItemEntry 4 )

monItemOutOfBandAlertStatus  OBJECT-TYPE
     SYNTAX  INTEGER (
             other(1),
             disabled(2),
             enabled(3)
             )
     ACCESS  read-only
     STATUS  mandatory
     DESCRIPTION
          "This field indicates whether the Server
          Manager board will notify pagers, telephones,
```

```
        or Server Manager Facilties when this monitored
        item crosses a defined threshold.

        This field is undefined if the monItemDataType
        is string, date or queue."
    ::= ( monItemEntry 5)

monItemInnateStatus  OBJECT-TYPE
    SYNTAX  INTEGER (
            externallyManaged(1)
            innate(2)
            )
    ACCESS  read-only
    STATUS  mandatory
    DESCRIPTION
        "This field indicates if the Server Manager
        board is responsible for monitoring the value
        of this monitored item or if an external
        operating system agent is acquiring the value
        and placing the data on the Server Manager
        board."
    ::= (monItemEntry 6 )

monItemHostNotify  OBJECT-TYPE
    SYNTAX  INTEGER (
            other(1),
            disabled(2),
            enabled(3)
            )
    ACCESS  read-only
    STATUS  mandatory
    DESCRIPTION
        "This field indicate if the operating system
        driver is to be notified of modifications to
        this monitored item's thresholds.
    ::= ( monItemEntry 7 )

monItemLogicalOperated  OBJECT-TYPE
    SYNTAX  INTEGER (
            equal(1),
            notequal(2),
            lessThan(3),
            greaterThan(4),
            lessThanOrEqual(5),
            greaterThanOrEqual(6),
```

```
             inside(7),
             outside(8)
             )
        ACCESS   read-only
        STATUS   mandatory
        DESCRIPTION
             "This shows the logical operation that is done
             with the limit (and optional) to determine if
             an alerting event has occurred.

             This field is undefined if the monItemDataType
             is string, data or queue."
        ::= ( monItemEntry 8 )

    monItemSeverity  OBJECT-TYPE
        SYNTAX   INTEGER (
                 status(1),
                 warning(2),
                 critical(3),
                 catastrophic(4)
                 )
        ACCESS   read-only
        STATUS   mandatory
        DESCRIPTION
             "The severity of a problem with this monitored
             item.

             This field is undefined if the monItemDataType
             is string, data or queue."
        ::= ( monItemEntry 9 )

    monItemDataType  OBJECT-TYPE
        SYNTAX   INTEGER (
                 counter(1),
                 state(2),
                 range(3),
                 string(4),
                 data(5),
                 queue(6)
                 )
        ACCESS   read-only
        STATUS   mandatory
        DESCRIPTION
             "The conceptual type of data of this monitored
             item."
```

```
    ::= ( monItemEntry 10)

monItemVoiceMagNum  OBJECT-TYPE
    SYNTAX  INTEGER (0..511)
    ACCESS  read-only
    STATUS  mandatory
    DESCRIPTION
        "The voice message number that would be
        delivered as part of a voice alert when this
        monitored item exceeds its threshold.

        This field is undefined if the monItemDataType
        is string, data, or queue."
    ::= ( monItemEntry 11)

monItemLabel  OBJECT-TYPE
    SYNTAX  DisplayString (SIZE (0..15))
    ACCESS  read-only
    STATUS  mandatory
    DESCRIPTION
        "A short text description of the monitored
        item."
    ::= ( monItemEntry 12 )

monItemLimit  OBJECT-TYPE
    SYNTAX  INTEGER (-2147483648..2147483647)
    ACCESS  read-only
    STATUS  mandatory
    DESCRIPTION
        "Threshold information for this monitored item.
        The interpretation of this field depends on the
        monItemDataType field.

        For counters this is the value that when
        passed, as specified by the comparator, an
        alert will occur.  the optional can be used to
        specify a step.  Whenever the value of the
        monitored item passes the value of the limit
        plus an integer multiple of the step a new
        alert will occur.

        For states this is the value that when passed,
        as specified by the comparator, an alert will
        occur.
```

For ranges this value (the low threshold) and the value of the optional (the high threshold) define a range. When the range boundaries are crossed, as specified by the comparator, an alert will occur.

This field is undefined if the monItemDataType is string, data, or queue.
::= ( monItemEntry 13 )

monItemOptional   OBJECT-TYPE
    SYNTAX   INTEGER (-2147483648..2147483647)
    ACCESS   read-only
    STATUS   mandatory
    DESCRIPTION
        "Threshold information for this monitored item. The interpretation of this field depends on the monItemDataType field.

For counters this is the step. Whenever the value of the monitored item passes the value of the limit plus an integer multiple of the step a new alert will occur.

For ranges this value (the high threshold) and the value of the limit (the low threshold) define a range. When the range boundaries are crossed, as specified by the comparator, an alert will occur.

This field is undefined if the monItemDataType is state, string, data or queue."
    ::= ( monItemEntry 14 )

monItemDefVal   OBJECT-TYPE
    SYNTAX   INTEGER (-2147483648..21474863647)
    ACCESS   read-only
    STATUS   mandatory
    DESCRIPTION
        "Default value information for this monitored item. Certain Server Manager data types support a reset function. This field specifies the value that the monitored item will change to when a reset command is received. This field is only valid if the monItemDataType value is counter, state, or range. This field is undefined if the monItemDataType is string, data, or queue."
::= ( monItemEntry 15 )

monItemCurVal OBJECT-TYPE
    SYNTAX  INTEGER (-2147483648..2147483647)
    ACCESS  read-only
    STATUS  mandatory
    DESCRIPTION
        "The value of the monitored item if the monitored item's data type is counter, state, or range. If the monitored item's data type is string, data, or queue this value is undefined."
    ::= ( monItemEntry 16 )

monItemCurString OBJECT-TYPE
    SYNTAX  DisplayString (SIZE (0..255))
    ACCESS  read-only
    STATUS  mandatory
    DESCRIPTION
        "The value of the monitored item is the monItemDataType is string. If the monItemDataType is counter, state, range, data or queue this value is undefined."
    ::= ( monItemEntry 17)

monItemCurContents OBJECT-TYPE
    SYNTAX  OCTET STRING (SIZE (0..256))
    ACCESS  read-only
    STATUS  mandatory
    DESCRIPTION
        "The value of the monitored item if the monItemDataType is data or queue. If the monItemDataType is counter, state, range or string this value is undefined.

If the monItemDataType is data this field will contain a length octet(byte) followed by a number of octets of data equal to the value of the length octet.

If the monItemDataType is queue this field will contain a head of queue octet followed by 255

```
        octets of data.  The value of the head of queue
        octet indicates the data octet that is the
        logical head of the circular queue of data.
     ::= ( monItemEntry 18)

monItemTimeStamp  OBJECT-TYPE
     SYNTAX  OCTET STRING (SIZE (0..6))
     ACCESS  read-only
     STATUS  mandatory
     DESCRIPTION
        "An octet string specifying the time of the
        last change of this monitored item.  This octet
        string contains in the following order:  year,
        month, day of month, hour, minute, second."
     ::= ( monItemEntry 19)
```

©1992 Compaq Computer Corporation

Figure 8E:
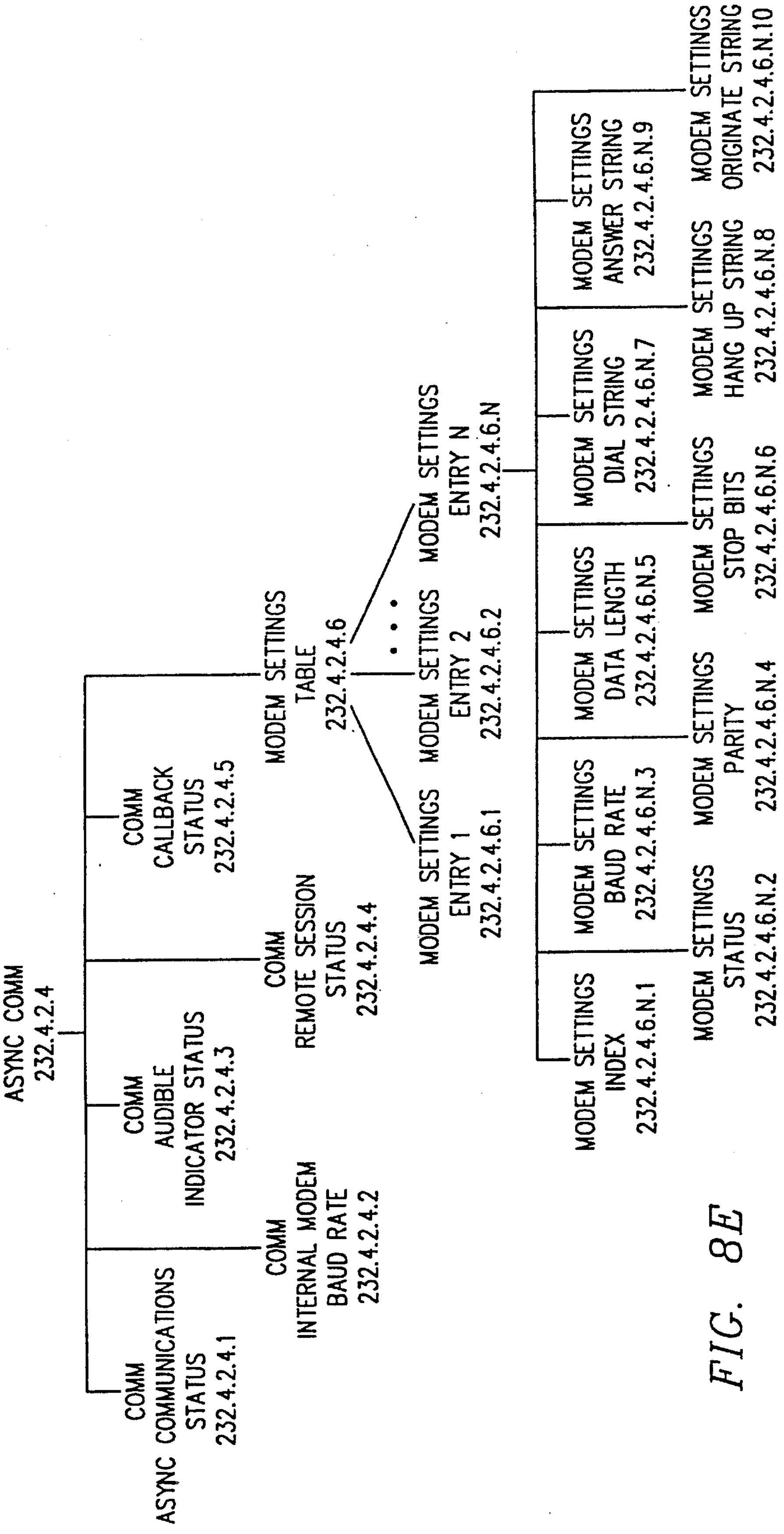
FIG. 8E is an inheritance tree illustrating an asynchronous communication child group of the component group of the subMIB of FIG. 8A.

Referring next to FIG. 8E, the asynchronous communications child group located at branch 232.4.2.4 will now be described in greater detail. The asynchronous communications child group contains five objects and a table for describing the configuration and status of the asynchronous communication ports of the server manager 24. The objects of the asynchronous communications child group include a status object located at branch 232.4.2.4.1, a internal modem baud rate object located at 232.4.2.4.2, an audible indicator status object located at branch 232.4.2.4.3, a remote session status object located at branch 232.4.2.4.3 and a callback status object located at branch 232.4.2.4.5. Information regarding the modem settings is contained in a modem settings table located at branch 232.4.2.4.6. The modem settings table includes an entry N for each modem installed on the server manager board. Each entry N contains a settings index object located at branch 232.4.2.4.6.N.1, a settings status object located at branch 232.4.2.4.6.N.2, a settings baud rate object located at branch 232.4.2.4.6.N.3, a settings parrity object located at branch 232.4.2.4.6.N.3, a settings data length object located at branch 232.4.2.4.6.N.4, a settings stop bits object located at branch 232.4.2.4.6.N.5, a settings dial string object located at branch 232.4.2.4.6.N.7, a settings hand up string located at branch 232.4.2.4.6.N.8, a settings answer string located at branch 232.4.2.4.6.N.9 and a settings originate string located at branch 232.4.2.4.6.N.10. The formal organizational framework for the asynchronous communications child group is as follows:

```
commAsyncCommunicationStatus  OBJECT-TYPE
     SYNTAX   INTEGER (
              other(1),
              disable(2),
              enabled(3)
              )
     ACCESS   read-only
     STATUS   mandatory
     DESCRIPTION
          "Async Status
               This shows if asynchronous communication
               with the Server Manager's serial interface
               and modem is enabled (3) or disabled (2).

               This feature can be enabled or disabled
               through  the  Collection  Agent  User
               Interface (CPQCAUI.NLM).

               You may want to disable the Async
               Communication with the Server Manager to
               prevent a Server manager Facility (SMF)
               user from assuming control of the system
               console.      Disabling    the    Async
               Communication disconnects any active SMF
               session.      Disabling    the    Async
               Communications also disables all remote
               alerts.   Server Manager On-the-Network
```

```
              alerts  will  remain  enabled.   On-the-
              Network alerts are those sent over the
              network."
        ::= ( asyncComm 1 )

commInternalModemMaxBaudRate  OBJECT-TYPE
        SYNTAX  INTEGER
        ACCESS  read-only
        STATUS  mandatory
        DESCRIPTION
              "The value specifies the maximum baud rate
              supported by the modem installed on the Server
              manager board.  A value of 0 indicates that the
              version of firmware on the Server Manager board
              does not make this information available."
        ::= ( asyncComm 2 )

commAudibleIndicatorStatus  OBJECT-TYPE
        SYNTAX  INTEGER (
                other(1),
                disabled(2),
                enabled(3)
                )
        ACCESS  read-only
        STATUS  mandatory
        DESCRIPTION
              "The current status of the remote console
              audible indicator.

              When enabled, the server will beep when the
              Server Manager is being used by a Server
              Manager Facility for remote session emulation."
        ::= ( asyncComm 3 )

commRemoteSessionStatus  OBJECT-TYPE
        SYNTAX  INTEGER (
                notSupported(1),
                noSessionActive(2),
                remoteSessionActive(3),
                pagerOrVoiceSessionActive(4),
                remoteSessionWithRemoteConsoleActive(5)
                )
        ACCESS  read-only
        STATUS  mandatory
        DESCRIPTION
```

```
        "The current value of the remote session
        activity. A value of notSupported indicates
        that the version of firmware on the Server
        Manager board does not make this information
        available."
    ::= ( asyncComm 4 )

commCallbackStatus  OBJECT-TYPE
    SYNTAX  INTEGER (
            other(1),
            disabled(2),
            enabled(3)
            )
    ACCESS  read-only
    STATUS  mandatory
    DESCRIPTION
        "The status of the call back feature of the
        Server Manager board."
    ::= ( asyncComm 5 )

commModemSettingsTable  OBJECT-TYPE
    SYNTAX  SEQUENCE OF ModemSettingEntry
    ACCESS  not-accessible
    STATUS  mandatory
    DESCRIPTION
        "The list of defined modem settings for the
        Server Manager board."
    ::= ( asyncComm 6 )

modemSettingsEntry  OBJECT-TYPE
    SYNTAX  ModemSettingsEntry
    ACCESS  not-accessible
    STATUS  mandatory
    DESCRIPTION
        "A defined modem's settings for the Server
        Manager board."
    INDEX  ( modemSettingsIndex )
    ::= ( commModemSettingsTable 1 )

ModemSettingsEntry  ::=SEQUENCE (
    modemSettingsIndex        INTEGER,
    modemSettingsStatus       INTEGER,
    modemSettingsBaudRate     INTEGER,
    modemSettingsParity       INTEGER,
    modemSettingsDataLength   INTEGER,
```

```
     modemSettingsStopBits    INTEGER (1..2)
     modemSettingsDialString  DisplayString (SIZE
                                   (0..24))
     modemSettingsHangUpString DisplayString (SIZE
                                   (0..24))
     modemSettingsAnswerString DisplayString (SIZE
                                   (0..24))
     modemSettingsOriginateString DisplayString (SIZE
                                   (0..24))
     )

modemSettingsIndex  OBJECT-TYPE
     SYNTAX  INTEGER (
             internalModem(48),
             externalModem(49),
             pager(50)
             )
     ACCESS  read-only
     STATUS  mandatory
     DESCRIPTION
          "The type of modem settings this entry
          describes."
     ::= ( modemSettingsEntry 1)

modemSettingsStatus  OBJECT-TYPE
     SYNTAX  INTEGER  (
             internalModemNotInstalled(1),
             internalUnitedStatesModemInstalled(2),
             internalInternationalModemInstalled(3),
             serialPortNotSetup(4),
             serialPortSetUpForDirectConnect(5),
             serialPartSetupForExternalModem(6),
             pagerInformationData(7)
             )
     ACCESS  read-only
     STATUS  mandatory
     DESCRIPTION
          "Status information about the modem described
          by this table entry.  Only some of these values
          are appropriate for some types of entries."
     ::= ( modemSettingsEntry 2 )

modemSettingsBaudRate  OBJECT-TYPE
     SYNTAX  INTEGER
     ACCESS  read-only
```

```
     STATUS  mandatory
     DESCRIPTION
          "The baud rate to be used over the
          communication medium by the Server Manager
          board."
     ::= ( modemSettingsEntry 3)

modemSettingsParity  OBJECT-TYPE
     SYNTAX  INTEGER (
             none(1),
             odd(2),
             even(3)
             )
     ACCESS  read-only
     STATUS  mandatory
     DESCRIPTION
          "The parity used for this communication medium
          by the Server Manager board."
     ::= ( modemSettingsEntry 4 )

modemSettingsDataLength  OBJECT-TYPE
     SYNTAX  INTEGER
     ACCESS  read-only
     STATUS  mandatory
     DESCRIPTION
          "The date length used for this communication
          medium by the Server Manager board."
     ::= ( modemSettingsEntry 5 )

modemSettingsStopBits  OBJECT-TYPE
     SYNTAX  INTEGER (1..2)
     ACCESS  read-only
     STATUS  mandatory
     DESCRIPTION
          "The number of stop bits used for this
          communication medium by the Server Manager
          board."
     ::= ( modemSettingsEntry 6 )

     modemSettingsDialString  OBJECT-TYPE
          SYNTAX  DisplayString  (SIZE (0..24))
          ACCESS  read-only
          STATUS  mandatory
          DESCRIPTION
```

```
          "The string that is entered before any
          dial operation by the Server Manager
          board."
     ::= ( modemSettingsEntry 7 )

modemSettingsHangUpString  OBJECT-TYPE
     SYNTAX  DisplayString (SIZE (0..24))
     ACCESS  read-only
     STATUS  mandatory
     DESCRIPTION
          "The string used to hang up the phone by
          the Server Manager board."
     ::= ( modemSettingsEntry 8 )

modemSettingsAnswerString  OBJECT-TYPE
     SYNTAX  DisplayString (SIZE (0..24))
     ACCESS  read-only
     STATUS  mandatory
     DESCRIPTION
          "The string used to put the modem into
          auto-answer mode by the Server Manager
          board."
     ::= ( modemSettingEntry 9 )

modemSettingsOriginateString  OBJECT-TYPE
     SYNTAX  DisplayString (SIZE (0..24))
     ACCESS  read-only
     STATUS  mandatory
     DESCRIPTION
          "The string is used to put the modem into
          originate mode by the Server Manager
          board."
     ::= ( modemSettingsEntry 10 )
```

©1992 Compaq Computer Corporation

Figure 8F:
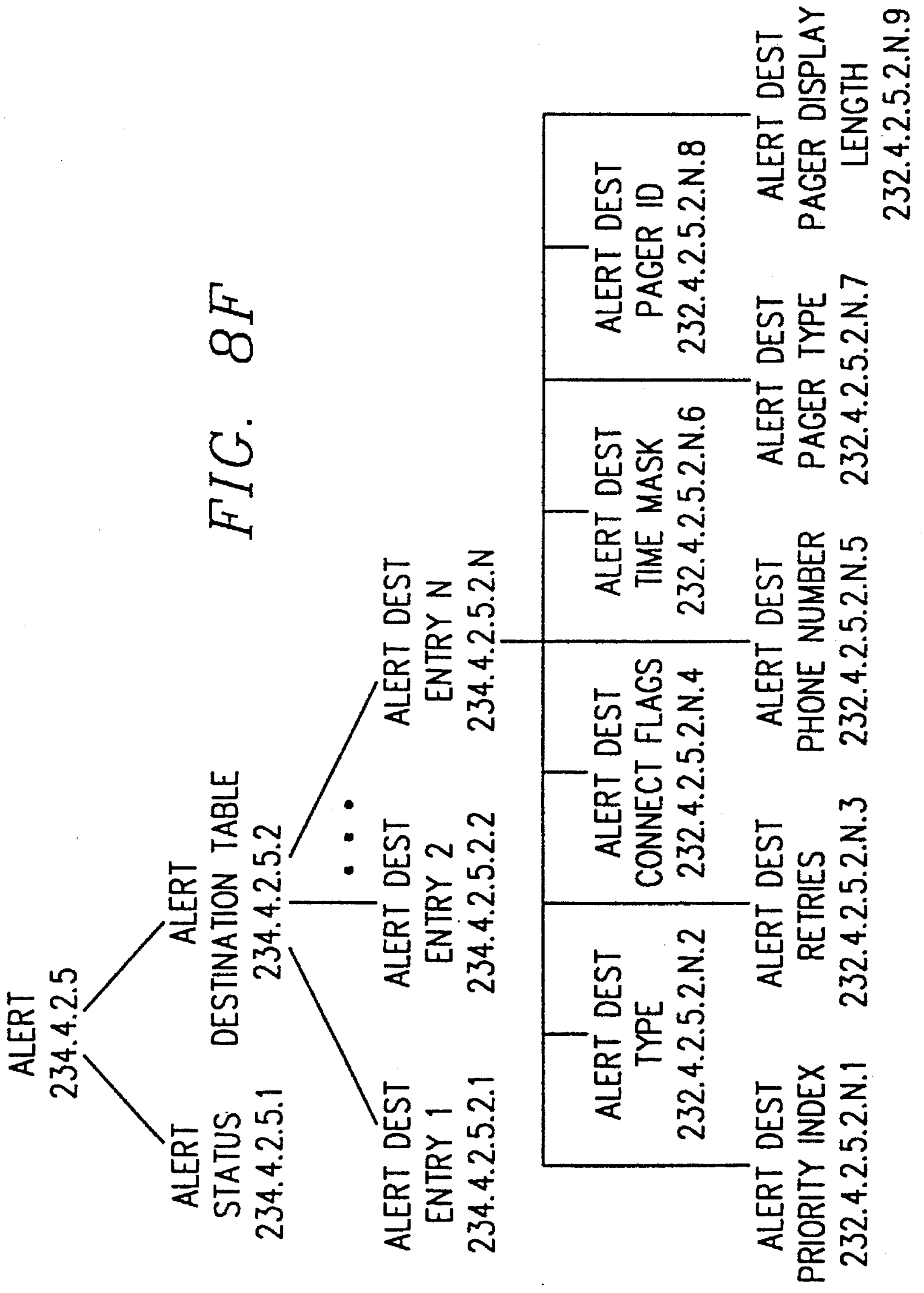
FIG. 8F is an inheritance tree illustrating an alert child group of the component group of the subMIB of FIG. 8A.

Referring next to FIG. 8F, the alert child group located at branch 234.4.2.5 will now be described in greater detail. The alert child group describes the configuration and status of the server manager board's alerting system using an alert status object located at branch 232.4.2.5.1 and an alert destination table located at branch 232.4.2.5.2. The alert destination table contains an entry N for each designated destination for an alert. For each selected destination, the alert destination table includes an alert priority index object located at branch 232.4.2.5.2.N.1, an alert destination type object located at branch 232.4.2.5.2.N.2, an alert destination retries object located at branch 232.4.2.5.2.N.3, an alert destination connect flags object located at branch 232.4.2.5.2.N.4, an alert destination phone number object located at branch 232.4.2.5.2.N.5, an alert destination time mask object located at branch 232.4.2.5.2.N.6, an alert destination pager type object located at branch 232.4.2.5.2.N.7, an alert destination pager ID object located at branch 232.4.2.5.2.N.8, and an alert destination pager display length object located at branch 232.4.2.5.2.N.9. The formal organization of the alert child group is as follows:

```
alertStatus                OBJECT-TYPE
    SYNTAX                 INTEGER (
                           other(1),
                           disabled(2),
                           enabled(3)
                           )
    ACCESS                 read-only
    STATUS                 mandatory
    DESCRIPTION
        "The current alerting status."
    ::= ( alert 1 )
alertDestTable             OBJECT-TYPE
    SYNTAX                 SEQUENCE OF AlertDestEntry
    ACCESS                 not-accessible
    STATUS                 mandatory
    DESCRIPTION
        "The list of currently defined alert
        destinations on the Server Manager board."
    ::=( alert 2 )
alertDestEntry             OBJECT-TYPE
    SYNTAX                 AlertDestEntry
    ACCESS                 not-accessible
    STATUS                 mandatory
    DESCRIPTION
        "A currently defined alert destination on the
        Server Manager board."
    INDEX      ( alertDestPriorityIndex )
    ::= ( alertDestTable 1 )
alertDestEntry       ::= SEQUENCE (
    alertDestPriorityIndex          INTEGER,
    alertDestType                   INTEGER,
    alertDestRetries                INTEGER (0 . . 31),
    alertDestConnectFlags           INTEGER,
    alertDestPhoneNumber            DisplayString (SIZE
                                      (0 . . 24)),
    alertDestTimeMast               OCTET STRING (SIZE
                                      (0 . . 21)),
    alertDestPagerType              INTEGER,
    alertDestPagerID                DisplayString (SIZE
                                      (0 . . 15)),
    alertDestPagerDisplayLength     INTEGER (0 . . 80)
    )
alertDestPriorityIndex        OBJECT-TYPE
    SYNTAX                 INTEGER
    ACCESS                 read-only
    STATUS                 mandatory
    DESCRIPTION
        "This is a number that uniquely specifies this
        alert destination. This number is also the
        priority of the alert destination. When an
        alert occurs, alert destinations are tried in
        an order based on their priority (lowest number
        first)."
    ::= ( alertDestEntry 1 )
```

-continued

```
alertDestType              OBJECT-TYPE
    SYNTAX                 INTEGER (
                           internalModemToSmf(161),
                           internalModemToPager(162),
                           internalModemToVoice(163),
                           externalModemToSmf(164),
                           externalModemToPager(165),
                           externalDirectToSmf(166)
                           )
    ACCESS                 read-only
    STATUS                 mandatory
    DESCRIPTION
        "The type of connection appropriate for the
        destination."
    ::= ( alertDestEntry 2 )
alertDestRetries           OBJECT-TYPE
    SYNTAX                 INTEGER (0 . . 31)
    ACCESS                 read-only
    STATUS                 mandatory
    DESCRIPTION
        "The number of retries for a successful
        connection that should be attempted to this
        alert destination."
    ::= ( alertDestEntry 3 )
alertDestConnectFlags      OBJECT-TYPE
    SYNTAX                 INTEGER (
                           alertOnly(1),
                           callbackOnly(2),
                           alertAndCallback(3)
                           )
    ACCESS                 read-only
    STATUS                 mandatory
    DESCRIPTION
        "The type(s) of communication that this
        destination supports."
    ::= ( alertDestEntry 4 )
alertDestPhoneNumber          OBJECT-TYPE
    SYNTAX                 DisplayString (SIZE (0 . . 24))
    ACCESS                 read-only
    STATUS                 mandatory
    DESCRIPTION
        "The phone number for this destination. This
        field is undefined if the alertDestType is
        externalDirectToSmf."
    ::= ( alertDestEntry 5 )
alertDestTimeMastk            OBJECT-TYPE
    SYNTAX                 OCTET STRING (SIZE (0 . . 21))
    ACCESS                 read-only
    STATUS                 mandatory
    DESCRIPTION
        "A set of bit flags specifying the times this
        is a valid destination. Each bit specifies
        whether if this a valid destination for a
        specific hour of the week. The first bit is
        for the hour 12:00:01 am to 1:00:00 am on
        Monday. Each bit thereafter specifies the
        validity of this destination for the next
        hour."
    ::= ( alertDestEntry 6 )
alertDestPagerType         OBJECT-TYPE
    SYNTAX                 INTEGER (
                           numericOnly(1),
                           alphanumeric(2)
                           )
    ACCESS                 read-only
    STATUS                 mandatory
    DESCRIPTION
        "The type of pager at this destination. This
        field is undefined if the alertDesType is
        internalModemToSmf, internalModemToVoice,
        externalModemtoSmf or externalDirectToSmf."
    ::= ( alertDestEntry 7 )
alertDestPagerID              OBJECT-TYPE
    SYNTAX                 DisplayString (SIZE (0 . . 15))
    ACCESS                 read-only
    STATUS                 mandatory
    DESCRIPTION
        "The pager ID assigned by the paging
        company to identify the pager. This field
        is undefined if the alertDestType is
```

-continued

```
        internalModemtoSmf, internalModemToVoice,
        e x t e r n a l M o d e m T o S m f ,  or
        externalDirectToSmf."
    ::= ( alertDestEntry 8 )
alertDestPagerDisplayLength        OBJECT-TYPE
    SYNTAX          INTEGER (0 . . 80)
    ACCESS          read-only
    STATUS          mandatory
    DESCRIPTION
        "The size of the pager display. This
        field is undefined if the alertDestType is
        internalModemToSmf, internalModemToVoice,
        e x t e r n a l M o d e m T o S m f  or
        externalDirectToSmf."
    ::= ( alertDestEntry 9 )
```

© 1992 Compaq Computer Corporation

Referring next to FIGS. 9A–F, a method by which a user may access the computer management system and associated enterprise MIB such as that previously described with respect to FIGS. 2–8F to manage at least one file server and/or other manageable device or devices networked with the computer management system will now be described in greater detail. More specifically, at step 200, the user launches the computer management system from a management platform 16 such as Microsoft Windows 3.1 where it may coexist with other network management and administration applications such as Compaq's Server Manager Facility (or "SMF") or System Manager Collector (or "SMC"), Novell's NetWare Tools or RCONSOLE (a server console emulation utility application), Hewlett Packard's Openview or another third party applications by selecting an icon previously designated as representative of the computer management system from a Windows display. Additionally, the computer management system application is interoperable with the Microsoft Window's version of Novell's NetWare Management System (or "NMS") wherein using a logical map generated by NMS, the user could select a file server and then launch the computer management application disclosed herein focussed on the server selected from Novell's logical map.

Proceeding to step 202, once launched, the management application 16 generates a server list GUI 500 which displays a list of servers which may be managed using the management application 16. The server list GUI 500, which may be seen by reference to FIG. 10, includes an information block 502 and view, setup, delete and help buttons 504, 506, 508 and 510, respectively. Any number of file servers, each with an identifying name, may be listed in the information block 502 as those file servers for which management by the management application 16 has been contemplated, although not all of the listed file servers will necessarily be manageable. For example, in FIG. 9, "Accounting", "Atlanta", "Benefits", "Boston", "Dallas Region", "Distribution", "Engineering", "Facilities", "Headquarters", "Houston", "Legal", "Marketing", "Medical" and "Miami", are displayed in the information block 502 and others, not visible in the information block 502, will be displayed if the server listing is upwardly or downwardly scrolled by depressing buttons 511, 513, respectively. All of the file servers listed in the information block 502 have been instrumented, i.e. a software management agent 18 has been installed therein and placed on line, i.e. networked with the management application 16 via the network 14 and are, therefore, manageable using the management application 16. It is contemplated that potentially manageable file servers that are off-line, i.e., the server is not powered or not communicating on the network, would be denoted on the listing with a single asterisk and potentially manageable servers that are not instrumented, i.e., the necessary instrumentation agents necessary to make the server manageable have not yet been installed would be denoted on the server listing with two asterisks.

From the server list GUI displayed at step 202, the user may either select a control or server feature at step 204. If the server feature is selected at step 204, the method proceeds to step 206 where the user selects a file server from the displayed list by highlighting the selected server by "pointing" to one of the listed servers followed by selecting one of the server control options for the selected server at step 206 by "clicking" or depressing one of the server control buttons n at step 106. The server features available from the server list GUI 500 are "delete", "setup" or "view" the highlighted file server. If deletion of the server is selected, the network administrator selects delete button 508 at step 208, thereby deleting the highlighted server. The network administrator then returns to step 202 where the modified server list window, now consisting of a list of the remaining servers is displayed. It should be noted, however, that only servers that are off-line may be deleted from the displayed list.

Returning to step 206, if the network administrator however, decides to setup the highlighted server, the network administrator selects the setup button 506. Proceeding to step 210, a server setup GUI (not shown) is displayed on the screen. From the server setup GUI, the specific configuration information may be input for the selected file server. More specifically, from the server setup GUI, the network administrator can turn the automatic data collection feature on or off for the selected file server, view the file name for the btrieve file containing the collected data for the selected file server, designate the frequency at which automatic reports are generated for the selected file server, select a template for all reports to be generated for the selected file server and set the SNMP timeout for the selected file server.

When automatic data collection is turned on, the management application 16 will periodically poll each file server 10 and store the data received in response thereto, thereby recording information about the polled file server over time. Once stored, the collected information can be viewed through reports or graphical displays. If automatic data collection is on, the management application 16 may be further instructed to generate printed reports of the data that is automatically collected and stored in the data file at a selected frequency and at a selected day or time of the week. Finally, when the management application 16 polls a file server, it expects a response within the SNMP timeout period. If a response is not received within the timeout period, data about the selected file server cannot be viewed using the management application 16. Once the network administrator has completed setup for a selected server, the server setup GUI is closed, thereby returning the network administrator to step 202 where the server list GUI is again displayed.

Figure 11:
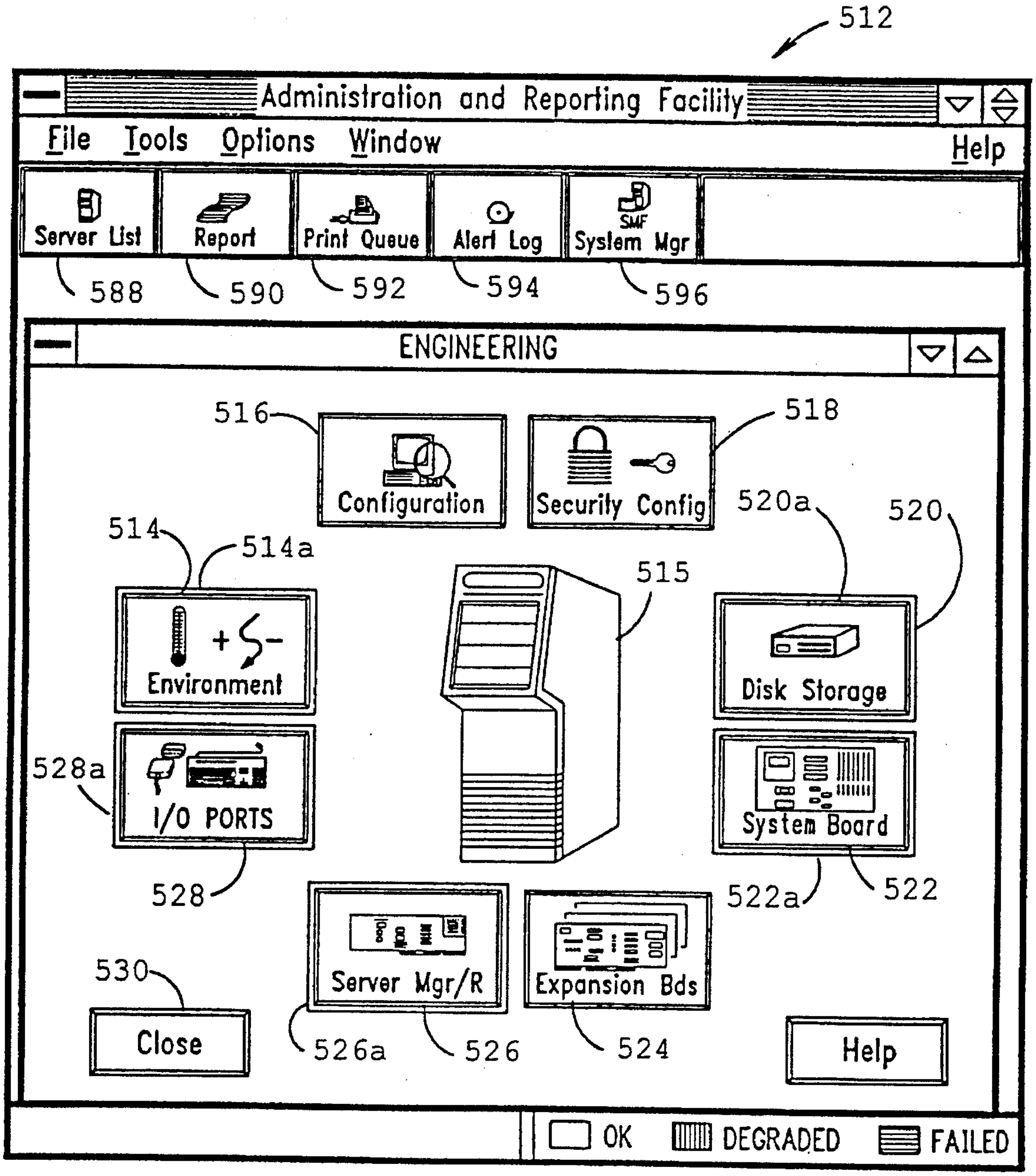
FIG. 11 illustrates a main system GUI for selectively accessing a server subsystem of the file server selected using the server list GUI of FIG. 10.

Returning to step 206, if the network administrator decides to view the highlighted server, the network administrator selects the view button 504. Proceeding to step 212, the management application 16 generates a selected server GUI 512 from which the selected file server may be managed. As may be seen in FIG. 11, the selected server GUI 512 identifies the detailed management information which may be viewed for the selected file server. The selected server GUI 512 includes an image 515 of the selected file server, in the illustrated example, a Systempro file server manufactured by Compaq Computer Corporation of Houston, Tex., surrounded by a plurality of buttons, each of which corresponds to one of plural file server subsystems for which management information regarding the selected file server is accessible for viewing. Buttons provided in the selected server GUI 512 include an environment subsystem button 514, a configuration subsystem button 516, a security configuration subsystem button 518, a disk storage subsystem button 520, a system board subsystem button 522, an expansion boards subsystem button 524, a server manager subsystem button 526 and an input/output (or "I/O") ports subsystem button 528. By selectively depressing one of subsystem buttons 516, 518, 520, 522, 524, 526 or 528, a GUI through which management information for the selected subsystem is available will be displayed.

Briefly, the environment subsystem accessible by depressing the environmental button 514 contains information regarding internal temperature and voltages for the selected server and is available only if a server manager board is installed in the selected file server. Otherwise the environment subsystem button 514 will be grayed. The configuration subsystem accessible by depressing the configuration button 516 contains a summary of the configuration of the selected file server and, as will be more fully described below, includes information from others of the displayed subsystems. The security configuration subsystem accessible by depressing the security configuration button 518 contains information regarding which ones of the available security options are configured for the selected server. The disk storage subsystem accessible by depressing the disk storage button 520 contains information regarding the disk storage subsystem for the selected file server. For example, the disk storage subsystem includes information on the status of the drives, controller and device driver information and error data for the selected file server. The system board subsystem accessible by depressing the system board button 522 contains information regarding the system board, for example, memory and processor information. The expansion boards subsystem accessible by depressing the expansion boards button 524 contains information on the expansion boards installed in the selected file server and may be used to keep track of which expansion boards are installed on a selected file server and what resources are being used by each installed expansion board. The server manager board subsystem accessible by depressing the server manager button 526 contains information regarding items on the server which are monitored by the server manager board and will be available if a server manager board is installed in the file server. Otherwise, the server manager subsystem button 526 will be grayed. The I/O ports subsystem accessible by depressing the I/O subsystem button 529 contains information regarding the I/O ports, for example, overrun and parity errors, for the selected file server and will be available if the server manager is installed. Otherwise the I/O subsystem button 528 will be grayed.

Additionally, the overall condition of several of the subsystems may be determined from the selected server GUI 512. Specifically, borders 514*a*, 520*a*, 522*a*, 526*a* and 528*a*, respectively, surround the environment, disk storage, system board, server manager, I/O ports and environment buttons 514, 520, 522, 526 and 528, respectively. Each border will be colored, depending on whether the status of the subsystem surrounded by that border is normal (or "OK"), degraded or failed.

From the selected server GUI 512 displayed at step 212, the network administrator may select any one of the available file server subsystems or close the selected file server at step 214. If the network administrator selects the environment subsystem button 514 at step 214, the environment subsystem is opened at step 216 (FIG. 8B) so that the network administrator may view environment conditions for the selected file server. More specifically, the environment window displays the internal temperature, in degrees Celsius, inside the selected file server, the temperature change, in degrees Celsius per minute, of the temperature inside the selected file server, the current reading, in millivolts, of the +5 volt power line on the EISA bus of the selected file server, the current reading, in milliVolts, of the −5 volt power line on the EISA bus of the selected file server, the current reading, in milliVolts, of the +12 volt power line on the EISA bus of the selected file server and the current reading, in milliVolts, of the −12 volt power line on the EISA bus of the selected file server. Each of these readings are determined by the server manager installed in the file server.

Figure 12:
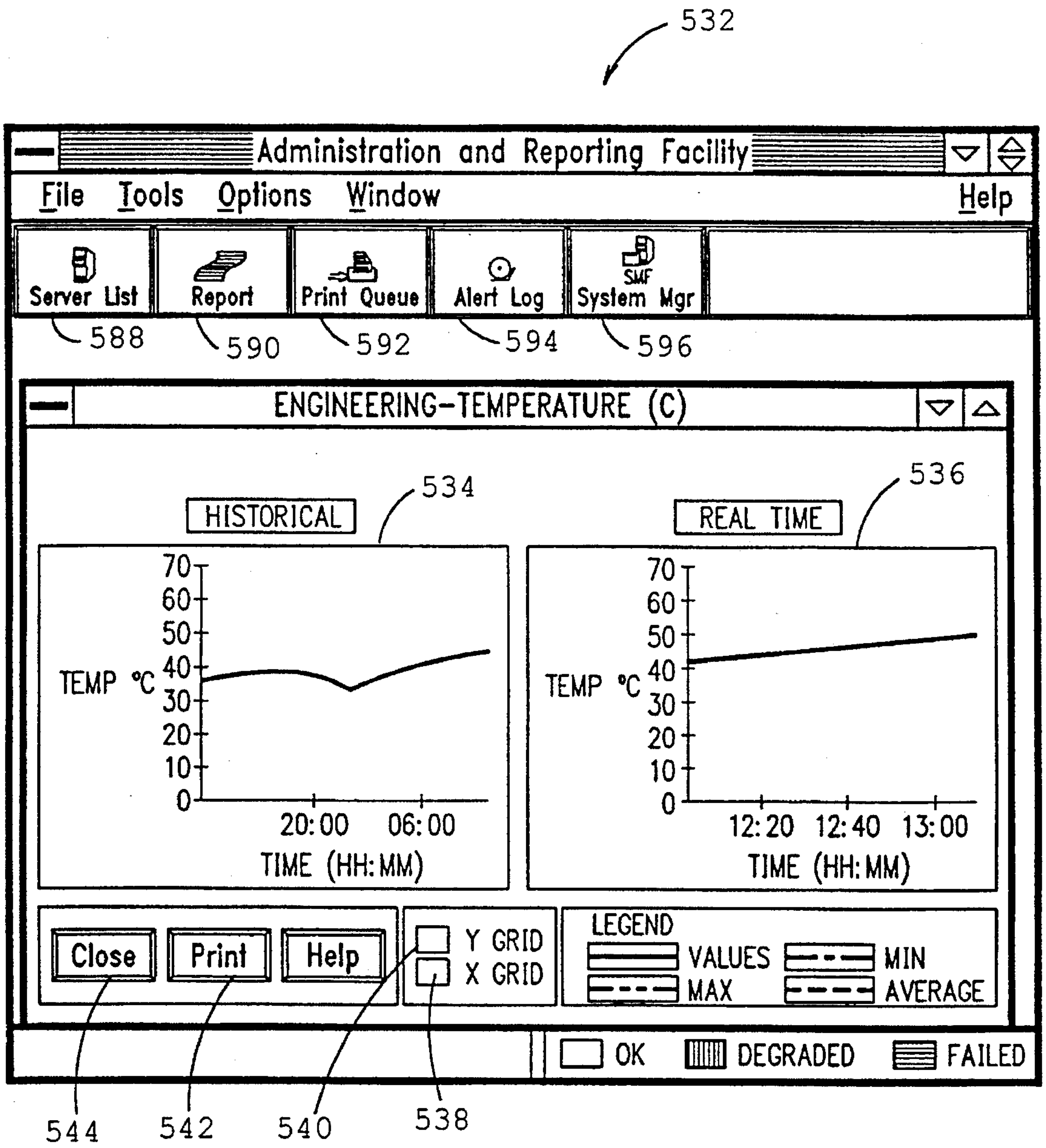
FIG. 12 illustrates an environment condition window accessible via the environment subsystem button of the main system GUI of FIG. 11.

Proceeding to step 218, the network administrator may either close the environment window and return to the selected server GUI 512 at step 212 or view any one of the selected conditions. If the network administrator views one of the conditions, a graphical window for the selected environment condition for the selected file server is opened at step 220. For example, FIG. 12 illustrates a condition window 532 for the environment subsystem of the engineering file server which would be generated if the network administrator selected temperature as the selected condition for the environment subsystem of the engineering file server. As may now be seen, the environment condition window 532 includes historical and real time graphical displays 534, 536 of the selected environment condition. Of the two, the historical display 534 will be generated only if data collection was turned enabled when the selected file server was configured using the server setup GUI. The environment condition window 532 also includes x-grid and y-grid buttons 538, 540 which, when selected, turn on grid lines parallel to the horizontal and vertical axes, respectively, for the historical and real time displays 534, 536, a print button 542 which, when selected, prints the historical and real time displays 534, 536 and a close button 544 which, when selected, closes the environment condition window 532 at step 222 and returns the network administrator to step 216 where the environment window is again displayed. Here, the network administrator may select another condition for viewing or may close the environment window and return to step 212 (FIG. 9A) where the selected server GUI 512 is again displayed.

Figure 9A:
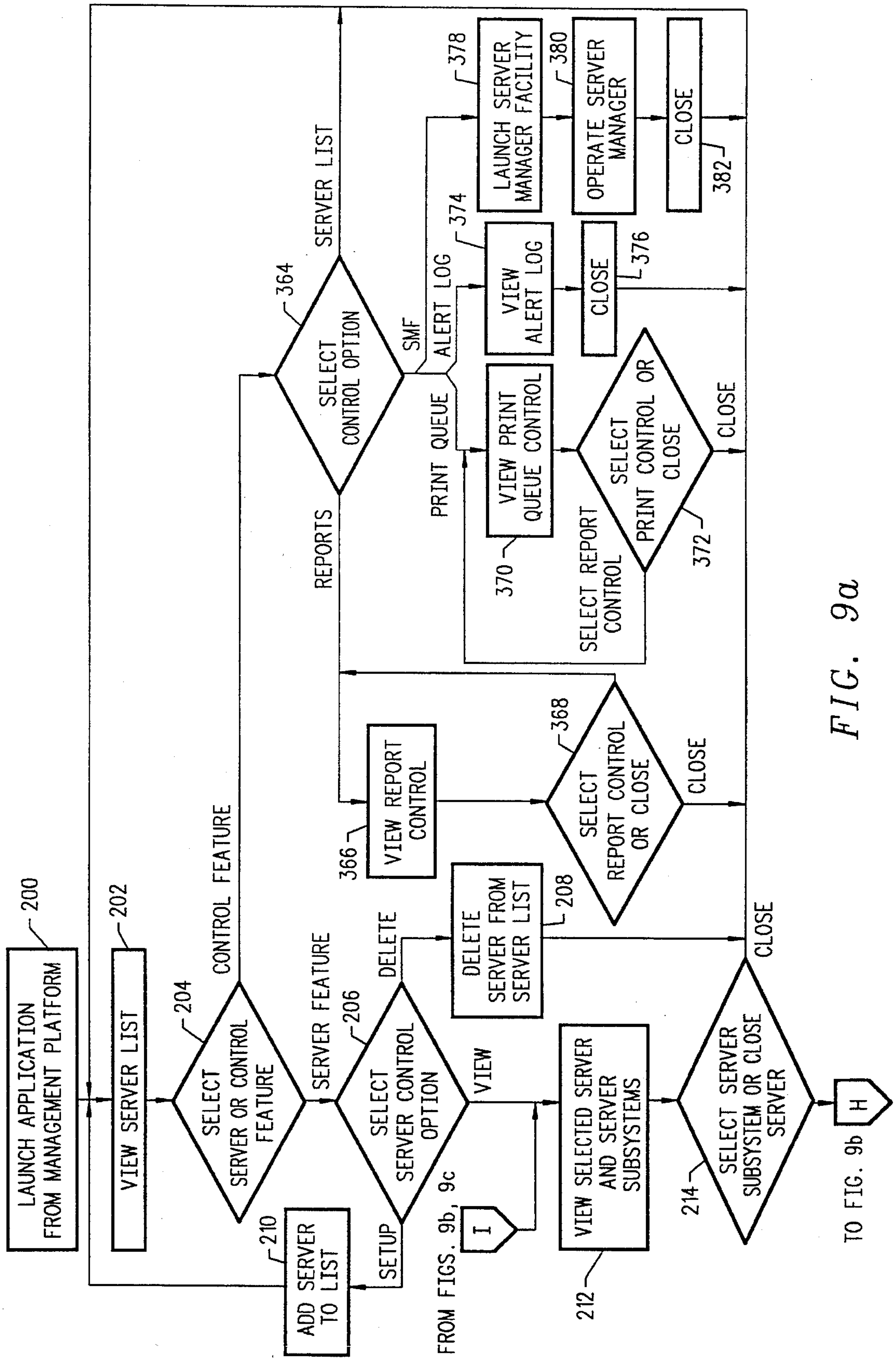
FIGS. 9A–F is a flow chart illustrating a method of managing a network of file servers using the computer management system and associated enterprise MIB of FIGS. 2–8F in accordance with the teachings of the present invention.
Figure 9B:
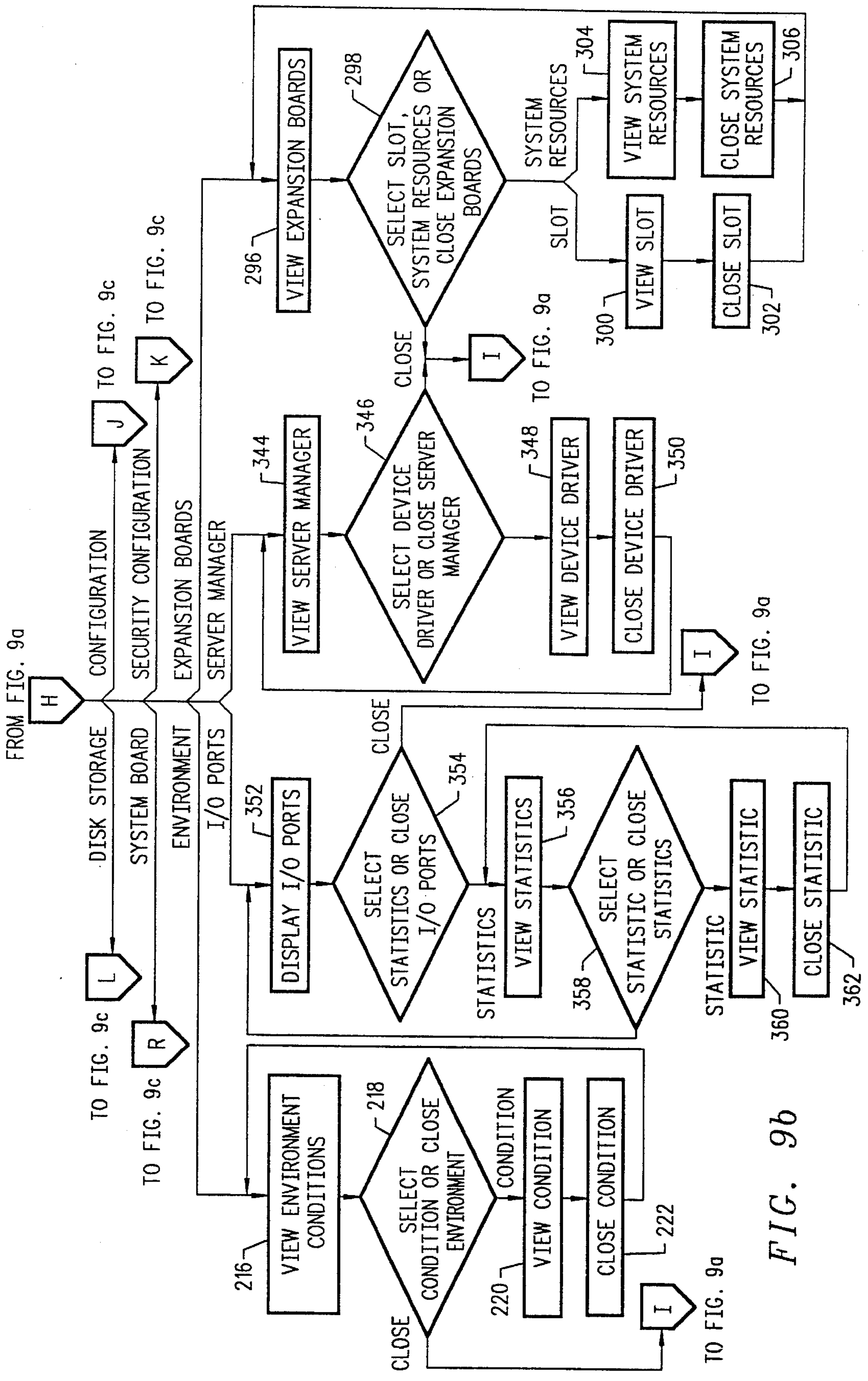
Figure 10:
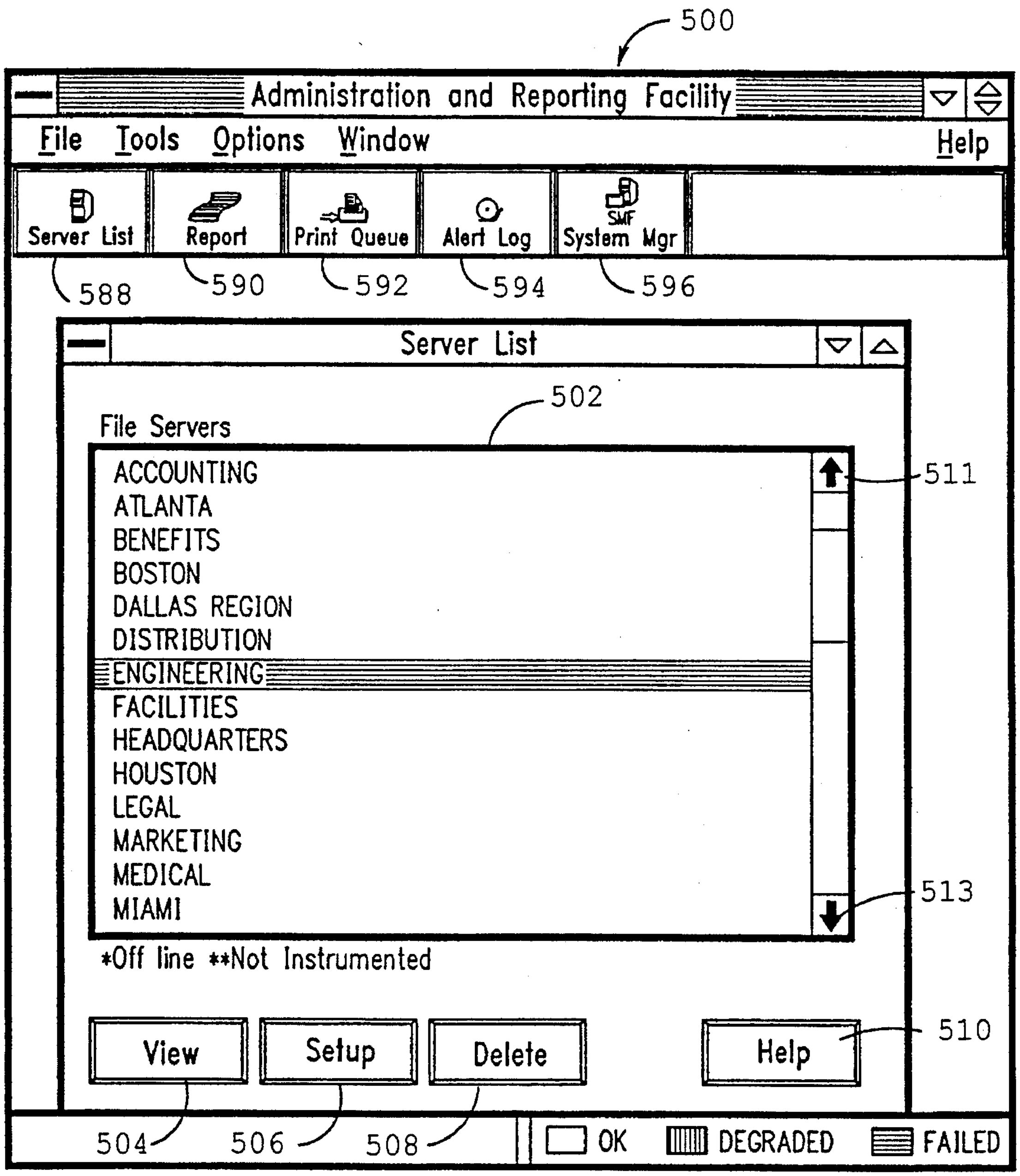
FIG. 10 illustrates a server list GUI for selectively accessing management information for a file server being managed by the computer management system of FIGS. 2–8F.

From the selected server GUI 512 displayed at step 212, if the network administrator selects the configuration subsystem button 516 at step 214, the configuration window is opened at step 224 (FIG. 8C) so that the network administrator may view the configuration of the selected file server. More specifically, the configuration window (not shown) displays how the selected file server is configured and provides details regarding the resources of the selected server. The information displayed here is a summary of selected ones of values found under the other subsystems and certain additional configuration items. Listed here are the product type, machine ID, processor type, expansion bus type, current system speed, descriptions of the system ROM, keyboard, diskette drives, fixed disks, size of base and extended memory, extended non-volatile memory, type and IRQ entries and port ranges. From the configuration window, the network administrator may also select a system resources button at step 226 to open a system resources window at step 228. From the system resources window, the network administrator may view the resources in use by the selected file server. These resources included interrupt request (or "IRQ") numbers, port address ranges, data memory access (or "DMA") channels and memory ranges. For each IRQ number, port address range, DMA channel and memory range in use, the slot number of the board using that IRQ, port address range, DMA channel or memory range is listed. After viewing the system resources window, the network administrator closes the window at step 230 and returns to the configuration subsystem window at step 224. The network administrator may opt to close the configuration subsystem window at step 226, thereby returning to the selected server GUI 512 at step 212 (FIG. 9A).

From the selected server GUI 512 again displayed at step 212, the network administrator may select the security configuration subsystem button 518 at step 214, thereby opening a security configuration window (not shown) at step 232 (FIG. 9C) so that the network administrator may view the security configuration of the selected file server to see which security features have been enabled on the selected file server. More specifically, the security configuration window identifies whether the network server mode used to lock the keyboard when the server is used as an unattended file server, the power-on password used to disable the computer, the prevent floppy boot used to prevent the drive from starting the file server, the quicklock used to disable the keyboard and pointing device interface using a hot-key combination, the quickblank feature used to blank the screen using a hot-key combination, serial port A control used to prevent data transfers through serial port A, serial port B control used to prevent data transfers through serial port B, parallel port control used to prevent transfers through the parallel port, diskette drive control used to prevent read or write operations from the floppy diskette drives, hard disk drive controls used to prevent read or write operation from the hard disk drive and server manager dial-back which is used to cause the server manager to hang up and check the number of a caller before allowing a caller to view system data, are enabled or disabled. After viewing the security configuration at step 232, the network administrator closes the security configuration window at step 234 and returns to the selected server GUI 512 at step 212 (FIG. 9A).

Figure 13:
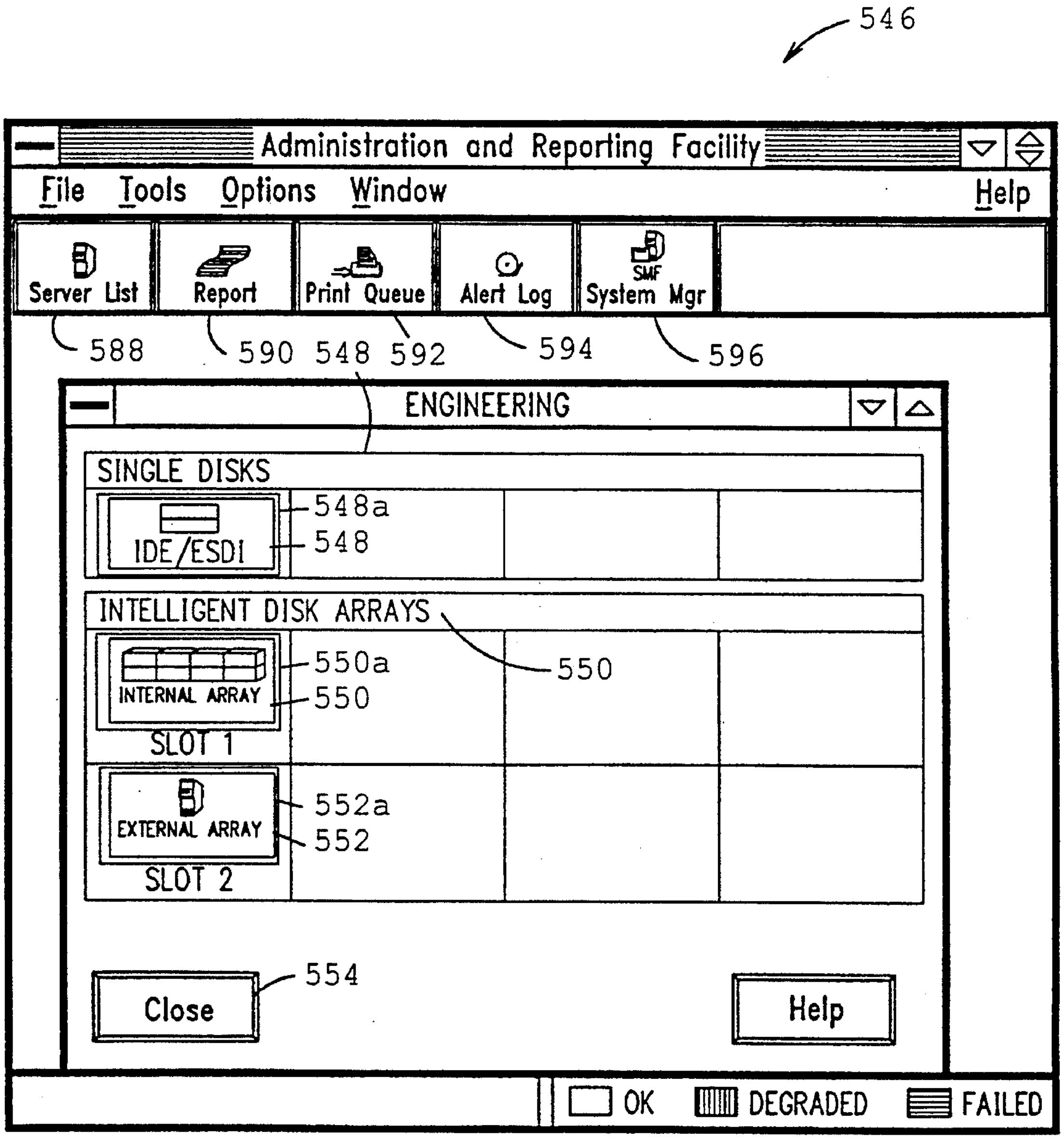
FIG. 13 illustrates a disk storage GUI for selectively accessing various logical and physical drives installed in a selected file server.

From the selected server GUI 512 again displayed at step 212, if the network administrator selects the disk storage subsystem button 520 at step 214, a disk storage GUI 546 is generated at step 236 (FIG. 9C) so that the network administrator may access various logical and physical drives installed in the file server and selectively view information regarding the various logical and physical drives for the selected file server. As may be seen in FIG. 13, the disk storage GUI 546 includes a single disks display 548 which lists all single disks installed in the selected file server and an intelligent disk arrays display 550 which lists all intelligent disk arrays installed in the selected file server. For each installed single disk or intelligent disk array, the disk storage GUI 546 provides a button to permit the network administrator to select that disk or disk array for viewing. For example, for the selected file server illustrated in FIG. 13, a single hard disk and a pair of intelligent disk arrays are installed therein. Accordingly, the disk storage GUI 546 includes a first button 548 which may be used to select the hard disk for viewing, a second button 550 which may be used to select the internal intelligent disk array for viewing and a third button 552 which may be used to select the external intelligent disk arrays for viewing. A border 548*a*, 550*a*, and 552*a* surrounds each button 548, 550, 552, respectively, to indicate the general condition of each displayed disk storage component as either normal, degraded or failed.

Proceeding to step 238, if the network administrator selects button 548, an IDE/ESDI window (not shown) from which the hard disk installed in the selected server may be viewed at step 240 (FIG. 9D) and information such as drive type and capacity and, if the server manager is installed, I/O errors and ECC error counts reviewed. More specifically, from the IDE/ESDI window, drive type, capacity, cylinders, heads, and sectors per track are displayed for each drive of the primary controller. Also, if the server manager is installed, I/O errors, ECC errors and track zero not found are displayed for the primary controller.

Proceeding to step 242, from the IDE/ESDI window, the network administrator may view any one of the selected conditions, I/O errors, ECC errors and Track zero not found. If, at step 242, the network administrator selects one of the conditions for viewing, a graphical window for that condition is opened and historical and real time graphs of the selected disk storage condition are displayed at step 244 for viewing. After viewing the displayed condition, the network administrator closes the graph window at step 246 and returns to the open IDE/ESDI window at step 240.

Again proceeding to step 242, from the IDE/ESDI window, the network administrator may select whether to display the IDE or ESDI controller in the IDE/ESDI window by selecting either the primary or secondary controller buttons included as part of the IDE/ESDI window. When opening the IDE/ESDI window, information for the primary IDE or ESDI controller is displayed. If a secondary IDE or ESDI controller is present in the file server, the network administrator may view the secondary controller for display in the IDE/ESDI window by selecting the secondary controller button at step 242. The information displayed in that IDE/ESDI window for the primary controller will be replaced with similar information for the secondary controller at step 248 and the network administrator will return to step 240 where conditions for the secondary controller may be viewed in the same manner by which conditions for the primary controller were viewed. Finally, after completing the viewing of the single disks, the network administrator may return to the disk storage GUI 546 by closing the IDE/ESDI window at step 242 and returning to step 236.

Figure 9C:
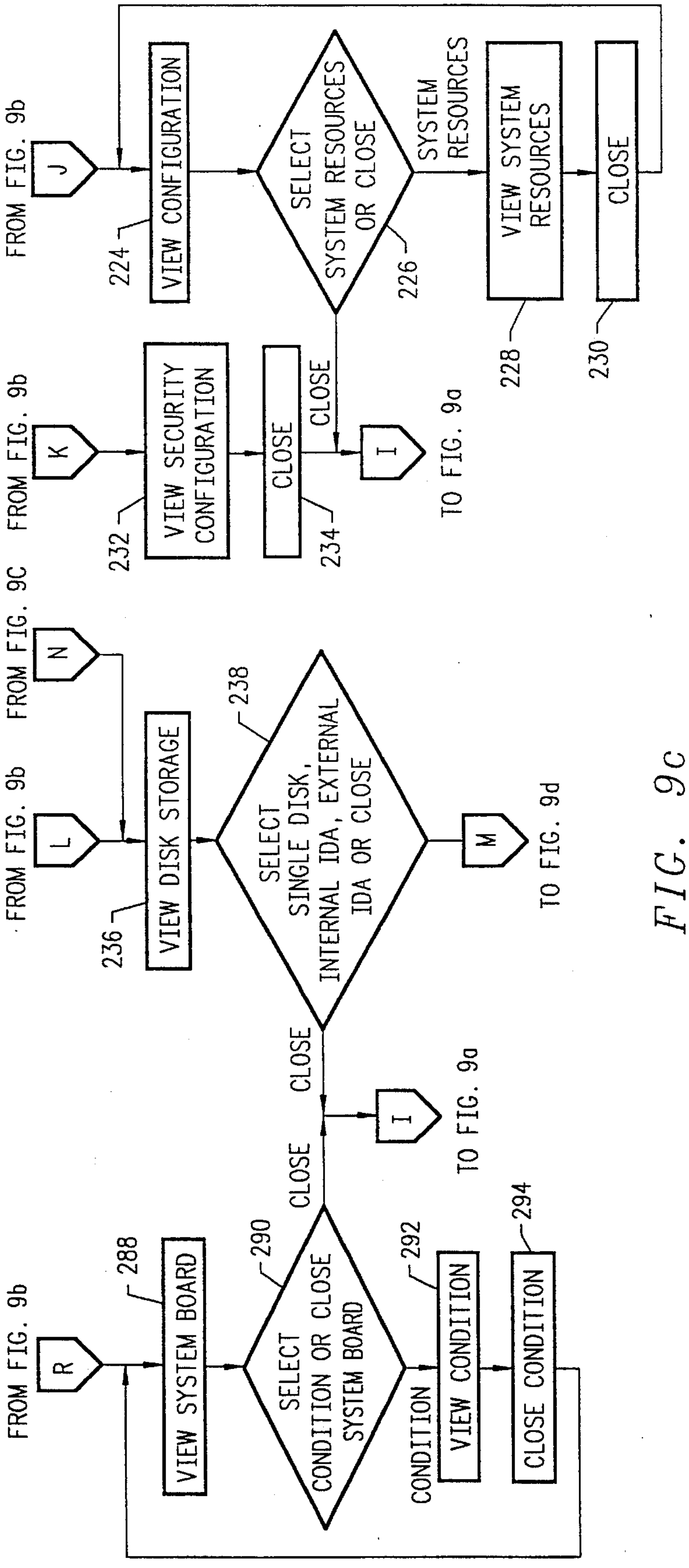
Figure 9D:
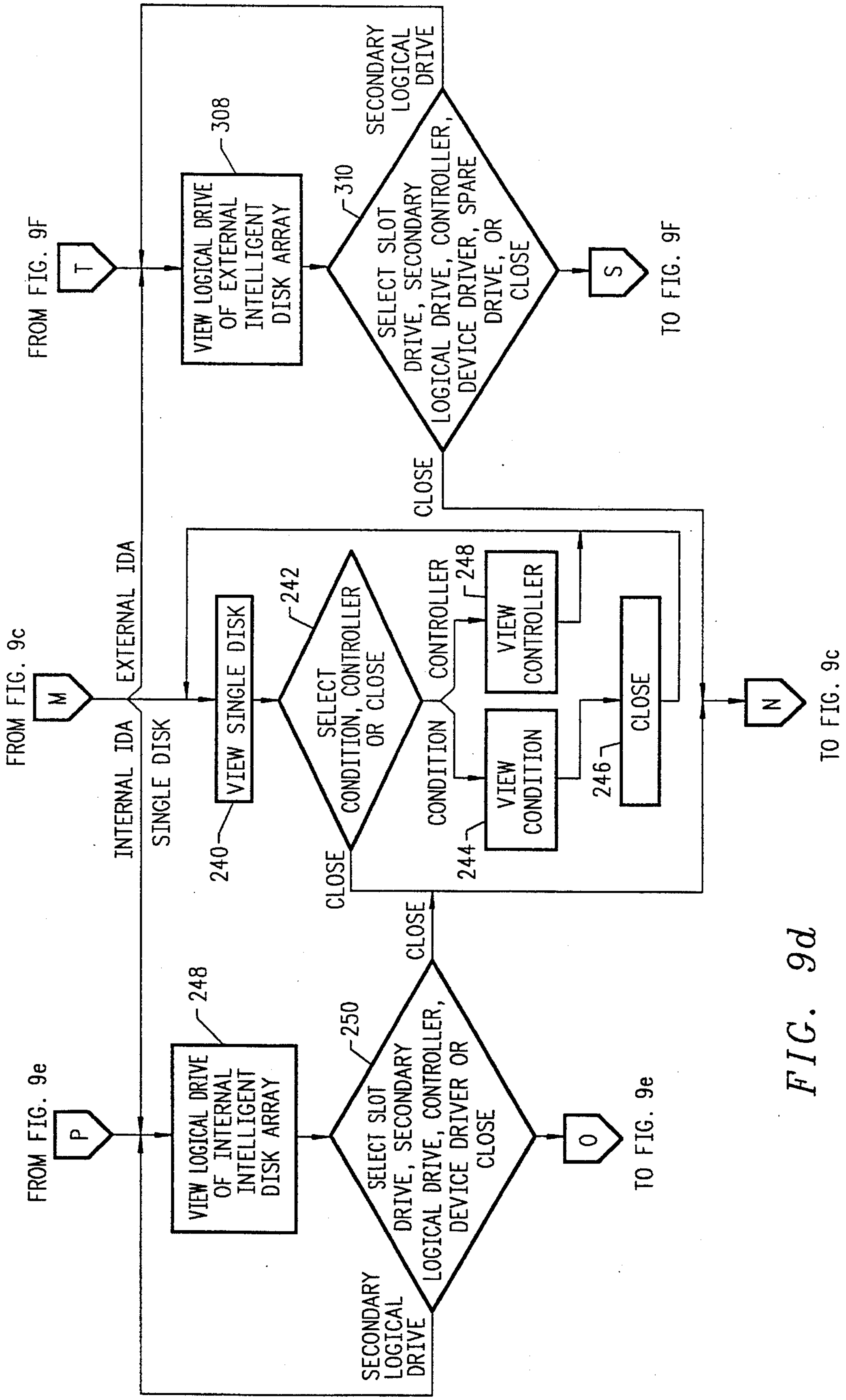
Figure 9E:
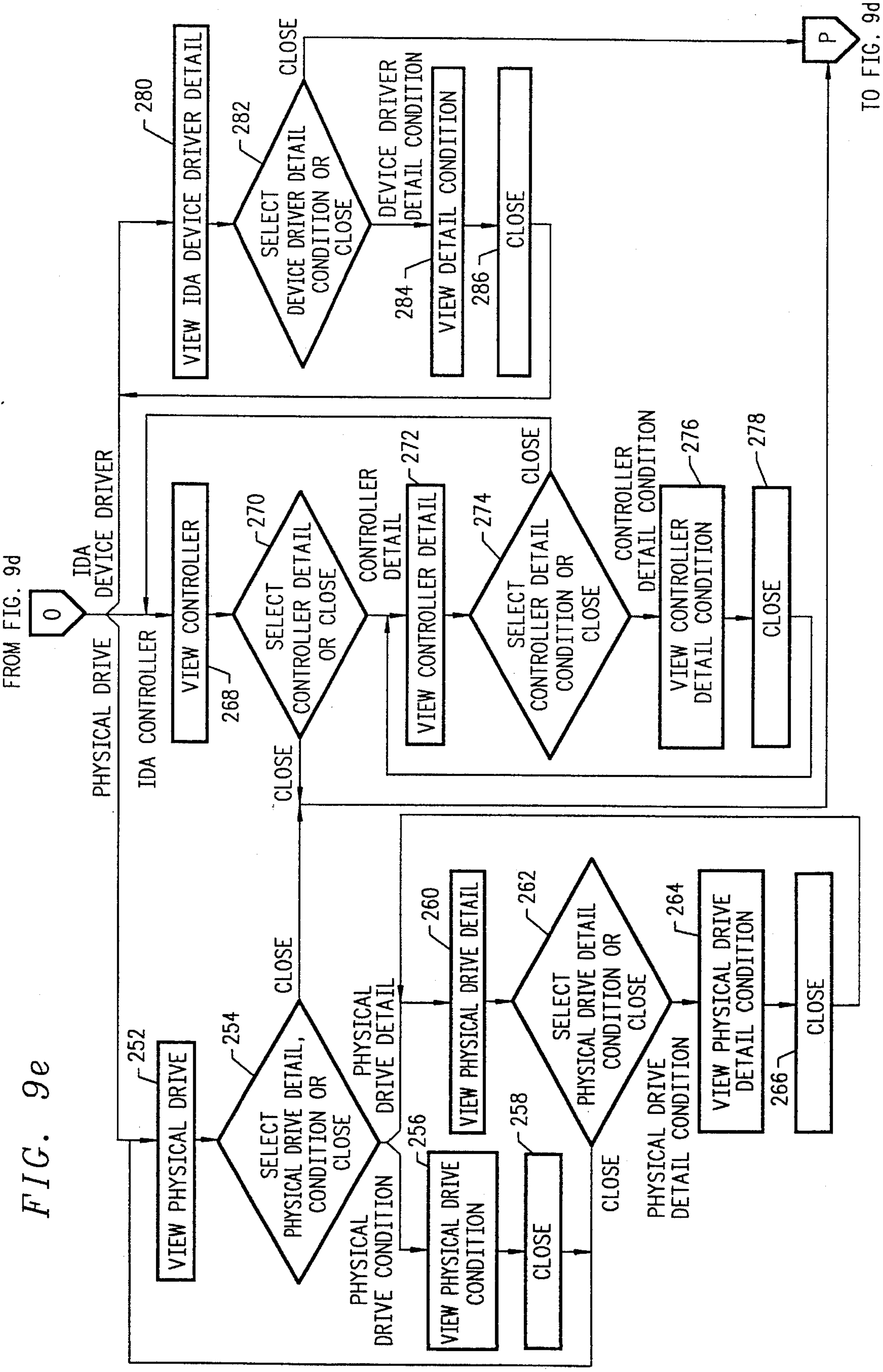
Figure 9F:
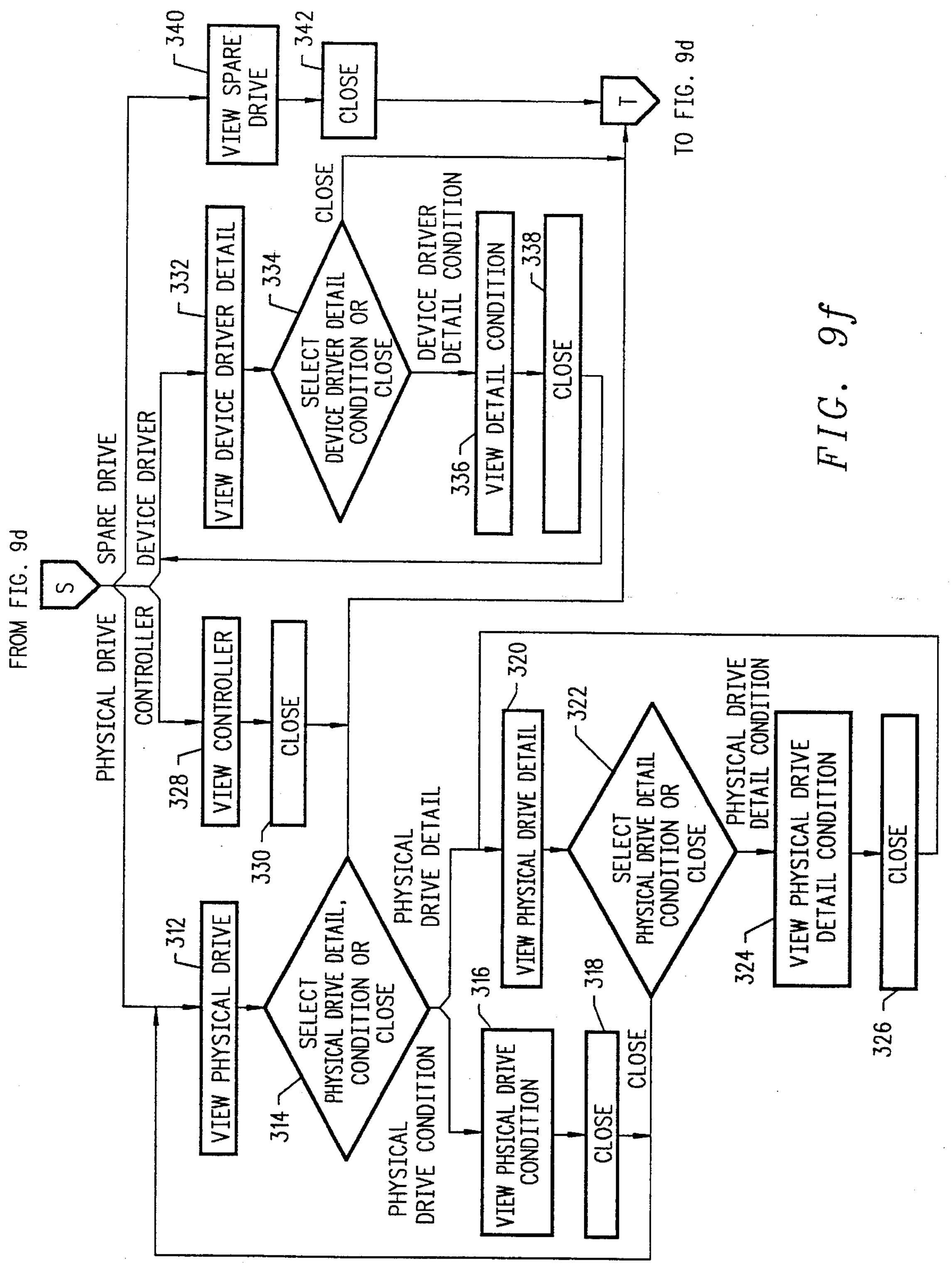
Figure 14:
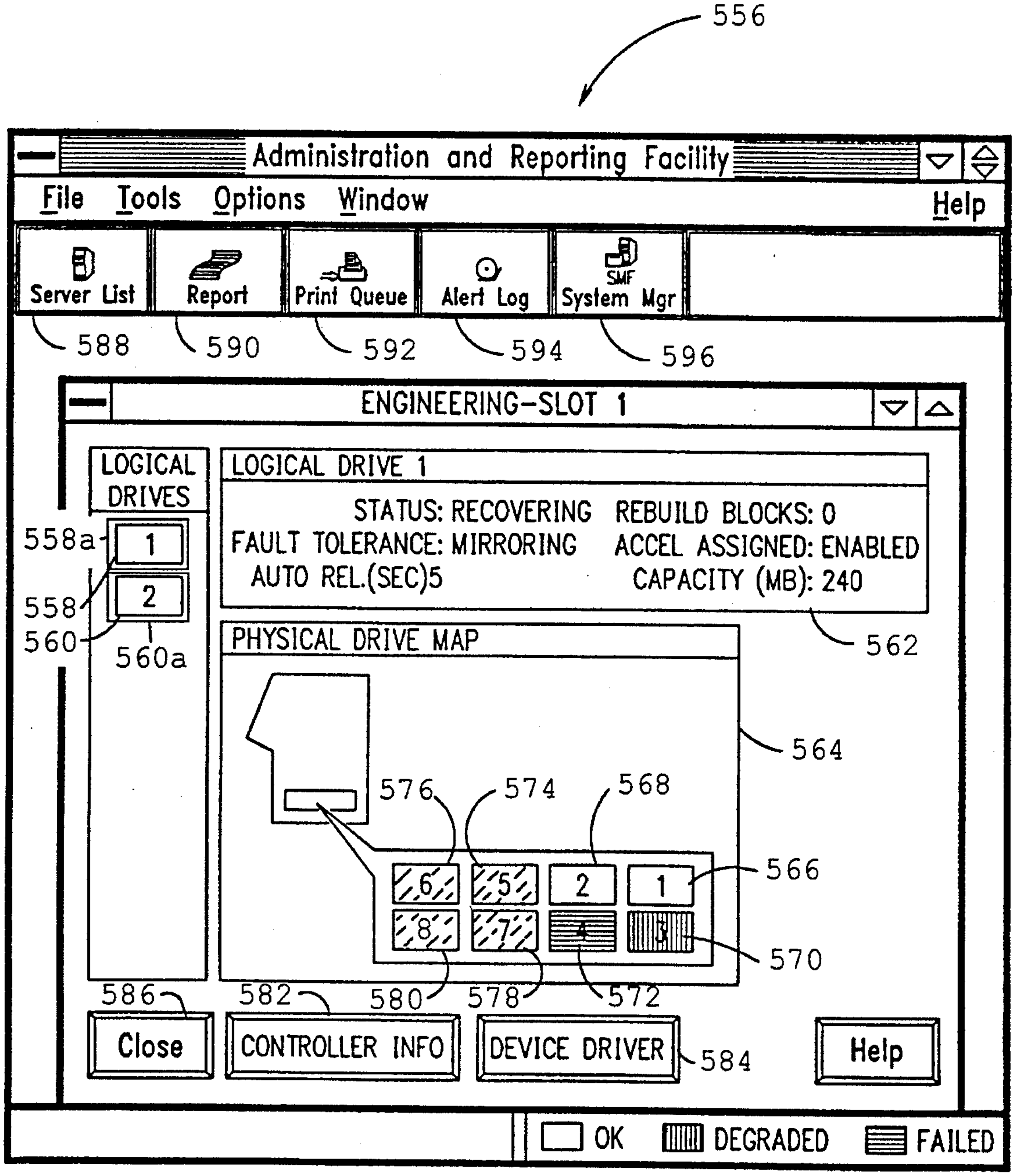
FIG. 14 illustrates an internal IDA logical drive GUI for selectively accessing from a selected logical drive.
Figure 15:
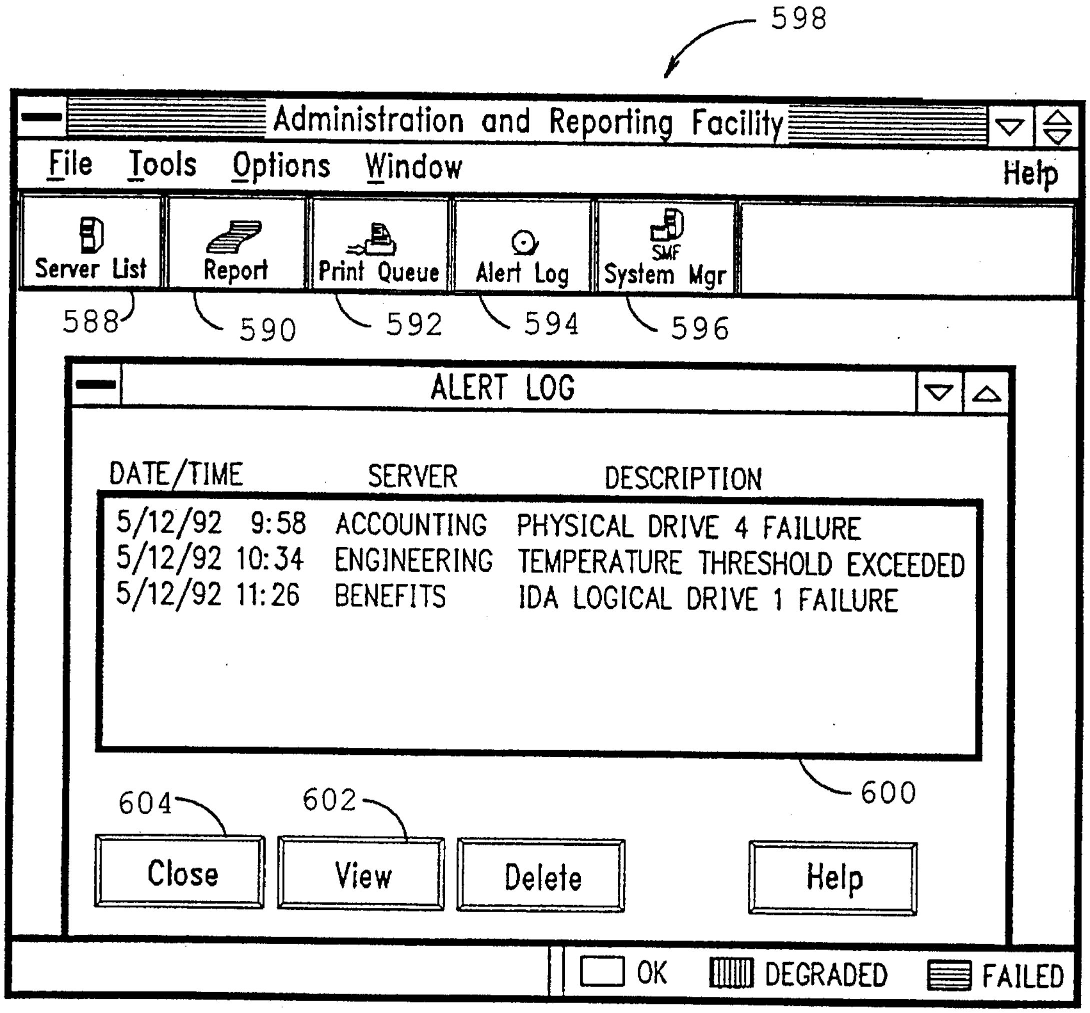
FIG. 15 illustrates an alert log generated by the computer management system of FIGS. 2–8F.

From the disk storage GUI 546, if the network administrator selects internal intelligent disk array button 550 at step 238, an internal IDA logical drive GUI 556 from which the physical map of the installed logical drives may be viewed is opened at step 248 (FIG. 9D). For example, an internal IDA logical drive GUI 556 for drive 1 of the selected server is illustrated in FIG. 14. As may now be seen, the internal IDA logical drive GUI 556 includes an information block 562 which describes the condition of the logical drive, a physical drive map 564 of the logical drive and logical drive buttons 558, 560 for selecting the logical drive to be described in the information block 562 and mapped in the physical drive map 564. When opening the internal IDA logical drive GUI 556, the primary logical drive is described in the information block 562 and mapped in the physical drive map 564 by default. Each logical drive button 558, 560 is surrounded by a border 558*a*, 560*a* which is colored to indicate whether the drive is normal, degraded or failed.

Accordingly, if primary and secondary controllers have been installed in the internal IDA logical drive, the network administrator may select the logical drive to be viewed at step 250 and then return to step 248 where the selected logical drive will be displayed as part of the logical drive GUI 556.

Having selected the secondary logical drive or accepted the default primary logical drive for viewing, at step 248, the network administrator may then view the logical drive. Information displayed in the information block 562 of the internal IDA logical drive GUI 556 for the selected logical drive are status, fault tolerance, auto-reliability, rebuild blocks, accelerator board and capacity. Status is a monitored item which indicates the status of the logical drive and may be in one of the following states: OK, failed, unconfigured, recovering, ready rebuild, rebuilding, wrong drive, bad connect, overheating and shutdown. Of these, OK indicates that the logical drive is in normal operation mode, failed indicates that more physical drives have failed than the fault tolerance mode of the logical drive can handle without data loss, unconfigured indicates that the logical drive is not configured, recovering indicates that the logical drive is in an interim recovery mode where at least one physical drive has failed but the logical drive's fault tolerance mode lets the drive continue to operate with no data loss, ready rebuild indicates that the logical drive is ready for automatic data recovery and that the physical drive that failed has been replaced but the logical drive is still operating in interim recovery mode, rebuilding indicates that the logical drive is doing automatic data recovery during which fault tolerance algorithms restore data to the replacement drive, wrong drive indicates that the wrong physical drive was replaced after a physical drive failure, bad connect indicates that a physical drive is not responding, overheating indicates that the drive array enclosure that contains the logical drive is overheating, and shutdown indicates that the drive array enclosure that contains the logical drive has overheated and that the logical drive is no longer functioning.

The fault tolerance item indicates the fault tolerance mode of the logical drive and may have the following values: none, mirroring, data guard and distributed data guarding. None indicates that fault tolerance is not enabled. If a physical drive reports an error, the data cannot be recovered. Mirroring indicates that, for each physical drive, there is a second physical drive containing identical data. If a drive fails, the data can be retrieved from the mirror drive. Data guard indicates that one of the physical drives is being used as a data guard drive and contains the exclusive OR of the data on the remaining drives. If a failure is detected, the data guard information, in combination with information from the other drives, can be used to rebuild the data. Distributed data guarding is similar to data guard but differs in that the parity information is distributed across all of the drives.

Auto-reliability indicates how many seconds the logical drive will wait with no requests before beginning auto-reliability monitoring in which each disk is scanned to verify that all of the sectors in the array are readable. If possible, detected bad sectors are remapped. If a request is received during autoreliability monitoring, the drive will stop monitoring to process the request. After a failed physical drive has been replaced, the physical drive must still have its data rebuilt. The rebuilt blocks value indicates, therefore, how many blocks of data still need to be rebuilt. When the value reaches zero, the rebuilding process is complete.

The accelerator board monitored item, which is displayed in the information block 562 of the internal IDA logical drive GUI 556 as "accel assigned", indicates whether the logical drive has an array accelerator board configured and enabled. This item may have a value of either enabled, disabled, unavailable or other. Enabled indicates that the array accelerator board is configured and enabled for the logical drive. Disabled indicates that the array accelerator board is configured but not enabled for the logical drive. Unavailable indicates that there is no array accelerator board configured for the logical drive and other indicates that the instrumentation agent does not recognize the array accelerator board. Finally, the capacity item indicates the size of the logical drive in megabytes.

From the internal IDA logical drive GUI 556 displayed at step 250, the network administrator may also view the physical drive map 564 for the selected logical drive. The physical drive map 564 identifies each physical drive mapped to the selected logical drive. For example, in FIG. 14, physical drives 1, 2, 3, 4, 5, 6, 7 and 8 are represented by a physical drive buttons 566, 568, 570, 572, 574, 576, 578 and 580, respectively, configured to indicate whether the physical drive is mapped to the selected logical drive and how it is functioning. For example, in FIG. 13, physical drives 1 and 2 are functioning normally, drive 3 is experiencing degraded performance, drive 4 has failed and drives 5, 6, 7 and 8 are not mapped to the selected logical drive.

From the physical drive map 564, the network administrator may select any of the physical drives for viewing at step 250 by depressing one of the physical drive buttons 566, 568, 570, 572, 574, 576, 578 or 580 to open the physical drive window for the selected drive. Proceeding to step 252, from the physical drive window, the network administrator may view the following information: status, logical drive, thresholds exceeded, drive model, firmware version, sectors read, sectors written, hard read errors, hard write errors, service minutes, functional test 1, functional test 2 and functional test 3.

Status indicates the status of the selected physical drive and may either be OK, indicating that the drive is functioning normally; failed, indicating that the drive is no longer operating and should be replaced; and other, indicating that the instrumentation agent does not recognize the drive. The logical drive item indicates which logical drive the selected physical drive maps to. The threshold exceeded item indicates whether certain thresholds that have been set to monitor performance of the drive have been exceeded. For example, a threshold value may be selected for spinup time. If the time that it actually takes the physical drive to spin up exceeds the threshold value, the threshold exceeded item would indicate that such an occurrence has taken place. The drive model item is a text description of the physical drive and will vary from physical drive to physical drive, depending on the type of physical drive and its manufacturer. The firmware version item indicates a version number for the firmware installed in the drive array. The sectors read item indicates the total number of sectors read from the physical disk drive. The sectors written item indicates the total number of sectors written to the physical disk drive. The hard read errors item indicates the number of read errors that have occurred on a drive that could not be recovered by the drive's ECC algorithm or through retries. The hard write errors item indicates the number of write errors that could not be recovered by the physical drive. The service minutes item shows the total number of minutes that the physical drive has been spinning since the drive was stamped. The functional test items provide information regarding a series of test that indicate how well a physical drive works by comparing the way the physical drive currently operates when performing selected tasks with the way it worked when new. A percent value is displayed that represents how the drive works currently when compared to how the drive worked when new.

From the physical drive window displayed at step 252, the network administrator may opt to view additional information (or "details") regarding the selected physical drive or to view conditions for selected ones of the previously described items at step 254. More specifically, sectors read, sectors written, hard read errors, hard write errors, service minutes and functional tests 1–3 are items having a graphical window associated therewith which may be viewed at step 254 by selecting the graph button adjacent the selected item. After viewing the graphical window for the selected item at step 256, the network administrator closes the selected graphical window at step 258 and returns to the physical drive window at step 252.

Returning to step 254, the network administrator may also select to view additional details regarding the physical drive by selecting an advanced physical drive button displayed on the physical drive window, thereby opening an advanced physical drive window at step 260 in which additional details regarding the selected physical drive are displayed for viewing by the network administrator. Specifically, in addition to the status, logical drive and thresholds exceeded items displayed in the previously described physical drive window, the advanced physical drive window will display factory reallocation, POST error, used reallocation, recovered read error, recovered write error, not ready error, total seek, seek errors, DRQ timeout, other timeout, spinup time, spinup retries, failed recovery read, failed recovery write, reallocated aborts and format errors for viewing by the network administrator.

The factory reallocation monitored item shows the number of spare sectors available for remapping at the time the physical drive was shipped. The POST error monitored item indicates the number of times that a physical drive has failed its self test. The used reallocated sectors monitored item indicates the number of sectors of the reallocation area that have been used by the physical drive. The recovered read errors monitored item indicates the number of read errors corrected through physical drive retries. The recovered write errors monitored item indicates the number of write errors corrected through physical drive retries or recovered by a physical drive on a monitored system. The drive not ready errors item indicates the number of times the physical drive failed after the spinup command was issued. The total seeks monitored item indicates the total number of seek operations performed by the selected physical drive since the drive was shipped. The seek errors monitored item indicates the number of seek errors that a physical drive detects. The DRQ timeouts monitored item indicates the number of times that a physical drive continued to request data, but did not get a command completion. The other timeouts monitored item indicates the number of times that a physical drive did not respond with an interrupt within a controller-defined period of time after a command had been issued. The spinup time monitored item indicates the time required for the physical drive to spin up to full speed. The spinup retries monitored item indicates the number of times that the physical drive has to retry to spin up before successfully achieving operating speed. The recovery failed read error monitored item indicates whether any read errors occurred while automatic data recovery from the selected physical drive to a second physical drive was taking place. The recovery failed write error monitored item indicates whether write errors occurred while doing automatic data recovery from another physical drive to the selected physical drive was taking place. The reallocation aborts monitored item indicates the number of times that the physical drive has failed due to an error that occurred when the controller was trying to reallocate a bad sector. The format error monitored item indicates the number of times that a format operation failed when the controller attempted to remap a bad sector.

After viewing the advanced physical drive window at step 260, the network administrator may open a graphical window for any one of the used reallocation, recovery read errors, recovery write errors, not ready errors, total seeks, seek errors, DRQ timeouts, other timeouts, spinup time railed recovery reads, failed recovery writes, reallocation aborts or format errors monitored items by selecting a graph button corresponding to the respective monitored item at step 262 to open the graphical window. The network administrator may then view the opened graphical window for the selected monitored item at step 264. The graph window is then closed at step 266, thereby returning the network administrator to the open advanced physical drive window at step 260 where, proceeding again to step 262, another graphical window may be selected for viewing or the advanced physical drive window closed to return the network administrator to the open physical drive window at step 252 where, if all monitored items from the advanced physical drive window and all graphical windows corresponding to monitored items which may be viewed from the logical drive window for which viewing is desired, have been viewed, the physical drive window is then closed to return to the open internal IDA logical drive GUI 556 at step 248 (FIG. 9D).

In addition to viewing the logical drive and selecting the logical drive to be viewed, at step 248, the network administrator may also select an IDA controller or device driver for viewing. To view the IDA controller from the internal IDA logical drive GUI 556, the network administrator would select controller information button 582 to open the IDA controller window. By selecting the controller information 582 at step 248, the IDA controller window is opened and the IDA controller may be viewed at step 268. From the IDA controller window, selected information regarding the IDA controller may be viewed. This information includes a model object instance which lists the type of controller card installed in the internal IDA, a drive array controller firmware revision object instance which lists the firmware revision of the drive array controller, a drive array controller BMIC interface object instance which confirms that the BMIC interface is enabled, a drive array controller standard interface object instance which indicates the status of the standard interface between the IDA and DOS, and a drive array controller slot object instance which indicates the physical slot where the drive array controller resides.

From the IDA controller window, further details on the IDA controller may be viewed by selecting an accelerator button at step 270 to open a drive array accelerator board window where information on a 4 MB array accelerator write cache associated with the drive array controller may be viewed at step 272. From the open drive array accelerator board window, object instances which may be viewed include a status item object instance which describes the status of the 4 MB array accelerator write cache as either enabled (indicating that write cache operations are currently configured and enabled for at least one logical drive), disabled (which indicates that write cache operations have been temporarily disabled), permanently disabled, invalid (which indicates that an array accelerator board has not been installed), or other (which indicates that the instrument agent does not recognize the status of the array accelerator); a memory object instance, which indicates the amount of memory allocated for the write cache; a bad data object instance, which indicates that the battery packs were not sufficiently charged at power up to retain data stored in the write cache; and an error code object instance which indicates the status of write cache operations. Monitored items which may be viewed from the array accelerator window include a board read errors monitored item which indicates the total number of read memory parity errors detected while reading from the array accelerator board and a write errors monitored item which indicates the total number of write memory parity errors that were detected while writing to the array accelerator board.

Proceeding to step 274, a graphical window may be opened for either of the monitored items by selecting a graph button associated with the monitored item, thereby enabling the network administrator to view the condition of the detail. After viewing the graphical window for the selected monitored item at step 276, the selected graphical window is closed at step 278 and the network administrator is returned to the drive array accelerator board window at step 272 for further viewing of details or detail conditions. After the network administrator has completed viewing of all desired drive array accelerator board details or detail conditions, the network administrator may close the drive array accelerator board window at step 274, thereby returning to the IDA controller window (step 268) where, if no additional viewing of the controller is desired, the network administrator may close the IDA controller window at step 270 to return to the internal IDA logical drive GUI 556 at step 248 (FIG. 9D).

Again proceeding from the internal IDA logical drive GUI 556, the network administrator may also open an IDA device driver window to view the IDA device driver by selecting device driver button 584 at step 250. From the IDA device driver window, a series of object instances and monitored items which describe the IDA device driver may be viewed by the network administrator at step 280. Monitored items include a total reads monitored item which provides a value representing the total number of reads accumulated by the IDA device driver for the logical drive, a total writes monitored item which provides a value representing the total number of writes accumulated by the IDA device driver for the selected logical drive, a corrected reads monitored item which shows the number of corrected reads as reported by the IDA controller for the selected logical drive, a corrected writes monitored item which shows the number of corrected writes as reported by the IDA controller for the selected logical drive, a fatal reads monitored item which shows the number of fatal reads as reported by the IDA controller for the selected logical drive, a fatal writes monitored item which shows the number of fatal writes as reported by the IDA controller for the selected logical drive, an array controller driver name, an array controller driver version, and volume info, which identifies the name of the NetWare volume and the segment number for that volume which maps to the selected logical drive.

Proceeding to step 282, a graphical window may be opened for either the total reads, total writes, corrected read, corrected writes, fatal reads or fatal writes monitored items by selecting a graph button associated with the monitored item, thereby enabling the network administrator to view the condition of the monitored item detail. After viewing the graphical window for the selected monitored item at step 284, the selected graphical window is closed at step 286 and the network administrator is returned to the IDA device driver detail window at step 280 where additional detail conditions for monitored items may be viewed. After the network administrator has completed viewing all desired detail conditions, the network administrator may close the IDA device driver window at step 282, thereby returning to the internal IDA logical drive GUI 556 at step 248 (FIG. 9D) where, if the network administrator has completed viewing of information accessible via the internal IDA logical drive GUI 556, close button 586 may be selected to close the internal IDA logical drive GUI 556 and return the network administrator to the disk storage GUI 546 at step 236 (FIG. 9C).

After completing the viewing of the single disks and the internal IDA logical drive, the network administrator may then view the external IDA logical drive from the disk storage GUI 546 by selecting the external intelligent disk array button 552 at step 238. Proceeding to step 308, an external IDA logical drive GUI (not shown) from which the physical map of the installed logical drives may be viewed is opened at step 308 (FIG. 9D). The external IDA logical drive GUI includes an information block which describes the condition of the logical drive, a physical drive map of the logical drive and logical drive buttons for selecting the logical drive to be described in the information block and mapped in the physical drive map. When opening the external IDA logical drive GUI, the primary logical drive is described in the information block and mapped in the physical drive map by default. Each logical drive button is surrounded by a border which is colored to indicate whether the drive is normal, degraded or failed. Accordingly, if primary and secondary controllers have been installed in the external IDA logical drive, the network administrator may select the logical drive to be viewed at step 310 and then return to step 308 where the selected logical drive will be displayed as part of the logical drive GUI.

Having selected the secondary logical drive or accepted the default primary logical drive for viewing, at step 308, the network administrator may then view the logical drive. Information displayed in the information block of the external IDA logical drive GUI for the selected logical drive are status, fault tolerance, autoreliability, rebuild blocks, spare drive bay and capacity. The spare drive bay is a monitored item which indicates which physical drives function as spares for the logical drive.

From the external IDA logical drive GUI displayed at step 308, the network administrator may also view the physical drive map for the selected logical drive. The physical drive map 564 identifies each physical drive mapped to the selected logical drive. Each physical drive is represented by a physical drive button configured to indicate whether the physical drive is mapped to the selected logical drive and how it is functioning, i.e. normal, degraded, failed, or not mapped to the selected logical drive.

From the physical drive map, the network administrator may select any of the physical drives for viewing at step 312 by depressing one of the physical drive buttons to open the physical drive window for the selected drive. Proceeding to step 314, from the physical drive window, the network administrator may view the following information: status, logical drive, thresholds exceeded, drive model, firmware version, sectors read, sectors written, hard read errors, hard write errors, service minutes, functional test 1, functional test 2 and functional test 3.

From the physical drive window displayed at step 312, the network administrator may opt to view additional information (or "details") regarding the selected physical drive or to view conditions for selected ones of the previously described items at step 314. More specifically, sectors read, sectors written, hard read errors, hard write errors, service minutes and functional tests 1–3 are items having a graphical window associated therewith which may be viewed at step 314 by selecting the graph button adjacent the selected item. After viewing the graphical window for the selected item at step 316, the network administrator closes the selected graphical window at step 318 and returns to the physical drive window at step 312.

Returning to step 314, the network administrator may also select to view additional details regarding the physical drive by selecting an advanced physical drive button displayed on the physical drive window, thereby opening an advanced physical drive window at step 320 in which additional details regarding the selected physical drive are displayed for viewing by the network administrator. Specifically, in addition to the status, logical drive and thresholds exceeded items displayed in the previously described physical drive window, the advanced physical drive window will display factory reallocation, POST error, used reallocation, recovered read error, recovered write error, not ready error, total seek, seek errors, DRQ timeout, other timeout, spinup time, spinup retries, failed recovery read, failed recovery write, reallocated aborts and format errors for viewing by the network administrator.

After viewing the advanced physical drive window at step 200, the network administrator may open a graphical window for any one of the used reallocation, recovery read errors, recovery write errors, not ready errors, total seeks, seek errors, DRQ timeouts, other timeouts, spinup time railed recovery reads, failed recovery writes, reallocation aborts or format errors monitored items by selecting a graph button corresponding to the respective monitored item at step 322 to open the graphical window. The network administrator may then view the opened graphical window for the selected monitored item at step 324. The graph window is then closed at step 326, thereby returning the network administrator to the open advanced physical drive window at step 320 where, proceeding again to step 322, another graphical window may be selected for viewing or the advanced physical drive window closed to return the network administrator to the open physical drive window at step 312 where, if all monitored items from the advanced physical drive window and all graphical windows corresponding to monitored items which may be viewed from the logical drive window for which viewing is desired, have been viewed, the physical drive window is then closed at step 314 to return to the external IDA logical drive GUI at step 308 (FIG. 9D).

In addition to viewing the logical drive and selecting the logical drive to be viewed, at step 310, the network administrator may also select an IDA controller or device driver for viewing. To view the IDA controller from the internal IDA logical drive, the network administrator would select the controller information button to open the IDA controller window. By selecting the controller information button at step 310, the IDA controller window is opened and the IDA controller may be viewed at step 328. From the IDA controller window, selected information regarding the IDA controller may be viewed. This information includes model, drive array controller firmware revision, drive array controller BMIC interface, drive array controller standard interface and drive array controller slot object instances. After viewing the IDA controller, the IDA controller window may be closed at step 330 to return to the external IDA logical drive GUI at step 308 (FIG. 9D).

Again proceeding from the external IDA logical drive GUI, the network administrator may also open an IDA device driver window to view the IDA device driver by selecting device driver button at step 310. From the IDA device driver window, a series of object instances and monitored items which describe the IDA device driver may be viewed by the network administrator at step 332. Monitored items include total reads, total writes, corrected reads, corrected writes, fatal reads and fatal writes monitored items. Also displayed are an array controller driver name, an array controller driver version, and volume info, which identifies the name of the NetWare volume and the segment number for that volume which maps to the selected logical drive.

Proceeding to step 334, a graphical window may be opened for either the total reads, total writes, corrected read, corrected writes, fatal reads or fatal writes monitored items by selecting a graph button associated with the monitored item, thereby enabling the network administrator to view the condition of the monitored item detail. After viewing the graphical window for the selected monitored item at step 336, the selected graphical window is closed at step 338 and the network administrator is returned to the IDA device driver detail window at step 332 where additional detail conditions for monitored items may be viewed. After the network administrator has completed viewing all desired detail conditions, the network administrator may close the IDA device driver window at step 334, thereby returning to the external IDA logical drive GUI at step 308 (FIG. 9D).

Again proceeding from the external IDA logical drive GUI, the network administrator may also open a spare drive window to view the spare driver by selecting a spare drive button at step 310. From the spare drive window, a series of monitored items which describe the spare drive, its status and the number of the physical drive it is replacing, if any, may be viewed by the network administrator at step 340. Monitored items include a logical drive spare drive bay, which indicates which physical drives function as spares for this logical drives, a status, which indicates the status of the on-line spare drive, a replaced drive bay, which identifies the failed physical drive by its bay number, and a rebuild blocks left, which indicates how many blocks of data remain to be built on the spare before the spare begins operating in place of a failed physical drive. The status of the on-line spare drive may either be building, indicating that a physical drive has failed and that automatic data recovery is in progress to recover data to the on-line spare, active, indicating that a physical drive has failed, automatic data recovery is complete and the system is using the on-line spare as a replacement for the failed drive, failed, indicating that the on-line spare has failed and is no longer available for use and inactive, indicating that the monitored system has an on-line spare configured, but that the spare is not currently in use. Finally, a spare drive bay number which indicates the bay location where the spare drive has been installed is also visible from the spare drive window.

After viewing the spare drive window at step 340, the window is closed at step 342 and the network administrator is returned to the external IDA logical drive GUI at step 308 (FIG. 9D) where, if the network administrator has completed viewing of information accessible via the external IDA logical drive GUI, a close button may be selected at step 310 to close the external IDA logical drive GUI and return the network administrator to the disk storage GUI 546 at step 236 (FIG. 9C) and where, if the network administrator has completed viewing information accessible via the disk storage GUI 546, close button 554 may be selected to close the disk storage GUI 546 and return the network administrator to the selected server GUI 512 at step 212 (FIG. 9A).

Proceeding again from the selected server GUI 512 displayed at step 212, if the network administrator selects the system board subsystem button 522 at step 214, the system board window is opened at step 288 (FIG. 9C) so that the network administrator may view information regarding the system board for the selected file server. The system board window (not shown) displays information regarding the processors and coprocessors installed in the selected file server. More specifically, the system board window displays the type of file server, the processor name, the coprocessor type and speed and the firmware version for the selected file server. The system board window also indicates whether an EISA bus is present for the selected file server, which slots of the file server have an expansion board installed therein, the amount of memory directly accessible by MS-DOS, the total amount of memory available and the serial number of the system board. Finally, the system board window displays includes two monitored items—I/O check and memory parity—both of which are valid if the server manager 24 is installed on the selected file server. The I/O check monitored item monitors all expansion boards installed in the selected file server that may produce I/O check errors and displays the total number of I/O check errors produced by the file server. The memory parity monitored item monitors the occurrence of memory parity errors, i.e. the value of bits in each byte transferred during a read or write operation does not match the expected value.

Proceeding to step 290, a graphical window may be opened for either the I/O check or the memory parity monitored items by selecting a graph button associated with the monitored item, thereby enabling the network administrator to view the condition of the monitored item detail. After viewing the graphical window for the selected monitored item at step 292, the selected graphical window is closed at step 294 and the network administrator is returned to the system board window at step 288. After completing the viewing of the system board window, the network administrator closes the window at step 290 and returns to the selected server GUI 512 at step 212 (FIG. 9A).

Proceeding again from the selected server GUI 512 displayed at step 212, if the network administrator selects the expansion boards subsystem button 524 at step 214, the expansion boards window is opened at step 296 (FIG. 9B) so that the network administrator may view information regarding the expansion boards installed in the selected file server. The expansion boards window (not shown) displays a list of installed expansion boards, their name, ID, slot number and the amount of system resources used by each board.

Proceeding to step 298, specific information regarding a particular one of the installed expansion boards installed in a slot on the expansion bus may be viewed at step 300 by highlighting a specific expansion board and depressing a view button provided on the expansion boards window. In addition to the above-listed information regarding the selected expansion board which is displayed by the expansion boards window, it is further contemplated that, if the selected expansion board is a server manager board or an intelligent drive array, information regarding the server manager subsystem or the disk storage subsystem, respectively, may be viewed by selecting a "more info" button.

After viewing the selected expansion board, the network administrator may close the view of the selected expansion board at step 302 and return to step 298 where the network administrator may select a system resources button to view information regarding the resources in use by the system at step 304. After viewing information regarding the resources in use by the system, the network administrator may close the system resources view at step 306 and return to the expansion boards window at step 298. After completing the viewing of the expansion boards window, the network administrator closes the window at step 298 and returns to the selected server GUI 512 at step 212 (FIG. 9A).

Again proceeding from the selected server GUI 512 displayed at step 212, if the network administrator selects the server manager subsystem button 526 at step 214, the server manager subsystem window is opened at step 344 (FIG. 9C) so that the network administrator may view information regarding the server manager for the selected file server. The physical configuration of a server manager was described in detail in co-pending U.S. patent application Ser. No. 07/720,259, filed Jun. 21, 1991 and issued Nov. 22, 1994 as U.S. Pat. No. 5,367,670, entitled "Computer System Manager" and previously incorporated by reference as if reproduced in its entirety.

From the server manager window (not shown), information regarding the board name, ID, ROM date, battery status, self test result, alert status, percent object space available, innate monitoring, async remote session, dial-back status, asynchronous settings and alert destinations may be viewed. The server manager board name monitored item lists the board name. The server manager board ID monitored item lists the server manager board ID. The server manager ROM date monitored item may be used to identify the particular revision of the server manager board firmware. The server manager battery status monitored item will identify whether the battery used to power the server manager board when system power is unavailable and must be enabled to prevent loss of server manager data in the event of power loss to the monitored system. The self test code error monitored item displays whether the sever manager board has experienced an error. The alert status monitored item identifies whether the server manager alert capability is enabled. If alert status is disabled, the monitored server cannot deliver any pending or new alerts to the server manager. The object space available monitored item displays the percentage of space available on the server manager board. This enables the user to determine whether there is enough space to create more objects or items. The innate monitoring status monitored item indicates whether the server manager is innately monitoring objects such as temperature, input/output check and power without input from the operating system. Enabled indicates that innate monitoring is active while disabled indicates that innate monitoring is not active. The async remote status monitored item indicates whether asynchronous communications between the server manager and the modem is enabled or disabled. If disabled, all remote alerting capability is disabled. The dial-back status monitored item lists the status of the server manager's dial back security feature. If enabled, the server manager will hang up and check the number of a caller before allowing the caller to view system data. If the number is valid, the server manager will then re-establish the connection.

If the self test error code indicates that the server manager has passed, no server manager errors have occurred. The self test error code can also display the following errors: ROM Checksum failed, RAM test failed and 80186 timer failed. Each of these errors indicates the need for immediate board service. In addition, the self test error code can display failures with the built-in modem, which indicates that the board will function but that functions requiring the modem such as off-the-network alerting will not occur, direct connect interface failures, which indicates that the server manager will continue operating but that functions requiring direct connection such as off-the-network alerting will not occur, real-time clock failures, which indicates that the server manager will require service as soon as possible, temperature and voltage sensor, which indicates that the server manager will continue operating but will be unable to provide correct information regarding temperature and voltage items, DTMF failures, which indicates that the server manager will continue operating but will be unable to process voice alerts, VSL failures, which indicates that the server manager will require service as soon as possible, or host bus monitor failures, which indicates that the server manager will continue to operate but that no information regarding items monitored by the host bus monitor such as keyboard items will be available, BMIC failures, which indicates that the board is operable but cannot communicate with the monitored system's operating system's drivers and battery is broken, which indicates the absence of any backup power source in case of power failure.

Finally, the server manager window also includes an asynchronous settings box which displays the current settings of the asynchronous ports, both mode and serial port, of the server manager and an alert destinations box which displays the alert destination list for the server manager. In the event of an alert, the server manager will attempt to deliver notification to the destinations on the alert destination list.

After viewing the server manager window at step 344, the network administrator may proceed to step 346 where a device driver window (not shown) may be opened from the server manager window by selecting a device driver button. The device drive window displays information regarding driver name, driver version, driver date, watchdog frequency and board resets monitored items. The driver name monitored item identifies the driver for the server manager. The driver date monitored item identifies the date of the driver for the server manager. The driver version monitored item identifies the version of the driver for the server manager. The watchdog frequency monitored item specifies the watchdog interval in minutes. The board reset monitored item indicates the number of times that the server manager performed a board reset.

Proceeding to step 348, the network administrator views the device driver for the server manager and, continuing on to step 350, the device driver is closed and the network administrator is returned to the server manager window at step 344. If the network administrator has completed viewing the server manager and device driver windows, the server manager window is closed at step 346, thereby returning the network administrator to the selected server GUI 512 at step 212 (FIG. 9A).

Proceeding again from the selected server GUI 512 displayed at step 212, if the network administrator selects the I/O ports subsystem button 528 at step 214, the I/O ports window (not shown) is opened at step 352 (FIG. 9B) so that the network administrator may view information regarding the I/O port addresses, keyboard type and other port configuration information. More specifically, the I/O ports window displays a serial port I/O address, a parallel port I/O address, a keyboard type, for example, a 101 key enhanced keyboard, a video type, for example, EGA or VGA, and a pointing device monitored item which indicates if the mouse port is enabled.

By selecting a "stats" button at step 354, an I/O port statistics window is opened at step 356. The I/O port statistics window displays the following monitored items: carrier detect, which indicates whether a link between the serial device attached to a serial port on a monitored system and another serial device occurs, LPTx status, which indicates the status of the printer port, overrun errors, which indicate the number of overrun errors produced by the device connected to a serial port on a monitored system, parity errors, which indicates the number of parity errors produced by the device attached to a serial port on a monitored system and framing errors, which indicates the number of framing errors produced by the device attached to a serial port on a monitored system.

Proceeding to step 358, a graphical window may be opened for either the overrun errors, parity errors or framing errors monitored items by selecting a graph button associated with the monitored item, thereby enabling the network administrator to view the condition of the statistic. After viewing the graphical window for the selected statistic at step 360, the selected graphical window is closed at step 362 and the network administrator is returned to the I/O ports statistics window at step 356. After completing the viewing of the I/O ports statistics window, the network administrator closes the window at step 358 and returns to the I/O ports window at step 352 and, after completing the viewing of the I/O ports window, the network administrator closes the window at step 354 and returns to the selected server GUI 512 at step 212 (FIG. 9A).

Having view all of the server subsystems accessible via the selected server GUI 512, the network administrator closes the selected server GUI at step 214 by selecting a close button 530, thereby returning to the server list GUI 500 at step 202. Proceeding again to step 204, the network administrator may now select a control feature option by selecting one of the control feature buttons 588, 590, 592, 594 or 596. Proceeding now to step 364, if the server list button 588 is selected, the network administrator returns to the server list GUI 500 at step 202. If the reports button 590 is selected, a report control window is opened at step 366. Proceeding to step 368, the format of reports to be generated may be modified by selecting various report control buttons. Once the desired report format has been selected, the report control window may be closed at step 368. If the print queue button 592 is selected at step 364, a print queue control window is opened at step 370 and the print queue listed. Proceeding to step 372, the print queue may be controlled, for example, by deleting a print job. After the print queue has been modified as desired, the print queue window is closed at step 372.

If the alert log button 594 is selected at step 364, an alert log window 598 is opened at step 374. The alert log window includes an alert log 600 which displays a record of alerts sent to the management console 12. The alert log 600 provides information on the date and time the alert was received, the name of the file server that produced the alert and the item that produced the alert. Further details regarding the alert may be displayed by highlighting an alert and selecting alert detail button 602. The alert detail window displays specific details on the alert such as the severity and threshold value of the alert. After viewing the alert log 600, the alert log window may be closed by selecting close button 604 at step 376.

If the server manager facility (or "SMF") button 596 is selected at step 364, the server manager facility is launched at step 378. Once launched, the server manager may be operated at step 380 and closed at step 382.

Thus, there has been described and illustrated herein a computer management system having plural instrumentation agents for querying manageable devices to collect object data, an associated enterprise MIB for storing object data in accordance with a specified MIB architecture and a GUI for managing the manageable devices using the enterprise MIB. However, those skilled in the art will recognize that many modifications and variations besides those specifically mentioned may be made in the techniques described herein without departing substantially from the concept of the present invention. Accordingly, it should be clearly understood that the form of the invention described herein is exemplary only and is not intended as a limitation on the scope of the invention.

What is claimed is:

1. A method for managing from a management console, a plurality of file servers networked thereto, each said file server having at least one manageable device associated therewith, comprising the steps of:

displaying, at said management console, a list of said networked file servers;

selecting, from a list of said networked file servers, a file server to be managed;

displaying a plurality of subsystems for said selected file server;

selecting, from said plurality of displayed subsystems, a subsystem to be viewed;

selectively viewing management information which describes said selected subsystem; and modifying the operation of said selected file server based upon said viewed management information wherein said subsystems for each said file server include a first subsystem which contains management information for a first manageable device associated with said file server and a second subsystem which contains management information for said file server.

2. A method for managing a plurality of file servers according to claim 1 and further comprising the steps of:

receiving, at said management console, an alert notification;

accessing an alert log from said management console;

viewing, in said alert log, details of an alert causing said alert notification;

wherein the selection of said file server subsystem management information to be viewed is based upon said viewed alert details.

3. A method for managing a plurality of file servers according to claim 2 wherein said subsystems for each said file server include a fourth subsystem which contains environmental information for said file server acquired by said second manageable device.

4. A method for managing a plurality of file servers according to claim 1 wherein said subsystems for each said file server include a third subsystem which contains management information for said first manageable device acquired by a second manageable device associated with said file server.

5. For a management information base (MIB) containing management information for a file server having at least one manageable device associated therewith and from which management information is acquired therefrom, said file server further including a server manager for collecting management information for a first one of said at least one manageable device and said MIB information including said management information collected by said server manager, a management system comprising:

means for arranging a first portion of said MIB information into a first subsystem containing management information describing a first manageable device associated with said file server;

means for arranging a second portion of said MIB information into a second subsystem containing management information for said file server;

means for arranging a third portion of said MIB information into a third subsystem which contains management information acquired by said server manager for said first one of said at least one manageable devices; and means for selectively accessing said MIB information for each of said first, second and third subsystems.

6. A management system according to claim 1 wherein said management system further comprises means for arranging a fourth portion of said MIB information into a fourth subsystem which contains management information acquired by said server manager for said first one of said at least one manageable devices and management information for said file server.

7. A management system according to claim 5 wherein said at least one manageable device associated with said file server further comprises a system board associated therewith and wherein said means for arranging a first portion of said MIB information into a first subsystem which contains management information describing a first manageable device associated with said file server further comprises means for arranging said first portion of said MIB information into a system board subsystem which contains said management information from said first portion which describes said system board.

8. A management system according to claim 7 wherein said at least one manageable device associated with said file server further comprises an expansion board associated therewith and wherein said means for arranging a first portion of said MIB information into a first subsystem which contains management information describing a first manageable device associated with said file server further comprises means for arranging said first portion of said MIB information into an expansion boards subsystem which contains said management information from said first portion which describes said expansion board.

9. A management system according to claim 7 wherein said at least one manageable device associated with said file server further comprises a disk storage system associated therewith and wherein said means for arranging a first portion of said MIB information into a first subsystem which corresponds to a first manageable device associated with said file server further comprises means for arranging said first portion of said MIB information into a disk storage subsystem which contains said management information from said first portion which describes said disk storage system.

10. A management system according to claim 7 wherein said means for arranging a second portion of said MIB information into a second subsystem which contains management information for said file server further comprises means for arranging said second portion of said MIB information into a configuration subsystem which contains said management information from said second portion which describes the configuration of said file server.

11. A management system according to claim 10 wherein said means for arranging a second portion of said MIB information into a second subsystem which contains management information describing said file server further comprises means for arranging said second portion of said MIB information into a security configuration subsystem which contains said management information describing the security configuration of said file server.

12. A management system according to claim 7 wherein said file server further comprises a server manager associated therewith for collecting management information for said system board, said MIB information including said management information collected by said server manager, and wherein said means for arranging said MIB information for said at least one manageable device associated with said file server into at least one subsystem further comprises:

means for arranging a third portion of said MIB information into a third subsystem which contains management information acquired by said server manager for said first one of said at least one manageable devices;

wherein at least part of said second portion of said MIB information arranged in said second subsystem which contains management information for said file server is acquired by said server manager.

13. A management system according to claim 12 wherein said means for arranging a second portion of said MIB information into a second subsystem which contains management information describing said file server and at least partially acquired by said server manager further comprises means for arranging said second portion of said MIB information into an environment subsystem which contains said management information related to internal temperature and voltage of said file server, said management information related to internal temperature and voltage being acquired by said server manager.

14. A management system according to claim 12 wherein said means for arranging a second portion of said MIB information into a second subsystem which contains management information describing said file server and at least partially acquired by said server manager further comprises means for arranging said second portion of said MIB information into an input/output (I/O) ports subsystem which contains said management information related to I/O ports of said file server, said management information related to said I/O ports being partially acquired by said server manager.

15. For a management information base (MIB) containing management information for a file server having at least one manageable device associated therewith from which said management information is acquired therefrom, said manageable devices associated therewith including a system board, an expansion board, a disk storage system and a server manager, said server manager configured to collect management information from said system board, a management system comprising:

means for arranging a first portion of said MIB information containing management information describing said system board into a first, manageable device specific, subsystem;

means for arranging a second portion of said MIB information containing management information describing said expansion board into a second, manageable device specific, subsystem;

means for arranging a third portion of said MIB information containing management information describing said disk storage system into a third, manageable device specific, subsystem;

means for arranging a fourth portion of said MIB information containing management information describing configuration of said file server into a fourth, non-manageable device specific, subsystem;

means for arranging a fifth portion of said MIB information containing management information describing security configuration for said file server into a fifth, non-manageable device specific, subsystem;

means for arranging a sixth portion of said MIB information containing management information describing said server manager into a sixth, manageable device specific, subsystem;

means for arranging a seventh portion of said MIB information containing management information describing input/output (I/O) ports of said file server into a seventh, non-manageable device specific, subsystem;

means for arranging an eighth portion of said MIB information containing management information describing internal environmental conditions of said file server into an eighth, non-manageable device specific, subsystem; and means for selectively accessing said MIB information for each of said first, second, third, fourth, fifth, sixth, seventh and eighth subsystems.

16. A management system according to claim 15 wherein said eighth subsystem containing said non-manageable device specific management information describing internal environmental conditions of said file server is comprised of information collected by said server manager from said system board.

17. A management system according to claim 16 wherein said seventh subsystem containing said non-manageable device specific MIB information describing said I/O ports is comprised of information acquired from said manageable devices and information collected by said server manager from said system board.

18. A management system according to claim 17 wherein said fourth subsystem containing said non-manageable device specific information describing configuration of said file server is comprised of a combination of information available from said remaining subsystems and information uniquely provided to said fourth subsystem.

19. For a management information base (MIB) containing management information describing a plurality of networked file servers, each having a plurality of manageable devices associated therewith and described by said management information contained in said MIB, a management system comprising:

means for selectively accessing said MIB information describing each of said plurality of file servers; and means for selectively accessing said MIB information describing each of said plurality of manageable devices associated with said selected file server;

wherein said plurality of manageable devices associated with each of said file servers further comprises a system board and a server manager for acquiring management information related to the operation of said system board; and wherein said means for selectively accessing said MIB information describing each of said plurality of manageable devices associated with said selected file server further comprises means for selectively accessing MIB information describing said system board associated with said selected file server and means for selectively accessing said MIB information acquired by said server manager for said system board.

20. A management system according to claim 19 wherein each of said system boards further comprises at least one processor and/or coprocessor and wherein said means for selectively accessing said MIB information describing said system board associated with said selected file server further comprises means for selectively accessing said MIB information describing each of said processors and/or coprocessors of said selected system board.

21. A management system according to claim 19 wherein said plurality of manageable devices associated with each of said file servers further comprises an expansion board and wherein said means for selectively accessing said MIB information describing each of said plurality of manageable devices associated with said selected file server further comprises means for selectively accessing said MIB information describing said expansion board associated with said selected file server.

22. A management system according to claim 19 wherein said plurality of manageable devices associated with each of said file servers further comprises a disk storage system and wherein said means for selectively accessing said MIB information describing each of said plurality of manageable devices associated with said selected file server further comprises means for selectively accessing said MIB information describing said disk storage system associated with said selected file server.

23. A management system according to claim 22 wherein each of said disk storage systems further comprise at least one hard disk drive, internal intelligent disk array and/or external intelligent disk array and wherein said means for selectively accessing said MIB information describing said disk storage system associated with said selected file server further comprises means for selectively accessing said MIB information describing each of said hard disk drive, internal intelligent disk array and/or external intelligent disk arrays of said selected disk storage system.

24. A management system according to claim 23 wherein said means for selectively accessing said MIB information describing each of said hard disk drive, internal intelligent disk array and/or external intelligent disk arrays for said selected disk storage system further comprises:

means for accessing a physical drive map for each of said internal intelligent disk arrays; and means for accessing a physical drive map for each of said external intelligent disk arrays.

25. A management system according to claim 24 wherein said means for accessing a physical drive map for each of said internal intelligent disk arrays further comprises:

means for determining, from said physical drive map for said selected internal intelligent disk array, statuses of logical drives mapped to said selected internal intelligent disk array; and means for accessing, from said physical drive map for said selected internal intelligent disk array, information related to said statuses of said logical drives mapped to said selected internal intelligent disk array.

26. A management system according to claim 25 wherein said means for accessing a physical drive map for each of said external intelligent disk arrays further comprises:

means for determining, from said physical drive map for said selected external intelligent disk array, statuses of logical drives mapped to said selected internal intelligent disk array; and means for accessing, from said physical drive map, information related to said statuses of said logical drives mapped to said selected external intelligent disk array.

27. A management system according to claim 19 wherein said server manager monitors said system board to acquire management information therefrom in the form of objects, performs object management on said acquired management information and generates alerts based on said performed object management and wherein said means for selectively accessing said MIB information describing said server manager subsystem for said selected file server further comprises means for selectively accessing management information regarding innate monitoring status, object space and alert status for said server manager.

28. A management system according to claim 27 wherein said file server further comprises a plurality of input/output (I/O) ports for coupling peripheral devices thereto and wherein said means for selectively accessing said MIB information describing each of said plurality of manageable devices associated with said selected file server further comprises means for selectively accessing said MIB information describing said I/O ports for said selected file server.

29. A management system according to claim 28 wherein said means for selectively accessing said MIB information describing said I/O ports for said selected file server further comprises means for accessing management information acquired by said server manager which describes said I/O ports.

30. A management system according to claim 27 wherein said means for selectively accessing said MIB information for each of said plurality of manageable devices associated with said selected file server further comprises means for selectively accessing said MIB information which describes environmental conditions for said selected file server.

31. A management system according to claim 30 wherein said means for selectively accessing said MIB information which describes environmental conditions for said selected file server further comprises means for accessing management information acquired by said server manager which describes environmental conditions for said file server.

32. A management system according to claim 31 wherein said means for accessing management information acquired by said server manager which describes said environment subsystem for said file server further comprises means for accessing a graphical analysis of the internal temperature and voltage of said selected file server.

* * * * *

UNITED STATES PATENT AND TRADEMARK OFFICE
CERTIFICATE OF CORRECTION

PATENT NO. : 5,559,958
DATED : September 24, 1996
INVENTOR(S) : Farrand et al.

It is certified that error appears in the above-indentified patent and that said Letters Patent is hereby corrected as shown below:

Claims 1 - 4 should be deleted.

Column 214, line 5, "claim 1" should be --claim 5--.

Signed and Sealed this

Second Day of June, 1998

Attest:

BRUCE LEHMAN

Attesting Officer

*Commissioner of Patents and Trademarks*